(12) United States Patent
Takahashi et al.

(10) Patent No.: US 11,670,988 B2
(45) Date of Patent: Jun. 6, 2023

(54) ROTATING ELECTRICAL MACHINE

(71) Applicant: DENSO CORPORATION, Kariya (JP)

(72) Inventors: Yuki Takahashi, Kariya (JP); Makoto Taniguchi, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 17/481,494

(22) Filed: Sep. 22, 2021

(65) Prior Publication Data
US 2022/0014074 A1    Jan. 13, 2022

Related U.S. Application Data

(60) Division of application No. 16/748,195, filed on Jan. 21, 2020, now Pat. No. 11,374,465, which is a
(Continued)

(30) Foreign Application Priority Data

Jul. 21, 2017 (JP) .............................. JP2017-142223
Jul. 21, 2017 (JP) .............................. JP2017-142224
(Continued)

(51) Int. Cl.
*H02K 3/28* (2006.01)
*H02K 9/22* (2006.01)
(Continued)

(52) U.S. Cl.
CPC ................. *H02K 9/22* (2013.01); *H02K 1/28* (2013.01); *H02K 5/18* (2013.01)

(58) Field of Classification Search
CPC .. H02K 9/22; H02K 1/28; H02K 5/18; H02K 1/2766; H02K 3/02; H02K 2201/03;
(Continued)

(56) References Cited

U.S. PATENT DOCUMENTS

| 4,463,276 A | 7/1984 | Nakamura |
| 5,128,574 A | 7/1992 | Koizumi et al. |

(Continued)

FOREIGN PATENT DOCUMENTS

| CA | 2659088 A1 | 1/2008 |
| CN | 85103498 A | 11/1986 |

(Continued)

OTHER PUBLICATIONS

Feb. 2, 2022 Notice of Allowance Issued In U.S. Appl. No. 16/748,195.

(Continued)

*Primary Examiner* — Thomas Truong
(74) *Attorney, Agent, or Firm* — Oliff PLC

(57) ABSTRACT

A rotating electrical machine includes a rotor and a magnet unit. The rotating electrical machine also includes a cylindrical stator and a housing. The stator is equipped with a stator winding made up of a plurality of phase windings. The stator is arranged coaxially with the rotor and faces the rotor. The housing has the rotor and the stator disposed therein. The rotor includes a cylindrical magnet retainer to which the magnet unit is secured and an intermediate portion which connects between a rotating shaft of the rotor and the magnet retainer and extends in a radial direction of the rotating shaft. A first region located radially inside an inner peripheral surface of a magnetic circuit component made up of the stator and the rotor is greater in volume than a second region between the inner peripheral surface of the magnetic circuit component and the housing in the radial direction.

15 Claims, 49 Drawing Sheets

Related U.S. Application Data continuation of application No. PCT/JP2018/027408, filed on Jul. 20, 2018.

(30) Foreign Application Priority Data

| | | |
|---|---|---|
| Jul. 21, 2017 | (JP) | JP2017-142225 |
| Jul. 21, 2017 | (JP) | JP2017-142226 |
| Jul. 21, 2017 | (JP) | JP2017-142227 |
| Jul. 21, 2017 | (JP) | JP2017-142228 |
| Dec. 28, 2017 | (JP) | JP2017-255048 |
| Dec. 28, 2017 | (JP) | JP2017-255049 |
| Dec. 28, 2017 | (JP) | JP2017-255050 |
| Dec. 28, 2017 | (JP) | JP2017-255051 |
| Dec. 28, 2017 | (JP) | JP2017-255052 |
| Dec. 28, 2017 | (JP) | JP2017-255053 |

(51) Int. Cl.
  *H02K 1/28* (2006.01)
  *H02K 5/18* (2006.01)

(58) Field of Classification Search
  CPC .......... H02K 1/2792; H02K 3/28; H02K 3/46; H02K 5/203; H02K 9/197; H02K 17/165; H02K 21/044; H02K 21/24; H02K 11/0094; H02K 2213/03; H02K 3/04; H02K 21/14; H02K 21/22; H02K 1/2786; H02K 1/187; H02K 1/20; H02K 1/274; H02K 1/30; H02K 3/345; H02K 5/04; H02K 21/145
  See application file for complete search history.

(56) References Cited

U.S. PATENT DOCUMENTS

| | | | |
|---|---|---|---|
| 5,478,222 | A | 12/1995 | Heidelberg et al. |
| 5,637,048 | A | 6/1997 | Maeda et al. |
| 5,723,933 | A | 3/1998 | Grundl et al. |
| 5,759,128 | A | 6/1998 | Mizutani et al. |
| 5,787,567 | A | 8/1998 | Miyazaki |
| 5,821,653 | A | 10/1998 | Kinto et al. |
| 5,880,544 | A | 3/1999 | Ikeda et al. |
| 6,501,205 | B1 | 12/2002 | Asao et al. |
| 6,700,236 | B2 | 3/2004 | Umeda et al. |
| 6,717,315 | B1 | 4/2004 | Tajima et al. |
| 6,770,999 | B2 | 8/2004 | Sakurai |
| 6,812,615 | B1 | 11/2004 | Ettridge |
| 6,882,077 | B2 | 4/2005 | Neet |
| 6,914,356 | B2 | 7/2005 | Yamamura et al. |
| 7,402,934 | B1 | 7/2008 | Gabrys |
| 7,902,707 | B2 | 3/2011 | Kawamura et al. |
| 8,446,060 | B1 | 5/2013 | Lugg |
| 8,552,678 | B2 | 10/2013 | Yuuki et al. |
| 8,766,468 | B1 | 7/2014 | Rilla et al. |
| 8,823,238 | B2 | 9/2014 | Greaves et al. |
| 9,172,280 | B2 | 10/2015 | Koga |
| 9,255,633 | B2 | 2/2016 | Markl |
| 9,595,851 | B2 | 3/2017 | Hazeyama et al. |
| 10,404,120 | B2 | 9/2019 | Ishizuka et al. |
| 11,110,793 | B2 | 9/2021 | Takahashi et al. |
| 2002/0050395 | A1 | 5/2002 | Kusumoto et al. |
| 2002/0180294 | A1 | 12/2002 | Kaneda et al. |
| 2004/0090130 | A1 | 5/2004 | Kaneko et al. |
| 2004/0119362 | A1 | 6/2004 | Neet |
| 2004/0128331 | A1 | 7/2004 | Hinds et al. |
| 2004/0263016 | A1 | 12/2004 | Neet |
| 2005/0134134 | A1 | 6/2005 | Mori et al. |
| 2006/0017345 | A1 | 1/2006 | Uchida et al. |
| 2006/0113857 | A1 | 6/2006 | Honkura et al. |
| 2006/0138879 | A1 | 6/2006 | Kusase |
| 2006/0197397 | A1 | 9/2006 | Takahashi et al. |
| 2008/0073992 | A1 | 3/2008 | Kusama |
| 2008/0093944 | A1 | 4/2008 | Takahashi et al. |
| 2008/0218007 | A1 | 9/2008 | Masuzawa et al. |
| 2009/0079277 | A1 | 3/2009 | Nakamura et al. |
| 2009/0230353 | A1 | 9/2009 | Shimazu et al. |
| 2009/0251023 | A1 | 10/2009 | Nakano et al. |
| 2009/0267441 | A1 | 10/2009 | Hiramatsu et al. |
| 2010/0007230 | A1 | 1/2010 | Suzuki et al. |
| 2010/0117481 | A1 | 5/2010 | Greaves et al. |
| 2010/0123426 | A1 | 5/2010 | Nashiki et al. |
| 2010/0181858 | A1 | 7/2010 | Hibbs |
| 2010/0194231 | A1 | 8/2010 | Rippel et al. |
| 2011/0012440 | A1 | 1/2011 | Toyota et al. |
| 2011/0057533 | A1 | 3/2011 | Murakami et al. |
| 2011/0210558 | A1 | 9/2011 | Stiesdal |
| 2011/0285243 | A1 | 11/2011 | Taniguchi |
| 2011/0304236 | A1 | 12/2011 | Nishiyama et al. |
| 2012/0001521 | A1 | 1/2012 | Shiraki et al. |
| 2012/0038168 | A1 | 2/2012 | Morishita et al. |
| 2012/0181891 | A1 | 7/2012 | Yamada et al. |
| 2012/0293035 | A1 | 11/2012 | Nakamura et al. |
| 2012/0306310 | A1 | 12/2012 | Takeuchi et al. |
| 2012/0319507 | A1 | 12/2012 | Ueno et al. |
| 2013/0082560 | A1 | 4/2013 | Takeuchi et al. |
| 2013/0106238 | A1 | 5/2013 | Saiki et al. |
| 2013/0127289 | A1 | 5/2013 | Koga |
| 2013/0249339 | A1 | 9/2013 | Makino et al. |
| 2013/0300241 | A1 | 11/2013 | Wedman et al. |
| 2013/0334991 | A1 | 12/2013 | Yuuki et al. |
| 2014/0084731 | A1 | 3/2014 | Iwami et al. |
| 2014/0125182 | A1 | 5/2014 | Takahashi |
| 2014/0174856 | A1 | 6/2014 | Takagi et al. |
| 2014/0197709 | A1 | 7/2014 | Hasegawa |
| 2014/0312718 | A1 | 10/2014 | Li et al. |
| 2015/0028708 | A1 | 1/2015 | Matsuoka |
| 2015/0089794 | A1 | 4/2015 | Dokonal et al. |
| 2015/0097453 | A1 | 4/2015 | Nishikawa et al. |
| 2015/0129711 | A1 | 5/2015 | Caubel |
| 2015/0171682 | A1 | 6/2015 | Fujisawa et al. |
| 2015/0171683 | A1 | 6/2015 | Kim et al. |
| 2015/0236556 | A1 | 8/2015 | Suwazono et al. |
| 2015/0340915 | A1 | 11/2015 | Kato et al. |
| 2016/0049835 | A1 | 2/2016 | Fukumoto et al. |
| 2016/0102705 | A1 | 4/2016 | Mei |
| 2016/0126871 | A1 | 5/2016 | Uematsu |
| 2016/0149454 | A1 | 5/2016 | Haga et al. |
| 2016/0204728 | A1 | 7/2016 | Notohara et al. |
| 2016/0211707 | A1 | 7/2016 | Yamada et al. |
| 2016/0277397 | A1 | 9/2016 | Watanabe |
| 2016/0315508 | A1 | 10/2016 | Li et al. |
| 2017/0085143 | A1 | 3/2017 | Tanaka et al. |
| 2017/0093257 | A1 | 3/2017 | Hirata et al. |
| 2017/0098969 | A1 | 4/2017 | Fukumoto et al. |
| 2017/0162311 | A1 | 6/2017 | Shimbo et al. |
| 2017/0187258 | A1 | 6/2017 | Fujikawa et al. |
| 2017/0222583 | A1 | 8/2017 | Akimatsu et al. |
| 2017/0237310 | A1* | 8/2017 | Nakamura ............... H02K 3/02 310/195 |
| 2017/0271941 | A1 | 9/2017 | Kaneko et al. |
| 2017/0271945 | A1 | 9/2017 | Germann et al. |
| 2017/0288489 | A1* | 10/2017 | Shiraki ................... H02K 9/02 |
| 2017/0353071 | A1 | 12/2017 | Saito et al. |
| 2017/0353131 | A1 | 12/2017 | Usagawa et al. |
| 2018/0056329 | A1 | 3/2018 | Akanuma et al. |
| 2018/0062471 | A1 | 3/2018 | Shiraki et al. |
| 2018/0108464 | A1 | 4/2018 | Fujikawa et al. |
| 2018/0262091 | A1 | 9/2018 | Gieras et al. |
| 2018/0269733 | A1 | 9/2018 | Mikami et al. |
| 2018/0287445 | A1 | 10/2018 | Ishizuka et al. |
| 2018/0323673 | A1 | 11/2018 | Shiraki et al. |
| 2018/0336981 | A1 | 11/2018 | Fujihara et al. |
| 2018/0358846 | A1 | 12/2018 | Baba et al. |
| 2019/0097509 | A1 | 3/2019 | Oguchi et al. |
| 2019/0157954 | A1 | 5/2019 | Takahashi et al. |
| 2019/0341828 | A1 | 11/2019 | Calverley et al. |
| 2019/0379252 | A1 | 12/2019 | Taniguchi et al. |
| 2020/0021222 | A1 | 1/2020 | Nigo |
| 2020/0161939 | A1 | 5/2020 | Takahashi et al. |

(56) References Cited

U.S. PATENT DOCUMENTS

2020/0162003 A1 5/2020 Takahashi et al.
2020/0244119 A1 7/2020 Morishita

FOREIGN PATENT DOCUMENTS

| | | |
|---|---|---|
| CN | 1761130 A | 4/2006 |
| CN | 102684326 A | 9/2012 |
| CN | 105305756 A | 2/2016 |
| CN | 104578462 B | 7/2017 |
| CN | 107104623 A | 8/2017 |
| EP | 0668651 A1 | 8/1995 |
| EP | 2136467 A1 | 12/2009 |
| FR | 2036866 A1 | 12/1970 |
| FR | 2933544 A1 | 1/2010 |
| JP | S55-173264 U | 12/1980 |
| JP | S61-14865 U | 1/1986 |
| JP | S61-180567 U | 11/1986 |
| JP | S61-258643 A | 11/1986 |
| JP | S62-095954 A | 5/1987 |
| JP | S62-196053 A | 8/1987 |
| JP | H02-303351 A | 12/1990 |
| JP | H02-3003348 A | 12/1990 |
| JP | H03-048373 U | 5/1991 |
| JP | H06-070522 A | 3/1994 |
| JP | 3001939 U | 9/1994 |
| JP | H07-212915 A | 8/1995 |
| JP | H08-242564 A | 9/1996 |
| JP | H08-265995 A | 10/1996 |
| JP | H08-275419 A | 10/1996 |
| JP | H09-308145 A | 11/1997 |
| JP | H11-018496 A | 1/1999 |
| JP | H11-206091 A | 7/1999 |
| JP | H11-215749 A | 8/1999 |
| JP | H11-308793 A | 11/1999 |
| JP | 2000-41367 A | 2/2000 |
| JP | 2000-245089 A | 9/2000 |
| JP | 2001-112197 A | 4/2001 |
| JP | 2001-333555 A | 11/2001 |
| JP | 2002-010602 A | 1/2002 |
| JP | 2002-171735 A | 6/2002 |
| JP | 2002-272066 A | 9/2002 |
| JP | 2003-070197 A | 3/2003 |
| JP | 2003-104076 A | 4/2003 |
| JP | 2003-324866 A | 11/2003 |
| JP | 2004-15906 A | 1/2004 |
| JP | 2004-092715 A | 3/2004 |
| JP | 2004-120892 A | 4/2004 |
| JP | 2004-147451 A | 5/2004 |
| JP | 2004-159453 A | 6/2004 |
| JP | 2004-187344 A | 7/2004 |
| JP | 2005-065385 A | 3/2005 |
| JP | 2005-117751 A | 4/2005 |
| JP | 2005-151667 A | 6/2005 |
| JP | 2005-253146 A | 9/2005 |
| JP | 2005-304292 A | 10/2005 |
| JP | 2005-312214 A | 11/2005 |
| JP | 2006-288187 A | 10/2006 |
| JP | 2006-320109 A | 11/2006 |
| JP | 2006-325338 A | 11/2006 |
| JP | 2007-202324 A | 8/2007 |
| JP | 2007-267565 A | 10/2007 |
| JP | 2007-274869 A | 10/2007 |
| JP | 2007-295716 A | 11/2007 |
| JP | 2008-148375 A | 6/2008 |
| JP | 2008-237021 A | 10/2008 |
| JP | 2008-245475 A | 10/2008 |
| JP | 2008-278648 A | 11/2008 |
| JP | 2009-017712 A | 1/2009 |
| JP | 2009-071939 A | 4/2009 |
| JP | 2009-291040 A | 12/2009 |
| JP | 2010-022192 A | 1/2010 |
| JP | 2010-041753 A | 2/2010 |
| JP | 2010-130819 A | 6/2010 |
| JP | 2010-130871 A | 6/2010 |
| JP | 2011-024324 A | 2/2011 |
| JP | 2011-244627 A | 12/2011 |
| JP | 2012-005232 A | 1/2012 |
| JP | 2012-010565 A | 1/2012 |
| JP | 2012-125088 A | 6/2012 |
| JP | 2012-165614 A | 8/2012 |
| JP | 2012-175755 A | 9/2012 |
| JP | 2012-228072 A | 11/2012 |
| JP | 2013-051765 A | 3/2013 |
| JP | 2013-108986 A | 6/2013 |
| JP | 2013/122849 A | 6/2013 |
| JP | 2013-162668 A | 8/2013 |
| JP | 2013-201853 A | 10/2013 |
| JP | 2013-207858 A | 10/2013 |
| JP | 2014-068443 A | 4/2014 |
| JP | 2014-068479 A | 4/2014 |
| JP | 2014-093835 A | 5/2014 |
| JP | 2014-213622 A | 11/2014 |
| JP | 2014-239586 A | 12/2014 |
| JP | 2015-015906 A | 1/2015 |
| JP | 2015-018633 A | 1/2015 |
| JP | 2015-033173 A | 2/2015 |
| JP | 2015-092792 A | 5/2015 |
| JP | 2015-122834 A | 7/2015 |
| JP | 2015-142484 A | 8/2015 |
| JP | 2015-177725 A | 10/2015 |
| JP | 2015-211492 A | 11/2015 |
| JP | 5805336 B1 | 11/2015 |
| JP | 2015-216714 A | 12/2015 |
| JP | 2016-026465 A | 2/2016 |
| JP | 2016-052210 A | 4/2016 |
| JP | 2016-072457 A | 5/2016 |
| JP | 2016-092995 A | 5/2016 |
| JP | 2016-126992 A | 7/2016 |
| JP | 2016-129439 A | 7/2016 |
| JP | 2016-129483 A | 7/2016 |
| JP | 2016-178814 A | 10/2016 |
| JP | 2016-226226 A | 12/2016 |
| JP | 2017-022914 A | 1/2017 |
| JP | 2017-060321 A | 3/2017 |
| JP | 2017-70140 A | 4/2017 |
| JP | 2017-071235 A | 4/2017 |
| JP | 2017-132378 A | 8/2017 |
| JP | 2017-169316 A | 9/2017 |
| JP | 2018-074767 A | 5/2018 |
| JP | 2018-201018 A | 12/2018 |
| JP | 2019-140368 A | 8/2019 |
| WO | 2002/015229 A1 | 2/2002 |
| WO | 2013/179476 A1 | 12/2013 |
| WO | 2015/097767 A1 | 7/2015 |
| WO | 2016/058870 A1 | 4/2016 |
| WO | 2016/072481 A1 | 5/2016 |
| WO | 2016/084204 A1 | 6/2016 |
| WO | 2017/163383 A1 | 9/2017 |

OTHER PUBLICATIONS

Nov. 2, 2021 Office Action issued in U.S. Appl. No. 16/914,605.
Mar. 21, 2022 Office Action Issued In U.S. Appl. No. 16/915,027.
U.S. Appl. No. 16/748,195, filed Jan. 21, 2020 in the name of Takahashi.
Oct. 16, 2018 International Search Report issued in Application No. PCT/JP2018/027408.
Oct. 23, 2018 International Search Report issued in Application No. PCT/JP2018/027409.
Apr. 9, 2019 International Search Report issued in International Patent Application No. PCT/JP2018/048246.
Apr. 16, 2019 Search Report issued in International Patent Application No. PCT/JP2018/048247.
U.S. Appl. No. 16/914,605, filed Jun. 29, 2020 in the name of Takahashi.
U.S. Appl. No. 16/915,027, filed Jun. 29, 2020 in the name of Takahashi.
U.S. Appl. No. 16/915,238, filed Jun. 29, 2020 in the name of Takahashi.
U.S. Appl. No. 16/915,566, filed Jun. 29, 2020 in the name of Takahashi.

(56) References Cited

OTHER PUBLICATIONS

U.S. Appl. No. 16/915,116, filed Jun. 29, 2020 in the name of Takahashi et al.
U.S. Appl. No. 16/914,532, filed Jun. 29, 2020 in the name of Takahashi.
U.S. Appl. No. 16/748,535, filed Jan. 21, 2020 in the name of Takahashi et al.
U.S. Appl. No. 16/915,348, filed Jun. 29, 2020 in the name of Takahashi et al.
Apr. 2, 2019 International Search Report issued in International Patent Application No. PCT/JP2018/048254.
Jan. 7, 2021 Office Action Issued in U.S. Appl. No. 16/915,348.
Apr. 2, 2021 Notice of Allowance issued in U.S. Appl. No. 16/915,348.
Apr. 9, 2019 International Search Report issued in International Patent Application No. PCT/JP2018/048248.
U.S. Appl. No. 16/914,570, filed Jun. 29, 2020 in the name of Takahashi.
May 2, 2022 Office Action issued in U.S. Appl. No. 16/915,238.

\* cited by examiner

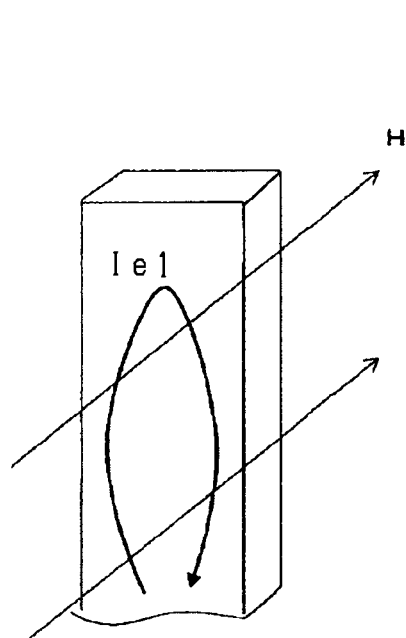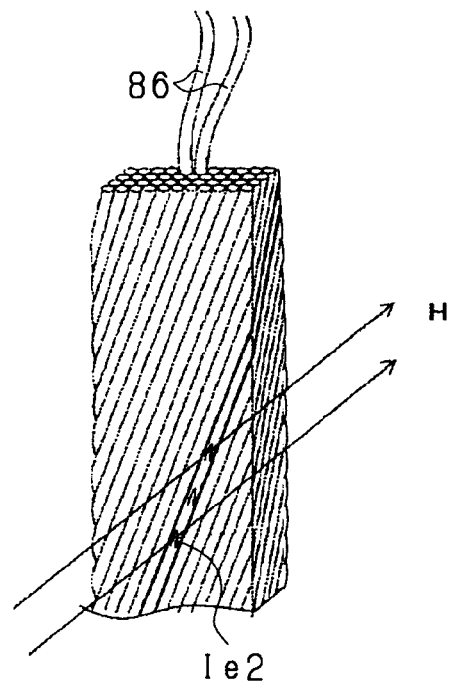
FIG. 18(a)   FIG. 18(b)
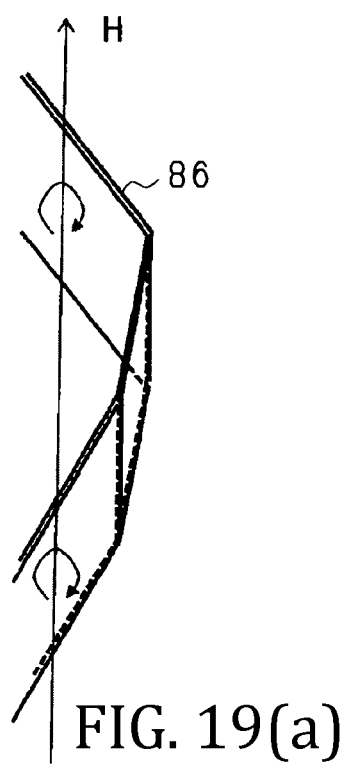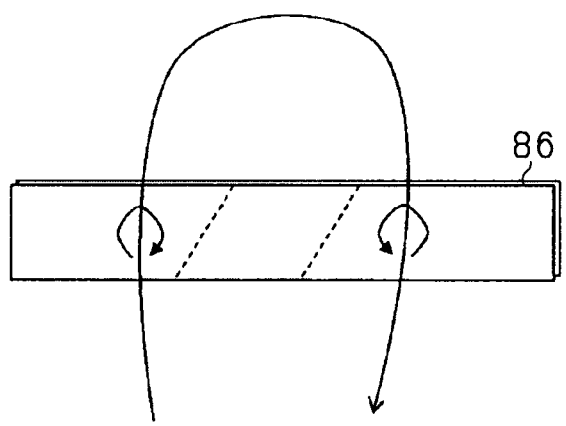
FIG. 19(a)   FIG. 19(b)

$$\left( K = \frac{g1 - g2}{g1} \right)$$

ANGLE OF COMMUTATING POLES [deg]

INPUT TERMINAL

OUTPUT TERMINAL

INPUT TERMINAL

OUTPUT TERMINAL $$\begin{pmatrix} \cdot\ 0.6 \leq LM/LS \leq 1 \\ \cdot\ 0.7 \leq MB/MA < 1 \\ \cdot\ DM \geq 50mm \end{pmatrix}$$

ROTATING ELECTRICAL MACHINE

CROSS REFERENCE TO RELATED DOCUMENTS

This Application is a Divisional of application Ser. No. 16/748,195 filed Jan. 21, 2020, which claims the benefit of priority of Japanese Patent Application Nos. 2017-142223 filed on Jul. 21, 2017, 2017-142224 filed on Jul. 21, 2017, 2017-142225 filed on Jul. 21, 2017, 2017-142226 filed on Jul. 21, 2017, 2017-142227 filed on Jul. 21, 2017, 2017-142228 filed on Jul. 21, 2017, 2017-255048 filed on Dec. 28, 2017, 2017-255049 filed on Dec. 28, 2017, 2017-255050 filed on Dec. 28, 2017, 2017-255051 filed on Dec. 28, 2017, 2017-255052 filed on Dec. 28, 2017, and 2017-255053 filed on Dec. 28, 2017, disclosures of which are incorporated herein by reference.

TECHNICAL FIELD

This disclosure relates to a rotating electrical machine.

BACKGROUND ART

A device which is capable of having a rotating machine and an inverter device built therein have been proposed as a rotating electrical machine (e.g., Patent Literature 1). In patent literature 1, a stator and a rotor of the rotating machine are of a circular ring-shape. The inverter device is disposed in space inside the stator and the rotor.

PRIOR ART DOCUMENT

Patent literature 1 Japanese patent first publication No. 2004-213622
Patent literature 2 Japanese patent first publication No. 2004-213622
Patent literature 3 Japanese patent first publication No. 2011-78298
Patent literature 4 Japanese patent first publication No. 2012-165614
Patent literature 5 Japanese patent first publication No. 1996-70522
Patent literature 6 Japanese patent first publication No. 2012-175755

SUMMARY OF THE INVENTION

In a case there the rotating electrical machine, as taught in the above patent literature 1, has a heat generating member, such as an inverter device, disposed inside the stator and the rotor, it is necessary to effectively dissipate heat. Particularly, a coil used with the stator or the rotor generates heat. It is, therefore, necessary to ensure a heat dissipating ability.

The present invention was made in view of the above problem. It is a principal object of the invention to provide a rotating electrical machine which has a suitable storage space and suitable ability to dissipate heat.

The first disclosure relates to a rotating electrical machine which comprises: (a) a rotor which includes a rotor body with a hollow portion and a magnet unit mounted on the rotor body, the rotor being retained to be rotatable; (b) a cylindrical stator which is equipped with a stator winding including a plurality of phase-windings, the stator being arranged to face the rotor coaxially therewith; and (c) a housing in which said rotor and said stator are disposed. The rotor body includes a cylindrical magnet retainer to which the magnet unit is secured and an intermediate portion that is a portion connecting a rotating shaft of the rotor and the magnet retainer and extends in a radial direction of the rotating shaft. A first region, as defined radially inside an inner peripheral surface of a magnetic circuit component made of the stator and the rotor, is greater in volume than a second region, as defined between the inner peripheral surface of the magnetic circuit component and the housing in the radial direction.

With the above arrangements, the first region is defined on a side of the inner peripheral surface of the magnetic circuit component, but has a volume greater than that of the second region defined between the inner peripheral surface of the magnetic circuit component and the housing. This facilitates dissipation of more heat from first region than from the second region, thereby achieving suitable heat dissipation ability.

In the second disclosure, if a radius of an inner periphery of the housing is defined as d in the first disclosure, the magnetic circuit component is located radially outside a distance of d×0.705 away from the center of rotation.

With the above arrangements, the first region defined radially inside the inner peripheral surface of the magnetic circuit component within the housing has a volume greater than that of the second region defined between the inner peripheral surface of the magnetic circuit component and the housing in the radial direction, thereby offering suitable ability to dissipate the heat.

The third disclosure relates to a rotating electrical machine which comprises: (a) a rotor which includes a rotor body with a hollow portion and a magnet unit mounted on the rotor body, the rotor being retained to be rotatable; (b) a cylindrical stator which is equipped with a stator winding including a plurality of phase-windings, the stator being arranged to face the rotor coaxially therewith; and (c) a housing in which said rotor and said stator are disposed. The rotor body includes a cylindrical magnet retainer to which the magnet unit is secured and an intermediate portion that is a portion connecting a rotating shaft of the rotor and the magnet retainer and extends in a radial direction of the rotating shaft. If a radius of an inner periphery of the housing is defined as d, a magnetic circuit component made up of the stator and the rotor is located radially outside a distance of d×0.705 away from the center of rotation.

With the above arrangements, a region defined radially inside an inner peripheral surface of the magnetic circuit component within the housing has a volume greater than that of a region defined between the inner peripheral surface of the magnetic circuit component and the housing in the radial direction, thereby offering suitable ability to dissipate heat.

The fourth disclosure relates to the structure, as set forth in any one of the first to third disclosures, wherein the intermediate portion is located away from a center of the rotor in an axial direction of the rotor.

With the above arrangements, the volume of the first region defined radially inside the inner peripheral surface of the magnetic circuit component is increased as compared with when the rotor has the intermediate portion in the center thereof or on both axial ends thereof. The intermediate portion is located away from the center of the rotor in one of opposite axial directions. The rotor, therefore, has an opening facing away from the intermediate portion and facilitates dissipation of heat therefrom, thereby improving the suitable ability to dissipate the heat.

The fifth disclosure relates to the structure, as set forth in any one of the first to fourth disclosure, wherein the rotor is of an outer rotor structure in which the rotor is arranged radially outside the rotor. The magnet unit is secured to a radially inner side of the rotor body.

The above arrangements, unlike the inner rotor structure, enable the magnet unit to be retained radially inside the rotor body without accidently detaching when the magnet unit is subjected to centrifugal force during rotation of the rotor. In other words, a structure required to secure magnets to the rotor body may be minimized as compared with the inner rotor structure. For instance, a surface magnet type rotor may be employed. This enables the rotor to have a decreased thickness as compared with the inner rotor structure, thereby increasing the size of the first region defined radially inside the inner peripheral surface of the magnetic circuit component.

The sixth disclosure relates to the structure, as set forth in the fifth disclosure, wherein the rotating electrical machine also includes a stator retainer which retains the stator. The stator retainer includes a cylinder attached to a radial inner side of the stator, and wherein the cylinder is equipped with a cooling portion.

The cooling portion works to release heat from the magnetic circuit component and also cool a member disposed in the first region defined radially inside the magnetic circuit component within the cylinder. The cooling portion having ability to suitably cool the magnetic circuit component enables the first region to dissipate heat therefrom because it has a size greater than that of the second region defined between the inner peripheral surface of the magnetic circuit component and the housing even when a heat generating member which generates an amount of heat equal to or less than that produced by the magnetic circuit component is disposed in the first region.

The seventh disclosure relates to the structure, as set forth in the sixth disclosure, wherein an electrical component is disposed inside the cylinder. The electrical component includes heat generating members which generates heat when electrically energized. The heat generating members are arranged along an inner peripheral surface of the cylinder. The cooling portion are arranged to overlap the heat generating members in a radial direction.

With the above arrangements, the cooling portion works to dissipate heat from the magnetic circuit component and also cool the electrical component effectively.

The eighth disclosure relates to the structure, as set forth in any one of the first to seventh disclosures, wherein an electromagnetic wave-generating member is disposed in a region which is located radially inside an inner peripheral surface of the magnetic circuit component.

The magnetic circuit component made up of the housing, the rotor and the stator is disposed radially outside the first region defined radially inside the inner peripheral surface of the magnetic circuit component, thereby minimizing dissipation of electromagnetic noise generated by the electromagnetic wave-generating member to the outside.

The ninth disclosure relates to the structure, as set forth in any one of the first to eighth disclosure, wherein the magnet unit has different magnetic poles arranged on a surface of the rotor which faces the stator. The different magnetic poles are alternately arrayed in a circumferential direction of the rotor. The stator has winding-to-winding members each of which is arranged between circumferentially adjacent magnet facing portions. If a width of the winding-to-winding members energized by excitation of the stator winding in a circumferential direction within a portion of the magnet unit equivalent to one of magnetic poles is defined as $Wt$, a saturation magnetic flux density of the winding-to-winding members is defined as $Bs$, a width of the magnet unit equivalent to one of the magnetic poles of the magnet unit in a circumferential direction of the magnet unit is defined as $Wm$, and a remanent flux density in the magnet unit is defined as $Br$, the winding-to-winding members are made of a magnetic material meeting a relation of $Wt \times Bs \leq Wm \times Br$ or a non-magnetic material.

The above structure enables a conductor sectional area of the stator winding to be increased, thereby minimizing the amount of heat generated therefrom. It is also possible to have a thickness of the stator winding which is increased in the radial direction to increase the volume of the first region defined radially inside the inner peripheral surface of the magnetic circuit component.

The tenth disclosure relates to the structure, as set forth in the ninth disclosure, wherein the stator winding includes anisotropy conductors.

In the case of the slot-less structure, the conductors of the stator winding has an increased density. The use of the anisotropy conductors facilitates the design of electrical insulation.

The eleventh disclosure relates to the structure, as set forth in any one of the first to tenth disclosure, wherein if an outer diameter of an air gap between the rotor and the stator is defined as $D$, and the number of poles is defined as $P$, a relation of $D/P < 12.2$ is met.

The above structure enables the first region defined radially inside the inner peripheral surface of the magnetic circuit component to have a volume greater than that of the second region defined between the inner peripheral surface of the magnetic circuit component and the housing without sacrificing the torque to be outputted.

The twelfth disclosure relates to the structure, as set forth in any one of the first to eleventh disclosure, wherein the rotor is made of a surface magnet type rotor in which permanent magnets are secured to the rotor body as the magnet unit. The magnet unit includes first magnets whose magnetization direction is oriented in a radial direction of the rotating shaft and second magnets whose magnetization direction is oriented in a circumferential direction of the rotating shaft. The magnet unit is designed in a magnet array in which the first magnets are arranged at a given interval away from each other in the circumferential direction. Each of the second magnets is disposed in the circumferentially adjacent first magnets.

The use of the surface magnet type rotor enables a used amount of magnetic metal material, such as iron, to be minimized to decrease the thickness of the rotor. The use of the above magnetic array reduces leakage of magnetic flux from the permanent magnets to create a magnetic circuit in the rotor. In other words, it is possible to fully achieve the function of the rotor 40 to create the magnetic circuit only by the permanent magnets. This structure enables the thickness to be decreased, thereby improving the output torque and increasing the volume of the first region defined radially inside the inner peripheral surface of the magnetic circuit component.

The thirteenth disclosure relates to the structure, as set forth in any one of the first to eleventh disclosure, wherein the rotor is made of a surface magnet type rotor in which permanent magnets are secured to the rotor body as the magnet unit. The magnet unit is made of polar anisotropic magnets.

The use of the surface magnet type rotor enables a used amount of magnetic metal material, such as iron, to be minimized to decrease the thickness of the rotor. The use of the above magnetic array reduces leakage of magnetic flux from the permanent magnets to create a magnetic circuit in the rotor. In other words, it is possible to fully achieve the function of the rotor to create the magnetic circuit only by the permanent magnets. This structure enables the thickness to be decreased, thereby improving the output torque and increasing the volume of the first region defined radially inside the inner peripheral surface of the magnetic circuit component.

The fourteenth disclosure relates to the structure, as set forth in any one of the first to thirteenth disclosure, which also includes bearings which are disposed in the housing and retain the rotating shaft of the rotor to be rotatable. The rotating shaft is rotatably held by the bearings arranged at locations different from each other in the axial direction of the rotating shaft. The bearings are disposed away from a center of the rotor in the axial direction.

In a cantilever structure in which the bearings are arranged close to one of the axially opposed sides, heat generated by the bearings usually concentrates only on one of the axially opposed sides. This enhances the dissipation of heat from a place located farther away from the bearings in a case where a heat generating member, such as a capacitor, is disposed in the first region defined radially inside the inner peripheral surface of the magnetic circuit component.

The fifteenth disclosure relates to a rotating electrical machine which comprises: (a) a rotor which includes a cylindrical rotor body with a hollow portion and a magnet unit mounted on the rotor body, the rotor being retained to be rotatable; (b) a cylindrical stator which is equipped with a stator winding including a plurality of phase-windings, the stator being arranged to face the rotor coaxially therewith; (c) a housing in which said rotor and said stator are disposed; (d) a stator which includes a stator winding made up of a plurality of phase windings, the stator being arranged coaxially with the rotor and facing the rotor; (e) a housing which secures the stator; and (f) bearings which are disposed in the housing and retain the rotating shaft of the rotor to be rotatable. The rotating shaft is rotatably held by the bearings arranged at locations different from each other in the axial direction of the rotating shaft. The bearings are disposed away from a center of the rotor in the axial direction.

Conventional rotating electrical machines capable of having an inverter device built together with a rotating machine have been proposed (e.g., patent literature 2). In patent literature 2, a stator and a rotor of the rotating machine are of a circular shape. The inverter device is disposed in space formed inside the stator and the rotor.

The rotating electrical machine taught in patent literature 2 is retained by a shift of a vehicle using a pair of bearings to be rotatable. Specifically, the shaft has mounted thereon a pair of wheel discs located away from each other in an axial direction of the shaft. The rotating electrical machine is rotatable relative to the shaft using the bearings mounted on central portions of the wheel discs. The inverter device is arranged between the wheel discs in the axial direction.

Therefore, in the rotating electrical machine disclosed in patent literature 2, the inverter device equipped with a heat generating member, such as a capacitor, is disposed in space surrounded by the bearings which usually generate heat during rotation thereof, so that the heat hardly dissipate from the space.

It is, therefore, principal object of the fifteenth disclosure to provide a rotating electrical machine which has suitable ability to dissipate heat. In the fifteenth disclosure, the cantilever structure in which the bearings are located only on one of axially opposed sides is used, so that heat generated by the bearings concentrates only on one of the axially opposed sides. This causes heat to be released effectively from a place facing away from the bearings even when a heat generating member, such as a capacitor, is arranged in the hollow portion of the rotor body.

The sixteenth disclosure relates to the structure, as set forth in the fifteenth disclosure, wherein the bearings are radial ball bearings equipped with an outer race, an inner race, and balls disposed between the outer race and the inner race. One of the bearings is designed to be different in dimension of a gap between each of the outer race and the inner race and the balls from the other of the bearings.

The above structure effectively absorbs swinging or vibration of the bearings due to imbalance resulting from oscillation of the rotor or parts tolerance at a location close to the center of the rotor.

The seventeenth disclosure relates to the structure, as set forth in the fifteenth or sixteenth disclosure, wherein the rotor is made of a surface magnet type rotor in which permanent magnets are secured to the rotor body.

In the case of use of the cantilever arrangement, the weight of a portion of the rotor which is far away from the bearings will be increased, so that the inertia is increased, thereby resulting in an increase in swinging or vibration of the rotor. The rotor is, therefore, designed in the form of the surface magnet type. This enables a used amount of magnetic metal material to be decreased as compared with an IPM rotor, thereby resulting in a decrease in inertia. It is, therefore, possible to reduce the swinging or vibration of the rotor even with the use of the cantilever arrangement.

The eighteenth disclosure relates to the structure, as set forth in the seventeenth disclosure, wherein the permanent magnets include first magnets whose magnetization direction is oriented in a radial direction of the rotating shaft and second magnets whose magnetization direction is oriented in a circumferential direction of the rotating shaft. The magnet unit is designed in a magnet array in which the first magnets are arranged at a given interval away from each other in the circumferential direction. Each of the second magnets is disposed in the circumferentially adjacent first magnets.

The use of the above magnetic array reduces leakage of magnetic flux from the permanent magnets to create a magnetic circuit in the rotor. In other words, it is possible to fully achieve the function of the rotor to create the magnetic circuit only by the permanent magnets. This structure enables the rotor body which retains the permanent magnets exhibiting inertia to be made of synthetic resin, such as CFRP, not magnetic metallic material, thereby minimizing the inertia. It is, therefore, possible to use the cantilever structure to minimize the inertia to reduce the swinging or vibration of the rotor.

The nineteenth disclosure relates to the structure, as set forth in the seventeenth disclosure, wherein the permanent magnets are made of polar anisotropic magnets.

It is possible to reduce adverse effects of demagnetization, as compared with a magnet array called a Halbach array.

The twentieth disclosure relates to the structure, as set forth in any one of the fifteenth to nineteenth disclosure, wherein the rotor is of an outer rotor structure in which the rotor is arranged radially outside the stator.

The above structure has the magnet unit secured radially inside the rotor body, thereby firmly holding the magnet unit radially inside the rotor body using the rotor body, unlike the inner rotor structure, when centrifugal force acts on the magnet unit during rotation of the rotor. In other words, as compared to the inner rotor structure, a structure required to secure the magnets to the rotor body enables to be minimized. This minimizes the inertia to reduce the swinging or vibration of the rotor even with the use of the cantilever structure.

The twenty-first disclosure relates to the structure, as set forth in any one of the fifteenth to twentieth disclosure, wherein the rotor body includes a cylindrical magnet retainer to which the magnet unit is secured, an fixing portion which is of a cylindrical shape and smaller in diameter than the magnet retainer and through which the rotating shaft passes, and an intermediate portion connecting between the magnet retainer and the fixing portion. The fixing portion to which the rotating shaft is secured to be rotatable along with the fixing portion is attached to the housing through the bearings to be rotatable. The intermediate portion includes a radially inner portion and a radially outer portion and has a difference in level between the radially inner portion and the radially outer portion in the axial direction. The magnet retainer and the fixing portion partially overlap each other in the axial direction.

The above structure results in a decrease in axial length of the rotating electrical machine and ensures required lengths of the magnet retainer and the fixing portion in the axial direction. The ensuring of the required length of the fixing portion enables the bearings to have a required interval therebetween, thereby achieving the stability in operation of the bearings. It is possible to partially place the bearings close the center of gravity of the rotor, thereby further enhancing the stability in operation of the bearings.

The twenty-second disclosure relates to the structure, as set forth in any one of the fifteenth to twenty-first disclosure, wherein the rotor is equipped with an air cooling fin.

The air cooling fan works to effectively release heat.

The twenty-third disclosure relates to the structure, as set forth in any one of the fifteenth to twenty-second disclosure, wherein the rotor body has an opening located farther away from the bearings in the axial direction.

The above structure enables the heat to be dissipated effectively from the opening even when a heat generating member is mounted inside the rotor. Since there is no bearing which will generate heat during rotation thereof near the opening, a flow of air is created into the opening, thereby enhancing the dissipation of heat.

The twenty-fourth disclosure relates to a rotating electrical machine which comprises: (a) a rotor which is equipped with a magnet unit which generates magnetic flux and retained to be rotatable; and (b) a stator which is equipped with a stator winding made up of a plurality of phase windings, the stator being arranged coaxially with the rotor and facing the rotor. The magnet unit includes first magnets whose magnetization direction is oriented in a radial direction of the rotor and second magnets whose magnetization direction is oriented in a circumferential direction of the rotor. The first magnets are arranged at a given interval away from each other in the circumferential direction. Each of the second magnets is disposed in the circumferentially adjacent first magnets. The magnet unit has end surfaces of the first magnets which face away from the stator and end surfaces of the second magnets which face away from the rotor. At least the end surfaces of the first magnets or the end surfaces of the second magnets define recesses hollowed toward the stator in the radial direction. The magnetic members are disposed in the recesses in a surface of the rotor which faces away from the stator.

Rotating electrical machines in which permanent magnets are disposed in a given array to increase the magnetic flux density are known (e.g., patent literature 3). The rotating electrical machine in patent literature 3 has the permanent magnets which include first magnets whose magnetization direction is oriented in a radial direction and second magnets whose magnetization direction is oriented in a circumferential direction. The first magnets are arranged in the circumferential direction. Each of the second magnets is disposed between the circumferentially adjacent first magnets radially outside the first magnets. Each of the first magnets has the magnetization direction oriented in a direction opposite that of the adjacent first magnet. Similarly, each of the second magnets has the magnetization direction oriented in a direction opposite that of the adjacent second magnet. A core segment is disposed radially outside the first magnets between a respective two of the second magnets. This increases the density of magnetic flux toward the stator and enables the rotating electrical machine to output a high degree of torque.

The rotating electrical machine taught in patent literature 3 has the first magnets secured to a shaft, thus leading to a risk that magnetic saturation may occur in a magnetic path in the shaft. The magnetic saturation results in a decrease in a flow of magnetic flux, thereby causing demagnetization of the first magnets. The decrease in magnetic flux density will result in a lowered output from the rotating electrical machine.

It is, therefore, a principal object of the twenty-fourth disclosure to provide a rotating electrical machine which is designed to facilitate flow of the magnetic flux. The magnet unit in the twenty-fourth disclosure has the recesses in the end surfaces of the first magnets facing away from the stator and/or the end surfaces of the second magnets facing away from the stator. The recesses are hollowed toward the stator in the radial direction. The rotor has the soft magnetic material-made members disposed in the recesses in order to facilitate flow of magnetic flux from the magnets, thereby improving the density of magnetic flux flowing toward the stator.

For instance, in a case where the magnet retainer made from soft magnetic material is disposed over the first and second magnets arranged circumferentially adjacent each other in the above magnet layout on an opposite side of the magnet unit to the stator, there is a risk that a magnetic path in the magnet retainer may be magnetically saturated. Particularly, there is a high probability that the magnetic saturation occurs at a boundary between the first and second magnets. The occurrence of magnetic saturation in the magnet retainer will cause magnetic flux to bypass a place where the magnetic saturation occurs, thereby resulting in distortion of the magnetic path which causes the demagnetization.

In order to alleviate the above problem, the recesses are formed in the surface of the magnet unit facing away from the stator. The magnetic members made from soft magnetic material are disposed in the recesses, thereby alleviating the risk of magnetic saturation to avoid the demagnetization of the magnets. This avoids a reduction in output from the rotating electrical machine.

For instance, even when there is no magnet retainer made from soft magnetic material on the opposite side of the magnet unit to the stator, the magnetic members serve to reduce leakage of magnetic flux from the opposite side of the magnet unit to the stator, thereby improving the density of magnetic flux flowing toward the stator.

The twenty-fifth disclosure relates to the structure, as set forth in the twenty-fourth disclosure, wherein a thickness of either of the first magnets or the second magnets in the radial direction is set smaller than that of the other of the first magnets and the second magnets to define the recesses, and wherein the magnetic members are arranged away from the stator in the first magnets or the second magnets, whichever are smaller in thickness.

The above structure facilitates flow of magnetic flux from the magnets, thereby improving the density of magnetic flux flowing toward the stator.

The twenty-sixth disclosure relates to the structure, as set forth in the twenty-fourth disclosure, wherein the first magnets have a thickness in the radial direction which is selected to be smaller than that of the second magnets to define the recesses. The magnetic members are disposed in portions of the first magnets which are located away from the stator. The sum of the thickness of each of the first magnets and a thickness of a corresponding one of the magnetic members in the radial direction is equal to the thickness of each of the second magnets in the radial direction.

The first magnets whose magnetization direction is oriented in the radial direction have portions which are located farther away from the stator and most magnetized. The demagnetization may, therefore, be by minimized by placing the magnetic members inside or outside the first magnets in the radial direction. This also enables the volume of the first magnets to be decreased. The sum of the thickness of each of the first magnets and the thickness of a corresponding one of the magnetic members in the radial direction is selected to be equal to the thickness of each of the second magnets in the radial direction, thereby facilitating flow of magnetic flux to improve the density of the magnetic flux.

The twenty-seventh disclosure relates to the structure, as set forth in the twenty-fourth disclosure, wherein ones of the first magnets have magnetization directions oriented toward the stator. The magnetic members are disposed in the ones of the first magnets away from the stator.

The above structure effectively avoids a reduction in copper loss in the rotor and minimizes the demagnetization.

The twenty-eighth disclosure relates to the structure, as set forth in the twenty-fourth disclosure, wherein the second magnets have a thickness in the radial direction which is selected to be smaller than that of the first magnets to define the recesses. The magnetic members are disposed in portions of the second magnets which are located away from the stator. The sum of the thickness of each of the second magnets and a thickness of a corresponding one of the magnetic members in the radial direction is equal to the thickness of each of the first magnets in the radial direction.

The demagnetization may, therefore, be by minimized by placing the magnetic members inside or outside the second magnets in the radial direction. This also enables the volume of the second magnets to be decreased. The sum of the thickness of each of the second magnets and the thickness of a corresponding one of the magnetic members in the radial direction is selected to be equal to the thickness of each of the first magnets in the radial direction, thereby facilitating flow of magnetic flux to improve the density of the magnetic flux.

The twenty-ninth disclosure relates to the structure, as set forth in any one of the twenty-fourth to twenty-eighth disclosures, wherein the rotor is equipped with a magnet retainer which is made from soft magnetic material and retains the magnetic members together with the magnet unit. The magnet retainer is disposed on a portion of the magnet unit which faces away from the stator. The magnet retainer extends over the first magnets and the second magnets which are disposed adjacent each other in the circumferential direction.

The use of the magnet retainer which is made from soft magnetic material and disposed on a portion of the magnet unit which faces away from the stator, thereby avoiding leakage of magnetic flux from the portion of the magnet unit facing away from the stator to improve the magnetic flux density toward the stator. The magnet retainer has a risk that the magnetic path becomes magnetically saturated and demagnetizes the first magnets. The recesses, as described above, alleviate the magnetic saturation to minimize the demagnetization of the magnets.

The thirtieth disclosure, as set forth in any one of the twenty-fourth to twenty-ninth disclosures, wherein the second magnets have a length in the circumferential direction which lies in a range of 52<a<80 where a is an electrical angle [degE].

The mounting of the magnetic members usually causes an optimum value of an angle between commutating poles that is typically 60 [degE] to be shifted to 68 [degE]. This enables the second magnets (i.e., the commutating poles) to be designed to lie in the above range to achieve the mechanical rotation stop without demagnetization.

The thirty-first disclosure relates to the structure, as set forth in any one of the twenty-fourth to thirtieth disclosures, wherein the rotor is of an outer rotor structure in which the rotor is arranged radially outside the stator.

The outer rotor structure has a lower probability that the magnets are accidentally dislodged by centrifugal force than the inner rotor structure. This eliminates the need for dislodging avoiding members and enables the rotor to have a decreased thickness and the size of the air gap between the stator and the rotor to be decreased, thereby improving the torque output.

The thirty-second disclosure relates to the structure, as set forth in any one of the twenty-fourth to thirty-first disclosure, wherein the rotor is equipped with a magnet retainer which retains said magnetic members together with the magnet unit. The magnetic members are equipped with engaging portions which are arranged in the circumferential direction and engage the magnet retainer.

Usually, the stop of rotation relative to the magnet retainer may be well achieved by designing the magnetic members which are higher in mechanical properties (i.e., rigidity) than the magnets to have engaging portions.

The thirty-third disclosure relates to the structure, as set forth in any one of the twenty-fourth to thirty-second disclosure, wherein the first magnets include a first A magnet whose magnetization direction is oriented outwardly in the radial direction and a first B magnet whose magnetization direction is oriented inwardly in the radial direction. The second magnets include a second A magnet whose magnetization direction is oriented in a first one of opposite circumferential direction and a second B magnet whose magnetization direction is oriented in a second one of the opposite circumferential direction. The magnet unit is designed to have the first A magnet, the second A magnet, the first B magnet, and the second B magnet arranged in this order in the circumferential direction.

The above layout of the magnets improves the density of magnetic flux toward the stator.

The thirty-fourth disclosure relates to a rotating electrical machine which comprises: (a) a rotor which includes a magnet unit and is retained to be rotatable; and (b) a stator which is equipped with a stator winding made up of a plurality of phase windings, the stator being arranged coaxially with the rotor. The stator winding includes magnet facing portions which overlap the magnet unit in an axial direction and turns each of which joints a first one and a second one of the magnet facing portions used for the same phase together axially outside the magnet unit. The first and second ones of the magnet facing portions are away from each other with a given number of the magnet facing portions interposed therebetween. The first and second ones of the magnet facing portions which are used for the same phase and joined together by one of the turns are arranged on the same pitch circle defined about a center of the rotor. If an arrangement pitch that is an interval between centers of the circumferentially adjacent magnet facing portions arranged on the same pitch circle in the circumferential direction is defined as Ps, a diameter of the same pitch circle is defined as Ds, and Ds/Ps is expressed by $\tau$, a relation of 24<$\tau$<34 is met.

A rotating electrical machine, as disclosed in the above patent literature 4, is known which includes a rotor which is equipped with a magnet unit and retained to be rotatable and a stator which is equipped with a stator winding made up of a plurality of phase windings and arranged coaxially with the rotor. The stator winding includes magnet facing portions located to overlap the magnet unit in the axial direction and turns each of which joints a first one and a second one of the magnet facing portions used for the same phase together axially outside the magnet unit. The first and second ones of the magnet facing portions are away from each other with a given number of the magnet facing portions interposed therebetween.

In order to strengthen torque output by the rotating electrical machine, it is required to select the arrangement pitch between the magnet facing portions of the stator winding to be a suitable value in the circumferential direction. The pitch usually depends upon the size of the rotating electrical machine. It is, thus, necessary to determine the pitch in view of the size of the rotating electrical machine, thus resulting in an increase in number of design steps.

It is, therefore, a principal object of the thirty-fourth disclosure to provide a rotating electrical machine which is capable of suitably determine the arrangement pitch of the magnet facing portions to avoid an increase in designing step thereof. In the thirty-fourth disclosure, the magnet facing portions which are used for the same phase and joined together by the turns are arranged on the same pitch circle defined about the axis of the rotor. An interval between the centers of the magnet facing portions which are arranged adjacent each other in the circumferential direction on the same pitch circle is defined as the arrangement pitch Ps. The diameter of the same pitch circle is defined as Ds which depends upon the size of the rotating electrical machine. The inventors of this application have found that if Ds/Ps is expressed by $\tau$, a suitable increase in torque output may be achieved regardless of the size of the rotating electrical machine by selecting the value $\tau$ to lie in a suitable range, and that such a range meets a relation of 24<$\tau$<34.

In the thirty-fourth disclosure, the arrangement pitch of the magnet facing portions is, therefore, selected to meet a relation of 4<$\tau$<34 in the circumferential direction. The use of the value $\tau$ enables the number of the designing steps to be properly minimized.

The magnet facing portions and the turns are sometimes made from conductive material other than copper. In such a case, if the electrical resistivity [$\Omega$m] of copper is defined as $\rho 1$, an electrical resistivity of the conductive material is defined as $\rho 2$, and $\rho 1/\rho 2$ is expressed by $\rho s$, a relation of 24/$\rho s$<$\tau$<34/$\rho s$ is preferably met. For instance, in a case of use of conductive material (e.g., aluminum) which is higher in electrical resistivity than copper, $\rho 1$ will be one or less, so that a lower limit or an upper limit of $\tau$ becomes great. This means that in a case of use of conductive material higher in electrical resistivity than copper, the arrangement pitch is shorter than that in a case of use of copper. The above described thirty-fifth disclosure avoids an increase in number of designing steps even when the magnet facing portions and the turns are made from conductive material other than copper.

The number of pole pairs of the rotor may be selected to be 12 or more.

The thirty-sixth disclosure relates to the structure, as set forth in the thirty-fourth or the thirty-fifth disclosure, wherein there of no tooth made from soft magnetic material between the circumferentially adjacent magnet facing portions.

The thirty-sixth disclosure relates to the slot-less structure in which a tooth made from soft magnetic material is not arranged between the circumferentially adjacent magnet facing portions. A sectional area of the conductors may, therefore, be increased by placing the magnetic facing portions close to each other as compared with a tooth is disposed between the magnet facing portions. The slot-less structure has no core between the magnet facing portions, thereby eliminating a risk of magnetic saturation. The increased sectional area of the conductors and the elimination of the risk of magnetic saturation enable an amount of electrical current delivered to the stator winding to be increase, thereby achieving a structure suitable for enhancing the torque output from the rotating electrical machine.

The structure in which there is a tooth between the circumferential adjacent conductors means that each tooth has a given thickness in the radial direction and a given width in the circumferential direction to form a portion of a magnetic circuit between the conductors, that is, a magnet-produced magnetic path. In contrast, the structure in which there is no tooth between the conductors means that the above magnetic circuit is not created.

The slot-less structure may be implemented by a structure in the thirty-seventh disclosure. The thirty-seventh disclosure relates to a rotating electrical machine which comprises: (a) a rotor which includes a magnet unit and is retained to be rotatable; and (b) a stator which is equipped with a stator winding made up of a plurality of phase windings, the stator being arranged coaxially with the rotor. The stator winding includes magnet facing portions which overlap the magnet unit in an axial direction and turns each of which joints a first one and a second one of the magnet facing portions used for the same phase together axially outside the magnet unit. The first and second ones of the magnet facing portions are away from each other with a given number of the magnet facing portions interposed therebetween. The first and second ones of the magnet facing portions which are used for the same phase and joined together by one of the turns are arranged on the same pitch circle defined about a center of the rotor. The magnet unit includes a plurality of magnets which are disposed on a surface of the rotor which faces the stator and have magnetic poles arrayed alternately in a circumferential direction. Winding-to-winding members are each disposed between the magnetic facing portions arranged adjacent each other in the circumferential direction. If a width of the winding-to-winding members energized by excitation of the stator winding in the circumferential direction within a portion of the magnet unit equivalent to one of magnetic poles thereof is defined as Wt, a saturation magnetic flux density of the winding-to-winding members is defined as Bs, a width of the magnet unit equivalent to one of the magnetic poles in the circumferential direction of the magnet unit is defined as Wm, and the remanent flux density in the magnet unit is defined as Br, the winding-to-winding members are made of magnetic material meeting a relation of Wt×Bs≤Wm×Br or non-magnetic material.

The thirty-seventh disclosure enables the stator to receive a sufficient amount of magnetic flux from the rotor.

In the thirty-seventh disclosure, the stator includes a stator core. The stator core is located on one of radially opposed sides of the stator winding which faces away from the rotor. The stator core includes a yoke located on one of the radially opposed sides of the stator winding which faces away from the rotor and protrusions each of which extends into a gap between the circumferentially adjacent magnet facing portions. The thickness of each of the protrusions from the yoke in the radial direction may be selected to be smaller than half a thickness of one of the magnet facing portions which is arranged adjacent the yoke in the radial direction.

The thirty-eighth disclosure relates to the structure, as set forth in the thirty-sixth or the thirty-seventh disclosure, wherein the stator includes a stator core. The stator core is located on an opposite side of the stator winding to the rotor in a radial direction.

In the thirty-eighth disclosure, the stator core is assembled with the stator winding. A core made from soft magnetic material does not occupy a gap between the circumferentially adjacent magnet facing portions. In this case, the stator core which is arranged on the opposite side to the rotor functions as a back yoke, thereby creating a required magnetic circuit even when there is no core between the magnet facing portions.

The thirty-ninth disclosure relates to the structure, as set forth in the thirty-fourth or the thirty-fifth disclosure, wherein the stator includes a stator core. The stator core is located on an opposite side of the stator winding to the rotor in a radial direction. The stator core includes a yoke located on the opposite side of the stator winding to the rotor in the radial direction and protrusions which protrude from the yoke toward an interval between the circumferentially adjacent magnet facing portions. The thickness of each of the protrusions from the yoke in the radial direction is smaller than half a thickness of the magnet facing portion in the radial direction.

In the thirty-ninth disclosure, the stator core has the protrusions each of which projects from the yoke arranged farther away from the rotor in the radial direction toward an interval between the circumferentially adjacent magnet facing portions. The protrusions have a thickness which is smaller than half that of the magnet facing portions in the radial direction. In this case, the protrusions have the thickness restricted in the radial direction, so that the interval between the circumferentially adjacent magnet facing portions does not function as a tooth. The rotating electrical machine in the thirty-ninth disclosure is, therefore, designed to have the slotless structure. This minimizes a risk of magnetic saturation thereby enabling an amount of electrical current delivered to the stator winding to be increased. This creates a structure suitable for enhancing the torque output from the rotating electrical machine.

The thirty-ninth disclosure may be modified to have a structure in, for example, the fortieth disclosure which relates to the structure, as set forth in the thirty ninth disclosure, wherein the magnet facing portions are arranged at a given interval away from each other in a circumferential direction of the stator winding and stacked in a multi-layer form in a radial direction of the stator winding. The thickness of each of the protrusions from the yoke in the radial direction is set smaller than half a thickness of one of the magnet facing portions which is arranged adjacent the yoke in the radial direction.

The fortieth disclosure may be modified to have a structure in the forty-first disclosure. The forty-first disclosure relates to the structure, as set forth in the fortieth disclosure, wherein the protrusions engage the magnet facing portions in the circumferential direction.

The structure in the forty-first disclosure enables the magnet facing portions of the stator winding to be used as a positioner and arranged in the circumferential direction.

The forty-second disclosure relates to the structure, as set forth in the thirty-ninth disclosure, wherein one of the phase windings for the same phase is made of a plurality of conductors connected electrically together, each of the conductors including the magnet facing portions and turns. The stator core has more protrusions than the conductors. Each of the protrusions is arranged at a location on the stator which corresponds to a location of one of the conductors.

The structure in the forty-second disclosure facilitates positioning of the conductors in the circumferential direction in a case where each of the phase windings is made up of the plurality of conductors.

The forth-third disclosure relates to the structure, as set forth in any one of the thirty-sixth to the forty-second disclosure, wherein the stator winding is made of a conductor having a flattened cross section whose thickness in a radial direction is smaller than a width thereof in a circumferential direction.

In the forty-third disclosure, the conductor of the stator winding is designed in a flattened shape to have a thickness decreased in the radial direction of the magnet facing portions, thereby enabling the centers of the magnet facing portions in the radial direction to be arranged close to the magnet unit of the rotor. This minimizes the magnetic saturation occurring in the stator of the slot-less structure and increases the density of magnetic flux in the magnetic facing portions of the stator winding to increase the torque output.

The forty-fourth disclosure relates to the structure, as set forth in any one of the thirty-sixth to the forty-third disclosure, wherein the conductor used in the stator winding includes a conductor body made of an aggregation of twisted wires.

In the slot-less structure, a magnetic field produced by the magnet unit of the rotor will be applied directly to the conductors of the stator winding through air. The magnetic field generated by the magnet unit of the rotor will be a rotating field because the rotor mechanically rotates. The strength of magnetic field, as viewed from the stator winding, will be that of an ac magnetic field in the shape of a sine wave. The rotating magnetic field may contain a harmonic component higher than a fundamental frequency synchronizing with a frequency at which the rotor mechanically rotates.

The electrical resistance of the conductor is much smaller than that of air. This causes an ac magnetic field containing a harmonic component to interlink with the conductors, so that a harmonic electromotive force is generated which circulates in the conductors in proportion to a change in interlinkage magnetic flux with time. An eddy current resulting from the electromotive force flows through the conductor in the form of a circulating current, thereby generating eddy-current loss. This leads to an increase in temperature or mechanical vibration of the stator.

In order to alleviate the above problems, the structure in the forty-fourth disclosure has the conductors of the stator winding each of which includes the conductor body made of an aggregation of twisted wires. This enables a current flow path defined by the conductor to be thin, thereby increasing an electrical resistance of the conductor to a flow of eddy current created when a magnetic field produced by the magnet unit containing a harmonic magnetic field interlinks with the conductor. This minimizes the eddy current flowing through the conductor.

Each conductor is made of an aggregation of twisted wires, so that each of the wires has portions to which magnetic field is applied in opposite directions, thereby cancelling back electromotive forces resulting from the interlinkage magnetic field. This enhances effects of decreasing the eddy current flowing in the conductors.

The forty-fifth disclosure relates to the structure, as set forth in the forty-fourth disclosure, wherein at least two of the wires which are arranged adjacent each other are electrically insulated from each other.

The structure in the forty-fifth disclosure enables an area of a current loop through which an eddy current flows to be decreased to increase effects on decrease in eddy current.

The forty-sixth disclosure relates to the structure as set forth in the forty-fourth or the forty-fifth disclosure, wherein an electrical resistance to flow of electrical current between the adjacent wires is higher than an electrical resistance of each of the wires to flow of electrical current through itself.

In the forty-sixth disclosure, each of the wires has the above property, i.e., electrical anisotropy. Each of the wires, therefore, serves to increase effects of decreasing the eddy current even if each of the wires has not insulating layer on an outer periphery thereof.

The forty-seventh disclosure relates to the structure, as set forth in any one of the thirty-fourth to the forty-seventh disclosure, wherein the turns are secured to at least axially opposed ends of the stator.

The structure in the forty-seventh disclosure achieves a firm joint of the stator winding to the stator.

In the forty-eighth disclosure, each of the turns has a sectional area greater than that of the magnet facing portions.

A place located axially outside the magnet facing portions does not face the magnet unit in the radial direction, so that space in which the turns are mounted is less restricted. Accordingly, the sectional area of each of the turns is selected to be greater than that of the magnet facing portions, thereby decreasing the electrical resistance of the turns to enhance the torque output.

The fiftieth disclosure relates to a rotating electrical machine which comprises: (a) a rotor which includes a magnet unit and is retained to be rotatable; and (b) a stator which is equipped with a stator winding including a plurality of conductors, the stator being arranged to face the rotor. A core made from a soft magnetic material is not disposed between the circumferentially adjacent conductors. Each of the conductors includes a conductor made of an aggregation of twisted wires.

Rotating electrical machines are known which are, as taught in the above patent literature 5, used for household, industrial, game, farming, architectural, or automotive applications. Typically, a stator core (i.e., an iron core) has formed therein slots which are defined by teeth and in which a winding is disposed. Conductors, such as copper wires or aluminum wires, are disposed in the slots to complete a stator winding.

Slot-less motors which omit the teeth from the stator have also been proposed.

In the slot-less structure, a magnetic field produced by the magnet unit of the rotor will be applied directly to the conductors of the stator winding through air. The magnetic permeability of the conductors is approximately equal to that of air, so that a magnetic field is uniformly applied to air and the conductors. The magnetic field generated by the magnet unit of the rotor will be a rotating field because the rotor mechanically rotates. The strength of magnetic field, as viewed from the stator winding, will be that of an ac magnetic field in the shape of a sine wave. The rotating magnetic field may contain a harmonic component higher than a fundamental frequency synchronizing with a frequency at which the rotor mechanically rotates.

The electrical resistance of the conductors is much smaller than that of air. This causes an ac magnetic field containing a harmonic component to interlink with the conductors, so that a harmonic electromotive force is generated which circulates in the conductors in proportion to a change in interlinkage magnetic flux with time. An eddy current resulting from the electromotive force flows through the conductor in the form of a circulating current, thereby generating eddy-current loss. This leads to an increase in temperature or mechanical vibration of the stator.

It is, therefore, a principal object of the fiftieth disclosure to provide a slot-less structure of a rotating electrical machine which is capable of reducing eddy current loss. The fiftieth disclosure relates to the slot-less structure in which a tooth made from soft magnetic material is not disposed between the circumferentially adjacent conductors. In order to alleviate the above problems, the structure in the fiftieth disclosure has the conductors of the stator winding each of which includes the conductor body made of an aggregation of twisted wires. This enables a current flow path defined by the conductors to be thin, thereby increasing effects of the conductors on decrease in eddy current even when a magnetic field produced by the magnet unit containing a harmonic magnetic field interlinks with the conductors. This minimizes the eddy current flowing through the conductors to decrease the eddy-current loss.

Each conductor is made of an aggregation of twisted wires, so that each of the wires has portions to which magnetic field is applied in opposite directions, thereby cancelling back electromotive forces resulting from the interlinkage magnetic field. This enhances effects on decrease in eddy current flowing in the conductors to increase the effects on decrease in eddy-current loss.

The structure in which the teeth are respectively disposed between the conductors arrayed in the circumferential direction means that each of the teeth has a given thickness in the radial direction and a given width in the circumferential direction of the stator, so that a portion of the magnetic circuit, that is, a magnet magnetic path lies between the adjacent conductors. In contrast, the structure in which no tooth lies between the adjacent conductors means that there is no magnetic circuit described above.

The fifty-first disclosure relates to a rotating electrical machine which comprises: (a) a rotor which includes a magnet unit and is retained to be rotatable; and (b) a stator which is equipped with a stator winding made up of a plurality of conductors and a stator core. The stator is arranged to face the rotor. The conductors include magnet facing portions arranged to face the magnet unit in a radial direction and turns each of which joints a first one and a second one of the magnet facing portions used for the same phase together axially outside the magnet facing portions. The first and second ones of the magnet facing portions are arranged away from each other with a given number of the magnet facing portions interposed therebetween. The first and second ones of the magnet facing portions which are used for the same phase and joined together by one of the turns are arranged on the same pitch circle defined about a center of the rotor. The stator core includes a yoke located on the opposite side of the stator winding to the rotor in the radial direction and protrusions which protrude from the yoke toward an interval between the circumferentially adjacent magnet facing portions. The thickness of each of the protrusions from the yoke in the radial direction is smaller than half a thickness of the magnet facing portion in the radial direction. Each of the conductors includes a conductor body made of an aggregation of twisted wires.

In the fifty-first disclosure, the stator core has the protrusions each of which projects from the yoke arranged farther away from the rotor in the radial direction toward an interval between the circumferentially adjacent magnet facing portions. The protrusions have a thickness which is smaller than half that of the magnet facing portions in the radial direction. In this case, the protrusions have the thickness restricted in the radial direction, so that the interval between the circumferentially adjacent magnet facing portions does not function as a tooth. The rotating electrical machine in the fifty-first disclosure is, therefore, designed to have the slot-less structure.

Since the thickness of the protrusions is restricted in the radial direction, the amount of interlinkage magnetic flux, as produced by the magnet unit, passing through portions of the magnet facing portions extending outside the protrusions in the radial direction is increased. Such an increase will result in an increase in eddy current. However, in the fifty-first disclosure, each of the conductors of the stator winding is made of twisted wires, thereby enhancing effects on decrease in eddy current flowing through the conductors. This results in a decrease in eddy current to reduce the eddy-current loss and also achieves a positioning function.

The structure in the fifty-first disclosure may be modified to have the structure in the fifty-second disclosure. In the fifty-second disclosure, the magnet facing portions are arranged at a given interval away from each other in a circumferential direction of the stator winding and stacked in a multi-layer form in a radial direction of the stator winding. The thickness of each of the protrusions from the yoke in the radial direction is smaller than half a thickness of one of the magnet facing portions which is arranged adjacent the yoke in the radial direction.

The structure in the fifty-second disclosure may be modified to have the structure in the fifty-third disclosure. In the fifty-third disclosure, the protrusions engage the magnet facing portions in a circumferential direction.

The structure in the fifth-third disclosure enables the protrusions to be used as positioners for the magnet facing portions of the stator winding to arrange the magnet facing portions in the circumferential direction.

The slot-less structure may be designed to have a structure in the fifth-fourth disclosure. Specifically, the structure of the fifth-fourth disclosure relates to a rotating electrical machine which comprises: (a) a stator which is equipped with a stator winding made up of a plurality of conductors; and (b) a rotor which is equipped with a magnet unit disposed on a surface thereof facing the stator. The rotor is retained to be rotatable. The conductors include magnet facing portions arranged to face the magnet unit in a radial direction and turns each of which joints a first one and a second one of the magnet facing portions used for the same phase together axially outside the magnet facing portions. The first and second ones of the magnet facing portions are arranged away from each other with a given number of the magnet facing portions interposed therebetween. The magnet facing portions of the stator winding are arranged at a given interval away from each other in the circumferential direction.

The magnet unit includes a plurality of magnets which are disposed on a surface of the rotor which faces the stator and have magnetic poles arrayed alternately in the circumferential direction. The stator is equipped with winding-to-winding members each of which is disposed between the magnetic facing portions arranged adjacent each other in the circumferential direction. If a width of the winding-to-winding members energized by excitation of the stator winding in the circumferential direction within a portion of the magnet unit equivalent to one of magnetic poles thereof is defined as Wt, a saturation magnetic flux density of the winding-to-winding members is defined as Bs, a width of the magnet unit equivalent to one of the magnetic poles in the circumferential direction of the magnet unit is defined as Wm, and the remanent flux density in the magnet unit is defined as Br, the winding-to-winding members are made of magnetic material meeting a relation of Wt×Bs≤Wm×Br or non-magnetic material.

The structure in the fifty-fourth disclosure enables the stator to sufficiently receive magnetic flux produced by the magnet unit of the rotor.

The fifty-fifth disclosure relates to the structure, as set forth in any one of the fiftieth to the fifty-fourth disclosure, wherein each of the wires is made of conducive fibers.

The structure in the fifty-fifth disclosure has the wires each of which is made of conductive fibers. This enables a current flow path defined by the conductors to be thin, thereby enabling the number of times the current flow path is twisted to be increased. This increases effects on decrease in eddy current to enhance effects on decrease in eddy-current loss.

Each of the wires may be, as in the fifty-sixth disclosure, made of carbon nanotube fibers (which will also be referred to below as CNT). This more effectively increases the effects on decrease in eddy current to decrease the eddy-current loss.

Each of the wires may be, as in the fifty-seventh disclosure, made of carbon nanotube fibers which include boron-containing microfibers in which at least a portion of carbon is substituted with boron. This more effectively strengthens the effects that decrease eddy current, to decrease the eddy-current loss.

The fifty-eighth disclosure relates to the structure, as set forth in any one of the fiftieth disclosure to the fifty-seventh disclosure, wherein the stator winding is made of a conductor having a flattened cross section whose thickness in a radial direction is smaller than a width thereof in a circumferential direction.

In the fifth-eighth disclosure, the conductor of the stator winding is designed in a flattened shape to have a thickness decreased in the radial direction of the magnet facing portions, thereby enabling the centers of the magnet facing portions in the radial direction to be arranged close to the magnet unit of the rotor. This minimizes the magnetic saturation occurring in the stator using the slot-less structure and increases the density of magnetic flux in the magnetic facing portions of the stator winding to increase the torque output.

The flattened shape of the conductors enhances the torque output, but however, results in an increase in amount of magnetic flux interlinking with the conductors. Such an increase will result in an increase in eddy current. However, in the fifth-eighth disclosure, each of the conductors of the stator winding is made of an aggregation of twisted wires, thereby enhancing effects on decrease in eddy current flowing through the conductors. The flattened shape of the conductors to have a thickness decreased in the radial direction also serves to reduce the eddy current. The structure in the fifty-eighth disclosure, therefore, serves to enhance the torque output from the rotating electrical machine and reduce the eddy current.

The structure of the fifth-eighth disclosure may be designed to have the stator equipped with a stator core. The stator core may be located on an opposite side of the stator winding to the rotor in the radial direction. In this case, the size of an air gap between the stator core and the rotor may be decreased by shaping the conductors to be flat to have a thickness of the magnet facing portions decreased in the radial direction. This reduces the magnetic resistance of a magnetic circuit to a flow of magnetic flux passing through the stator and the rotor to increase the amount of magnetic flux in the magnetic circuit. This minimizes magnetic saturation occurring in the stator using the slot-less structure and increases the torque output from the rotating electrical machine.

The fifty-ninth disclosure relates to the structure, as set forth in any one of the fiftieth to fifty-eighth disclosure, wherein the magnet unit includes permanent magnets.

In a structure in which the magnet unit is equipped with a field winding, when drive control for the rotating electrical machine is not performed, it will cause not current to be delivered to the field winding, so that the field winding does not produce magnetic flux. In contrast, in a case where the magnet unit is equipped with permanent magnets, the magnetic field is created by the permanent magnets all the time. Accordingly, when power is transmittable from a rotating shaft of the rotating electrical machine to wheels of a vehicle, it will cause the rotor to be rotated by the wheels even when the rotating electrical machine is at rest, so that the magnet unit generates a rotating magnetic field all the time, thereby causing eddy current flowing through the conductors to be created by a harmonic magnetic field. This results in occurrence of eddy-current loss.

The structure in the fifty-ninth disclosure, however, has the conductors of the stator winding each of which is made of an aggregation of a plurality of twisted wires, thereby enhancing effects on decrease in eddy current flowing through the conductors. The structure in the fifty-ninth disclosure, therefore, serves to effectively reduce the eddy-current loss when the rotating electrical machine is at rest.

The sixtieth disclosure relates to the structure, as set forth in the fifty-ninth disclosure, wherein the permanent magnets include first magnets whose magnetization direction extends in an arc shape toward a center of a magnetic pole thereof and second magnets whose magnetization direction extends in an arc shape toward a center of a magnetic pole thereof and which is different in polarity from that of the first magnets. The first magnets and the second magnets are arranged alternately in the circumferential direction on a surface of the rotor which faces the stator.

A rotor of a rotating electrical machine of an embedded-magnet structure is known which has permanent magnets arranged on a d-axis and an iron core arranged on a q-axis. Excitation of a stator winding near the d-axis will results flow of excited current from a stator to the q-axis of the rotor. This results in magnetic saturation in a wide range around a portion of the core of the rotor on the q-axis.

In order to eliminate the magnetic saturation occurring in a portion of the core on the q-axis, the structure in the sixtieth disclosure is designed to have permanent magnets on a surface of the rotor which faces the stator. Further, in order to enhance the torque output from the rotating electrical machine, the structure of the sixtieth disclosure uses polar anisotropic permanent magnets. Specifically, the permanent magnets include the first magnets whose magnetization direction extends in an arc shape toward the center of the magnetic pole thereof and the second magnets whose magnetization direction extends in an arc shape toward the center of the magnetic pole thereof and which is different in polarity from that of the first magnets. The first magnets and the second magnets are arranged alternately in the circumferential direction on the surface of the rotor which faces the stator. This increases the amount of magnetic flux in the magnetic circuit and enhance the torque output from the rotating electrical machine.

The increase in amount of magnetic flux will result in an increase in torque output, but however, it leads to an increase in amount of magnetic flux interlinking with the conductors. Such an increase will result in an increase in eddy current. However, in the sixtieth disclosure, each of the conductors of the stator winding is made of twisted wires, thereby enhancing effects on decrease in eddy current flowing through the conductors. The structure in the sixtieth disclosure, therefore, serves to strengthen the torque produced by the rotating electrical machine and reduce the eddy-current loss.

The permanent magnets in the sixtieth disclosure may alternatively be designed to have a structure in the sixty-first disclosure. In the sixty-first disclosure, the permanent magnets include first magnets whose magnetization direction is oriented in a radial direction and second magnets whose magnetization direction is oriented in a direction other than the radial direction. The first magnets are arranged at a given interval away from each other in the circumferential direction on a surface of the rotor which faces the stator. Each of the second magnets is disposed in the circumferentially adjacent first magnets.

The sixty-second disclosure relates to the structure, as set forth in any one of the fiftieth to sixty-first disclosure, wherein the conductors include magnet facing portions arranged to face the magnet unit in a radial direction and turns each of which joints a first one and a second one of the magnet facing portions used for the same phase together axially outside the magnet facing portions. The first and second ones of the magnet facing portions are arranged away from each other with a given number of the magnet facing portions interposed therebetween. Each of the turns has a sectional area greater than that of the magnet facing portions.

A place located axially outside the magnet facing portions does not face the magnet unit in the radial direction, so that space in which the turns are mounted is less restricted. Accordingly, the sectional area of each of the turns is selected to be greater than that of the magnet facing portions, thereby decreasing the electrical resistance of the turns to enhance the torque output.

A magnetic flux leaking from the rotating magnetic field interlinks with the turns. The turns have an increased sectional area, thus leading to a risk that the eddy current may become great. However, in the sixty-second disclosure, each of the conductors of the stator winding is made of an aggregation of twisted wires, thereby enhancing effects on decrease in eddy current flowing through the conductors. The structure in the sixty-second disclosure, therefore, serves to enhance the torque output from the rotating electrical machine and reduce the eddy-current loss.

The sixty-third disclosure relates to a rotating electrical machine which comprises: (a) a rotor which includes a magnet unit and is retained to be rotatable; and (b) a stator which is equipped with a stator winding made up of a plurality of conductors. The stator is arranged coaxially with the rotor. A tooth made of soft magnetic material is not disposed between the circumferentially adjacent conductors. A distance between a surface of the magnet unit which faces the stator in a radial direction and an axial center of the rotor in the radial direction is set to be 50 mm or more. If a distance between a surface of the magnet unit facing away from the stator and a surface of the stator winding which faces away from the rotor in the radial direction is defined as LS, and a thickness of the magnet unit in the radial direction is defined as LM, LM/LS is selected to be greater than or equal to 0.6 and smaller than or equal to 1.0. If a maximum value of a distance from an axial center of the rotor in the radial direction is defined as a first distance MA, a minimum distance from the axial center of the rotor in the radial direction is defined as a second distance MB in a magnetic circuit in the stator and the rotor, MB/MA is selected to be 0.7 or more and 1.0 or less.

As a conventional brushless rotating electrical machine, a core-less motor taught in the above patent literature or a slot-less motor in which an iron core is not used with a stator is widely known.

A small-sized slot-less structure of a rotating electrical machine whose output is several tens or hundreds watt is usually used for models. The inventors of this application have not seen examples where the slot-less structure is used with large-sized industrial rotating electrical machines whose output is more than 10 kW. The inventors have studied the reason for this.

Modern major rotating electrical machines are categorized into four main types: a brush motor, a squirrel-cage induction motor, a permanent magnet synchronous motor, a reluctance motor.

Brush motors are supplied with exciting current using brushes. Large-sized brush motors, therefore, have an increased size of brushes, thereby resulting in complex maintenance thereof. With the remarkable development of semiconductor technology, brushless motors, such as induction motors, have been used instead. In the field of small-sized motors, a large number of coreless motors have also come on the market in terms of low inertia or economic efficiency.

Squirrel-cage induction motors operate on the principle that a magnetic field produced by a primary stator winding is received by a secondary stator core to deliver induced current to bracket-type conductors, thereby creating magnetic reaction field to generate torque. In terms of small-size and high-efficiency of the motors, it is inadvisable that the stator and the rotor be designed not to have iron cores.

Reluctance motors are motors designed to use a change in reluctance in an iron core. It is, thus, inadvisable that the iron core be omitted in principle.

In recent years, permanent magnet synchronous motors have used an IPM (Interior Permanent Magnet) rotor. Especially, most large-sized motors use an IPM rotor unless there are special circumstances.

IPM motors has properties of producing both magnet torque and reluctance torque. The ratio between the magnet torque and the reluctance torque is timely controlled using an inverter. For these reasons, the IMP motors are thought of as being compact and excellent in ability to be controlled.

According to analysis by the inventors, torque on the surface of a rotor producing the magnet torque and the reluctance torque is expressed in FIG. 73 as a function of the distance DM between a surface of one of radially opposed sides of the permanent magnets of the rotor which faces the stator and the center of the axis of the rotor, that is, the radius of a stator core of a typical inner rotor indicated on the horizontal axis.

The potential of the magnet torque, as can be seen in the following equation (eq1), depends upon the strength of magnetic field created by a permanent magnet, while the potential of the reluctance torque, as can be seen in the following equation (eq2), depends upon the degree of inductance, especially, on the q-axis.

$$\text{The magnet torque} = k \cdot \Psi Iq \tag{eq1}$$

$$\text{The reluctance torque} = k \cdot (Lq - Ld) \cdot Iq \cdot Id \tag{eq2}$$

Comparison between the strength of magnetic field produced by the permanent magnet and the degree of inductance of a winding using the radius of the stator core shows that the strength of magnetic field created by the permanent magnet, that is, the amount of magnetic flux $\Psi$ is proportional to a total area of a surface of the permanent magnet which faces the stator. In case of a cylindrical stator, such a total area is a cylindrical surface area of the permanent magnet. Technically speaking, the permanent magnet has an N-pole and an S-pole, and the amount of magnetic flux $\Psi$ is proportional to half the cylindrical surface area. The cylindrical surface area is proportional to the radius of the cylindrical surface and the length of the cylindrical surface. When the length of the cylindrical surface is constant, the cylindrical surface area is proportional to the radius of the cylindrical surface.

The inductance Lq of the winding depends upon the shape of the iron core, but its sensitivity is low and rather proportional to the square of the number of turns of the stator winding, so that it is strongly dependent upon the number of the turns. The inductance L is expressed by a relation of $L = \mu \cdot N^2 \times S/\delta$ where $\mu$ is permeability of a magnetic circuit, N is the number of turns, S is a sectional area of the magnetic circuit, and $\delta$ is an effective length of the magnetic circuit. The number of turns of the winding depends upon the size of space occupied by the winding. In the case of a cylindrical motor, the number of turns, therefore, depends upon the size of space occupied by the winding of the stator, in other words, areas of slots in the stator. The slot is, as demonstrated in FIG. 74, rectangular, so that the area of the slot is proportional to the product of a and b where a is the width of the slot in the circumferential direction, and b is the length of the slot in the radial direction.

The width of the slot in the circumferential direction becomes larger with an increase in diameter of the cylinder, so that the width is proportional to the diameter of the cylinder. The length of the slot in the radial direction is proportional to the diameter of the cylinder. The area of the slot is, therefore, proportional to the square of the diameter of the cylinder. It is apparent from the above equation (eq2) that the reluctance torque is proportional to the square of current in the stator. The performance of the rotating electrical machine, therefore, depends upon how much current is enabled to flow in the rotating electrical machine, that is, depends upon the areas of the slots in the stator. The reluctance is, therefore, proportional to the square of the diameter of the cylinder for a cylinder of constant length. Based on this fact, a relation of the magnetic torque and the reluctance torque with the radius of the stator core is shown by plots in FIG. 73.

The magnet torque is, as shown in FIG. 73, increased linearly as a function of the radius of the stator core, while the reluctance torque is increased in the form of a quadratic function as a function of the radius of the stator core. FIG. 73 shows that when the radius of the stator core is small, the magnetic torque is dominant, while the reluctance torque becomes dominant with an increase in radius of the stator core. The inventors of this application have arrived at the conclusion that an intersection of lines expressing the magnetic torque and the reluctance torque in FIG. 73 lies near a stator core radius of 50 mm. It seems that it is difficult for a motor whose output is 10 kW and whose stator core has a radius much larger than 50 mm to omit the stator core because the use of the reluctance torque is now mainstream. This is one of reasons why the slotless structure is not used in large-sized motors.

The rotating electrical machine using an iron core in the stator always faces a problem associated with the magnetic saturation of the iron core. Particularly, radial gap type rotating electrical machines has a longitudinal section of the rotating shaft which is of a fan shape for each magnetic pole, so that the further inside the rotating electrical machine, the smaller the width of a magnetic circuit, so that inner dimensions of teeth forming slots in the core become a factor of the limit of performance of the rotating electrical machine. Even if a high performance permanent magnet is used, generation of magnetic saturation in the permanent magnet will lead to a difficulty in producing a required degree of performance of the permanent magnet. It is necessary to design the permanent magnet to have an increased inner diameter in order to eliminate a risk of generation of the magnetic saturation, which results in an increase in size of the rotating electrical machine.

For instance, a typical rotating electrical machine with a distributed three-phase winding is designed so that three to six teeth serve to produce a flow of magnetic flux for each magnetic pole, but encounters a risk that the magnetic flux may concentrate on a leading one of the teeth in the circumferential direction, thereby causing the magnetic flux not to flow uniformly in the three to six teeth. For instance, the flow of magnetic flux concentrates on one or two of the teeth, so that the one or two of the teeth in which the magnetic saturation is occurring will move in the circumferential direction with rotation of the rotor, which may lead to a factor causing the slot ripple.

For the above reasons, it is required to omit the teeth in the slot-less structure of the rotating electrical machine in which the radius of the stator core is 50 mm or more to eliminate the risk of generation of the magnetic saturation. The omission of the teeth, however, results in an increase in magnetic resistance in magnetic circuits of the rotor and the stator, thereby decreasing torque produced by the rotating electrical machine. The reason for such an increase in magnetic resistance is that there is, for example, a large air gap between the rotor and the stator. The slot-less structure of the rotating electrical machine in which the radius of the stator core is 50 mm or more, therefore, has room for improvement for increasing the output torque.

It is a principal object of the sixty-third disclosure to provide a rotating electrical machine which is of a slot-less structure in which the above described DM is 50 mm or more and capable of enhancing the degree of torque output.

In the sixty-third disclosure, the more the above value of LM/LS, the greater the thickness of the magnet unit in the radial direction, thereby increasing the degree of magnetomotive force produced by the permanent magnets. This enables the slot-less structure of the rotating electrical machine to increase the magnetic flux density in the stator winding to enhance the torque output therefrom. The higher the value of LM/LS, the smaller the size of the gap between the rotor and the stator winding, thereby resulting in a decrease in magnetic resistance in the magnetic circuit in the rotor and the stator. This enables the torque output to be increased. In the sixty-third disclosure, the value of LM/LS is selected to be 0.6 or more, which is capable of achieving a structure suitable for enhancing the torque output.

Further, in the sixty-third disclosure, if a maximum value of a distance from an axial center of the rotor in the radial direction in a magnetic circuit of the rotor and the stator is defined as a first distance MA, a minimum distance from the axial center of the rotor in the radial direction in the magnetic circuit is defined as a second distance MB, a value of MB/MA is selected to be greater than or equal to 0.7 and smaller than or equal to 1.0. The greater value of MB/MA means that the thinning of the magnetic circuit in the radial direction. The thinning of the magnetic circuit in the radial direction means the magnetic path is shortened, thus resulting in a decrease in magnetic resistance. Accordingly, the structure suitable to decrease the magnetic resistance is achieved by selecting the value of MB/MA to be 0.7 or more. This enhances the torque output.

The structure in which there is no tooth between the conductors arranged in the circumferential direction means that the tooth has a given thickness in the radial direction and a given width in the circumferential direction, and a portion of the magnetic circuit, i.e., a magnet-produced magnetic path is formed between the conductors. In this respect, the structure in which there are no teeth also means that the above described magnetic circuit is not created.

The slot-less structure of the rotating electrical machine may be designed to have a structure in the sixty-fourth disclosure. The sixty-fourth disclosure relates to a rotating electrical machine which comprises: (a) a stator which is equipped with a stator winding made up of a plurality of conductors; and (b) a rotor which is equipped with a magnet unit disposed on a surface thereof facing the stator, the rotor being retained to be rotatable. The conductors include magnet facing portions arranged to face the magnet unit in a radial direction and turns each of which joints a first one and a second one of the magnet facing portions used for the same phase together axially outside the magnet facing portions. The first and second ones of the magnet facing portions are arranged away from each other with a given number of the magnet facing portions interposed therebetween. The magnet facing portions of the stator winding are arranged at a given interval away from each other in a circumferential direction. The magnet unit includes a plurality of magnets which are disposed on a surface of the rotor which faces the stator and have magnetic poles arrayed alternately in the circumferential direction. The stator is equipped with winding-to-winding members each of which is disposed between the magnetic facing portions arranged adjacent each other in the circumferential direction. If a width of the winding-to-winding members energized by excitation of the stator winding in the circumferential direction within a portion of the magnet unit equivalent to one of magnetic poles thereof is defined as Wt, a saturation magnetic flux density of the winding-to-winding members is defined as Bs, a width of the magnet unit equivalent to one of the magnetic poles in the circumferential direction of the magnet unit is defined as Wm, and the remanent flux density in the magnet unit is defined as Br, the winding-to-winding members are made of magnetic material meeting a relation of Wt×Bs≤Wm×Br or non-magnetic material.

The structure in the sixty-fourth disclosure has the stator sufficiently receiving magnetic flux produced by the magnet unit of the rotor.

The slot-less structure of the rotating electrical machine may be designed to have a structure in the sixty-sixth disclosure. The sixty-sixth disclosure relates to a rotating electrical machine which comprises: (a) a rotor which includes a magnet unit and is retained to be rotatable; and (b) a stator which is equipped with a stator winding including a plurality of conductors and a stator core. The stator is arranged coaxially with the rotor. A distance between a surface of the magnet unit which faces the stator in a radial direction and an axial center of the rotor in the radial direction is set to be 50 mm or more. The conductors include magnet facing portions arranged to face the magnet unit in a radial direction and turns each of which joints a first one and a second one of the magnet facing portions used for the same phase together axially outside the magnet facing portions. The first and second ones of the magnet facing portions are arranged away from each other with a given number of the magnet facing portions interposed therebetween. The first and second ones of the magnet facing portions which are used for the same phase and joined together by one of the turns are arranged on the same pitch circle defined about a center of the rotor. The stator core includes a yoke located on an opposite side of the stator winding to the rotor in the radial direction and protrusions which protrude from the yoke toward an interval between the circumferentially adjacent magnet facing portions. The thickness of each of the protrusions from the yoke in the radial direction is smaller than half a thickness of the magnet facing portion in the radial direction.

In the sixty-sixth disclosure, the stator core is equipped with the protrusions each of which extends from the yoke toward a gap between the circumferentially adjacent magnet facing portions. The thickness of each of the protrusions from the yoke in the radial direction is smaller than half the thickness of one of the magnet facing portions which is arranged adjacent the yoke in the radial direction. In this case, each of the magnet facing portions of the stator winding may be arranged in the circumferential direction with use of the protrusions as positioners. Since the thickness of the protrusions is restricted in the radial direction, the protrusions do not serve as teeth between the circumferentially adjacent magnet facing portions. The rotating electrical machine in the sixty-sixth disclosure is, therefore, of the slot-less structure.

The structure in the sixty-sixth disclosure may be designed to have a structure in the sixty-seventh disclosure. In the sixty-seventh disclosure, the magnet facing portions are arranged at a given interval away from each other in a circumferential direction of the stator winding and stacked in a multi-layer form in a radial direction of the stator winding. The thickness of each of the protrusions from the yoke in the radial direction is smaller than half the thickness of one of the magnet facing portions which is arranged adjacent the yoke in the radial direction.

The structure in the sixty-seventh disclosure may be designed to have a structure in the sixty-eighth disclosure. In the sixty-eighth disclosure, the protrusions engage the magnet facing portions in the circumferential direction.

The structure in the sixty-eighth disclosure is capable of arranging the magnet facing portions of the stator winding in the circumferential direction with use of the protrusions as positioners.

The sixty-ninth disclosure relates to the structure, as set forth in any one of the sixty-fifth to the sixty-eighth disclosure, wherein the stator is equipped with a stator core which is arranged on one of radially opposed sides of the stator winding which is located farther away from the rotor.

In the sixty-ninth disclosure, the stator core which is arranged on the opposite side to the rotor in the radial direction functions as a back yoke, thereby creating a required magnetic circuit even when there is no tooth between the magnet facing portions.

The seventieth disclosure relates to the structure, as set forth in any one of the sixty-fifth to the sixty-eighth disclosure, wherein the rotor is arranged radially outside the stator. The magnet unit includes first magnets whose magnetization direction extends in an arc-shape toward the center of a magnetic pole thereof and second magnets whose magnetization direction extends in an arc-shape toward the center of a magnetic pole thereof. The first magnets are different in magnetic polarity than the second magnets. The first magnets and the second magnets are arranged alternately in the circumferential direction on a surface of the rotor which faces the stator. The first distance is a distance between the axial center of the rotor and a radially outer surface of the annular magnet unit in the radial direction. The second distance is a distance between the axial center of the rotor and a radially inner surface of the annular stator core in the radial direction.

In the seventieth disclosure, the rotor is of an outer rotor structure in which the rotor is arranged radially outside the stator. The second distance is, therefore, set to a distance between the axial center of the rotor and a radially inner surface of the stator core in the radial direction.

The structure in the seventieth disclosure uses polar anisotropic permanent magnets in order to strengthen torque outputted by the rotating electrical machine. Specifically, the magnet unit includes the first magnets whose magnetization direction extends in an arc-shape toward the center of the magnetic pole thereof and the second magnets whose magnetization direction extends in an arc-shape toward the center of the magnetic pole thereof. The first magnets are different in magnetic polarity than the second magnets. The first magnets and the second magnets are arranged alternately in the circumferential direction. This enables the amount of magnetic flux in the magnetic circuit to be increased to enhance the torque produced by the rotating electrical machine. In this structure, most of the magnetic flux, as produced by the magnet unit, passes through the magnet unit. Accordingly, in the seventieth disclosure, the first distance is set to a distance between the axial center of the rotor and the radially outer surface of the annular magnet unit in the radial direction.

The seventy-first disclosure relates to the structure, as set forth in any one of the sixty-fifth to the sixty-eighth disclosure, wherein the rotor is arranged radially outside the stator. The magnet unit includes first magnets whose magnetization direction is oriented in the radial direction and second magnets whose magnetization direction is oriented in a direction other than the radial direction. The first magnets are arranged at a given interval away from each other in the circumferential direction on a surface of the rotor which faces the stator. Each of the second magnets is disposed in the circumferentially adjacent first magnets. If an interval between magnetic poles of the magnet unit in the circumferential direction is defined as df from the radially outer surface of the magnet unit, the first distance is a distance between a place located away from a radially outer surface of the magnet unit by df/2 outward in the radial direction and the axial center of the rotor, and the second distance is a distance between the axial center of the rotor and a radially inner surface of the annular stator core in the radial direction.

The structure in the seventy-first disclosure is designed as an outer rotor structure. The second distance is, therefore, set to a distance between the axial center of the rotor and a radially inner surface of the annular stator core in the radial direction.

The structure in the seventy-first disclosure is equipped with the first magnets whose magnetization direction is oriented in the radial direction and the second magnets whose magnetization direction is oriented in a direction other than the radial direction in order to increase the amount of magnetic flux produced by the magnets. A portion of the magnetic flux produced by the magnet unit leaks from the stator core. The magnetic circuit is, therefore, increased in size outward in the radial direction, as compared with the ninth means. The effects resulting from the increase in size in the outward radial direction may be quantified as a function of the value df that is an interval between the magnetic poles of the magnet unit in the circumferential direction. Accordingly, in the seventy-first disclosure, the first distance is set to a distance between the place located away from the radially outer surface of the magnet unit by df/2 outward in the radial direction and the axial center of the rotor.

The seventy-second disclosure relates to the structure, as set forth in any one of the sixty-fifth to the sixty-eighth disclosure, wherein the rotor is arranged radially inside the stator. The magnet unit includes the first magnets whose magnetization direction extends in an arc-shape toward the center of the magnetic pole thereof and the second magnets whose magnetization direction extends in an arc-shape toward the center of the magnetic pole thereof. The first magnets are different in magnetic polarity than the second magnets. The first magnets and the second magnets are arranged on a surface of the rotor which faces the stator alternately in the circumferential direction. The first distance is a distance between the axial center of the rotor and a radially outer surface of the annular stator core in the radial direction. The second distance is a distance between the axial center of the rotor and a radially inner surface of the magnet unit in the radial direction.

The structure in the seventy-second disclosure is designed as an inner rotor structure in which the rotor is arranged radially inside the stator. The second distance is, therefore, set to a distance between the axial center of the rotor and a radially inner surface of the stator core in the radial direction.

In the seventy-second disclosure, the polar anisotropic permanent magnets are used. In this structure, most of the magnetic flux, as produced by the magnet unit, passes through the magnet unit. Accordingly, in the seventy-second disclosure, the first distance is set to a distance between the axial center of the rotor and the radially outer surface of the stator core in the radial direction.

In the seventy-second disclosure, the rotor is arranged radially inside the stator. The magnet unit includes the first magnets whose magnetization direction is oriented in the radial direction and the second magnets whose magnetization direction is oriented in a direction other than the radial direction. Each of the second magnets is disposed between the circumferentially adjacent first magnets. If an interval between magnetic poles of the magnet unit in the circumferential direction is defined as df from the radially outer surface of magnet unit, the first distance is a distance between a place located away from a radially inner surface of the stator core by df/2 inward in the radial direction and the axial center of the rotor, and the second distance is a distance between the axial center of the rotor and a radially inner surface of the magnet unit in the radial direction.

The structure in the seventy-second disclosure is designed as an inner rotor structure in which the rotor is arranged radially inside the stator. The second distance is, therefore, set to a distance between the axial center of the rotor and a radially inner surface of the stator core in the radial direction.

The structure in the seventy-second disclosure is equipped with the first magnets whose magnetization direction is oriented in the radial direction and the second magnets whose magnetization direction is oriented in a direction other than the radial direction in order to increase the amount of magnetic flux produced by the magnets. In this structure, a portion of the magnetic flux produced by the magnet unit leaks from the stator core. Accordingly, in the seventy-second disclosure, the first distance is set to a distance between the place located away from the radially inner surface of the stator core by df/2 inward in the radial direction and the axial center of the rotor in the radial direction.

The seventy-third disclosure relates to the structure, as set forth in any one of the sixty-ninth to the seventy-second disclosure, wherein the stator core has a thickness in the radial direction thereof which is smaller than that of the magnet unit in the radial direction and greater than that of the stator winding in the radial direction.

The structure in the seventy-third disclosure enables the stator to receive magnetic flux generated by the magnets of the magnet unit without magnetic saturation and is capable of avoiding leakage of magnetic flux from the stator.

The seventy-fourth disclosure relates to the structure, as set forth in any one of the sixty-third to the seventy-third disclosure, wherein the stator winding is made using a conductor having a flattened cross section whose thickness in a radial direction of the stator winding is smaller than a width thereof in a circumferential direction of the stator winding.

In the seventy-fourth disclosure, the conductor of the stator winding is designed in a flattened shape to have a thickness of the magnet facing portions decreased in the radial direction, thereby enabling the centers of the magnet facing portions in the radial direction to be arranged close to the magnet unit of the rotor. This minimizes the magnetic saturation occurring in the stator using the slot-less structure and increases the density of magnetic flux in the magnetic facing portions of the stator winding to increase the torque output.

The seventy-fifth disclosure relates to the structure, as set forth in any one of the sixty-third to the seventy-fourth disclosure, wherein if a length of a portion of the magnetic unit equivalent to one magnetic pole in the circumferential direction is defined as Cs, $2 \times DM/Cs$ is selected to be in a range of 3.5 or more and 12 or less.

The circumferential dimension of a surface of the magnet unit which faces the stator is approximately expressed by $2\pi \times DM$. The value of $2\pi \times DM/Cs$ indicates a ratio of a circumferential dimension of one magnetic pole to the above circumferential dimension. When the value of $2 \times DM/Cs$ is selected to be greater than or equal to 3.5 and smaller than or equal to 12, an integer value of $2 \times DM/Cs$ will be 11 or more and 37 or less. Therefore, the number of magnetic poles in the above type of the rotating electrical machine is a relatively great value, that is, in a range of 12 or more and 36 or less. This enables the amount of magnetic flux produced by one magnetic pole to be decreased, thereby enabling the volume of the magnets to be decreased.

BRIEF DESCRIPTION OF THE DRAWINGS

The above described object, another object, features, or beneficial advantages in this disclosure will be apparent from the appended drawings or the following detailed discussion.

In the drawings:

FIG. 18(*a*) is a view for explaining an effect of decreasing eddy current in a conventional structure.

FIG. 18(*b*) is a view for explaining an effect of decreasing eddy current in the first embodiment.

FIG. 19(*a*) is a view for explaining an effect of decreasing eddy current.

FIG. 19(*b*) is a developed view of FIG. 19(*a*).

FIG. 29(*b*) is a time chart which represents and a change in torque produced by a rotating electrical machine.

FIG. 36(*b*) is a view which illustrates a magnet unit equipped with magnetic member in the second embodiment.

EMBODIMENTS FOR CARRYING OUT THE INVENTION

Figure 1:
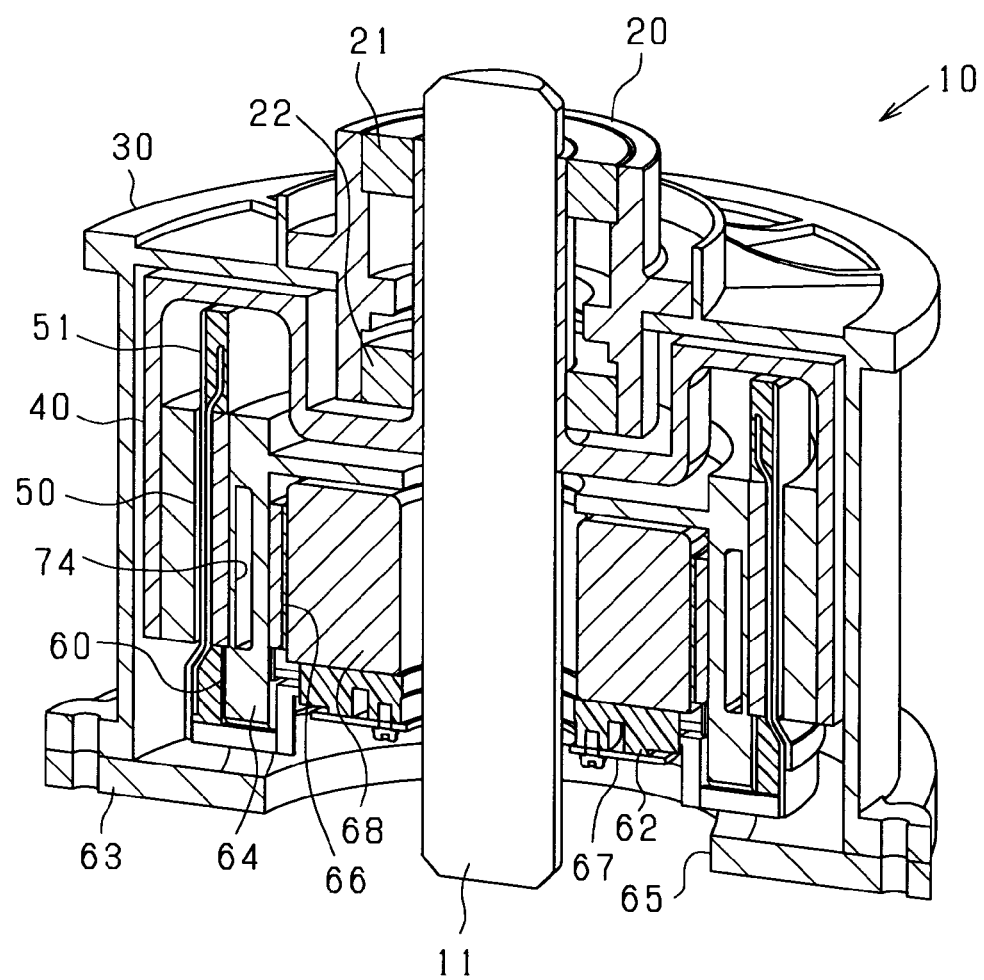
FIG. 1 is a perspective longitudinal sectional view of a rotating electrical machine.

The rotating electrical machine in the embodiments is configured to be used, for example, as a power source for vehicles. The rotating electrical machine may, however, be used widely for industrial, automotive, domestic, office automation, or game applications. In the following embodiments, the same or equivalent parts will be denoted by the same reference numbers in the drawings, and explanation thereof in detail will be omitted.

First Embodiment

Figure 2:
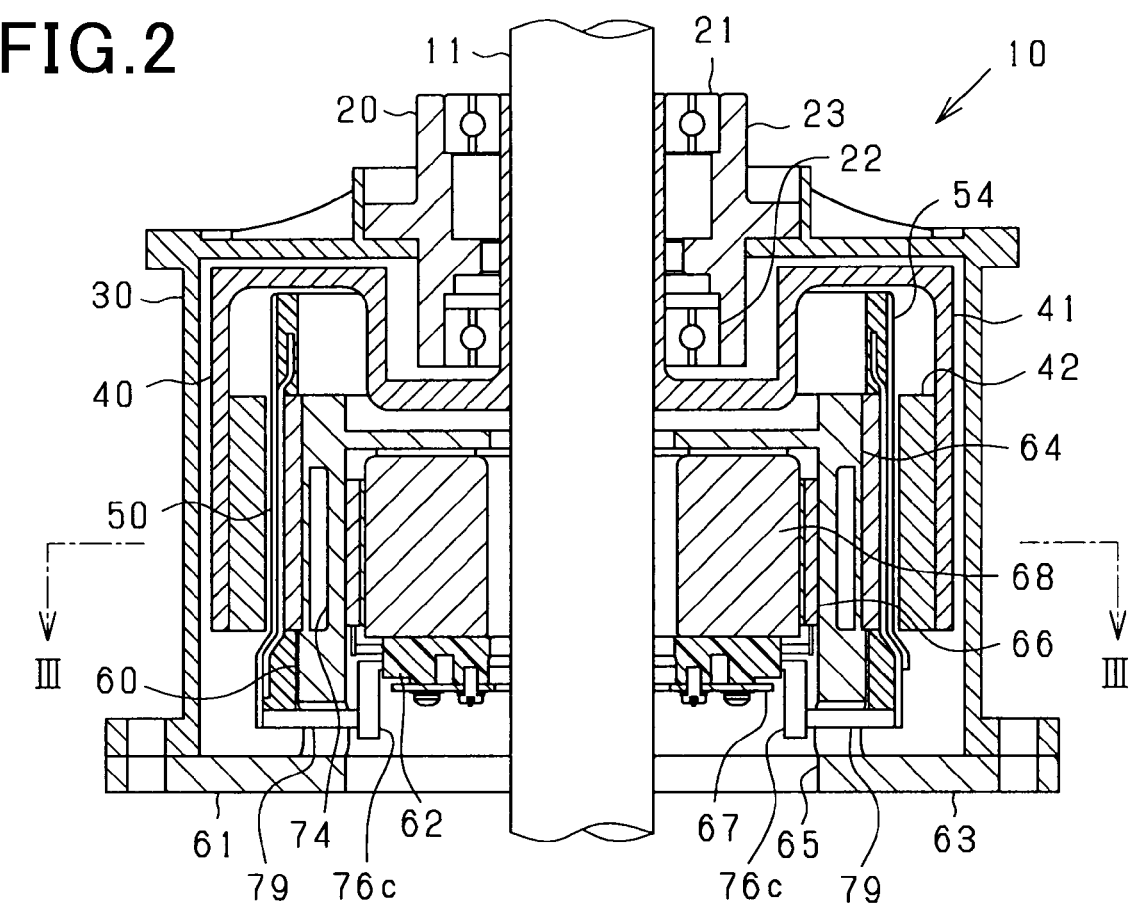
FIG. 2 is a longitudinal sectional view of a rotating electrical machine.
Figure 3:
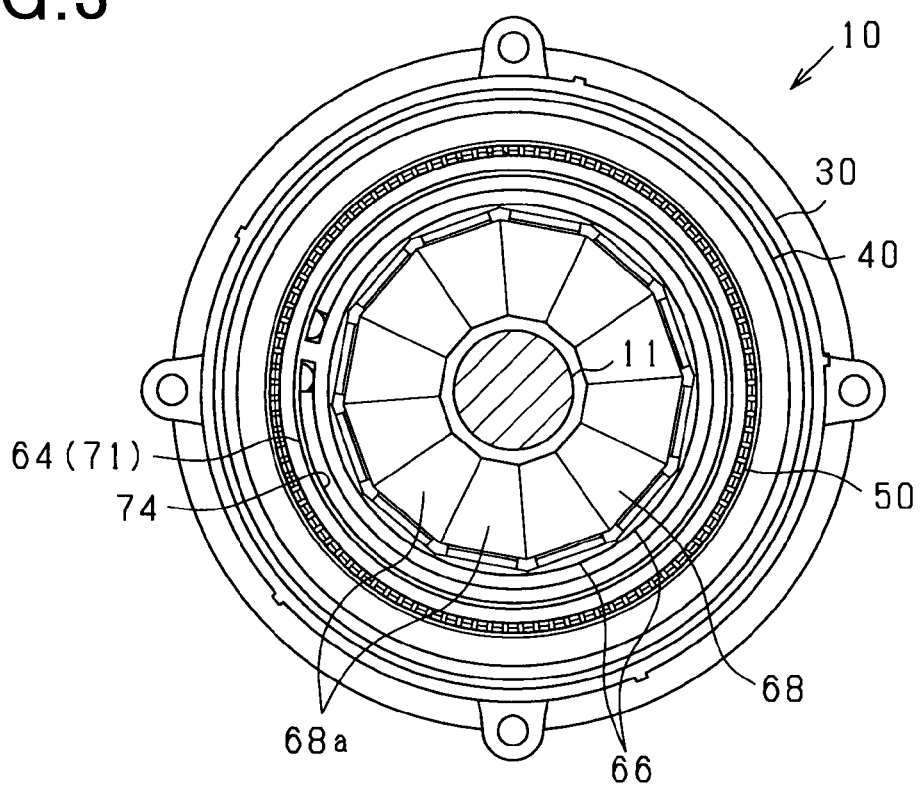
FIG. 3 is a sectional view taken along the line III-III in FIG. 2.
Figure 4:
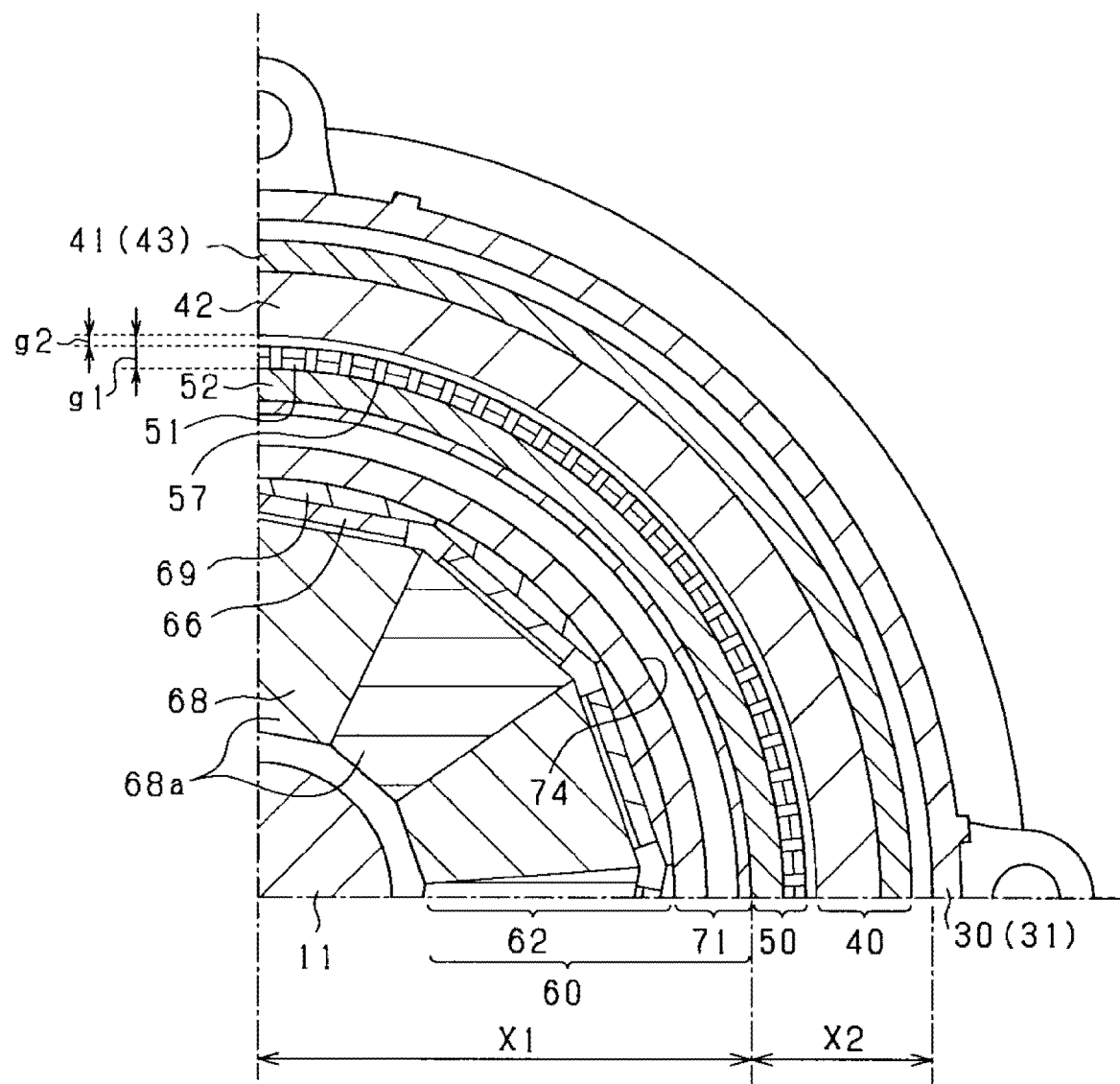
FIG. 4 is a partially enlarged sectional view of FIG. 3.
Figure 5:
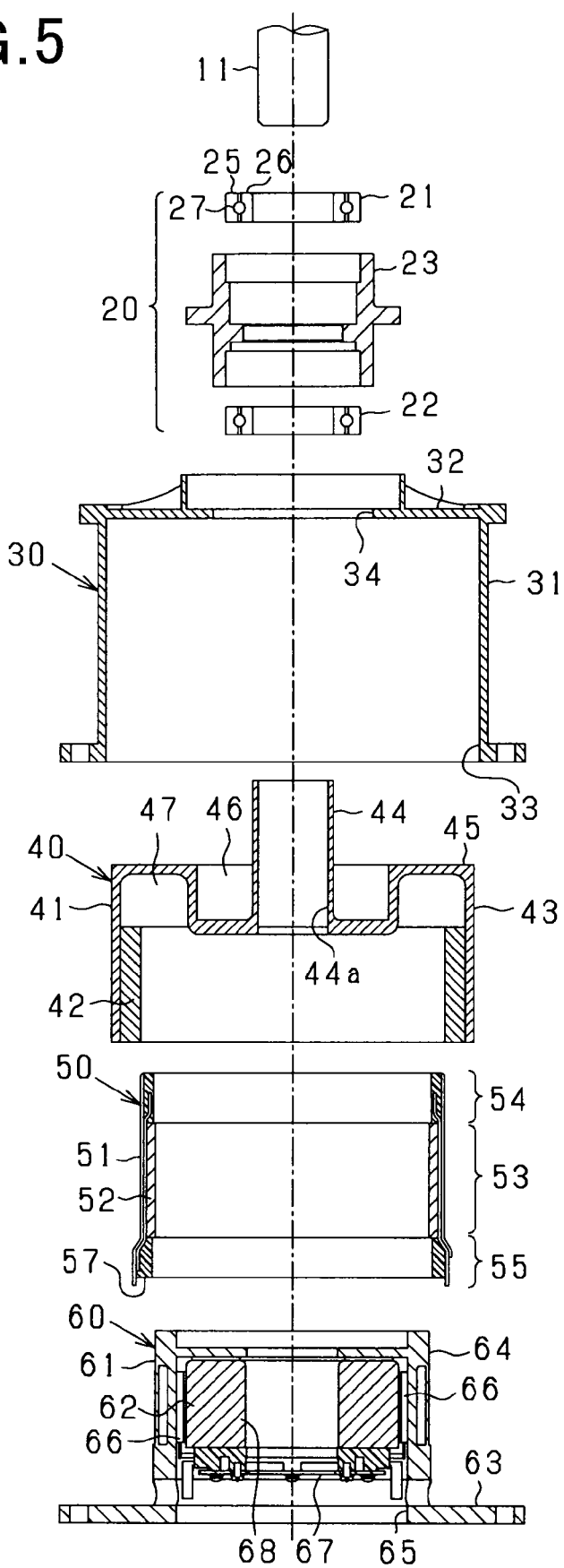
FIG. 5 is an exploded view of a rotating electrical machine.

The rotating electrical machine 10 in this embodiment is a synchronous polyphase ac motor having an outer rotor structure (i.e., an outer rotating structure). The outline of the rotating electrical machine 10 is illustrated in FIGS. 1 to 5. FIG. 1 is a perspective longitudinal sectional view of the rotating electrical machine 10. FIG. 2 is a longitudinal sectional view along the rotating shaft 11 of the rotating electrical machine 10. FIG. 3 is a transverse sectional view (i.e., sectional view taken along the line III-III in FIG. 2) of the rotating electrical machine 10 perpendicular to the rotating shaft 11. FIG. 4 is a partially enlarged sectional view of FIG. 3. FIG. 5 is an exploded view of the rotating electrical machine 10. FIG. 3 omits hatching showing a section except the rotating shaft 11 for the sake of simplicity of the drawings. In the following discussion, a lengthwise direction of the rotating shaft 11 will also be referred to as an axial direction. A radial direction from the center of the rotating shaft 11 will be simply referred to as a radial direction. A direction along a circumference of the rotating shaft 11 about the center thereof will be simply referred to as a circumferential direction.

The rotating electrical machine 10 includes the bearing unit 20, the housing 30, the rotor 40, the stator 50, and the inverter unit 60. These members are arranged coaxially with each other together with the rotating shaft 11 and assembled in a given sequence to complete the rotating electrical machine 10.

The bearing unit 20 includes two bearings 21 and 22 arranged away from each other in the axial direction and the retainer 23 which retains the bearings 21 and 22. The bearings 21 and 22 are implemented by, for example, radial ball bearings each of which includes the outer race 25, the inner race 26, and a plurality of balls 27 disposed between the outer race 25 and the inner race 26. The retainer 23 is of a cylindrical shape. The bearings 21 and 22 are disposed radially inside the retainer 23. The rotating shaft 11 and the rotor 40 are retained radially inside the bearings 21 and 22 to be rotatable.

The housing 30 includes the cylindrical peripheral wall 31. The peripheral wall 31 has a first end and a second end opposed to each other in an axial direction thereof. The peripheral wall 31 has the end surface 32 on the first end and the opening 33 in the second end. The opening 33 occupies the entire area of the second end. The end surface 32 has formed in the center thereof the circular hole 34. The bearing unit 20 is inserted into the hole 34 and fixed using a fastener, such as a screw or a rivet. The hollow cylindrical rotor 40 and the hollow cylindrical stator 50 are disposed in an inner space defined by the peripheral wall 31 and the end surface 32 within the housing 30. In this embodiment, the rotating electrical machine 10 is of an outer rotor type, so that the stator 50 is arranged radially inside the cylindrical rotor 40 within the housing 30. The rotor 40 is retained in a cantilever form by a portion of the rotating shaft 11 close to the end surface 32 in the axial direction.

The rotor 40 includes the hollow cylindrical magnetic holder 41 and the annular magnet unit 42 disposed radially inside the magnet holder 41. The magnet holder 41 is of substantially a cup-shape and works as a magnet holding member. The magnet holder 41 includes the magnet retainer 43, the fixing portion 44 which is of a cylindrical shape and smaller in diameter than the magnet retainer 43, and the intermediate portion 45 connecting the magnet retainer 43 and the fixing portion 44 together. The magnet retainer 43 has the magnet unit 42 secured to an inner peripheral surface thereof.

The rotating shaft 11 passes through the through-hole 44a of the fixing portion 44. The fixing portion 44 is secured to a portion of the rotating shaft 11 disposed inside the through-hole 44a. In other words, the magnet holder 41 is secured to the rotating shaft 11 through the fixing portion 44. The fixing portion 44 may preferably be joined to the rotating shaft 11 using concavities and convexities, such as a spline joint or a key joint, welding, or crimping, so that the rotor 40 rotates along with the rotating shaft 11.

The bearings 21 and 22 of the bearing unit 20 are secured radially outside the fixing portion 44. The bearing unit 20 is, as described above, fixed on the end surface 32 of the housing 30, so that the rotating shaft 11 and the rotor 40 are retained by the housing 30 to be rotatable. The rotor 40 is, thus, rotatable within the housing 30.

The rotor 40 is equipped with the fixing portion 44 arranged only one of ends thereof opposed to each other in the axial direction of the rotor 40. This cantilevers the rotor 40 on the rotating shaft 11. The fixing portion 44 of the rotor 40 is rotatably retained at two points of supports using the bearings 21 and 22 of the bearing unit 20 which are located away from each other in the axial direction. In other words, the rotor 40 is held to be rotatable using the two bearings 21 and 22 which are separate at a distance away from each other in the axial direction on one of the axially opposed ends of the magnet holder 41. This ensures the stability in rotation of the rotor 40 even though the rotor 40 is cantilevered on the rotating shaft 11. The rotor 40 is retained by the bearings 21 and 22 at locations which are away from the center intermediate between the axially opposed ends of the rotor 40 in the axial direction thereof.

The bearing 22 of the bearing unit 20 which is located closer to the center of the rotor 40 (a lower one of the bearings 21 and 22 in the drawings) is different in dimension of a gap between each of the outer race 25 and the inner race and the balls 27 from the bearing 21 which is located farther away from the center of the rotor 40 (i.e., an upper one of the bearings 21 and 22). For instance, the bearing 22 closer to the center of the rotor 40 is greater in the dimension of the gap from the bearing 21. This minimizes adverse effects on the bearing unit 20 which arise from deflection of the rotor 40 or mechanical vibration of the rotor 40 due to imbalance resulting from parts tolerance at a location close to the center of the rotor 40. Specifically, the bearing 22 closer to the center of the rotor 40 is engineered to have dimensions of the gaps or plays increased using precompression, thereby absorbing the vibration generated in the cantilever structure. The precompression may be provided by either fixed position preload or constant pressure preload. In the case of the fixed position preload, the outer race 25 of each of the bearings 21 and 22 is joined to the retainer 23 using press-fitting or welding. The inner race 26 of each of the bearings 21 and 22 is joined to the rotating shaft 11 by press-fitting or welding. The precompression may be created by placing the outer race 25 of the bearing 21 away from the inner race 26 of the bearing 21 in the axial direction or alternatively placing the outer race 25 of the bearing 22 away from the inner race 26 of the bearing 22 in the axial direction.

The intermediate portion 45 includes a radially center portion and a radially outer portion and has a difference in level between the radially center portion and the radially outer portion in the axial direction. In other words, the radially center portion and the radially outer portion are different in level from each other in the axial direction. This layout results in a partial overlap between the magnet retainer 43 and the fixing portion 44 in the axial direction. In other words, the magnet retainer 43 protrudes outside a base end portion (i.e., a lower portion, as viewed in the drawing) of the fixing portion 44 in the axial direction. The structure in this embodiment enables the rotor 40 to be retained by the rotating shaft 11 at a location closer to the center of gravity of the rotor 40 than a case where the intermediate portion 45 is shaped to be flat without any shoulder, thereby ensuring the stability in operation of the rotor 40.

In the above described structure of the intermediate portion 45, the rotor 40 has the annular bearing housing recess 46 which is formed in an inner portion of the intermediate portion 45 and radially surrounds the fixing portion 44. The bearing housing recess 46 has a portion of the bearing unit 20 disposed therein. The rotor 40 also has the coil housing recess 47 which is formed in an outer portion of the intermediate portion 45 and radially surrounds the bearing housing recess 46. The coil housing recess 47 has disposed therein the coil end 54 of the stator winding 51 of the stator 50, which will be described later in detail. The housing recesses 46 and 47 are arranged adjacent each other in the axial direction. In other words, a portion of the bearing unit 20 is laid to overlap the coil end 54 of the stator winding 51 in the axial direction. This enables the rotating electrical machine 10 to have a length decreased in the axial direction.

The coil end 54 may be bent radially inwardly or outwardly to have a decreased axial dimension, thereby enabling the axial length of the stator 50 to be decreased. A direction in which the coil end 54 is bent is preferably determined depending upon installation thereof in rotor 40. In the case where the stator 50 is installed radially inside the rotor 40, a portion of the coil end 54 which is inserted into the rotor 40 is preferably bent radially inwardly. A coil end opposite the coil end 54 may be bent either inwardly or outwardly, but is preferably bent to an outward side where there is an enough space in terms of the production thereof.

The magnet unit 42 working as a magnetic portion is made up of a plurality of permanent magnets which are disposed radially inside the magnet retainer 43 to have different magnetic poles arranged alternately in a circumferential direction thereof. The magnet unit 42 will also be described later in detail.

The stator 50 is arranged radially inside the rotor 40. The stator 50 includes the stator winding 51 wound in a substantially cylindrical form and the stator core 52 arranged radially inside the stator winding 51. The stator winding 51 is arranged to face the annular magnet unit 42 through a given air gap therebetween. The stator winding 51 includes a plurality of phase windings each of which is made of a plurality of conductors which are arranged at a given pitch away from each other in the circumferential direction and joined together. In this embodiment, two three-phase windings: one including a U-phase winding, a V-phase winding, and a W-phase winging and the other including an X-phase winding, a Y-phase winding, and a Z-phase winding are used to complete the stator winding 51 as a six-phase winding.

The stator core 52 is formed by an annular stack of magnetic steel plates made of soft magnetic material and mounted radially inside the stator winding 51.

The stator winding 51 overlaps the stator core 52 in the radial direction and includes the coil side portion 53 disposed radially outside the stator core 52 and the coil ends 54 and 55 overhanging at ends of the stator core 52 in the axial direction. The coil side portion 53 faces the stator core 52 and the magnet unit 42 of the rotor 40 in the radial direction. The stator 50 is arranged inside the rotor 40. The coil end 54 that is one (i.e., an upper one, as viewed in the drawings) of the axially opposed coil ends 54 and 55 and arranged close to the bearing unit 20 is disposed in the coil housing recess 47 defined by the magnet holder 41 of the rotor 40. The stator 50 will also be described later in detail.

The inverter unit 60 includes the unit base 61 secured to the housing 30 using fasteners, such as bolts, and a plurality of electrical components 62 mounted on the unit base 61. The unit base 61 is made from, for example, carbon fiber reinforced plastic (CFRP). The unit base 61 includes the end plate 63 secured to an edge of the opening 33 of the housing 30 and the casing 64 which is formed integrally with the end plate 63 and extends in the axial direction. The end plate 63 has the circular opening 65 formed in the center thereof. The casing 64 extends upward from a peripheral edge of the opening 65.

The stator 50 is arranged on an outer peripheral surface of the casing 64. Specifically, an outer diameter of the casing 64 is selected to be identical with or slightly smaller than an inner diameter of the stator core 52. The stator core 52 is attached to the outer side of the casing 64 to complete a unit made up of the stator 50 and the unit base 61. The unit base 61 is secured to the housing 30, so that the stator 50 is unified with the housing 50 in a condition where the stator core 52 is installed on the casing 64.

The casing 64 has a radially inner storage space in which the electrical components 62 are disposed. The electrical components 62 are arranged to surround the rotating shaft 11 within the storage space. The casing 64 functions as a storage space forming portion. The electrical components 62 include the semiconductor modules 66, the control board 67, and the capacitor module 68 which constitute an inverter circuit.

Figure 6:
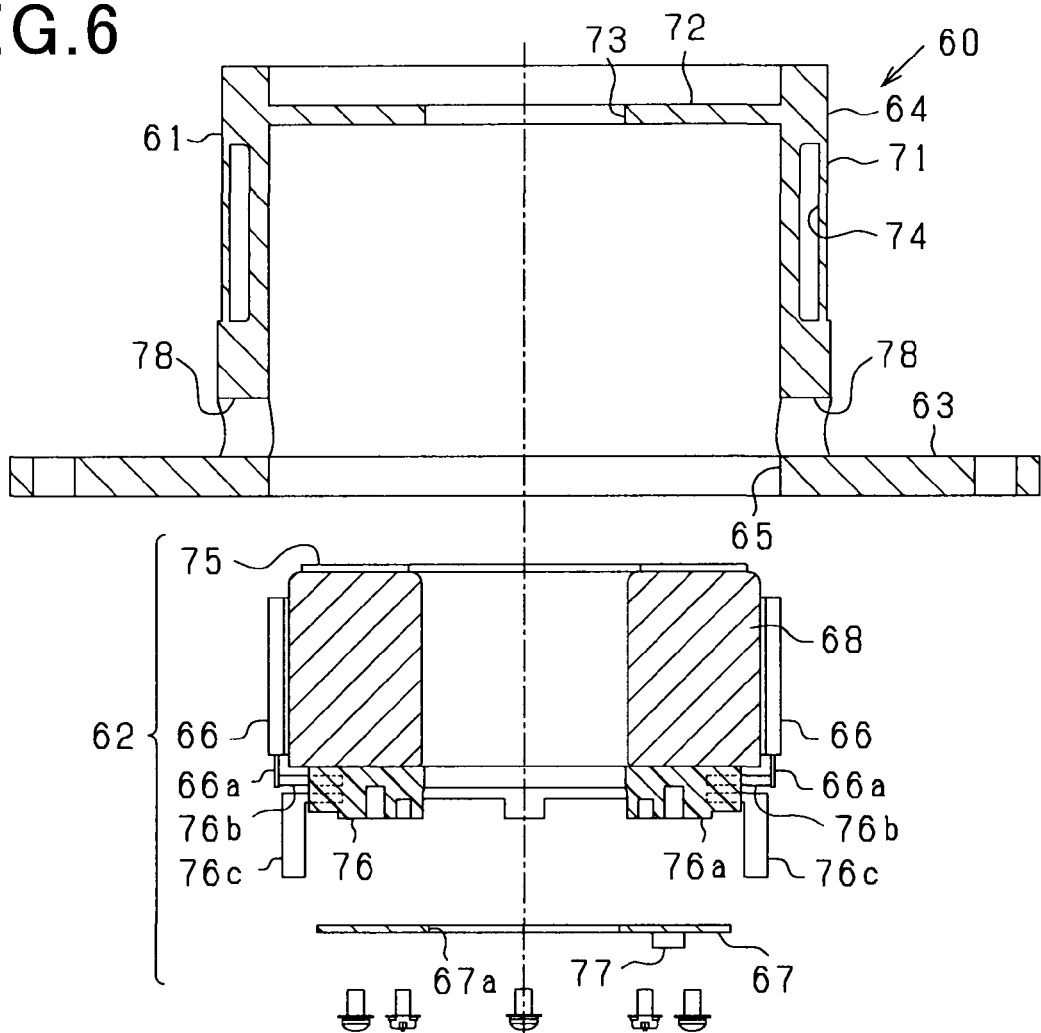
FIG. 6 is an exploded view of an inverter unit.

The inverter unit 60 will be also be described using FIG. 6 that is an exploded view in addition to FIGS. 1 to 5.

The casing 64 of the unit base 61 includes the cylinder 71 and the end surface 72 that is one of ends of the cylinder 71 which are opposed to each other in the axial direction of the cylinder 71 (i.e., the end of the casing 64 close to the bearing unit 20). The end of the cylinder 71 opposed to the end surface 72 in the axial direction is shaped to be fully open through the opening 65 of the end plate 63. The end surface 72 has formed in the center thereof the circular hole 73 through which the rotating shaft 11 is insertable.

The cylinder 71 of the casing 64 serves as a partition which isolates the rotor 40 and the stator 50 arranged radially outside the cylinder 71 from the electrical components 62 arranged radially inside the cylinder 71. The rotor 40, the stator 50, and the electrical components 62 are arranged radially inside and outside the cylinder 71.

The electrical components 62 are electrical devices making up the inverter circuit equipped with a motor function and a generator function. The motor function is to deliver electrical current to the phase windings of the stator winding 51 in a given sequence to turn the rotor 40. The generator function is to receive a three-phase ac current flowing through the stator winding 51 in response to the rotation of the rotating shaft 11 and generate and output electrical power. The electrical components 62 may be engineered to perform either one of the motor function and the generator function. In a case where the rotating electrical machine 10 is used as a power source for a vehicle, the generator function has a regenerative function to output a regenerated electrical power.

Specifically, the electrical components 62 include the hollow cylindrical capacitor module 68 arranged around the rotating shaft 11 and the semiconductor modules 66 mounted on the capacitor module 68. The capacitor module 68 has a plurality of smoothing capacitors 68a connected in parallel to each other. Specifically, each of the capacitors 68a is implemented by a stacked-film capacitor which is made of a plurality of film capacitors stacked in a trapezoidal shape in cross section. The capacitor module 68 is made of the twelve capacitors 68a arranged in an annular shape.

The capacitors 68a may be produced by preparing a long film which has a given width and is made of a stack of films and cutting the long film into isosceles trapezoids each of which has a height identical with the width of the long film and whose short bases and long bases are alternately arranged. Electrodes are attached to the thus produced capacitor devices to complete the capacitors 68a.

The semiconductor module 66 includes, for example, a semiconductor switch, such as a MOSFET or an IGBT and is of substantially a planar shape. In this embodiment, the rotating electrical machine 10 is, as described above, equipped with two sets of three-phase windings and has the inverter circuits, one for each set of the three-phase windings. The electrical components 62, therefore, include a total of twelve semiconductor modules 66 which are arranged in an annular form to make up the semiconductor module group 66A.

The semiconductor modules 66 are interposed between the cylinder 71 of the casing 64 and the capacitor module 68. The semiconductor module group 66A has an outer peripheral surface placed in contact with an inner peripheral surface of the cylinder 71. The semiconductor module group 66A also has an inner peripheral surface placed in contact with an outer peripheral surface of the capacitor module 68. This causes heat, as generated in the semiconductor modules 66, to be transferred to the end plate 63 through the casing 64, so that it is dissipated from the end plate 63.

The semiconductor modules 66 preferably has the spacers 69 disposed radially outside the outer peripheral surface thereof, i.e., between the semiconductor modules 66 and the cylinder 71. A combination of the capacitor modules 68 is so arranged as to have a regular dodecagonal section extending perpendicular to the axial direction thereof, while the inner periphery of the cylinder 71 has a circular transverse section. The spacers 69 are, therefore, each shaped to have a flat inner peripheral surface and a curved outer peripheral surface. The spacers 69 may alternatively be formed integrally with each other in an annular shape and disposed radially outside the semiconductor module group 66A. The spacers 69 are highly thermally conductive and made of, for example, metal, such as aluminum or heat dissipating gel sheet. The inner periphery of the cylinder 71 may alternatively be shaped to have a dodecagonal transverse section like the capacitor modules 68. In this case, the spacers 69 are each preferably shaped to have a flat inner peripheral surface and a flat outer peripheral surface.

In this embodiment, the cylinder 71 of the casing 64 has formed therein the coolant path 74 as a cooling portion through which coolant flows. The heat generated in the semiconductor modules 66 is also released to the coolant flowing in the coolant path 74. In other words, the casing 64 is equipped with a cooling mechanism. The coolant path 74 is, as clearly illustrated in FIGS. 3 and 4, formed in an annular shape and surrounds the electrical components 62 (i.e., the semiconductor modules 66 and the capacitor module 68). The semiconductor modules 66 are arranged along the inner peripheral surface of the cylinder 71. The coolant path 74 is laid to overlap the semiconductor modules 66 in the radial direction.

The stator 50 is arranged outside the cylinder 71. The electrical components 62 are arranged inside the cylinder 71. This layout causes the heat to be transferred from the stator 50 to the outer side of the cylinder 71 and also transferred from the semiconductor modules 66 to the inner side of the cylinder 71. It is possible to simultaneously cool the stator 50 and the semiconductor modules 66, thereby facilitating dissipation of thermal energy generated by heat-generating members of the rotating electrical machine 10.

The electrical components 62 include the insulating sheet 75 disposed on one of axially opposed end surfaces of the capacitor module 68 and the wiring module 76 disposed on the other end surface of the capacitor module 68. The capacitor module 68 has two axially-opposed end surfaces: a first end surface and a second end surface. The first end surface of the capacitor module 68 closer to the bearing unit 20 faces the end surface 72 of the casing 64 and is laid on the end surface 72 through the insulating sheet 75. The second end surface of the capacitor module 68 closer to the opening 65 has the wiring module 76 mounted thereon.

The wiring module 76 includes the resin-made circular plate-shaped body 76a and a plurality of bus bars 76b and 76c embedded in the body 76a. The bus bars 76b and 76c electrically connect the semiconductor modules 66 and the capacitor module 68 together. Specifically, the semiconductor modules 66 are equipped with the connecting pins 66a extending from axial ends thereof. The connecting pins 66a connect with the bus bars 76b radially outside the body 76a. The bus bars 76c extend away from the capacitor module 68 radially outside the body 76a and have top ends connecting with the wiring members 79 (see FIG. 2).

The capacitor module 68, as described above, has the insulating sheet 75 mounted on the first end surface thereof. The capacitor module 68, therefore, has two heat dissipating paths which extend from the first and second end surfaces of the capacitor module 68 to the end surface 72 and the cylinder 71. This enables the heat to be released from the end surfaces of the capacitor module 68 other than the outer peripheral surface on which the semiconductor modules 66 are arranged. In other words, it is possible to dissipate the heat not only in the radial direction, but also in the axial direction.

The capacitor module 68 is of a hollow cylindrical shape and has the rotating shaft 11 arranged therewithin at a given interval away from the inner periphery of the capacitor module 68, so that heat generated by the capacitor module 68 will be dissipated from a hollow portion of the capacitor module 68. The rotation of the rotating shaft 11 usually produces a flow of air, thereby enhancing cooling effects.

The wiring module 76 has the disc-shaped control board 67 attached thereto. The control board 67 includes a printed circuit board (PCB) on which given wiring patterns are formed and also has ICs and the control device 77 mounted thereon. The control device 77 serves as a controller and is made of a microcomputer. The control board 67 is secured to the wiring module 76 using fasteners, such as screws. The control board 67 has formed in the center thereof the hole 67a through which the rotating shaft 11 passes.

The control board 67 is disposed on one of the axial ends of the wiring module 76 which is on the opposite side to the capacitor module 68. The bus bars 76c of the wiring module 76 extend from one of surfaces of the control board 67 to the other. The control board 67 may have cut-outs for avoiding physical interference with the bus bars 76c. For instance, the control board 67 may have the cut-outs formed in portions of the circular outer edge thereof.

The electrical components 62 are, as described already, arranged inside the space surrounded by the casing 64. The housing 30, the rotor 40, and the stator 50 are disposed outside the space in the form of layers. This structure serves to shield against electromagnetic noise generated in the inverter circuits. Specifically, the inverter circuit works to control switching operations of the semiconductor modules 66 in a PWM control mode using a given carrier frequency. The switching operations usually generate electromagnetic noise against which the housing 30, the rotor 40, and the stator 50 which are arranged outside the electrical components 62 shield.

The cylinder 71 has the through-holes 78 which are formed near the end plate 63 and through which the wiring members 79 (see FIG. 2) pass to electrically connect the stator 50 disposed outside the cylinder 71 and the electrical components 62 arranged inside the cylinder 71. The wiring members 79, as illustrated in FIG. 2, connect with ends of the stator winding 51 and the bus bars 76c of the wiring module 76 using crimping or welding techniques. The wiring members 79 are implemented by, for example, bus bars whose joining surfaces are preferably flattened. A single through-hole 78 or a plurality of through-holes 78 are preferably provided. This embodiment has two through-holes 78. The use of the two through-holes 78 facilitates the ease with which terminals extending from the two sets of the three-phase windings are connected by the wiring members 79, and is suitable for achieving multi-phase wire connections.

The rotor 40 and the stator 50 are, as described already in FIG. 4, arranged within the housing 30 in this order in a radially inward direction. The inverter unit 60 is arranged radially inside the stator 50. If a radius of the inner periphery of the housing 30 is defined as d, the rotor 40 and the stator 50 are located radially outside a distance of d×0.705 away from the center of rotation of the rotating electrical machine 10. If a region located radially inside the inner peripheral surface of the stator 50 (i.e., the inner circumferential surface of the stator core 52) is defined as a first region X1, and a region radially extending from the inner peripheral surface of the stator 50 to the housing 30 is defined as a second region X2, an area of a transverse section of the first region X1 is set greater than that of the second region X2. As viewed in a region where the magnet unit 42 of the rotor 40 overlaps the stator winding 51, the volume of the first region X1 is larger than that of the second region X2.

The rotor 40 and the stator 50 are fabricated as a magnetic circuit component assembly. In the housing 30, the first region X1 which is located radially inside the inner peripheral surface of the magnetic circuit component assembly is larger in volume than the region X2 which lies between the inner peripheral surface of the magnetic circuit component assembly and the housing 30 in the radial direction.

Next, the structures of the rotor 40 and the stator 50 will be described below in more detail.

Typical rotating electrical machines are known which are equipped with a stator with an annular stator core which is made of a stack of steel plates and has a stator winding wound in a plurality of slots arranged in a circumferential direction of the stator core. Specifically, the stator core has teeth extending in a radial direction thereof at a given interval away from a yoke. Each slot is formed between the two radially adjacent teeth. In each slot, a plurality of conductors are arranged in the radial direction in the form of layers to form the stator winding.

However, the above described stator structure has a risk that when the stator winding is energized, an increase in magnetomotive force in the stator winding may result in magnetic saturation in the teeth of the stator core, thereby restricting torque density in the rotating electrical machine. In other words, rotational flux, as created by the energization of the stator winding of the stator core, is thought of as concentrating on the teeth, which has a risk of causing magnetic saturation.

Generally, IPM (Interior Permanent Magnet) rotors are known which have a structure in which permanent magnets are arranged on a d-axis of a d-q axis coordinate system, and a rotor core is placed on a q-axis of the d-q axis coordinate system. Excitation of a stator winding near the d-axis will cause an excited magnetic flux to flow from a stator to a rotor according to Fleming's rules. This causes magnetic saturation to occur widely in the rotor core on the q-axis.

Figure 7:
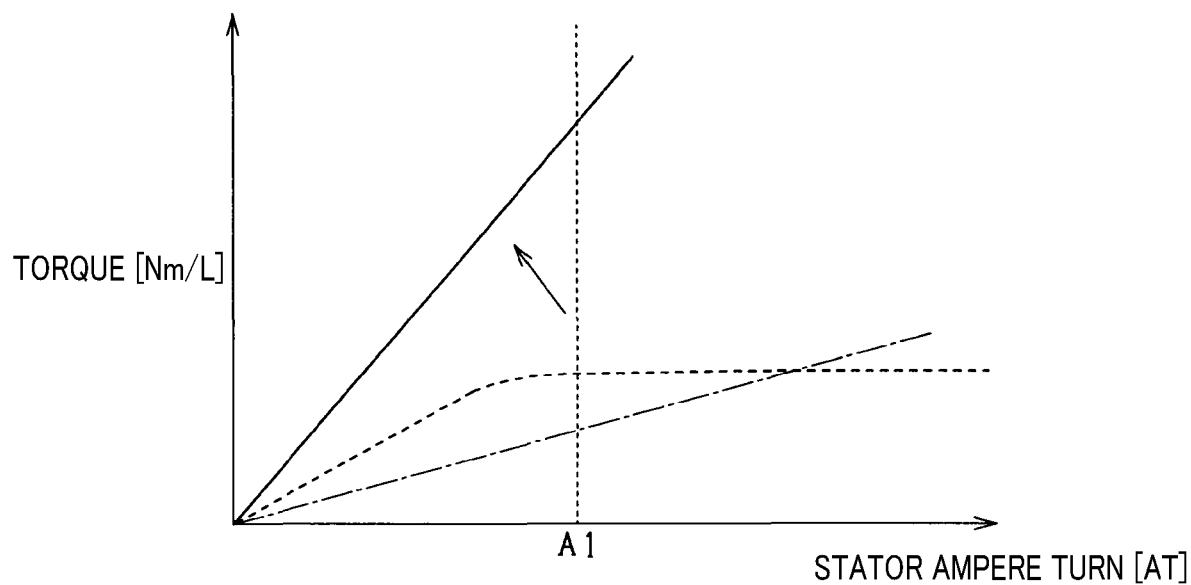
FIG. 7 is a torque diagrammatic view which demonstrates a relationship between an ampere-turn and a torque density in a stator winding.

FIG. 7 is a torque diagrammatic view which demonstrates a relationship between an ampere-turn (AT) representing a magnetomotive force created by the stator winding and a torque density (Nm/L). A broken line indicates characteristics of a typical IPM rotor-rotating electrical machine. FIG. 7 shows that in the typical rotating electrical machine, an increase in magnetomotive force in the stator will cause magnetic saturation to occur at two places: the tooth between the slots and the q-axis rotor (i.e., the rotor core on the q-axis), thereby restricting an increase in torque. In this way, a design value of the ampere-turn is restricted to be A1 or less in the typical rotating electrical machine.

In order to alleviate the above problem in this embodiment, the rotating electrical machine 10 is designed to have an additional structure, as will be described below, in order to eliminate the restriction arising from the magnetic saturation. Specifically, as a first measure, the stator 50 is designed to have a slot-less structure for eliminating the magnetic saturation occurring in the teeth of the stator core of the stator and also to use an SPM (Surface Permanent Magnet) rotor for eliminating the magnetic saturation occurring in a q-axis core of the IPM rotor. The first measure serves to eliminate the above described two places where the magnetic saturation occurs, but however, may result in a decrease in torque in a low-current region (see an alternate long and short dash line in FIG. 7). In order to alleviate this problem, as a second measure, a polar anisotropic structure is employed to increase a magnetic path of magnets in the magnet unit 42 of the rotor 40 to enhance a magnetic force in order to increase a magnetic flux in the SPM rotor to minimize the torque decrease.

Additionally, as a third measure, a flattened conductor structure is employed to decrease a thickness of conductors of the coil side portion 53 of the stator winding 51 in the radial direction of the stator 50 for compensating for the torque decrease. The above magnetic force-enhanced polar anisotropic structure is thought of as resulting in a flow of large eddy current in the stator winding 51. The third measure is, however, to employ the flattened conductor structure in which the conductors have a decreased thickness in the radial direction, thereby minimizing the generation of the eddy current in the stator winding 51 in the radial direction. In this way, the above first to third structures are, as indicated by a solid line in FIG. 7, expected to greatly improve the torque characteristics using strong magnetic force magnets and also alleviate a risk of generation of a large eddy current resulting from the use of the high-magnetic force magnets.

Additionally, as a fourth measure, a magnet unit is employed which has a polar anisotropic structure to create a magnetic density distribution approximating a sine wave. This increases a sine wave matching percentage using pulse control, as will be described later, to enhance the torque and also results in a moderate change in magnetic flux, thereby minimizing an eddy-current loss.

As a fifth measure, the stator winding 51 is designed to have a conductor strand structure made of a bundle of wires. This causes fundamental wave components to be collected, thereby enabling a high current or large amount of current to flow in the stator winding 51 and also minimizing an eddy current occurring in the conductors widened in the circumferential direction of the stator 50 more effectively than the third measure in which the conductors are flattened in the radial direction because each of the wires has a decreased transverse sectional area. The use of the bundle of the wires will cancel an eddy current arising from magnetic flux occurring according to Ampere's circuital law in response to the magnetomotive force produced by the conductors.

The use of the fourth and fifth measures minimizes the eddy-current loss resulting from the high magnetic force produced by the high-magnetic force magnets provided by the second measure and also enhance the torque.

Figure 8:
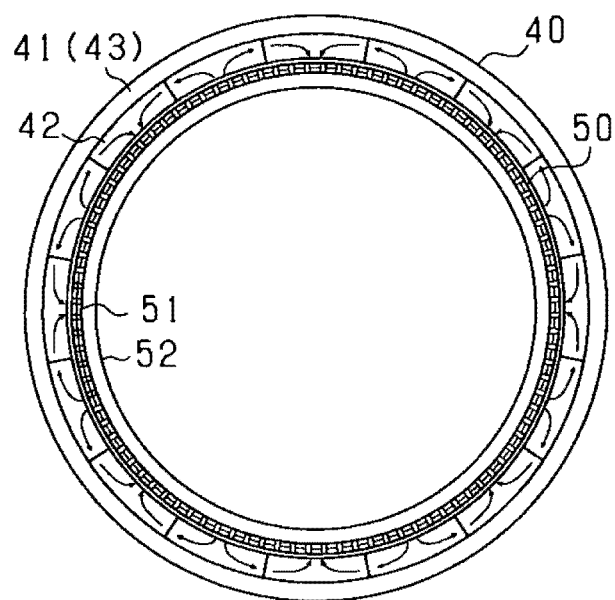
FIG. 8 is a transverse sectional view of a rotor and a stator.
Figure 9:
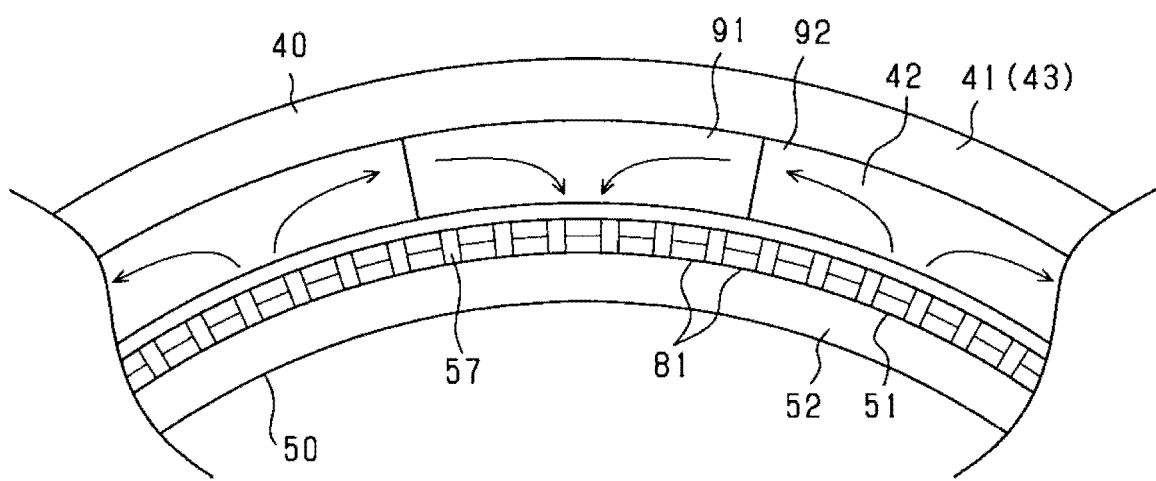
FIG. 9 is an enlarged view of part of FIG. 8.
Figure 10:
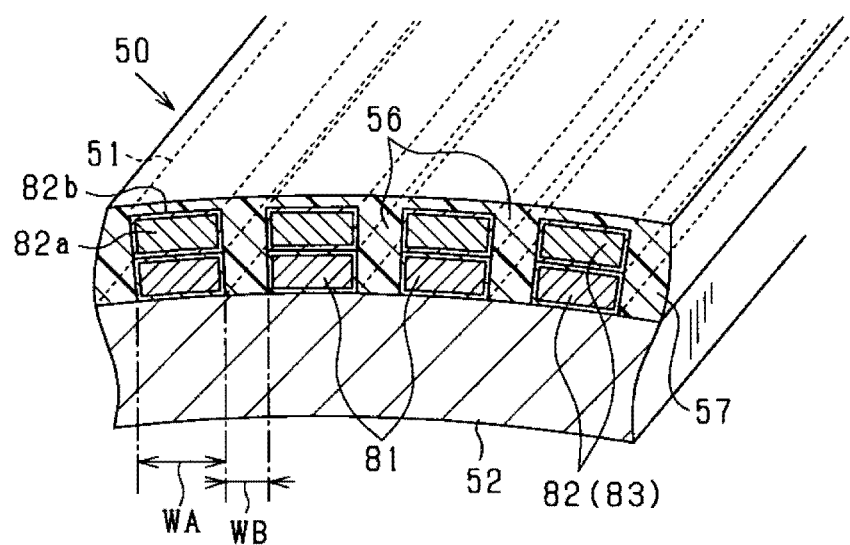
FIG. 10 is a transverse sectional view of a stator.
Figure 11:
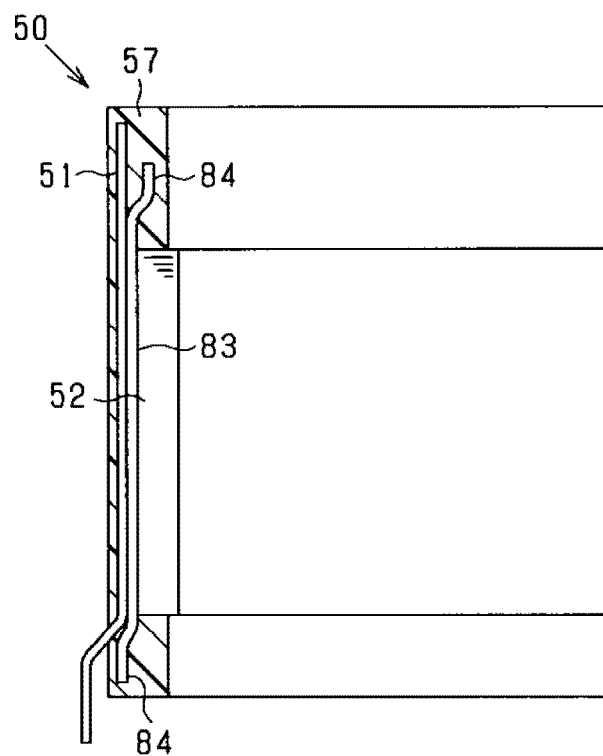
FIG. 11 is a longitudinal sectional view of a stator.
Figure 12:
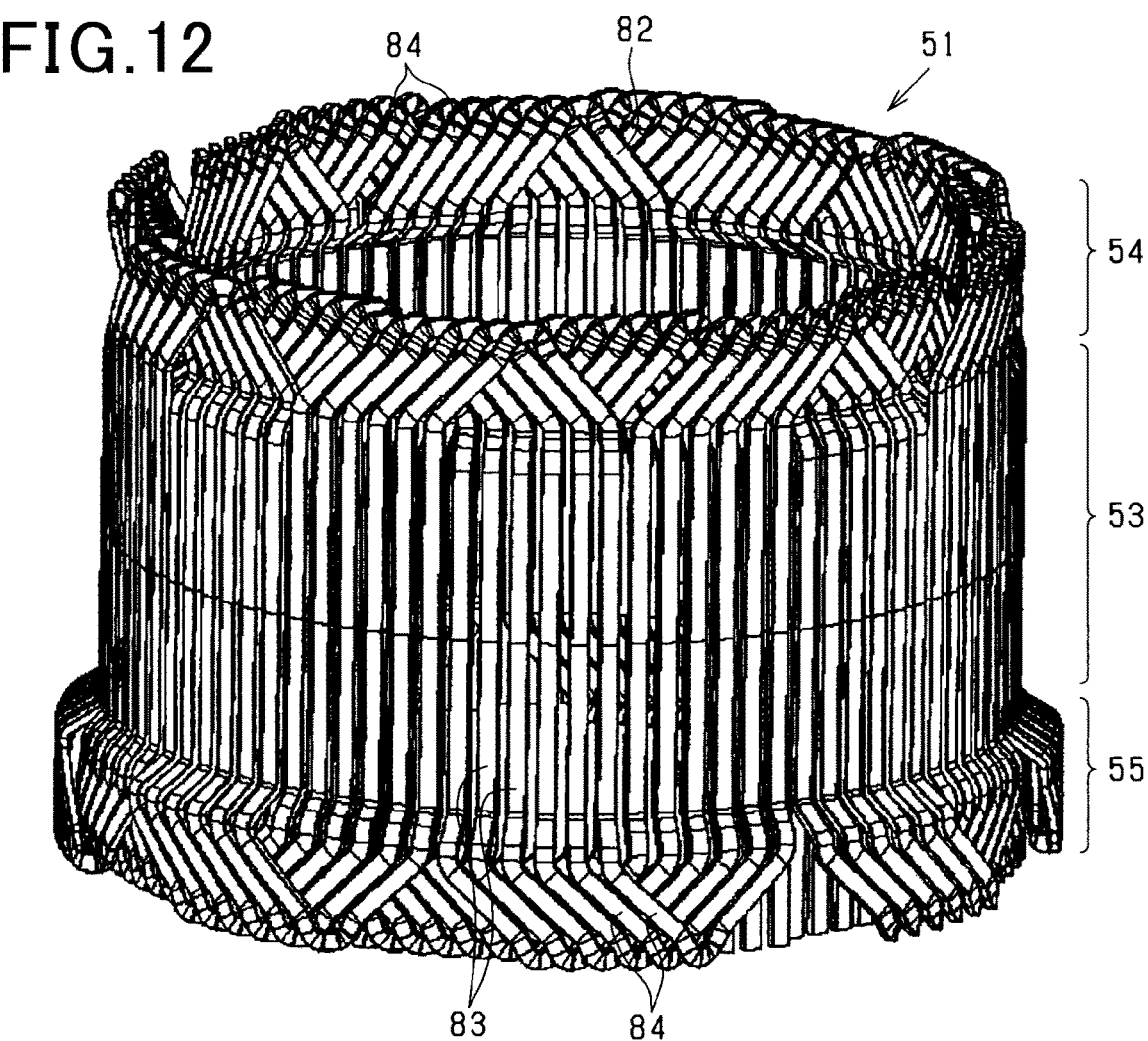
FIG. 12 is a perspective view of a stator winding.

The slot-less structure of the stator 50, the flattened conductor structure of the stator winding 51, and the polar anisotropic structure of the magnet unit 42 will be described below. The slot-less structure of the stator 50 and the flattened conductor structure of the stator winding 51 will first be discussed. FIG. 8 is a transverse sectional view illustrating the rotor 40 and the stator 50. FIG. 9 is a partially enlarged view illustrating the rotor 40 and the stator 50 in FIG. 8. FIG. 10 is a transverse sectional view of the stator 50 taken along the line X-X in FIG. 11. FIG. 11 is a longitudinal sectional view of the stator 50. FIG. 12 is a perspective view of the stator winding 51. FIGS. 8 and 9 indicate directions of magnetization of magnets of the magnet unit 42 using arrows.

The stator core 52 is, as clearly illustrated in FIGS. 8 to 11, of a cylindrical shape and made of a plurality of magnetic steel plates stacked in the axial direction of the stator core 52 to have a given thickness in a radial direction of the stator core 52. The stator winding 51 is mounted on the outer periphery of the stator core 52 which faces the rotor 40. The outer peripheral surface of the stator core 52 facing the rotor 40 serves as a conductor mounting portion (i.e., a conductor area). The outer peripheral surface of the stator core 52 is shaped as a curved surface without any irregularities. A plurality of conductor groups 81 are arranged on the outer peripheral surface of the stator core 52 at given intervals away from each other in the circumferential direction of the stator core 52. The stator core 52 functions as a back yoke that is a portion of a magnetic circuit working to rotate the rotor 40. The stator 50 is designed to have a structure in which a tooth (i.e., a core) made of a soft magnetic material is not disposed between a respective two of the conductor groups 81 arranged adjacent each other in the circumferential direction (i.e., the slot-less structure). In this embodiment, a resin material of the sealing member 57 is disposed in the space or gap 56 between a respective adjacent two of the conductor groups 81. Before the sealing members 57 are placed to seal the gaps 56, the conductor groups 81 are arranged in the circumferential direction radially outside the stator core 52 at a given interval away from each other through the gaps 56 that are conductor-to-conductor regions. This makes up the slot-less structure of the stator 50.

The structure, as referred to herein, in which the teeth are respectively disposed between the conductor groups 81 arrayed in the circumferential direction means that each of the teeth has a given thickness in the radial direction and a given width in the circumferential direction of the stator 50, so that a portion of the magnetic circuit, that is, a magnet magnetic path lies between the adjacent conductor groups 81. In contrast, the structure in which no tooth lies between the adjacent conductor groups 81 means that there is no magnetic circuit between the adjacent conductor groups 81.

The stator winding 51 is, as can be seen in FIGS. 10 and 11, sealed by the sealing members 57 which are formed by a synthetic resin. As a transverse section is viewed in FIG. 10, each of the sealing members 57 is formed by placing synthetic resin between the conductor groups 81, that is, in the gap 56. In other words, the sealing member 57 provides an insulating member between the conductor groups 81. Each of the sealing members 57, therefore, functions as an insulator in a corresponding one of the gaps 56. The sealing members 57 occupy a region which is located radially outside the stator core 52 and in which all the conductor groups 81 are disposed, in other words, which is defined to have a dimension larger than that of each of the conductor groups 81 in the radial direction.

As a longitudinal section is viewed in FIG. 11, the sealing members 57 lie to occupy a region including the turns 84 of the stator winding 51. Radially inside the stator winding 51, the sealing members 57 lie in a region including at least a portion of the axially opposed ends of the stator core 52. In this case, the stator winding 51 is fully sealed by the resin except for the ends of each phase winding, i.e., terminals joined to the inverter circuits.

The structure in which the sealing members 57 are disposed in the region including the ends of the stator core 52 enables the sealing members 57 to compress the stack of the steel plates of the stator core 52 inwardly in the axial direction. In other words, the sealing members 57 work to firmly retain the stack of the steel plates of the stator core 52. In this embodiment, the inner peripheral surface of the stator core 52 is not sealed using resin, but however, the whole of the stator core 52 including the inner peripheral surface may be sealed using resin.

In a case where the rotating electrical machine 10 is used as a power source for a vehicle, the sealing members 57 are preferably made of a high heat-resistance fluororesin, epoxy resin, PPS resin, PEEK resin, LCP resin, silicon resin, PAI resin, or PI resin. In terms of a linear coefficient expansion to minimize damage to the sealing members 57 due to an expansion difference, the sealing members 57 are preferably made of the same material as that of an outer film of the conductors of the stator winding 51. The silicon resin whose linear coefficient expansion is twice those of other resins is preferably excluded from the material of the sealing members 57. In a case of electrical products, such as electric vehicles equipped with no combustion engine, PPO resin, phenol resin, or FRP resin which resists 180° C. may be used, except in fields where an ambient temperature of the rotating electrical machine is expected to be lower than 100° C.

The degree of torque outputted by the rotating electrical machine 10 is usually proportional to the degree of magnetic flux. In a case where a stator core is equipped with teeth, a maximum amount of magnetic flux in the stator core is restricted depending upon the saturation magnetic flux density in the teeth, while in a case where the stator core is not equipped with teeth, the maximum amount of magnetic flux in the stator core is not restricted. Such a structure is, therefore, useful for increasing an amount of electrical current delivered to the stator winding 51 to increase the degree of torque produced by the rotating electrical machine 10.

Each of the conductor groups 81 arranged radially outside the stator core 52 is made of a plurality of conductors 82 whose transverse section is of a flattened rectangular shape and which are disposed on one another in the radial direction of the stator core 52. Each of the conductors 82 is oriented to have a transverse section meeting a relation of dimension in radial direction<dimension in circumferential direction. This causes each of the conductor groups 81 to be thin in the radial direction. A conductive region of the conductor group 81 also extends inside a region occupied by teeth of a typical stator. This creates a flattened conductive region structure in which a sectional area of each of the conductors 82 is increased in the circumferential direction, thereby alleviating a risk that the amount of thermal energy may be increased by a decrease in sectional area of a conductor arising from flattening of the conductor. A structure in which a plurality of conductors are arranged in the circumferential direction and connected in parallel to each other is usually subjected to a decrease in sectional area of the conductors by a thickness of a coated layer of the conductors, but however, has beneficial advantages obtained for the same reasons as described above.

The stator 50 in this embodiment is, as described already, designed to have no slots, thereby enabling the stator winding 51 to be designed to have a conductive region of an entire circumferential portion of the stator 50 which is larger in size than a non-conductive region unoccupied by the stator winding 51 in the stator 50. In typical rotating electrical machines for vehicles, a ratio of the conductive region/the non-conductive region is usually one or less. In contrast, this embodiment has the conductor groups 81 arranged to have the conductive region substantially identical in size with or larger in size than the non-conductive region. If the conductor region, as illustrated in FIG. 10, occupied by the conductor 82 (i.e., the straight section 83 which will be described later in detail) in the circumferential direction is defined as WA, and a conductor-to-conductor region that is an interval between a respective adjacent two of the conductors 82 is defined as WB, the conductor region WA is larger in size than the conductor-to-conductor region WB in the circumferential direction.

The degree of torque produced by the rotating electrical machine 10 is substantially inversely proportional to the thickness of the stator core 52 in the radial direction. The conductor groups 81 arranged radially outside the stator core 52 are, as described above, designed to have the thickness decreased in the radial direction. This design is useful in increasing the degree of torque outputted by the rotating electrical machine 10. This is because a distance between the magnet unit 42 of the rotor 40 and the stator core 52 (i.e., a distance in which there is no iron) may be decreased to decrease the magnetic resistance. This enables interlinkage magnetic flux in the stator core 52 produced by the permanent magnets to be increased to enhance the torque.

Each of the conductors 82 is made of a coated conductor formed by covering the surface of the conductor body 82*a* with the insulating coating 82*b*. The conductors 82 stacked on one another in the radial direction are, therefore, insulated from each other. Similarly, the conductors 82 are insulated from the stator core 52. The insulating coating 82*b* of the conductor 82 has a thickness of, for example, 80 μm which is greater than that (e.g., 20 to 40 μm) of a coating of a typical conductor. This ensures the insulation between the conductors 82 and the stator core 52 without use of insulating sheet therebetween. Each phase winding made of the conductors 82 is insulated by the coating 82*b* except an exposed portion thereof for joining purposes. The exposed portion includes, for example, an input or an output terminal or a neutral point in a case of a star connection. The conductor groups 81 arranged adjacent each other in the radial direction are firmly adhered to each other using resin or self-bonding coated wire, thereby minimizing a risk of insulation breakdown, mechanical vibration, or noise caused by rubbing of the conductors 82.

Figure 13:
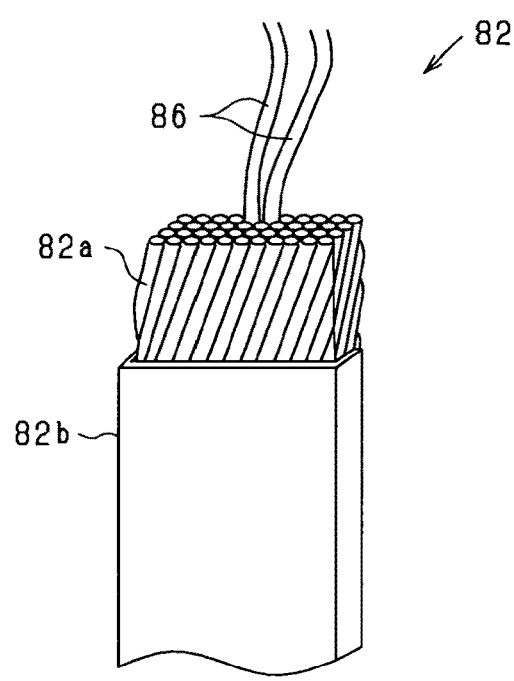
FIG. 13 is a perspective view of a conductor.
Figure 14:
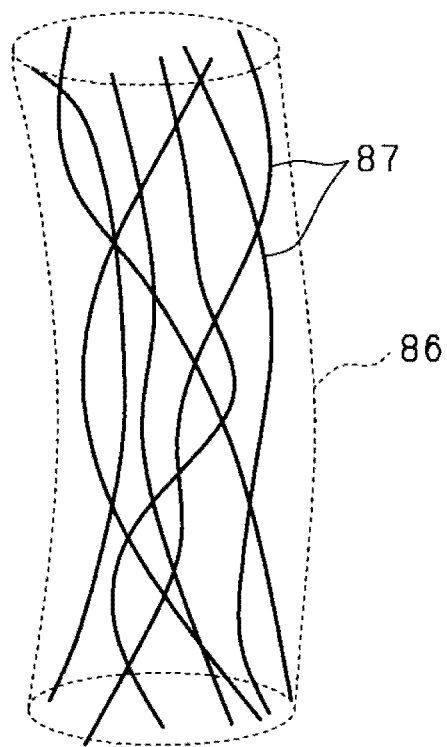
FIG. 14 is a schematic view illustrating a structure of a wire.
Figure 15:
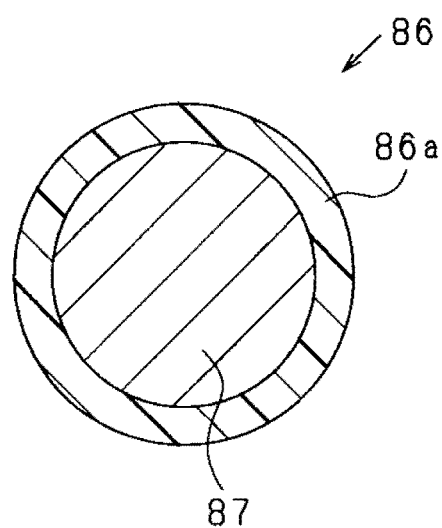
FIG. 15 is a schematic view which illustrates a cross section of a wire.

In this embodiment, the conductor body 82*a* is made of a collection of a plurality of wires 86. The conductor body 82*a* has the wires 86 connected in parallel to each other. Specifically, the conductor body 82*a* is, as can be seen in FIG. 13, made of a strand of the twisted wires 86. The conductor body 82*a* is equivalent to an anisotropic conductor. Usually, the electrical resistance of a wire is inversely proportional to a sectional area thereof. Accordingly, the more the number of the wires 86, the smaller the sectional area of each of the wires 86, thereby resulting in greater attenuation of the eddy current. Each of the wires 86 is, as can be seen in FIG. 14, made of a bundle of a plurality of thin conductive fibers 87. For instance, each of the wires 86 may be made of a complex of CNT (carbon nanotube) fibers. The CNT fibers include boron-containing microfibers in which at least a portion of carbon is substituted with boron. Instead of CNT fibers that are carbon-based microfibers, vapor grown carbon fiber (VGCF) may be used, but however, CNT fiber is preferable. The surface of the wire 86 is, as illustrated in FIG. 15, covered with a layer of insulating polymer, such as enamel.

The conductor body 82a is, as described above, made of the twisted wires 86, thereby reducing an eddy current created in each of the wires 86, which reduces an eddy current in the conductor body 82a. Each of the wires 86 is twisted, thereby causing each of the wires 86 to have portions where directions of applied magnetic field are opposite each other, which cancels a back electromotive force. This results in a reduction in the eddy current. Particularly, each of the wires 86 is made of the conductive fibers 87, thereby enabling the conductive fibers 87 to be thin and also enabling the number of times the conductive fibers 87 are twisted to be increased, which enhances the reduction in eddy current.

The wires 86 made of a complex of CNT (Carbon Nanotube) fibers will be described below. The electrical resistance of CNT is expected to be lower than one-fifth of that of copper wire. This embodiment uses, as CNT fibers, boron-containing fine fibers in which at least a portion of carbon is replaced with boron. The boron-containing fine fibers usually have high conductivity, thus enabling the conductors 82 to have a greatly decreased electrical resistance. Instead of CNT fibers, vapor grown carbon fibers (VGCFs) may be used as carbon fine fibers, but CNT fibers are useful in this embodiment.

Figure 16:
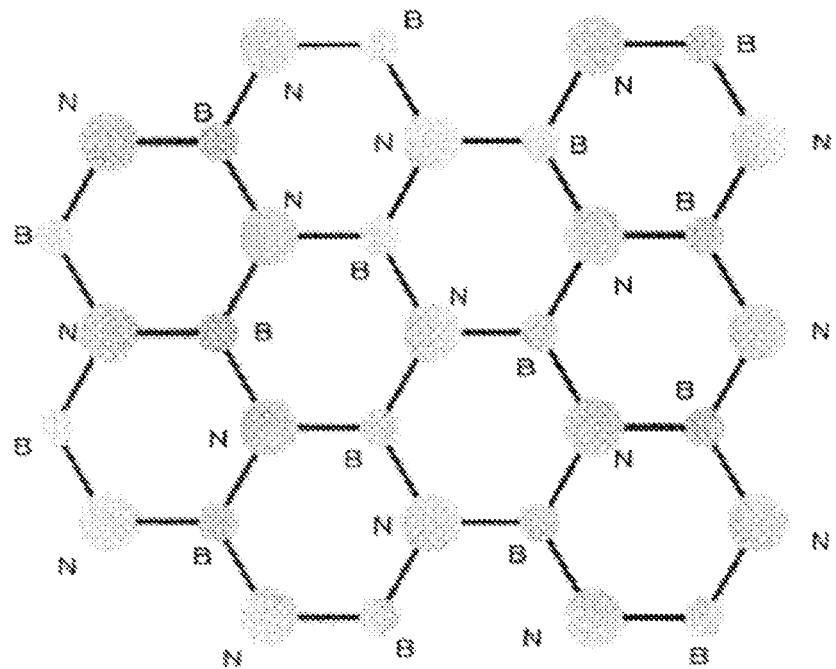
FIG. 16 is a schematic view which illustrates boron-containing microfiber.

As CNT fibers, carbon fine fibers in which all atoms of carbon are, as illustrated in FIG. 16, substituted with atoms of boron and nitrogen are preferably used. A ratio of boron and nitrogen in the boron nitrogen-containing fine fibers is preferably 1:1.

The boron nitrogen-containing fine fibers may be made by executing a step in which a fiber aggregate including carbon fine fibers is mixed with atoms of boron and then heated in a nitrogen atmosphere to change a portion of the carbon fine fibers into boron nitrogen-containing fine fibers or a step in which a fiber aggregate including carbon fine fibers is mixed with atoms of boron and then heated in an inert gas atmosphere to change a portion of the carbon fine fibers into boron-containing fine fibers. The substitution of carbon in CNT may be made in a method taught in Japanese Patent No. 4577385.

Figure 17:
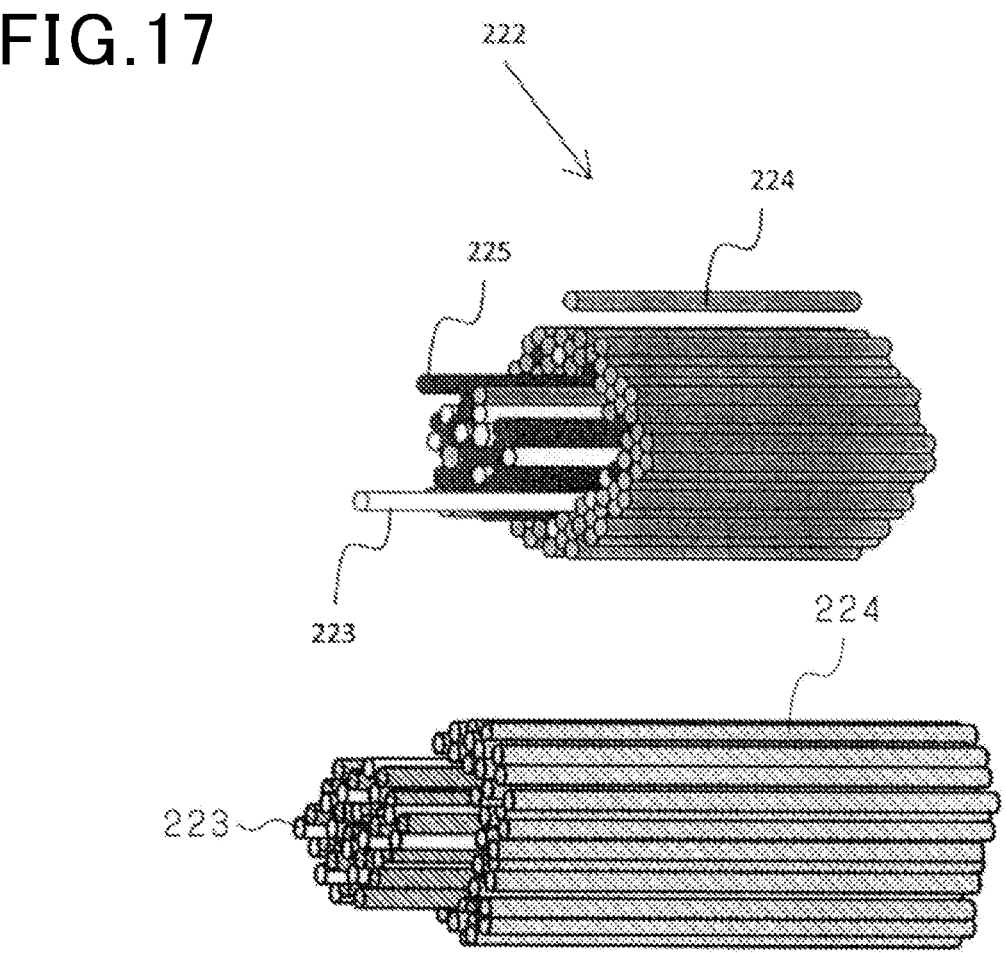
FIG. 17 is a schematic view of a wire group containing CNT fiber.

The above method will be discussed below. CNT wire and boron are input in a heating graphite crucible to have a molar ratio of 2:1, heated for thirty minutes at 2,000° C. under an argon atmosphere (i.e., 200 sccm, 1.0 atm) in a high-frequency heating furnace, and then naturally cooled to room temperature. In this step, at least a portion of carbon in a portion of CNT constituting the CNT wire is substituted with boron. The graphite crucible is ejected from the heating furnace. Boron is also added to the graphite crucible so that the CNT wire and boron have a molar ratio of 5:1. The graphite crucible is then heated for thirty minutes at 2,000° C. under a nitrogen atmosphere (200 sccm, 1.0 atm) in the heating furnace. In this step, carbon is, as illustrated in FIG. 16, substituted with nitrogen and boron in a portion of CNT constituting the CNT wire. In the CNT in which carbon is substituted with boron and nitrogen, divalent electrons of nitrogen forming a six-membered ring has high electronegativity so that they cannot be moved freely. The CNT in which carbon is substituted with boron and nitrogen, therefore, has electrical insulation properties. In the following discussion, wire in which carbon in a portion of CNT is substituted with boron and nitrogen will also be referred to as treated CNT wire. CNT wire in which carbon is not substituted will also be referred to as untreated CNT wire. The treated CNT wire 222, as illustrated in FIG. 17(a), has an outer layer covered with the treated CNT 224 in which carbon is substituted with boron and nitrogen. The center of the treated CNT wire 222 includes a mixture of CNT 223 in which carbon is not substituted with boron and nitrogen and CNT 225 in which carbon is partially substituted with boron.

The treated CNT wire may be as illustrated in FIG. 17(a), made of a mixture of the CNT 223 in which carbon is not substituted with boron and nitrogen, the CNT 224 in which carbon is partially substituted with boron, and the CNT 223 in which carbon is not substituted with boron and nitrogen.

Generally, a stator winding is, as illustrated in FIG. 18(a), made of a thick conductor (which has, for example, a rectangular section), so that a magnetic field H applied to the conductor develops a loop-shaped eddy current Ie1. The conductor has a high uniform electrical conductivity, so that there is no block for the eddy current, thereby resulting in an increased area where the eddy current Ie1 flows in the loop shape, so that the eddy current becomes great. In contrast, the conductor body 82a in this embodiment is, as illustrated in FIG. 18(b), made of a plurality of twisted wires 86 each of which is covered with an insulating layer, so that no eddy current flows one of the wires 86 to another, thus resulting in a decrease in area where the eddy current Ie1 flows in the loop shape, so that the amount of the eddy current Ie1 become small.

Each of the wires 86 is twisted, thereby causing each of the wires 86 to have portions, as illustrated in FIG. 19(a), where directions of applied magnetic field are opposite each other, which cancels a back electromotive force as viewed in FIG. 19(a) in which the wire 96 is developed. This results in a reduction in the eddy current. Particularly, each of the wires 86 is made of the conductive fibers 87, thereby enabling the conductive fibers 87 to be thin and also enabling the number of times the conductive fibers 87 are twisted to be increased, which enhances the reduction in eddy current.

Figure 20:
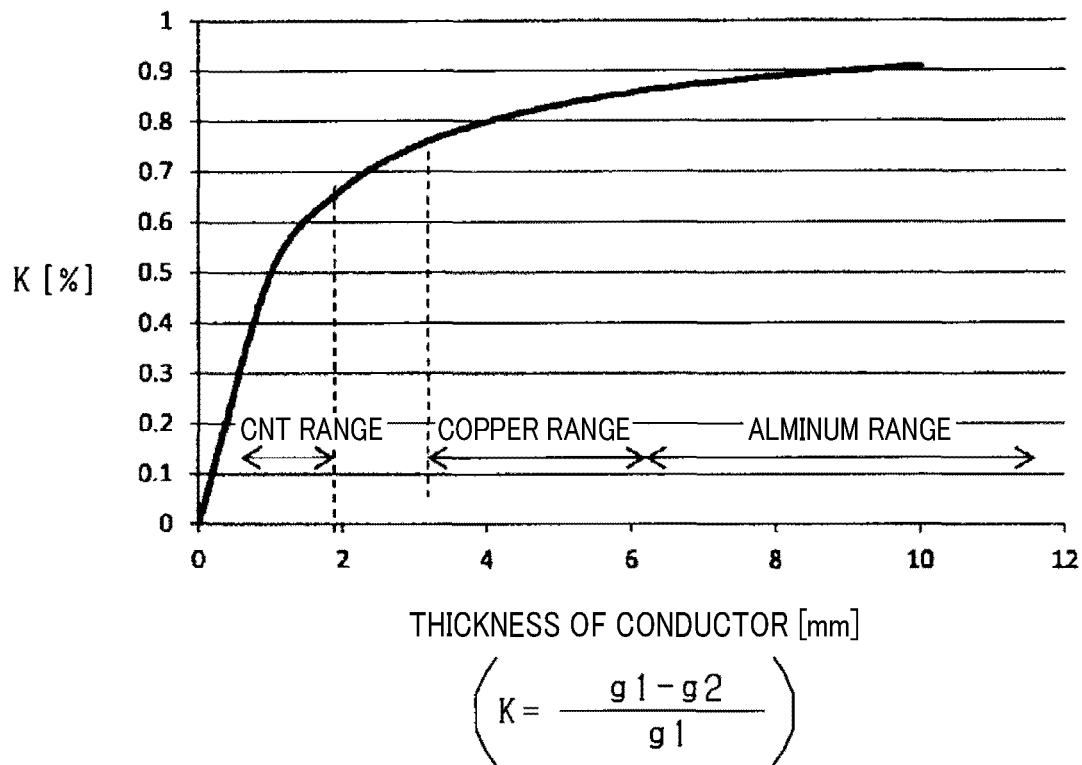
FIG. 20 is a view which illustrates a relation between a winding ratio and a thickness of a conductor.

If a distance between a radially inner peripheral surface of the magnet unit 42 and a radially outer peripheral surface of the stator core 52 is, as illustrated in FIG. 4, defined as g1, and a distance between the radially inner peripheral surface of the magnet unit 42 and a radially outer peripheral surface of the stator winding 51 is defined as g2, the thickness of the stator winding 51 in the radial direction is given by g1−g2. In the following discussion, a winding ratio K is defined as K=(g1−g2)/g1. The use of the CNT fibers, as can be seen in FIG. 20, enables the winding ratio K to be 66% or less. FIG. 20 is a view which represents a relation between the thickness of a conductor and the winding ratio K. In FIG. 20, a vertical axis expresses the winding ratio K in percentage. The reason why the winding ratio K is decreased is that the use of CNT results in a great increase in electrical conductivity to enhance a packaging density of electric loading. This results in a great decrease in distance between the radially inner peripheral surface of the magnet unit 42 and the radially peripheral surface of the stator core 52, thereby greatly decreasing the magnetic resistance in the magnetic circuit. This enables magnetomotive force required to generate equal amounts of magnetic flux to be decreased to decrease the thickness of the permanent magnets of the rotor.

FIG. 20 demonstrates a design example where the stator core 52 has an outer diameter of about 200 mm. In a case of use of copper wire, it is impossible for a percentage of occupancy of a conductor in a void space to be lower than 75%. It is difficult to decrease the length of the void space. Usually, copper alloy is higher in electrical resistivity than pure copper. It is impossible even for silver that is lower in electrical resistance than pure copper to have the winding ratio K less than 70%. For example, it is possible to use a high-temperature superconductor, but however, an existing operable temperature thereof is far from room temperatures. It is, therefore, impossible to use a high-temperature superconductor especially with automobiles. The resistance in CNT may be kept low even at room temperature. CNT is, thus, useful in decreasing the distance between the radially inner peripheral surface of the magnet unit 42 and the radially outer peripheral surface of the stator core 52.

Instead of the wires 86 fully covered with the polymer insulating later 86a, at least one of the wires 86 may be partially covered with the polymer insulating layer 86a.

Figure 21:
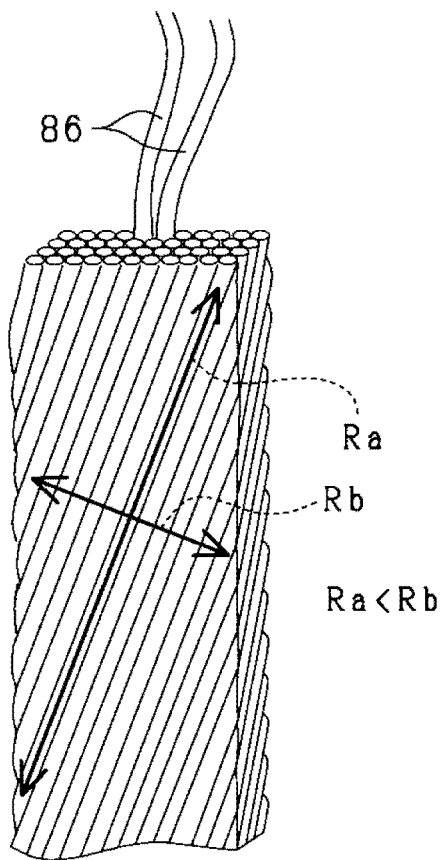
FIG. 21 is a view for explaining electrical anisotropy in wire.

In the case where the wires 86 have electrical anisotropy, it is not necessary to cover all the wires 86 with the polymer insulating layer 86a. Such a characteristic is, as shown in FIG. 21, that the electrical resistance Rb to flow of electrical current between the adjacent wires 86 is greatly higher than the electrical resistance Ra of the wire 86 to flow of electrical current through itself. This blocks the eddy current without use of insulating layers. It is, thus, possible to minimize heat generation at low cost.

Each of the wires 86 is, as described above, made of the conductive fibers 87, thereby enabling a current flow path in the conductors 82 to be thinner, which also enables the number of times the current flow path is twisted to be increased, thereby minimizing the eddy current. The wires 86 may be made of a composite conductor containing copper and carbon nanotube fibers.

The conductors 82 are, as described above, of a low-profile or flattened rectangular shape in cross section and arranged in the radial direction. For example, each of the conductors 82 is made of a strand of the wires 86 and twisted into a desired shape using synthetic resin.

The conductors 82 are each bent and arranged in a given pattern in the circumferential direction of the stator winding 51, thereby forming the phase-windings of the stator winding 51. The stator winding 51, as illustrated in FIG. 12, includes the coil side portion 53 and the coil ends 54 and 55. The conductors 82 have the straight sections 83 which extend straight in the axial direction of the stator winding 51 and form the coil side portion 53. The conductors 82 have the turns 84 which are arranged outside the coil side portion 53 in the axial direction and form the coil ends 54 and 55. Each of the conductor 82 is made of a wave-shaped string of conductor formed by alternately arranging the straight sections 83 and the turns 84. The straight sections 83 are arranged to face the magnet unit 42 in the radial direction. The straight sections 83 are arranged at a given interval away from each other and joined together using the turns 84 located outside the magnet unit 42 in the axial direction. The straight sections 83 correspond to magnet facing portions.

In this embodiment, the stator winding 51 is shaped in the form of an annular distributed winding. In the coil side portion 53, the straight sections 83 are arranged at an interval away from each other which corresponds to each pole pair of the magnet unit 42 for each phase. In each of the coil ends 54 and 55, the straight sections 83 for each phase are joined together by the turn 84 which is of a V-shape. The straight sections 83 which are paired for each pole pair are opposite to each other in a direction of flow of electrical current. A respective two of the straight sections 83 which are joined together by each of the turns 84 are different between the coil end 54 and the coil end 55. The joints of the straight sections 83 by the turns 84 are arranged in the circumferential direction on each of the coil ends 54 and 55 to complete the stator winding in a hollow cylindrical shape.

More specifically, the stator winding 51 is made up of two pairs of the conductors 82 for each phase. The stator winding 51 is equipped with a first three-phase winding set including the U-phase winding, the V-phase winding, and the W-phase winding and a second three-phase phase winding set including the X-phase winding, the Y-phase winding, and the Z-phase winding. The first three-phase phase winding set and the second three-phase winding set are arranged adjacent each other in the radial direction in the form of two layers. If the number of phases of the stator winding 51 is defined as S (i.e., 6 in this embodiment), the number of the conductors 82 for each phase is defined as m, then 2×S×m=2 Sm conductors 82 are used for each pole pair in the stator winding 51. The rotating electrical machine in this embodiment is designed so that the number of phases S is 6, the number m is 4, and 8 pole pairs are used. 6×4×8=192 conductors 82 are arranged in the circumferential direction of the stator core 52.

The stator winding 51 in FIG. 12 is designed to have the coil side portion 53 which has the straight sections 82 arranged in the form of two overlapping layers disposed adjacent each other in the radial direction. Each of the coil ends 54 and 55 has a respective two of the turns 84 which extend from the radially overlapping straight sections 82 in opposite circumferential directions. In other words, the conductors 82 arranged adjacent each other in the radial direction are opposite to each other in direction in which the turns 84 extend except for ends of the stator winding 51.

A winding structure of the conductors 82 of the stator winding 51 will be described below in detail. In this embodiment, the conductors 82 formed in the shape of a wave winding are arranged in the form of a plurality of layers (e.g., two layers) disposed adjacent or overlapping each other in the radial direction. FIGS. 22(a) and 2(b) illustrate the layout of the conductors 82 which form the $n^{th}$ layer. FIG. 22(a) shows the configurations of the conductor 82, as viewed from the side of the stator winding 51. FIG. 22(b) shows the configurations of the conductors 82 as viewed in the axial direction of the stator winding 51. In FIGS. 22(a) and 22(b), locations of the conductor groups 81 are indicated by symbols D1, D2, D3 . . . , and D9. For the sake of simplicity of disclosure, FIGS. 22(a) and 2(b) show only three conductors 82 which will be referred to herein as the first conductor 82_A, the second conductor 82_B, and the third conductor 82_C.

The conductors 82_A to 82_C have the straight sections 83 arranged at a location of the $n^{th}$ layer, in other words, at the same position in the circumferential direction. Every two of the straight sections 82 which are arranged at 6 pitches (corresponding to 3×m pairs) away from each other are joined together by one of the turns 84. In other words, in the conductors 82_A to 82_C, an outermost two of the seven straight sections 83 arranged in the circumferential direction of the stator winding 51 on the same circle defined about the center of the rotor 40 are joined together using one of the turns 84. For instance, in the first conductor 82_A, the straight sections 83 placed at the locations D1 and D7 are joined together by the inverse V-shaped turn 84. The conductors 82_B and 82_C are arranged at an interval equivalent to an interval between a respective adjacent two of the straight sections 83 away from each other in the circumferential direction at the location of the n$^{th}$ layer. In this layout, the conductors 82_A to 82_C are placed at a location of the same layer, thereby resulting in a risk that the turns 84 thereof may physically interfere with each other. In order to alleviate such a risk, each of the turns 84 of the conductors 82_A to 82_C in this embodiment is shaped to have an interference avoiding portion formed by offsetting a portion of the turn 84 in the radial direction.

Specifically, the turn 84 of each of the conductors 82_A to 82_C includes the slant portion 84*a*, the head portion 84*b*, the slant portion 84*c*, and the return portion 84*d*. The slant portion 84*a* extends in the circumferential direction of the same circle (which will also be referred to as a first circle). The head portion 84*a* extends from the slant portion 84*a* radially inside the first circle (i.e., upward in FIG. 22(*b*)) to reach another circle (which will also be referred to as a second circle). The slant portion 84*c* extends in the circumferential direction of the second circle. The return portion 84*d* returns from the second circle back to the first circle. The head portion 84*b*, the slant portion 84*c*, and the return portion 84*d* define the interference avoiding portion. The slant portion 84*c* may be arranged radially outside the slant portion 84*a*.

In other words, each of the conductors 82_A to 82_C has the turn 84 shaped to have the slant portion 84*a* and the slant portion 84*c* which are arranged on opposite sides of the head portion 84*b* at the center in the circumferential direction. The locations of the slant portions 84*a* and 84*b* are different from each other in the radial direction (i.e., a direction perpendicular to the drawing of FIG. 15(*a*) or a vertical direction in FIG. 15(*b*)). For instance, the turn 84 of the first conductor 82_A is shaped to extend from the location D1 on the n$^{th}$ layer in the circumferential direction, be bent at the head portion 84*b* that is the center of the circumferential length of the turn 84 in the radial direction (e.g., radially inwardly), be bent again in the circumferential direction, extend again in the circumferential direction, and then be bent at the return portion 84*d* in the radial direction (e.g., radially outwardly) to reach the location D9 on the n$^{th}$ layer.

With the above arrangements, the slant portions 84*a* of the conductors 82_A to 82_C are arranged vertically or downward in the order of the first conductor 82_A, the second conductor 82_B, and the third conductor 82_C. The head portions 84*b* change the order of the locations of the conductors 82_A to 82_C in the vertical direction, so that the slant portions 84*c* are arranged vertically or downward in the order of the third conductor 82_3, the second conductor 82_B, and the first conductor 82_A. This layout achieves an arrangement of the conductors 82_A to 82_C in the circumferential direction without any physical interference with each other.

In the structure wherein the conductors 82 are laid to overlap each other in the radial direction to form the conductor group 81, the turns 84 leading to a radially innermost one and a radially outermost one of the straight sections 83 forming the two or more layers are preferably located radially outside the straight sections 83. In a case where the conductors 82 forming the two or more layers are bent in the same radial direction near boundaries between ends of the turns 84 and the straight sections 83, the conductors 82 are preferably shaped not to deteriorate the insulation therebetween due to physical interference of the conductors 82 with each other.

Figure 22:
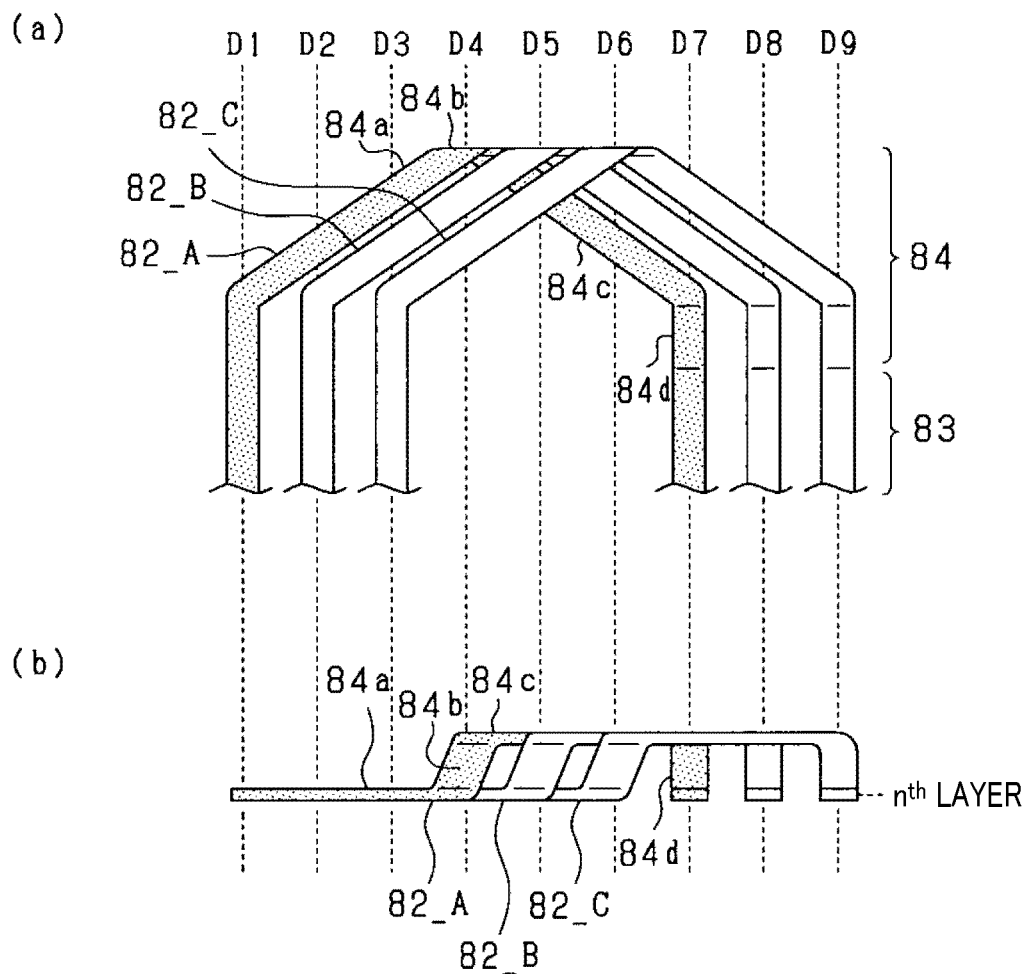
FIG. 22 is a view showing the layout of conductors at the $n^{th}$ layer position.
Figure 23:
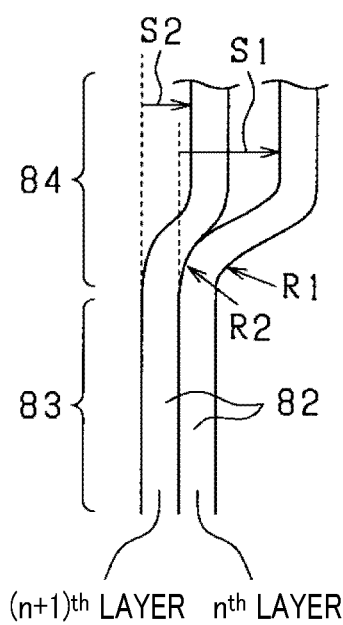
FIG. 23 is a side view showing conductors at the $n^{th}$ layer position and the $(n+1)^{th}$ layer position.

In the example of FIGS. 22(*a*) and 22(*b*), the conductors 82 laid on each other in the radial direction are bent radially at the return portions 84*d* of the turns 84 at the location D7 to D9. It is advisable that the conductor 82 of the n$^{th}$ layer and the conductor 82 of the n+1$^{th}$ layer be bent, as illustrated in FIG. 16, at radii of curvature different from each other. Specifically, the radius of curvature R1 of the conductor 82 of the n$^{th}$ layer is preferably selected to be smaller than the radius of curvature R2 of the conductor 82 of the n+1$^{th}$ layer.

Additionally, radial displacements of the conductor 82 of the n$^{th}$ layer and the conductor 82 of the n+1$^{th}$ layer are preferably selected to be different from each other. If the amount of radial displacement of the conductor 82 of the n$^{th}$ layer is defined as S1, and the amount of radial displacement of the conductor 82 of the n+1$^{th}$ layer located radially outside the nth layer defined as S2, the amount of radial displacement S1 is preferably selected to be greater than the amount of radial displacement S2.

The above layout of the conductors 82 eliminates the risk of interference with each other, thereby ensuring a required degree of insulation between the conductors 82 even when the conductors 82 laid on each other in the radial direction are bent in the same direction.

The structure of the magnet unit 42 of the rotor 40 will be described below. In this embodiment, the magnet unit 42 is made of permanent magnets in which a remanent flux density Br=1.0 T, and an intrinsic coercive force Hcj=400 kA/m. 5,000 to 10,000 AT is applied to the magnets. The demagnetization of the magnets is, therefore, avoided by designing the magnets to have a length of 25 mm for paired magnetic poles. In this embodiment, permanent magnets are used which are magnetically oriented to control the easy axis of magnetization thereof, thereby enabling a magnetic circuit length within the magnets to be longer than that within typical linearly oriented magnets which produces a magnetic flux density of 1.0 T or more. In other words, the magnetic circuit length for one pole pair in the magnets in this embodiment may be achieved using the magnets with a small volume. Additionally, a range of reversible flux loss in the magnets is not lost when subjected to severe high temperatures, as compared with use of typical linearly oriented magnets. The inventors of this application have found that characteristics similar to those of anisotropic magnets are obtained even using conventional magnets.

The magnet unit 42 is, as clearly illustrated in FIGS. 8 and 9, of an annular shape and arranged inside the magnet holder 41 (specifically, radially inside the cylinder 43). The magnet unit 42 is equipped with the first magnets 91 and the second magnets 92 which are each made of a polar anisotropic magnet. Each of the first magnets 91 and each of the second magnets 92 are different in polarity from each other. The first magnets 91 and the second magnets 92 are arranged alternately in the circumferential direction of the magnet unit 42. Each of the first magnets 91 is engineered to have a portion creating an N-pole near the stator winding 51. Each of the second magnets 92 is engineered to have a portion creating an S-pole near the stator winding 51. The first magnets 91 and the second magnets 92 are each made of, for example, a permanent rare earth magnet, such as a neodymium magnet.

Figure 24:
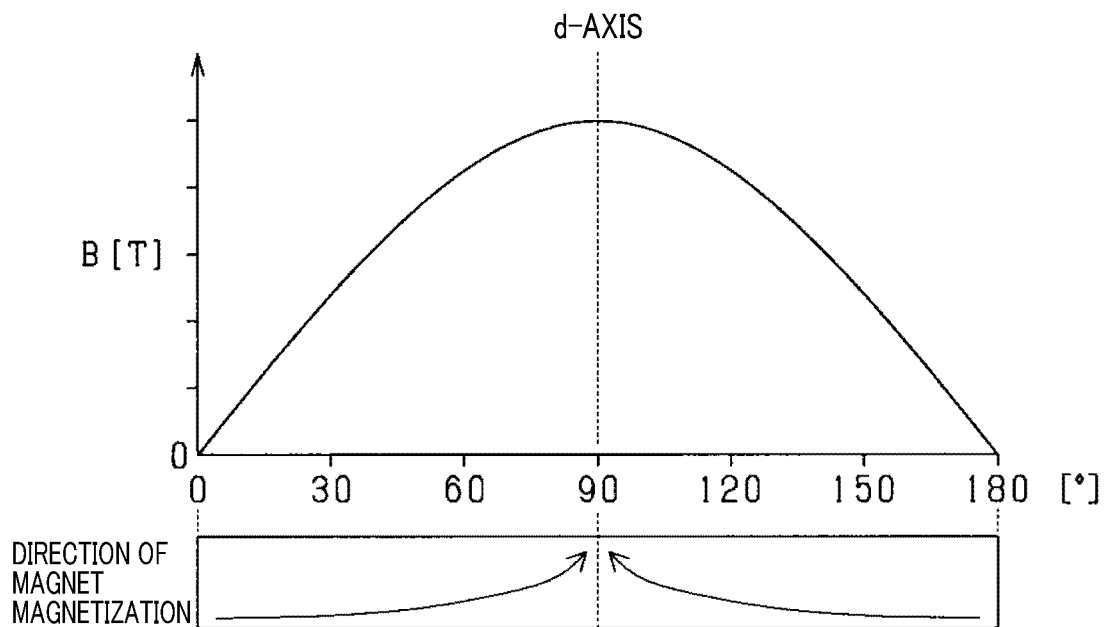
FIG. 24 is a view representing a relation between an electrical angle and a magnetic flux density in magnets of an embodiment.
Figure 25:
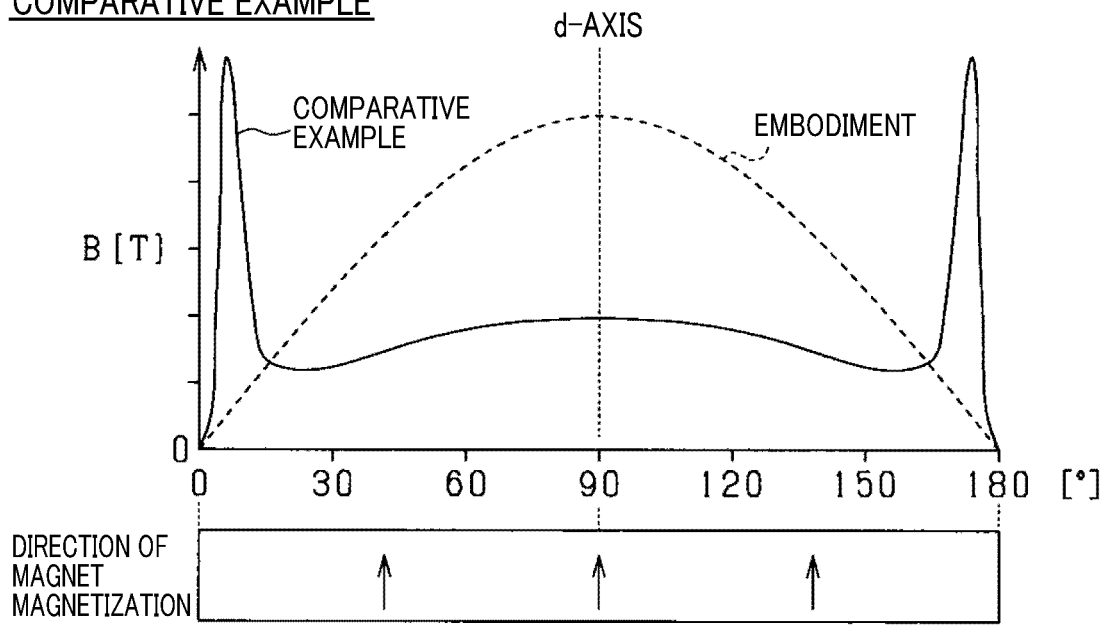
FIG. 25 is a view which represents a relation between an electrical angle and a magnetic flux density in a comparative example of magnets.

Each of the magnets 91 and 92 is engineered to have a direction of magnetization which extends in an annular shape in between a d-axis and a q-axis where the d-axis represents the center of a magnetic pole, and the q-axis represents a magnetic boundary between the magnetic poles. In the magnet unit 42, a magnetic flux flows in an annular shape between a respective adjacent two of the N-poles and the S-poles of the magnets 91 and 92, so that each of the magnetic paths has an increased length, as compared with, for example, radial anisotropic magnets. A distribution of the magnetic flux density will, therefore, exhibit a shape similar to a sine wave illustrated in FIG. 24. This facilitates concentration of magnetic flux around the center of the magnetic pole unlike a distribution of magnetic flux density of a radial anisotropic magnet demonstrated in FIG. 25 as a comparative example, thereby enabling the degree of torque produced by the rotating electrical machine 10 to be increased. It has also been found that the magnet unit 42 in this embodiment has the distribution of the magnetic flux density distinct from that of a typical Halbach array magnet. In FIGS. 24 and 25, a horizontal axis indicates the electrical angle, while a vertical axis indicates the magnetic flux density. 90° on the horizontal axis represents the d-axis (i.e., the center of the magnetic pole). 0° and 180° on the horizontal axis represent the q-axis.

The sine wave matching percentage in the distribution of the magnetic flux density is preferably set to, for example, 40% or more. This improves the amount of magnetic flux around the center of a waveform of the distribution of the magnetic flux density as compared with a radially oriented magnet or a parallel oriented magnet in which the sine wave matching percentage is approximately 30%. By setting the sine wave matching percentage to be 60% or more, the amount of magnetic flux around the center of the waveform is improved, as compared with a concentrated magnetic flux array, such as the Halbach array.

In the comparative example demonstrated in FIG. 25, the magnetic flux density changes sharply near the q-axis. The more sharp the change in magnetic flux density, the more an eddy current generating in the stator winding 51 will increase. In contrast, the distribution of the magnetic flux density in this embodiment has a waveform approximating a sine wave. A change in magnetic flux density near the q-axis is, therefore, smaller than that in the radial anisotropic magnet near the q-axis. This minimizes the generation of the eddy current.

The magnet unit 42 creates a magnetic flux oriented perpendicular to the magnetic pole face near the d-axis (i.e., the center of the magnetic pole) in each of the magnets 91 and 92. Such a magnetic flux extends in an arc-shape farther away from the d-axis as leaving the magnetic pole face close to the stator 50. The more perpendicular to the magnetic pole face the magnetic flux extends, the stronger the magnetic flux is. The rotating electrical machine 10 in this embodiment is, as described above, designed to shape each of the conductor groups 81 to have a decreased thickness in the radial direction, so that the radial center of each of the conductor groups 81 is located close to the magnetic flux-acting surface of the magnet unit 42, thereby causing the strong magnetic flux to be applied to the stator 50 from the rotor 40. The rotating electrical machine 10 in this embodiment is, as described above, designed to shape each of the conductor groups 81 to have a decreased thickness in the radial direction, so that the radial center of each of the conductor groups 81 is located close to the magnetic pole face of the magnet unit 42, thereby causing the strong magnetic flux to be applied to the stator 50 from the rotor 40.

The stator 50 has the cylindrical stator core 52 arranged radially inside the stator winding 51, that is, on the opposite side of the stator winding 51 to the rotor 40. This causes the magnetic flux extending from the magnetic flux-acting surface of each of the magnets 91 and 92 to be attracted by the stator core 52, so that it circulates through the magnetic path partially including the stator core 52. This enables the orientation of the magnetic flux and the magnetic path to be optimized.

Figure 26:
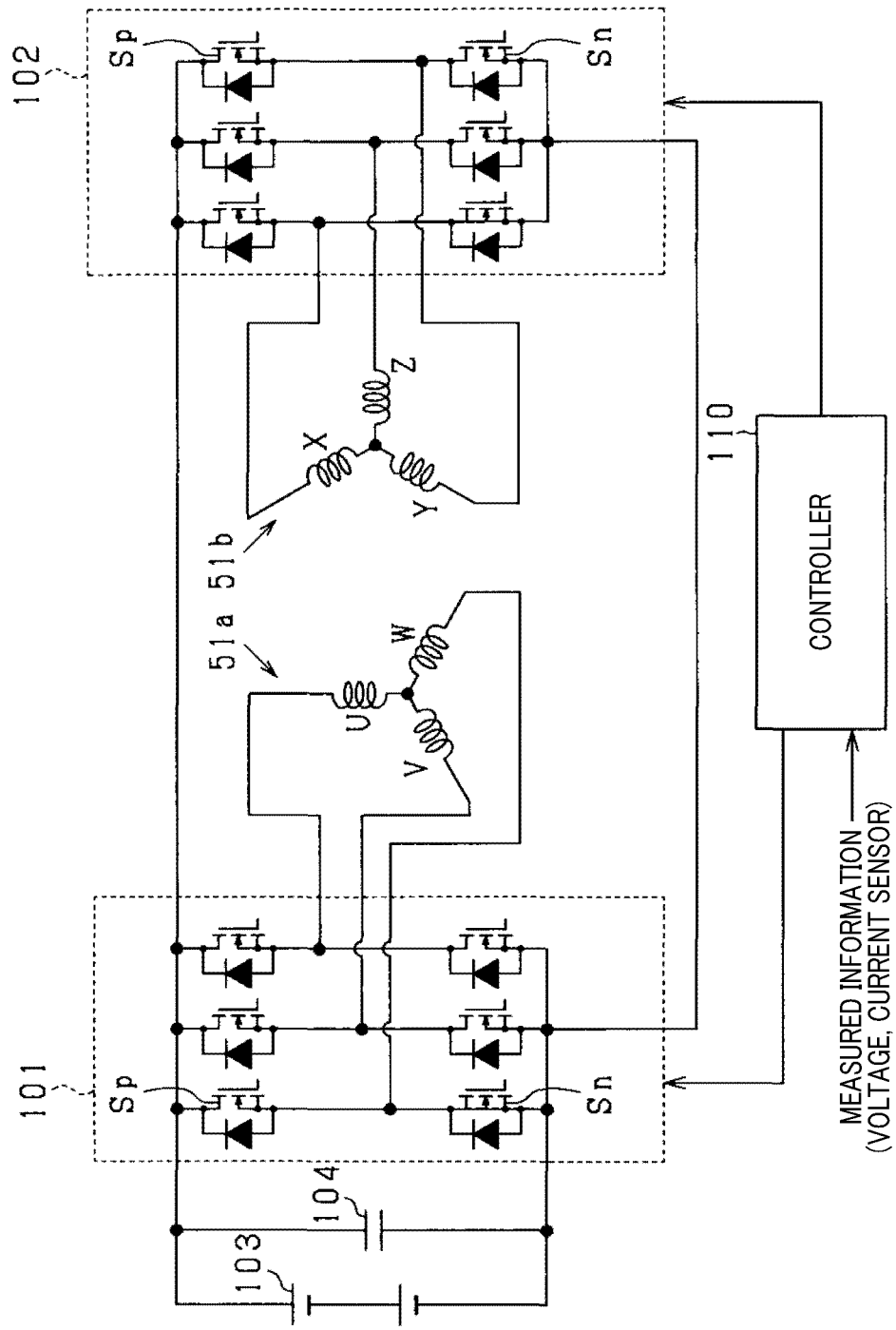
FIG. 26 is an electrical circuit diagram of a control system for a rotating electrical machine.
Figure 27:
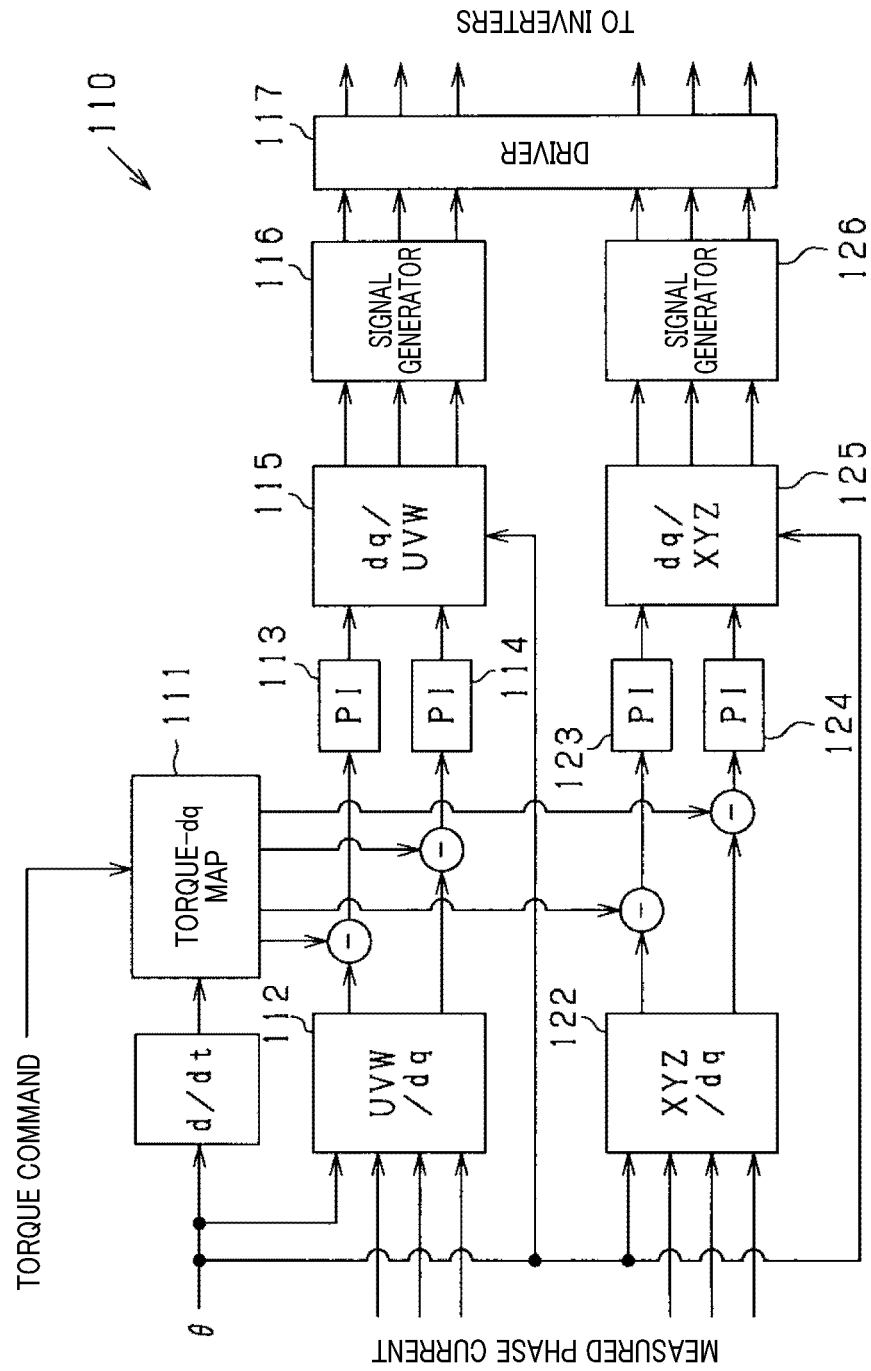
FIG. 27 is a functional block diagram which shows a current feedback control operation of a control device.

The structure of a control system for controlling an operation of the rotating electrical machine 10 will be described below. FIG. 26 is an electrical circuit diagram of the control system for the rotating electrical machine 10. FIG. 27 is a functional block diagram which illustrates control steps performed by the controller 110.

FIG. 26 illustrates two sets of three-phase windings 51a and 51b. The three-phase winding 51a includes a U-phase winding, a V-phase winding, and a W-phase winding. The three-phase winding 51b includes an X-phase winding, a Y-phase winding, and a Z-phase winding. The first inverter 101 and the second inverter 102 are provided as electrical power converters for the three-phase windings 51a and 51b, respectively. The inverters 101 and 102 are made of bridge circuits with as many upper and lower arms as the phase-windings. The current delivered to the phase windings of the stator winding 51 is regulated by turning on or off switches (i.e., semiconductor switches) mounted on the upper and lower arms.

The dc power supply 103 and the smoothing capacitor 104 are connected parallel to the inverters 101 and 102. The dc power supply 103 is made of, for example, a plurality of series-connected cells. The switches of the inverters 101 and 102 correspond to the semiconductor modules 66 in FIG. 1. The capacitor 104 corresponds to the capacitor module 68 in FIG. 1.

The controller 110 is equipped with a microcomputer including a CPU and memories and works to perform control energization by turning on or off the switches of the inverters 101 and 102 using several types of measured information measured in the rotating electrical machine 10 or requests for a motor mode or a generator mode of the rotating electrical machine 10. The controller 110 corresponds to the control device 77 shown in FIG. 6. The measured information about the rotating electrical machine 10 includes, for example, an angular position (i.e., an electrical angle) of the rotor 40 measured by an angular position sensor, such as a resolver, a power supply voltage (i.e., voltage inputted into the inverters) measured by a voltage sensor, and electrical current delivered to each of the phase-windings, as measured by a current sensor. The controller 110 produces and outputs an operation signal to operate each of the switches of the inverters 101 and 102. A request for electrical power generation is a request for driving the rotating electrical machine 10 in a regenerative mode, for example, in a case where the rotating electrical machine 10 is used as a power source for a vehicle.

The first inverter 101 is equipped with a series-connected part made up of an upper arm switch Sp and a lower arm switch Sn for each of the three-phase windings: the U-phase winding, the V-phase winding, and the W-phase winding. The upper arm switches Sp are connected at high-potential terminals thereof to a positive terminal of the dc power supply 103. The lower arm switches Sn are connected at low-potential terminals thereof to a negative terminal (i.e., ground) of the dc power supply 103. Intermediate joints of the upper arm switches Sp and the lower arm switches Sn are connected to ends of the U-phase winding, the V-phase winding, and the W-phase winding. The U-phase winding, the V-phase winding, and the W-phase winding are connected in the form of a star connection (i.e., Y-connection). The other ends of the U-phase winding, the V-phase winding, and the W-phase winding are connected with each other at a neutral point.

The second inverter 102 is, like the first inverter 101, equipped with a series-connected part made up of an upper arm switch Sp and a lower arm switch Sn for each of the three-phase windings: the X-phase winding, the Y-phase winding, and the Z-phase winding. The upper arm switches Sp are connected at high-potential terminals thereof to the positive terminal of the dc power supply 103. The lower arm switches Sn are connected at low-potential terminals thereof to the negative terminal (i.e., ground) of the dc power supply 103. Intermediate joints of the upper arm switches Sp and the lower arm switches Sn are connected to ends of the X-phase winding, the Y-phase winding, and the Z-phase winding. The X-phase winding, the Y-phase winding, and the Z-phase winding are connected in the form of a star connection (i.e., Y-connection). The other ends of the X-phase winding, the Y-phase winding, and the Z-phase winding are connected with each other at a neutral point.

FIG. 27 illustrates a current feedback control operation to control electrical currents delivered to the U-phase winding, the V-phase winding, and the W-phase winding and a current feedback control operation to control electrical currents delivered to the X-phase winding, the Y-phase winding, and the Z-phase winding. The control operation for the U-phase winding, the V-phase winding, and the W-phase winding will first be discussed.

In FIG. 27, the current command determiner 111 uses a torque-dq map to determine current command values for the d-axis and the q-axis using a torque command value in the motor mode of the rotating electrical machine 10 (which will also be referred to as a motor-mode torque command value), a torque command value in the generator mode of the rotating electrical machine 10 (which will be referred to as a generator-mode torque command value), and an electrical angular velocity ω derived by differentiating an electrical angle θ with respect to time. The current command determiner 111 is shared between the U-, V-, and W-phase windings and the X-, Y-, and W-phase windings. The generator-mode torque command value is a regenerative torque command value in a case where the rotating electrical machine 10 is used as a power source of a vehicle.

The d-q converter 112 works to convert currents (i.e., three phase currents), as measured by current sensors mounted for the respective phase windings, into a d-axis current and a q-axis current that are components in a two-dimensional rotating Cartesian coordinate system in which a d-axis is defined as a direction of an axis of a magnetic field or field direction.

The d-axis current feedback control device 113 determines a command voltage for the d-axis as a manipulated variable for bringing the d-axis current into agreement with the current command value for the d-axis in a feedback mode. The q-axis current feedback control device 114 determines a command voltage for the q-axis as a manipulated variable for bringing the q-axis current into agreement with the current command value for the q-axis in a feedback mode. The feedback control devices 113 and 114 calculate the command voltage as a function of a deviation of each of the d-axis current and the q-axis current from a corresponding one of the current command values using PI feedback techniques.

The three-phase converter 115 works to convert the command values for the d-axis and the q-axis into command values for the U-phase, V-phase, and W-phase windings. Each of the devices 111 to 115 is engineered as a feedback controller to perform a feedback control operation for a fundamental current in the d-q transformation theory. The command voltages for the U-phase, V-phase, and W-phase windings are feedback control values.

The operation signal generator 116 uses the known triangle wave carrier comparison to produce operation signals for the first inverter 101 as a function of the three-phase command voltages. Specifically, the operation signal generator 116 works to produce switch operation signals (i.e., duty signals) for the upper and lower arms for the three-phase windings (i.e., the U-, V-, and W-phase windings) under PWM control based on comparison of levels of signals derived by normalizing the three-phase command voltages using the power supply voltage with a level of a carrier signal, such as a triangle wave signal.

The same structure as described above is provided for the X-, Y-, and Z-phase windings. The d-q converter 122 works to convert currents (i.e., three phase currents), as measured by current sensors mounted for the respective phase windings, into a d-axis current and a q-axis current that are components in the two-dimensional rotating Cartesian coordinate system in which the d-axis is defined as the direction of the axis of the magnetic field.

The d-axis current feedback control device 123 determines a command voltage for the d-axis. The q-axis current feedback control device 124 determines a command voltage for the q-axis. The three-phase converter 125 works to convert the command values for the d-axis and the q-axis into command values for the X-phase, Y-phase, and Z-phase windings. The operation signal generator 126 produces operation signals for the second inverter 102 as a function of the three-phase command voltages. Specifically, the operation signal generator 126 works to switch operation signals (i.e., duty signals) for the upper and lower arms for the three-phase windings (i.e., the X-, Y-, and Z-phase windings) based on comparison of levels of signals derived by normalizing the three-phase command voltages using the power supply voltage with a level of a carrier signal, such as a triangle wave signal.

The driver 117 works to turn on or off the switches Sp and Sn in the inverters 101 and 102 in response to the switch operation signals produced by the operation signal generators 116 and 126.

Subsequently, a torque feedback control operation will be described below. This operation is to increase an output of the rotating electrical machine 10 and reduce torque loss in the rotating electrical machine 10, for example, in a high-speed and high-output range wherein output voltages from the inverters 101 and 102 rise. The controller 110 selects one of the torque feedback control operation and the current feedback control operation and performs the selected one as a function of an operating condition of the rotating electrical machine 10.

Figure 28:
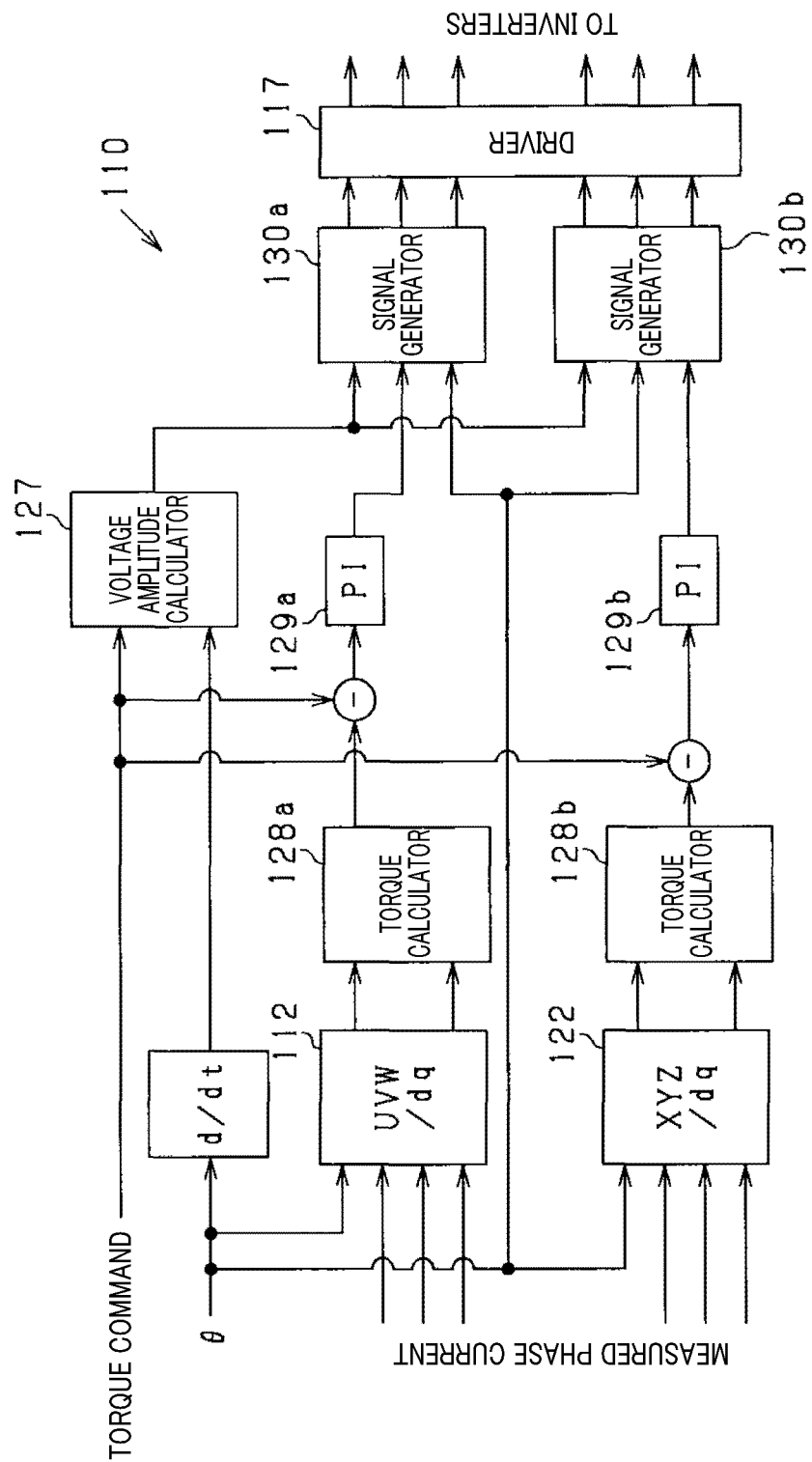
FIG. 28 is a functional block diagram which shows a torque feedback control operation of a control device.

FIG. 28 shows the torque feedback control operation for the U-, V-, and W-phase windings and the torque feedback control operation for the X-, Y-, and Z-phase windings. In FIG. 28, the same reference numbers as employed in FIG. 27 refer to the same parts, and explanation thereof in detail will be omitted here. The control operation for the U-, V-, and W-phase windings will be first described.

The voltage amplitude calculator 127 works to calculate a voltage amplitude command that is a command value of a degree of a voltage vector as a function of the motor-mode torque command value or the generator-mode torque command value for the rotating electrical machine 10 and the electrical angular velocity ω derived by differentiating the electrical angle θ with respect to time.

The torque calculator 128a works to estimate a torque value in the U-phase, V-phase, or the W-phase as a function of the d-axis current and the q-axis current converted by the d-q converter 112. The torque calculator 128a may be designed to calculate the voltage amplitude command using a map listing relations among the d-axis current, the q-axis current, and the voltage amplitude command.

The torque feedback controller 129a calculates a voltage phase command that is a command value for a phase of the voltage vector as a manipulated variable for bringing the estimated torque value into agreement with the motor-mode torque command value or the generator-mode torque command value in the feedback mode. Specifically, the torque feedback controller 129a calculates the voltage phase command as a function of a deviation of the estimated torque value from the motor-mode torque command value or the generator-mode torque command value using PI feedback techniques.

The operation signal generator 130a works to produce the operation signal for the first inverter 101 using the voltage amplitude command, the voltage phase command, and the electrical angle θ. Specifically, the operation signal generator 130a calculates the command values for the three-phase windings based on the voltage amplitude command, the voltage phase command, and the electrical angle θ and then generates switching operation signals for the upper and lower arms for the three-phase windings by means of PWM control based on comparison of levels of signals derived by normalizing the three-phase command voltages using the power supply voltage with a level of a carrier signal, such as a triangle wave signal.

The operation signal generator 130a may alternatively be designed to produce the switching operation signals using pulse pattern information that is map information about relations among the voltage amplitude command, the voltage phase command, the electrical angle θ, and the switching operation signal, the voltage amplitude command, the voltage phase command, and the electrical angle θ.

The same structure as described above is provided for the X-, Y-, and Z-phase windings. The torque calculator 128b works to estimate a torque value in the X-phase, Y-phase, or the Z-phase as a function of the d-axis current and the q-axis current converted by the d-q converter 122.

The torque feedback controller 129b calculates a voltage phase command as a manipulated variable for bringing the estimated torque value into agreement with the motor-mode torque command value or the generator-mode torque command value in the feedback mode. Specifically, the torque feedback controller 129b calculates the voltage phase command as a function of a deviation of the estimated torque value from the motor-mode torque command value or the generator-mode torque command value using PI feedback techniques.

The operation signal generator 130b works to produce the operation signal for the second inverter 102 using the voltage amplitude command, the voltage phase command, and the electrical angle θ. Specifically, the operation signal generator 130b calculates the command values for the three-phase windings based on the voltage amplitude command, the voltage phase command, and the electrical angle θ and then generates the switching operation signals for the upper and lower arms for the three-phase windings by means of PWM control based on comparison of levels of signals derived by normalizing the three-phase command voltages using the power supply voltage with a level of a carrier signal, such as a triangle wave signal. The driver 117 then works to turn on or off the switches Sp and Sn for the three-phase windings in the inverters 101 and 102 in response to the switching operation signals derived by the operation signal generators 130a and 130b.

The operation signal generator 130b may alternatively be designed to produce the switching operation signals using pulse pattern information that is map information about relations among the voltage amplitude command, the voltage phase command, the electrical angle θ, and the switching operation signal, the voltage amplitude command, the voltage phase command, and the electrical angle θ.

Figure 29:
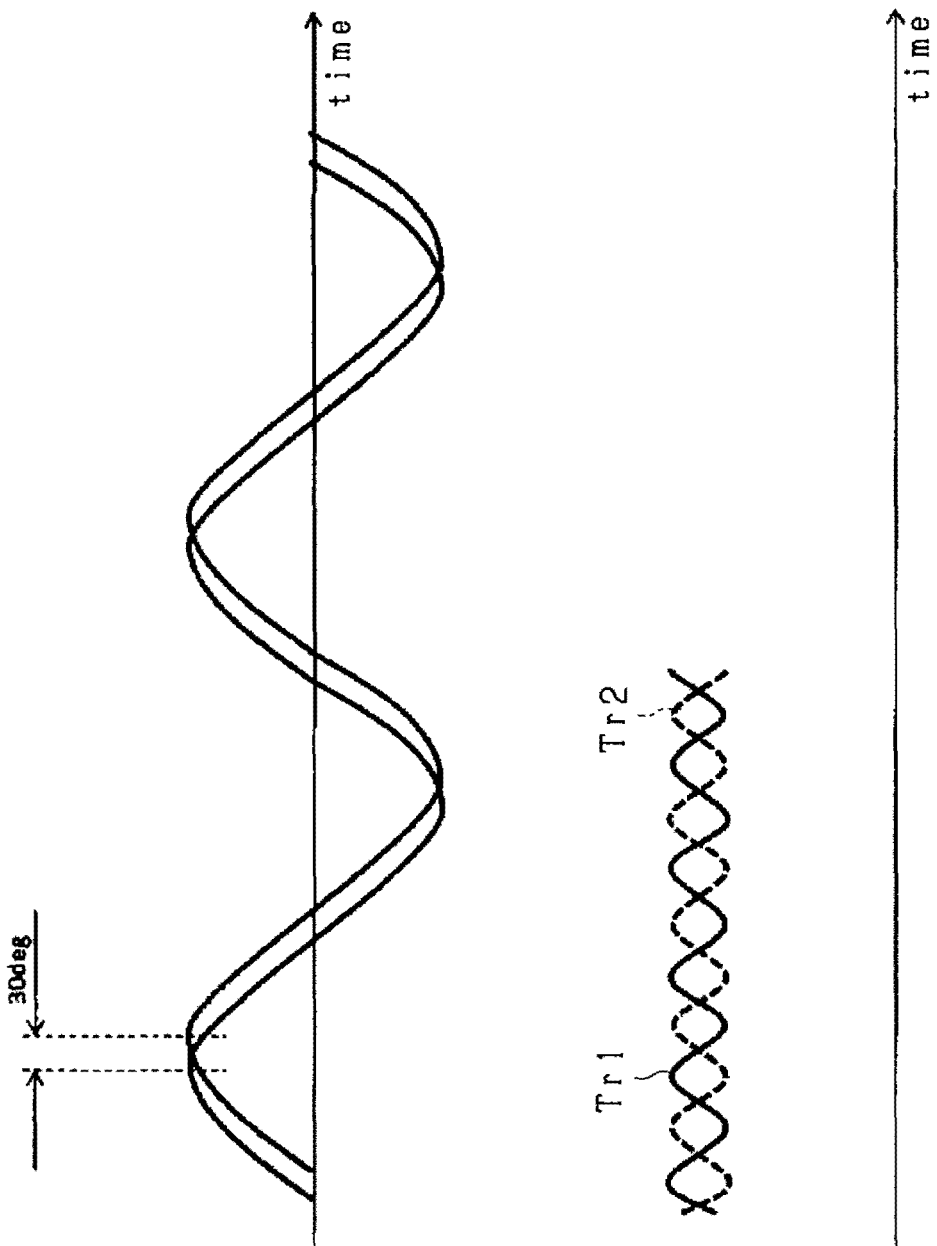
FIG. 29(*a*) is a time chart which represents an electrical current flowing through a stator winding.
Figure 30:
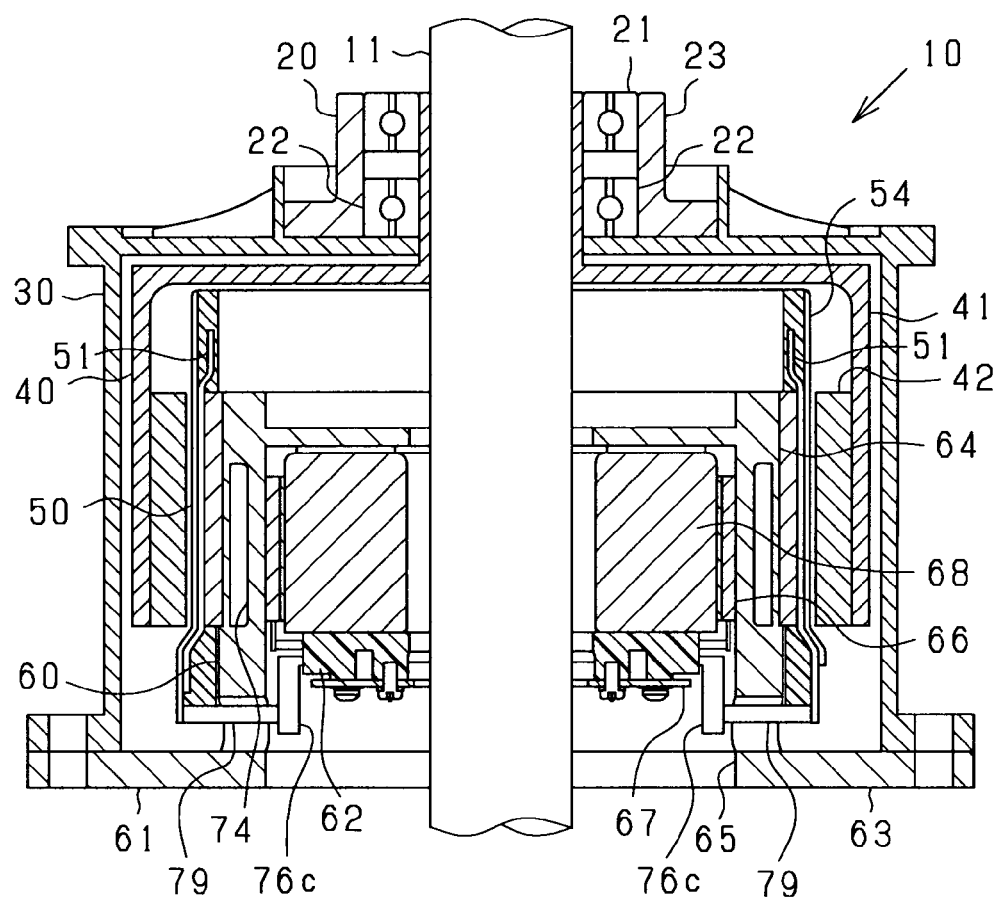
FIG. 30 is a longitudinal sectional view of a rotating electrical machine in a modified form of the first embodiment.

In operation, the switches Sp and Sn are turned on or off, so that phase currents, as illustrated in FIG. 29(a), flow 30° out of phase with each other in two sets of phase windings, i.e., the three-phase windings 51a and 51b. This causes, as demonstrated in FIG. 29(b), the three-phase winding 51a to produce torque Tr1 and the three-phase winding 51b to produce torque Tr2, thereby effectively reducing pulsation of the $6^{th}$ harmonic component of torque produced by the rotating electrical machine 10.

The above described embodiment offers the following beneficial advantages.

The bearings 21 and 22 are usually subjected to friction during rotation of the rotor 40, and therefore generate heat. The heat would be an obstruction to dissipation of heat from the stator winding 51 disposed in the rotor body 41 or from the electrical components 62. Accordingly, the rotating electrical machine 10 is designed to have the bearings 21 and 22 offset from the axial center of the rotor 40 to one of ends of the axis of the rotor 40. In other words, the bearings 21 and 22 are arranged only one of the ends of the rotor 40 in a cantilever form. This causes the heat generated from the bearings 21 and 22 during rotation of the rotor 40 to concentrate on only one of the ends of the rotor 40, thereby eliminating an obstruction to the dissipation of heat.

The concentration of the heat, as generated from the bearings 21 and 22 during rotation of the rotor 40, on only one of the ends of the axis of the rotor 40 will result in a difference in temperature in the axial direction of the rotor 40. This facilitates flow of air from the bearings 21 and 22 toward the rotor 40, thereby improving effectiveness in dissipating the heat from behind the bearings 21 and 22 even when the electrical components 62 are mounted in a hollow portion of the rotor body 41.

The rotor body 41 has an opening located farther away from the bearings 21 and 22. This facilitates dissipation of heat from the opening of the rotor body 41 even when heating elements, such as the electrical components 62, are disposed inside the rotor body 41.

The cantilever arrangement of the rotating shaft 11 may lead to a risk that the rotation of the rotor 40 increases swinging or vibration of the rotating shaft 11. One of the bearings 21 and 22 is designed to be different in dimension of a gap between each of the outer race 25 and the inner race 26 and the balls 27 from the other of the bearings 21 and 22. This minimizes adverse effects on the bearing unit 20 which arise from deflection of the rotor 40 or mechanical vibration of the rotor 40 due to imbalance resulting from parts tolerance at a location close to the center of the rotor 40. The stability in rotation of the rotor 40 is, therefore, ensured even in the cantilever arrangement of the rotating shaft 11.

In the case of use of the cantilever arrangement, the weight of a portion of the rotor which is far away from the bearings will be increased, so that the inertia is increased, thereby resulting in an increase in swinging or vibration of the rotor. The rotor 40 is, therefore, designed in the form of a surface magnet type in which the first magnets 91 and the second magnets 92 of the magnet unit 42 are secured to the rotor body 41. This enables an amount of magnetic metal material used to be decreased as compared with an IPM rotor, thereby resulting in a decrease in inertia. It is, therefore, possible to reduce the swinging or vibration of the rotor 40 even with the use of the cantilever arrangement.

The magnet unit 42 uses the first magnets 91 and the second magnets 92 implemented by polar anisotropic magnets and is designed to create a flow of magnetic flux in an annular shape between adjacent N and S-poles in the magnets 91 and 92. The magnetic path, therefore, has an increased length, as compared with, for example, radial anisotropic magnets. A distribution of the magnetic flux density will, therefore, exhibit a shape similar to a sine wave illustrated in FIG. 17. This facilitates concentration of magnetic flux on the magnetic pole, thereby enabling the degree of torque produced by the rotating electrical machine 10 to be increased. This also reduces leakage of magnetic flux from the permanent magnets to make a magnetic circuit in the rotor 40. In other words, the function of the rotor 40 to create the magnetic circuit is achieved fully by the permanent magnets.

The rotor body 41 retaining the magnets 91 and 92 exhibiting inertia may be made of synthetic resin, such as CFRP, not a magnetic metal material. The use of synthetic resin to make the rotor body 41 minimizes the inertia, thereby reducing the swinging or vibration of the rotor 40 in the cantilever arrangement.

The rotating electrical machine 10 is designed to have the outer rotor structure in which the rotor 40 is arranged outside the stator 50 in the radial direction. The magnet unit 42 is, therefore, secured to the inner periphery or inner circumferential surface of the rotor body 41. This firmly retains, unlike the inner rotor structure, the magnet unit 42 inside the rotor body 41 against centrifugal force acting on the magnet unit 43 during rotation of the rotor 40. In other words, it is possible to minimize the size of a structure retaining the magnet unit 42 on the rotor body 41 as compared with the inner rotor structure, thereby enabling the inertia to be decreased to minimize the swinging or vibration of the rotor 40 even in the cantilever arrangement.

The intermediate portion 45 has a radially inner portion and a radially outer portion which has a difference in level therebetween in the axial direction. The magnet retainer 43 and the fixing portion 44 partially overlap each other in the axial direction. This results in a decrease in dimension of the rotating electrical machine 10 in the axial direction thereof to be decreased and also ensures required dimensions of the magnet retainer 43 and the fixing portion 44 in the axial direction. The ensuring of the required dimension of the fixing portion 44 in the axial direction enables the bearings 21 and 22 to be arranged at a required interval away from each other, thereby ensuring the stability in operation of the bearings 21 and 22. This also enables the rotor 40 to be retained on the rotating shaft 11 around to the center of gravity of the rotor as compared with when the intermediate portion 45 is shaped to be flat without any difference in level, thereby achieving the stability in operation of the rotor 40.

The rotating electrical machine 10 is designed to have a slot-less structure in which there is no soft magnetic material-made tooth between the conductors 82 arranged adjacent each other in the circumferential direction. Each of the conductors 82 has the conductor body 82a made of an aggregation of the wires 86. This enables the current flow path in the conductors 82 to be thinned, thereby resulting in an increase in electrical resistance of the conductors 82 to a flow of eddy current arising from interlinking of a magnetic field including a harmonic magnetic field from the magnet unit 42 with the conductors 82. This reduces the eddy current flowing through the conductors 82 to decrease the eddy-current loss.

The conductor body 82a is, as described above, made of the twisted wires 86, thereby causing each of the wires 86 to have portions where directions of applied magnetic field are opposite each other, which cancels a back electromotive force resulting from the interlinking magnetic field. This results in a great reduction in the eddy current to decrease the eddy-current loss.

Particularly, in this embodiment, each of the wires 86 is made of fibers including boron-containing microfibers in which carbon in carbon nanotube fibers is at least partially substituted with boron. This enables a current flow path in the conductor body 82a to be made narrower and also enables the number of times the current flow path is twisted to be increased, thereby minimizing electrical resistance to a flow of the eddy current to enhance a decrease in eddy-current loss.

The conductors 82 of the stator winding 51 are, as described above, flattened, thereby resulting in a decreased thickness of the straight sections 83 in the radial direction, which enables the radial center of the straight sections 83 to be located close to the magnet unit 42. The air gap between the stator core 52 and the magnet unit 42 may also be decreased by shaping the conductors 82 to be flat to decrease the thickness of the straight sections 83 in the radial direction. This reduces the magnetic resistance in the magnetic circuit to a flow of magnetic flux passing through the stator 50 and the rotor 40, so that the magnetic flux is increased in the magnetic circuit. This decreases magnetic saturation in the stator 50 using the slot-less structure and also enhances the density of magnetic flux in the straight sections 83 to increase torque produced by the rotating electrical machine 10.

The torque is, as described above, increased by the flat shape of the conductors 82, but however, the flat shape will result in an increase in amount of magnetic flux traveling from the magnet unit 42 to the conductors 82, thus resulting in an increase in eddy current. Each of the conductors 82 in this embodiment is, however, made of an aggregation of the wires 86. The conductor body 82a is formed by the twisted wires 86, thereby further decreasing the eddy current flowing in the conductors 82. The conductors 82 are flattened in the radial direction, thereby also decreasing the eddy current. This embodiment, therefore, serves to increase the torque output from the rotating electrical machine 10 and reduce the eddy-current loss.

The magnet unit 42 is made up of permanent magnets: the first magnets 91 and the second magnets 92, so that the magnet unit 42 generates magnetic field all the time. This causes the magnet unit 42 to produce a rotating magnetic field resulting from rotation of the rotor 40 without any load thereon even when the controller 110 is not driving the rotating electrical machine 10, so that the eddy current will flow through the conductors 82 due to a harmonic magnetic field. However, each of the conductors 82 in this embodiment is made of an aggregation of the wires 86. Each of the conductor bodies 82a is formed by the twisted wires 86. This enhances a decrease in eddy current flowing in the conductors 82. It is, therefore, possible to decrease the eddy-current loss even when the rotating electrical machine 10 is at rest.

In order to eliminate magnetic saturation in a q-axis core portion, the first magnets 91 and the second magnets 92 are mounted on a surface of the motor 40 which faces the stator 50. On this condition, polar anisotropic permanent magnets are used to make the first magnets 91 and the second magnets 92 in order to enhance the torque output from the rotating electrical machine 10. This structure increases the torque with an increase in magnetic flux, but results in an increase in amount of magnetic flux interlinking with the conductors 82, so that the eddy current is increased. This embodiment, however, has the conductors 82 each of which is made of an aggregation of the wires 86 and also has the conductor bodies 82a each of which is made of the twisted wires 86, thereby more effectively decreasing the eddy current flowing through the conductors 82. The rotating electrical machine 10 in this embodiment is, therefore, capable of increasing the torque output and reducing the eddy-current loss.

The rotating electrical machine 10 is designed to have a first region X1 and a second region X2. The first region X1 is a region located radially inside an inner periphery of a magnetic circuit component including the stator 50 and the rotor 40. The second region X2 is a region radially extending from the inner periphery of the magnetic circuit component to the housing 30. The volume of the first region X1 is larger than that of the second region X2, so that the dissipation of heat is more facilitated in the first region X1 than the second region X2, thereby providing a suitable heat dissipation ability.

The first region X1 is smaller in transverse sectional area than the second region X2. Specifically, if a radius of an inner peripheral surface of the housing 30 is defined as d, the magnetic circuit component is located at a distance from the center of rotation of the rotor 40 which is greater than d×0.705 in the radial direction. As viewed in a region where the magnet unit 42 of the rotor 40 overlaps the stator winding 51 in the axial direction, the volume of the first region X1 is larger than that of the second region X2. This enhances the heat dissipation ability.

The intermediate portion 45 is offset from the center of the rotor 40 in the axial direction of the rotor 40. This layout enables the first region X1 to have an increased volume as compared with when the intermediate portion 45 is located at the center of the rotor 40 or when intermediate portions are offset from the center of the rotor 40 in opposite axial direction. The offset layout of the intermediate portion 45 from the center of the rotor 40 in the axial direction enables the rotor 40 has an opening located away from the intermediate portion 45 to facilitate the dissipation of heat therefrom. This enhances the heat dissipation ability.

The rotor 40 has the outer rotor structure in which the rotor 40 is located radially outside the stator 50. The magnet unit 42 is secured to the radially inner periphery of the rotor body 41. This holds the magnetic unit 42, unlike the inner rotor structure, from being accidentally removed from the rotor 40 when subjected to centrifugal force during rotation of the rotor 40, thereby ensuring the stability in retaining the magnet unit 42 to the inner periphery of the rotor body 41. Therefore, it is possible to decrease the number of parts required to secure the magnet unit 42 to the rotor body 41 as compared with the inner rotor structure. For instance, a surface magnet type rotor 40 may be used, thereby enabling the rotor 40 to be thinner than the inner rotor structure, which also enables the first region X1 and the second region X2 to have increased sizes.

The unit base 61 is provided which serves as a stator retainer for retaining the stator 50. The unit base 61 includes the cylinder 71 secured to a radially inner periphery of the stator 50. The cylinder 71 has formed therein the coolant path 74 (corresponding to a cooling portion) through which coolant flows. The coolant path 74 serves to dissipate heat from the magnetic circuit component to cool the magnetic circuit component and also to release heat from the electrical components 62 disposed in the first region X1 radially inside the cylinder 71. The coolant path 74 has the cooling ability to sufficiently cool the magnetic circuit component. In other words, the first region X1 is larger in size than the second region X2, thereby facilitating the dissipation of heat from the electrical components 62 including heat generating parts or members (e.g., the semiconductor modules 66) in the first region X1 which generate an amount of heat equal to or less than that generated by the magnetic circuit component.

The electrical components 62 include the heat generating parts or members (i.e., the semiconductor modules 66 and the capacitor modules 68) when energized. The semiconductor modules 66 are arranged along the inner peripheral surface of the cylinder 71. The coolant path 74 is arranged to overlap the semiconductor modules 66 in the radial direction. The coolant path 74, therefore, serves to dissipate heat from the magnetic circuit component (i.e., the rotor 40 and the stator 50) and also from the electrical components 62.

The semiconductor modules 66 constitute an inverter circuit and include semiconductor switching devices. When turned on or off, the semiconductor modules 66 usually generates electromagnetic waves. The electrical components 62, therefore, corresponds to electromagnetic wave-generating members. The electrical components 62 are arranged in a void space surrounded by the casing 64. The housing 30, the rotor 40, and the stator 50 are arranged outside the casing 64 in the form of layers. This layout effectively blocks electromagnetic noise generated by the inverter circuit.

The stator 50 is of the slot-less structure, thereby enabling the stator winding 51 to have an increased conductive area which reduces the amount of heat generated therefrom. The stator 50 is also enabled to have a decreased thickness in the radial direction thereof to increase the volume of the first region X1.

The slot-less structure results in an increased conductive density of the stator winding 51. The stator winding 51, therefore, uses anisotropy conductors. Specifically, the conductor 82 of the stator winding 51 has the conductor body 82a made of the twisted wires 86. The conductor body 82a is covered with the insulating coating 82b. This facilitates insulating design.

The rotor 40 and the stator 50 are configured to have an air gap therebetween which meets a relation of D/P<12.2 where D is an outer diameter of the air gap, and P is the number of magnetic poles. Specifically, the rotor 40 has an inner diameter D (i.e., the outer diameter of the air gap between the rotor 40 and the stator 50). The rotating electrical machine 10 has the number of magnetic poles P (i.e., 16 in this embodiment). D/P is selected to be 12.2 or less to form the first region X1 larger than the second region X2.

The rotor 40 is a surface magnet rotor to which permanent magnets (i.e., the magnet unit 42) firmly secured to the rotor body 41. This minimizes a used amount of magnetic metallic material, such as iron, and enables the rotor 40 to be thin.

The magnet unit 42 uses the first magnets 91 and the second magnets 92 that are polar anisotropic magnets. The first and second magnets 91 and 92 are engineered to create a magnetic flux flowing in an annular shape between a respective adjacent two of the N-poles and the S-poles of the magnets 91 and 92, so that each of the magnetic paths has an increased length, as compared with, for example, radial anisotropic magnets. A distribution of the magnetic flux density will, therefore, exhibit a shape similar to a sine wave illustrated in FIG. 24. This facilitates concentration of magnetic flux around the magnetic poles, thereby enabling the degree of torque produced by the rotating electrical machine 10 to be increased. Additionally, only use of the permanent magnets reduces the leakage of magnetic flux to develop a magnetic circuit in the rotor 40. In other words, the function of the rotor 40 to create the magnetic circuit is achieved fully by the permanent magnets. This enables the surface magnet type rotor to be used to increase the required torque output and also enables the rotor 40 to be thin, which enables the first region X1 to be increased in size and improves the torque output.

The rotating shaft 11 is retained to be rotatable by a plurality of bearings 21 and 22 which are arranged away from each other in the axial direction. The bearings 21 and 22 are offset from the center of the rotor 40 to the same side in the axial direction. In other words, the bearings 21 and 22 are offset to the same side in the axial direction in the cantilever form. The cantilever form causes heat, as produced from the bearings 21 and 22, to concentrate on the same side in the axial direction, thereby facilitating dissipation of heat from the opposite side to the bearings 21 and 22 even when the electrical components 62 including heat generating members, such as the capacitor modules 68 are disposed in the first region X1.

Modification of First Embodiment

The rotor body 41 of the rotor 40 in the above embodiment is equipped with the intermediate portion 45 which has a difference in level in the axial direction, however, the rotor body 41 may alternatively be designed to have the flat intermediate portion 45 without the difference in level.

Figure 31:
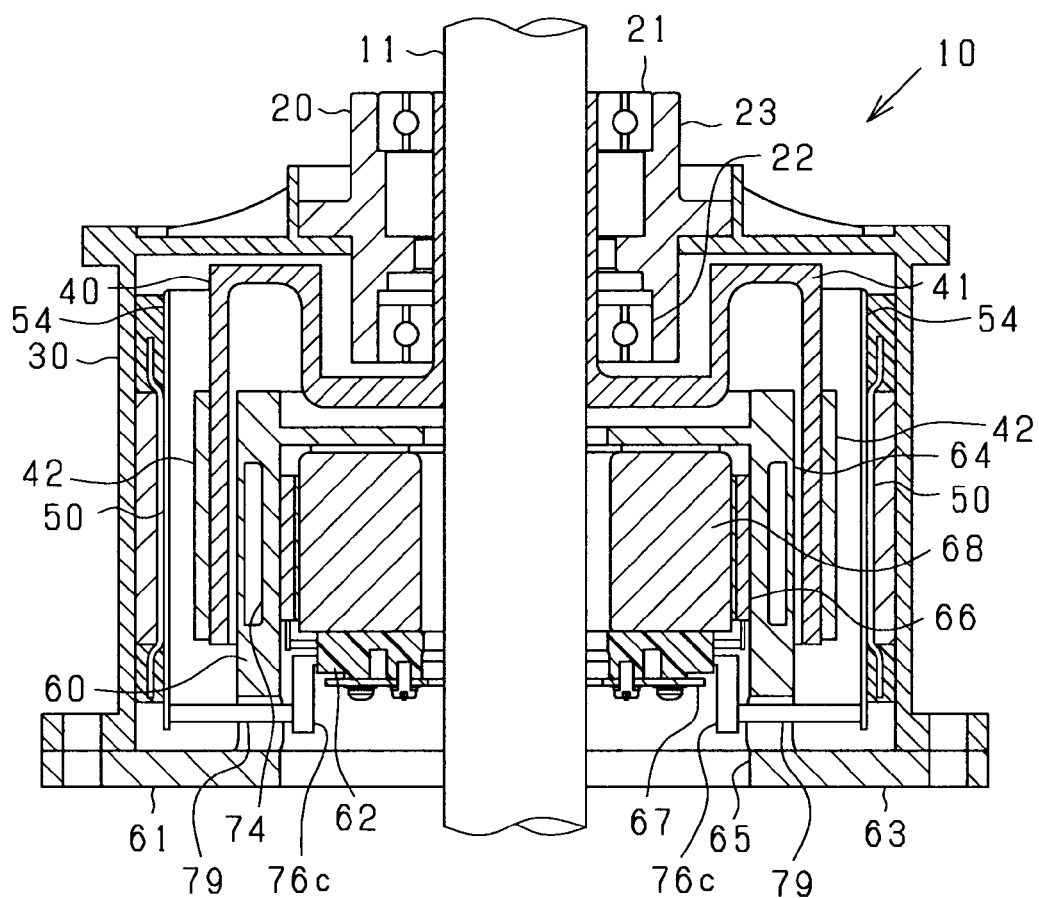
FIG. 31 is a longitudinal sectional view of a rotating electrical machine in a modified form of the first embodiment.

The present invention may be, as illustrated in FIG. 31, used with an inner rotor rotating electrical machine (i.e., an inward rotating type). In this case, the stator 50 and the rotor 40 are arranged radially inward in this order within the housing 30. The inverter unit 60 may be mounted radially inside the rotor 40.

Figure 32:
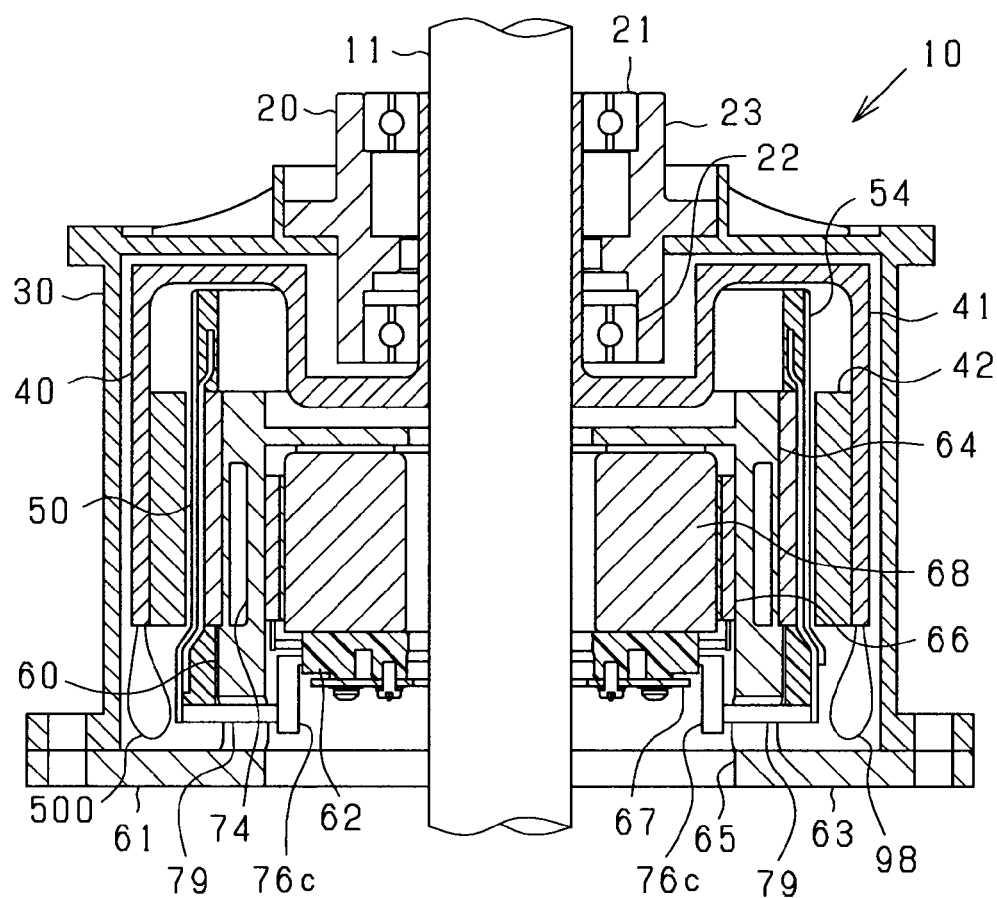
FIG. 32 is a longitudinal sectional view of a rotating electrical machine in a modified form of the first embodiment.

The rotor 40 may be, as illustrated in FIG. 32, equipped with the air cooling fins 98 which creates flows of air to dissipate heat.

Figure 33:
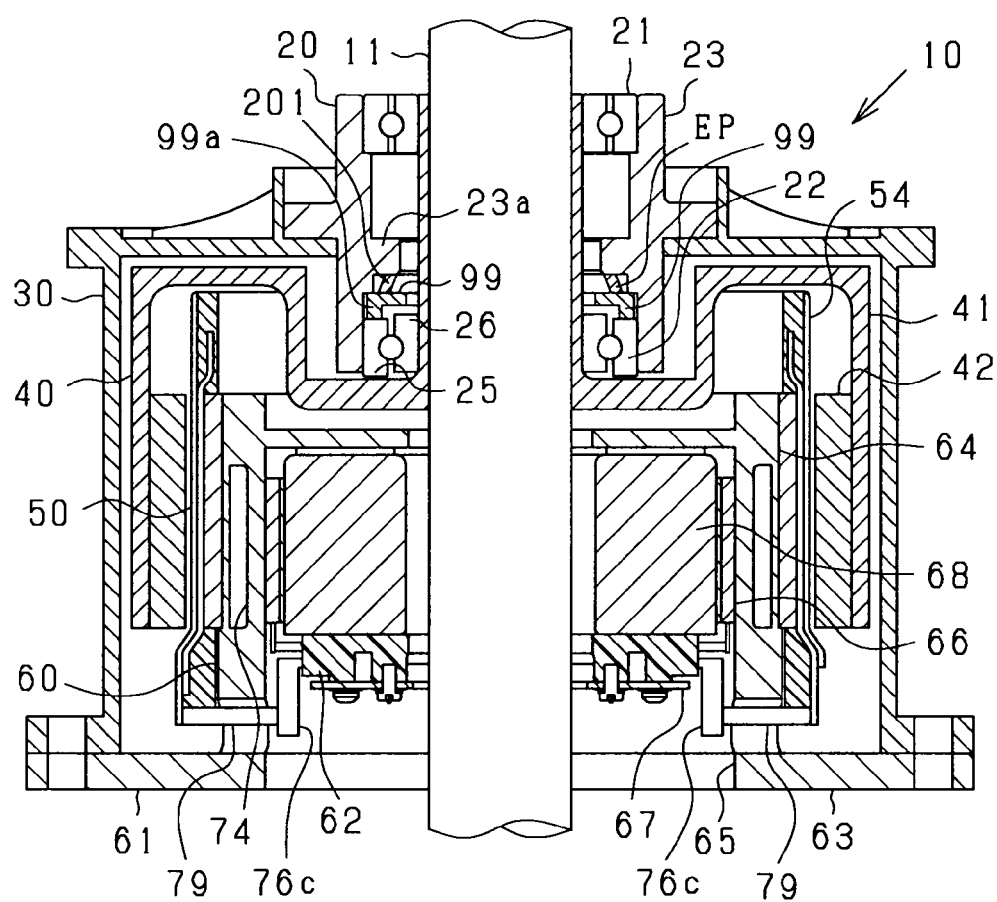
FIG. 33 is a longitudinal sectional view of bearings in a modified form of the first embodiment.

In the above embodiment, precompression may be applied from the side of the rotor 40 to the outer race 25 of the bearing 22 which is located closer to the center of the rotor 40 in the axial direction. For instance, the annular spacer 9 is, as illustrated in FIG. 33, disposed between the bearing 21 and the bearing 22. The spacer 99 has the annular protrusion 99a oriented toward the outer race 25 of the bearing 22. The protrusion 99a has an inner diameter larger than an outer diameter of the inner race 26 of the bearing 22 and smaller than an outer diameter of the outer race 25. An elastic member EP, such as a disc spring, is disposed between the inner shoulder 23a formed radially inside the retainer 23 and the spacer 99. The precompression is exerted on the spacer 99 toward the bearing 22, so that it is applied only to the outer race 25 of the bearing 22 to urge the outer race 25 toward the rotor 40 in the axial direction. This results in there being no clearance in the bearing 22, thereby reducing vibration of the bearing 22.

Other embodiments will be described below in terms of differences between themselves and the first embodiment.

Second Embodiment

In this embodiment, the polar anisotropic structure of the magnet unit 42 of the rotor 40 is changed and will be described below in detail.

Figure 34:
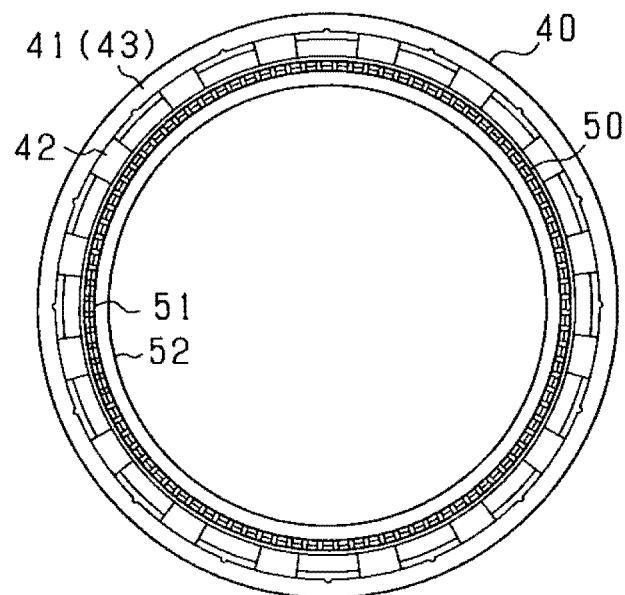
FIG. 34 is a transverse sectional view of a rotor and a stator in the second embodiment.
Figure 35:
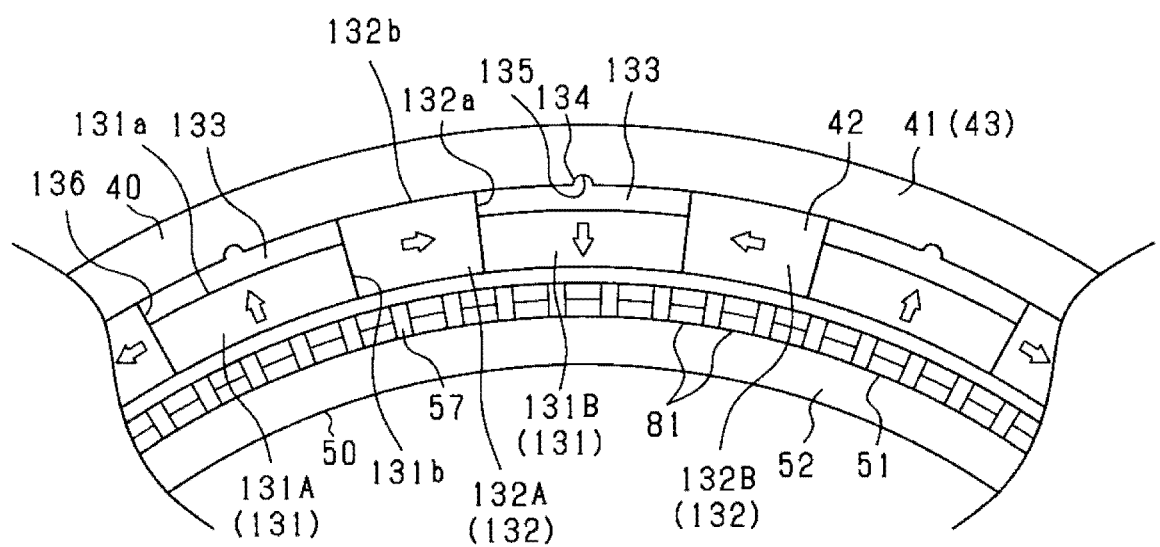
FIG. 35 is a partially enlarged view of FIG. 34.

The magnet unit 42 is, as clearly illustrated in FIGS. 34 and 35, made using a magnet array referred to as a Halbach array. Specifically, the magnet unit 42 is equipped with the first magnets 131 and the second magnets 132. The first magnets 131 have a magnetization direction (i.e., an orientation of a magnetization vector thereof) oriented in the radial direction of the magnet unit 42. The second magnets 132 have a magnetization direction (i.e., an orientation of the magnetization vector thereof) oriented in the circumferential direction of the magnet unit 42. The first magnets 131 are arrayed at a given interval away from each other in the circumferential direction. Each of the second magnets 132 is disposed between the first magnets 131 arranged adjacent each other in the circumferential direction. The first magnets 131 and the second magnets 132 are each implemented by a rare-earth permanent magnet, such as a neodymium magnet.

The first magnets 131 are arranged away from each other in the circumferential direction so as to have N-poles and S-poles which are created in radially inner portions thereof and face the stator 50. The N-poles and the S-poles are arranged alternately in the circumferential direction. The second magnets 132 are arranged to have N-poles and S-poles alternately located adjacent the first magnets 131 in the circumferential direction. Specifically, the first magnets 131 include the first A magnet 131A whose magnetization direction is oriented radially outward and the first B magnet 131B whose magnetization direction is oriented radially inward. The second magnets 132 include the second A magnet 132A whose magnetization direction is oriented in a first one of opposite circumferential directions and the second B magnet 132B whose magnetization direction is oriented in a second one of the opposite circumferential directions. The magnet unit 42 is configured to have the first A magnet 131A, the second A magnet 132A, the first B magnet 131B, the second B magnet 132B, the first A magnet 131A . . . which are arrayed in this order in the circumferential direction.

The magnet retainer 43 is made of a soft magnetic material and forms a magnetic path. The magnet retainer 43 minimizes leakage of magnetic flux from the first magnet 131 or the second magnet 132 outward in the radial direction (away from the stator 50) and directs a flow of the magnetic flux inwardly in the radial direction, thereby enhancing the density of magnetic flux from the first magnet 131 and the second magnet 132 inwardly in the radial direction.

The recesses 136 are provided radially outside the first magnets 131, in other words, near the magnet retainer 43 of the rotor body 41. The recesses 136 are hollowed radially inwardly toward the stator 50. More specifically, the magnet unit 42 has end surfaces (i.e., the magnetic pole faces 131a) of the first magnets 131 which face away from the stator 50 and end surfaces (i.e., the side surfaces 132b) of the second magnets 132 which face away from the rotor 50. At least one of the magnetic pole face 131a and the side surface 132b defines each of the recesses 136 hollowed toward the stator 50. Specifically, the recesses 136 are arranged so that the radially outward magnetic pole faces 131a of the first magnets 131 and the radially outer side surfaces 132b of the second magnets 132 arranged adjacent the first magnets 131 are arranged alternately in the radial direction. In this embodiment, the magnetic pole faces 131a of all the first magnets 131 are located more radially inwardly than the side surfaces 132b of the second magnets 132 toward the stator 50 to define the recesses 136. In other words, the recesses 126 are arranged radially outside the first magnets 131. Each of the recesses 136 has a length in the circumferential direction which is equivalent to that of the first magnet 131 (especially, a dimension of an outer periphery of the first magnet 131).

The magnetic member 133 made of a soft magnetic material is disposed in each of the recesses 136. In other words, the magnetic members 133 made of a soft magnetic material are arranged radially outside the first magnets 131, i.e., inside the magnet retainer 43 of the rotor body 41. For instance, each of the magnetic members 133 may be made of magnetic steel sheet, soft iron, or a dust core.

Each of the recesses 136 has a length in the circumferential direction which is equivalent to that of the first magnet 131 (especially, a dimension of the outer periphery of the first magnet 131). An assembly of the first magnet 131 and the magnetic member 133 has a thickness in the radial direction which is equivalent to that of the second magnet 132 in the radial direction. In other words, the first magnets 131 has a thickness smaller than that of the second magnet 132 by that of the magnetic member 133 in the radial direction. Each of the magnetic members 133 fully occupies a corresponding one of the recesses 136. Each of the magnets 131 and 132 is firmly joined to the magnetic member 133 using, for example, adhesive. In the magnet unit 42, the radial outside of the first magnets 131 faces away from the stator 50. The magnetic members 133 are located on the opposite side of the first magnets 131 to the stator 50 in the radial direction.

Each of the magnetic members 133 has the key 134 in a convex shape which is formed on the outer periphery thereof and protrudes radially outside the magnetic member 133, in other words, protrudes into the magnet retainer 43 of the rotor body 41. The magnet retainer 43 has the key grooves 135 which are formed in an inner peripheral surface thereof in a concave shape and in which the keys 134 of the magnetic members 133 are fit. The protruding shape of the keys 134 is contoured to conform with the recessed shape of the key grooves 135. As many of the key grooves 135 as the keys 134 of the magnetic members 133 are formed. The engagement between the keys 134 and the key grooves 135 serves to eliminate misalignment or a positional deviation of the first magnets 131, the second magnets 132, and the rotor body 41 in the circumferential direction (i.e. a rotational direction). The keys 134 and the key grooves 135 (i.e., convexities and concavities or engaging portions and disengaged portions) may be formed either on the magnet retainers 43 of the rotor body 41 or in the magnetic members 133, respectively. Specifically, the magnetic members 133 may have the key grooves 135 in the outer periphery thereof, while the magnet retainer 43 of the rotor body 41 may have the keys 134 formed on the inner periphery thereof.

The magnet unit 42 has the first magnets 131 and the second magnets 132 alternately arranged to increase the magnetic flux density in the first magnets 131. This results in concentration of magnetic flux on one surface of the magnet unit 42 to enhance the magnetic flux close to the stator 50.

The layout of the magnetic members 133 radially arranged outside the first magnets 131, in other words, farther away from the stator 50 reduces partial magnetic saturation occurring radially outside the first magnets 131, thereby alleviating a risk of demagnetization in the first magnets 131 arising from the magnetic saturation. This results in an increase in magnetic force produced by the magnet unit 42. In other words, the magnet unit 42 in this embodiment has portions which are usually subjected to demagnetization and replaced by the magnetic members 133.

Figure 36A:
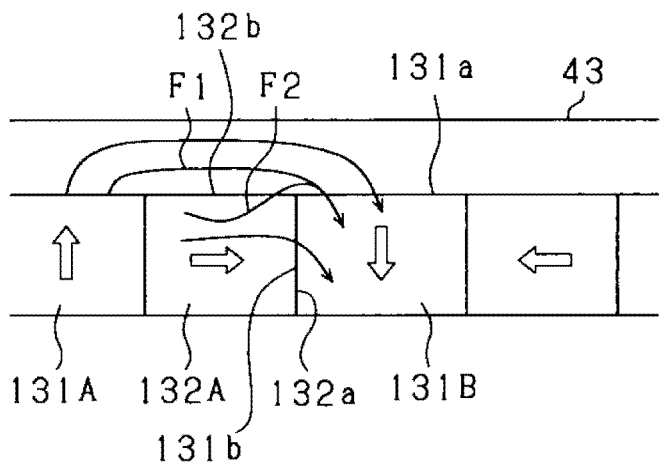
FIG. 36(*a*) is a view demonstrating flows of magnetic flux in a conventional magnet unit.

FIGS. 36(*a*) and 36(*b*) are illustrations which demonstrate flows of magnetic flux in the magnet unit 42. FIG. 36(*a*) illustrates a conventional structure in which the magnet unit 42 is not equipped with the magnetic members 133. FIG. 36(*b*) illustrates the structure in this embodiment in which the magnet unit 42 is equipped with the magnetic members 133. FIGS. 36(*a*) and 36(*b*) are linearly developed views of the magnet retainer 43 of the magnet holder 41 and the magnet unit 42. Lower sides of FIGS. 36(*a*) and 36(*b*) are close to the stator 50, while upper sides thereof are farther away from the stator 50.

In the structure shown in FIG. 36(*a*), the magnetic pole face of each of the first magnets 131 and a side surface of each of the second magnets 132 are placed in contact with the inner peripheral surface of the magnet retainer 43. Each of the first magnets 91 and the second magnets 92 usually has a magnetic flux density higher on the magnetic pole face than in the center of the magnetic pole thereof. In the structure of FIG. 36(*a*), an end of the magnetic pole face 131*a* of the first magnet 131 and an end of the magnetic pole face 132*a* of the second magnet 132 are close to each other on a surface of contact (i.e., a boundary) between the first magnet 131 and the second magnet 132, thus leading to a risk that magnetic saturation occurs near the surface of contact between the first magnet 131 and the second magnet 132 in the magnet retainer 43.

In the magnet retainer 43, a combined magnetic flux is created which is made up of a magnetic flux F1 which passes outside the second magnet 132 and then enters the surface of the first magnets 131 contacting the magnet retainer 43 and a magnetic flux which flows substantially parallel to the magnet retainer 43 and attracts a magnetic flux F2 produced by the second magnet 132. A magnetic flux passing through the magnet retainer 43 bypasses a portion of the magnet retainer 43 where magnetic saturation partially occurs (i.e., near a surface of contact between the first magnets 131 and the second magnets 132). This results in an increase in magnetic path passing through the magnet retainer 43 which may lead to demagnetization.

In the structure in FIG. 36(*b*), each of the recesses 136 is arranged so that the end surface (i.e., the magnetic pole face 131*a*) of the first magnets 131 and the end surface (i.e., the side surface 132*b*) of the second magnet 132 which contacts the first magnet 131 radially outside the second magnet 132 are offset from each other in the radial direction. In other words, ends or corners of the magnetic pole faces 131*a* of the first magnet 131 and the magnetic pole surface 132*a* of the second magnet 132 are located away from each other, thereby minimizing a risk that magnetic saturation may occur in a portion of the magnet retainer 43 near the contact between the first magnet 131 and the second magnet 132, in other words, decreasing the magnetic saturation in the magnet retainer 43 which deflects flows of magnetic flux, thereby resulting in an increase in resistance to demagnetization.

Each of the magnetic members 133 is disposed in space defined by the recess 136. This facilitates flow of magnetic flux through the magnetic member 133 and the magnet retainer 43 radially outside the magnet unit 42 between the first A magnet 131A and the first B magnet 131B. Accordingly, the magnetic members 133 fully occupying the recesses 136 serve to facilitate the flow of magnetic flux more as compared with when the recesses 136 are filled with non-magnetic members or air. The magnetic member 133 also facilitates flow of magnetic flux, as emerging from the magnetic pole face 132*a* of the second magnets 132, toward the magnetic pole face 131*a* of the first magnet 131. This ensures passage of magnetic flux, as produced by the first magnets 131 or the second magnets 132, through the magnet retainer 43 and the magnetic members 133.

The structure in FIG. 36(*b*), unlike FIG. 36(*a*), functions to eliminate the magnetic flux F2 inducing the magnetic saturation. This effectively enhances the permeance in the whole of the magnetic circuit, thereby ensuring the stability in properties of the magnetic circuit under elevated temperature.

Figure 36B:
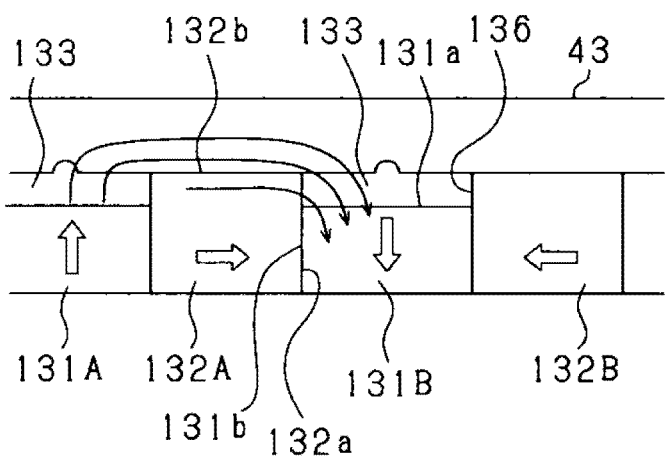
Figure 37:
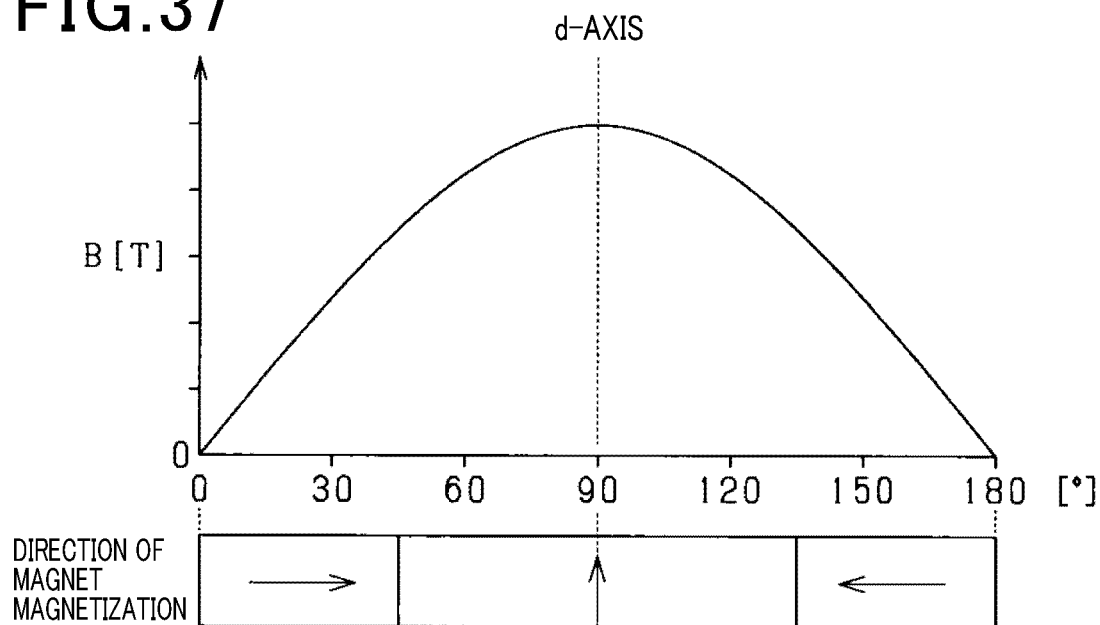
FIG. 37 is a view which represents a relation between an electrical angle and a magnetic flux density in magnets.

As compared with radial magnets used in conventional SPM rotors, the structure in FIG. 36(b) has an increased length of the magnetic path passing through the magnet. This results in a rise in permeance of the magnet which enhances the magnetic force to increase the torque. Further, the magnetic flux concentrates on the center of the d-axis, thereby increasing the sine wave matching percentage. Particularly, the increase in torque may be achieved effectively by shaping the waveform of the current to a sine or trapezoidal wave under PWM control or using 120° excitation switching ICs Specifically, the magnetic density distribution, as illustrated in FIG. 37, becomes approximately a sine wave, thereby resulting in concentration of magnetic flux on the magnetic pole, unlike a magnetic density distribution of radial anisotropic magnets shown in the comparative example of FIG. 25, which enhances torque output from the rotating electrical machine 10. In FIG. 37, a horizontal axis indicates the electrical angle, while a vertical axis indicates the magnetic flux density. 90° on the horizontal axis represents the d-axis (i.e., the center of the magnetic pole). 0° and 180° on the horizontal axis represent the q-axis.

In the comparative example demonstrated in FIG. 25, the magnetic flux density changes sharply near the q-axis. The more sharp the change in magnetic flux density, the more an eddy current generating in the stator winding 51 will increase. In contrast, the distribution of the magnetic flux density in this embodiment has a waveform approximating a sine wave. A change in magnetic flux density near the q-axis is, therefore, smaller than that in the radial anisotropic magnet near the q-axis. This minimizes the generation of the eddy current. The sine wave matching percentage in the distribution of the magnetic flux density is preferably set to, for example, 40% or more. This improves the amount of magnetic flux around the center of a waveform of the distribution of the magnetic flux density as compared with a radially oriented magnet or a parallel oriented magnet in which the sine wave matching percentage is approximately 30%.

The magnet unit 42 creates a magnetic flux oriented perpendicular to the magnetic pole face near the d-axis of each of the magnets 131 and 132 (i.e., the center of the magnetic pole). Such a magnetic flux extends in an arc-shape farther away from the d-axis, farther from the magnetic pole face. The more perpendicular to the magnetic pole face the magnetic flux extends, the stronger the magnetic flux is. The rotating electrical machine 10 in this embodiment is, as described above, designed to shape each of the conductor groups 81 to have a decreased thickness in the radial direction, so that the radial center of each of the conductor groups 81 is located close to the magnetic pole face of the magnet unit 42, thereby causing the strong magnetic flux to be applied to the stator 50 from the rotor 40.

The stator 50 has the cylindrical stator core 52 arranged radially inside the stator winding 51, that is, on the opposite side of the stator winding 51 to the rotor 40. This causes the magnetic flux extending from the magnetic pole face of each of the magnets 131 and 132 to be attracted by the stator core 52, so that it circulates through the magnetic path partially including the stator core 52. This enables the orientation of the magnetic flux and the magnetic path to be optimized.

The above described second embodiment offers the following beneficial advantages.

The magnet unit 42 has the recesses 136 each of which is defined by at least one of the end surface (i.e., the magnetic pole face 131a) of the first magnet 131 which is located away from the stator 50 and the end surface (i.e., the side surface 132b) of the second magnet 132 which is located away from the stator 50. Such an end surface is hollowed toward the stator 50 to define the recess 136. In other words, the magnet unit 42 has formed therein the recesses 136 which orient the radially outside end surfaces (i.e., the magnetic pole faces 131a of the first magnets 131 and the radially outside end surfaces (i.e., the side surfaces 132b) of the second magnets 132 arranged adjacent the first magnets 131 so that they are offset from each other in the radial direction. The magnetic members 133 made of soft magnetic material are disposed in the recesses 136.

With the above layout, the ends or corners of the magnetic pole faces 131a of the first magnets 131 are located away from the ends or corners of the magnetic pole faces 132a of the second magnets 132, thereby minimizing a risk that magnetic saturation may occur in a portion of the magnet retainer 43 near the contact between the first magnet 131 and the second magnet 132, in other words, decreasing the magnetic saturation in the magnet retainer 43 which deflects flows of magnetic flux, thereby resulting in an increase in resistance to the demagnetization. The spaces defined by the recesses 136 are occupied by the magnetic members 133 which facilitates flow of magnetic flux through the magnetic member 133 and the magnet retainer 43 radially outside the magnet unit 42 between the first A magnet 131A and the first B magnet 131B. The magnetic member 133 also facilitates flow of magnetic flux, as emerging from the magnetic pole face 132a of the second magnets 132, toward the magnetic pole face 131a of the first magnet 131. This ensures passage of magnetic flux, as produced by the first magnets 131 or the second magnets 132, through the magnet retainer 43 and the magnetic members 133. Therefore, flows of magnetic flux from the magnets 131 and 132 are facilitated to improve the magnetic flux density close to the stator 50.

Each of the first magnets 131 whose magnetization direction is oriented radially has a portion which is farther away from the stator 50 and has the highest probability of demagnetization. In order to alleviate such a problem, the above structure is designed to have the end surfaces of all the first magnets 131 which are hollowed radially inward so that they are located radially inside the end surfaces of the second magnets 132, thereby defining the recesses 136. The magnetic members 133 are arranged radially outside the first magnets 131. This minimizes the demagnetization and enables the volume of the first magnets 131 to be decreased.

The sum of thicknesses of each of the first magnet 131 and a corresponding one of the magnetic members 133 are selected to be equal to the thickness of each of the second magnets 132 in the radial direction, thereby facilitating the flow of magnetic flux and improving the magnetic flux density.

The magnet retainer 43 made of soft magnetic material is located on an opposite side of the magnet unit 42 to the stator 50 and extends over the magnets 131 and 132 arranged adjacent each other in the circumferential direction, thereby minimizing leakage of magnetic flux from the magnet unit 42 away from the stator 50 to improve the magnetic flux density close to the stator 50. There is, however, a risk that magnetic saturation partially occurs in the magnet retainer 43, thereby demagnetizing the first magnets 131. Such demagnetization is, as described already, alleviated by the magnetic members 133 disposed in the recesses 136, thereby minimizing the demagnetization of the first magnets 131.

The rotor 40 is of an outer rotor structure in which the rotor 40 is arranged radially outside the stator 50, thereby minimizing a risk of accidental removable of the magnet unit 42 arising from the centrifugal force, as compared with an inner rotor structure. This eliminates the need for an additional stopper to hold the magnet unit 42 from being removed. This enables the rotor 40 to have a decreased thickness and an air gap between the stator 50 and the rotor 40 to be reduced in size, thereby enhancing the torque output.

The magnetic members 133 have the keys 134 fit in the magnet retainer 43. Specifically, the magnet members 133 which are higher in mechanical properties (i.e., rigidity) than typical magnets are designed to have the keys 134, so that the keys 134 sufficiently function as stoppers to hold the magnetic members 133 from being rotated relative to the magnet retainer 43.

The magnet unit 42 has the first A magnet 131A, the second A magnet 132A, the first B magnet 131B, and the second B magnet 132B arrayed in this order in the circumferential direction. This layout (i.e., magnetic flux concentrated layout) enhances the magnetic flux density close to the stator 50.

The magnet layout in the second embodiment enables a magnetic circuit to be created in the rotor 40 without leakage of magnetic flux using the magnets 131 and 132. In other words, the function of the rotor 40 to create the magnetic circuit is achieved fully only using the magnets 131 and 132.

The rotor body 41 retaining the magnets 91 and 92 exhibiting inertia may, therefore, be made of synthetic resin, such as CFRP, not a magnetic metal material. The use of synthetic resin to make the rotor body 41 minimizes the inertia, thereby reducing the swinging or vibration of the rotor 40 in the cantilever arrangement.

The function of the rotor 40 to create the magnetic circuit is, as described above, achieved fully only by the magnets 131 and 132. This enables the surface magnet type rotor to be used to increase the required torque output and also enables the rotor 40 to be thin, which enables the first region X1 to be increased in size and improves the torque output.

Modification of Second Embodiment

Figure 38:
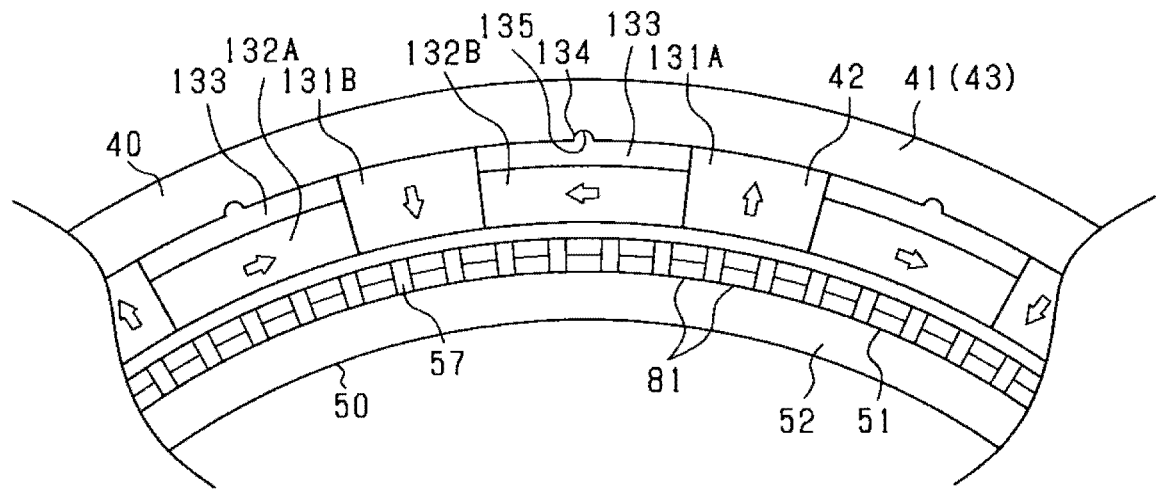
FIG. 38 is a view which illustrates a magnet unit in a modification of the second embodiment.

The second embodiment is designed to have the recesses 136 disposed on the opposite side of the first magnets 131 to the stator 50. The magnetic members 133 are arranged in the recesses 136. The magnetic members 133 may alternatively be located on the opposite side of the second magnets 132 to the stator 50. For instance, the second magnets 132 may be, as illustrated in FIG. 38, shaped to have a radial thickness smaller than that of the first magnets 131 to create the recesses 136. The magnetic members 133 are mounted in the recesses 136. In other words, the magnetic members 133 are located on the opposite side of the second magnets 132 to the stator 50. The sum of the radial thicknesses of each of the second magnets 132 and a corresponding one of the magnetic members 133 is preferably determined to be equal to the radial thickness of the first magnet 131.

The above structure is capable of minimizing the demagnetization and decreasing the volume of the second magnets 132. By selecting the sum of the radial thicknesses of each of the second magnets 132 and a corresponding one of the magnetic members 133 to be equal to the radial thickness of the first magnet 131, flow of magnetic flux is facilitated to improve the magnetic flux density.

In the second embodiment, the recesses 136 and the magnetic members 133 are provided for both the first A magnet 131A and the first B magnet 131B, but however, they may alternatively be provided only for either of the first A magnet 131A or the first B magnet 131B whose magnetization direction is oriented radially inwardly (i.e., toward the stator 50). This minimizes iron loss and reduction in magnetic field in the rotor 40. Similarly, the recesses 136 and the magnetic members 133 may alternatively be provided only for either of the second A magnet 132A or the second B magnet 132B. At least one of the first A magnet 131A, the first B magnet 131B, the second A magnet 132A, and the second B magnet 132B may alternatively be shaped to have the recess 136 which is formed in a surface thereof facing away from the stator 50 and in which the magnetic member 133 is disposed. At least one of end surfaces of the first A magnets 131A may alternatively have the recess 136 hollowed toward the stator 50. The same applies to the first B magnet 131B, the second A magnet 132A, or the second B magnet 132B. At least one of end surfaces of the magnets 131 and 132 may have the recess 136 hollowed toward the stator 50.

Figure 39:
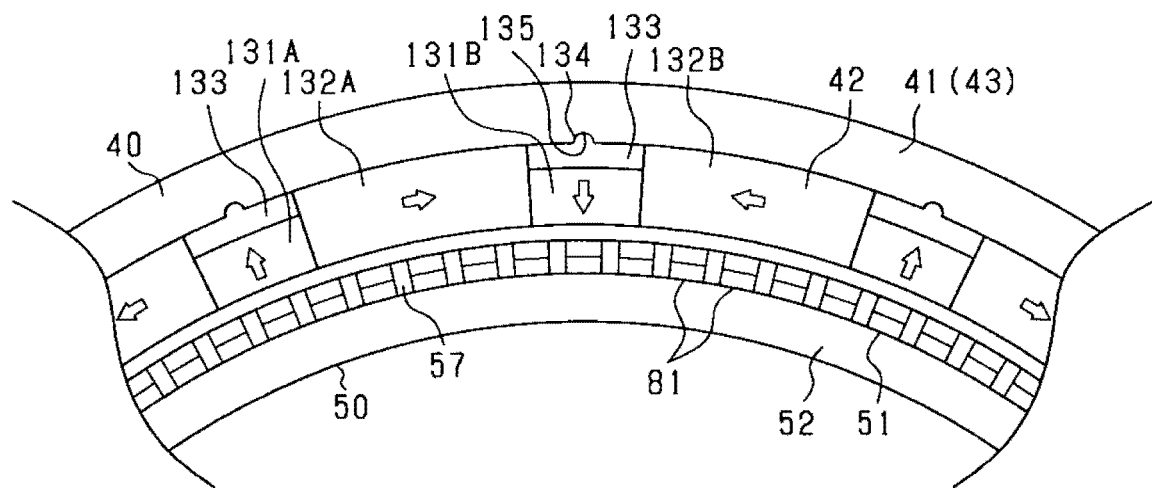
FIG. 39 is a view which illustrates a magnet unit in a modification of the second embodiment.
Figure 40:
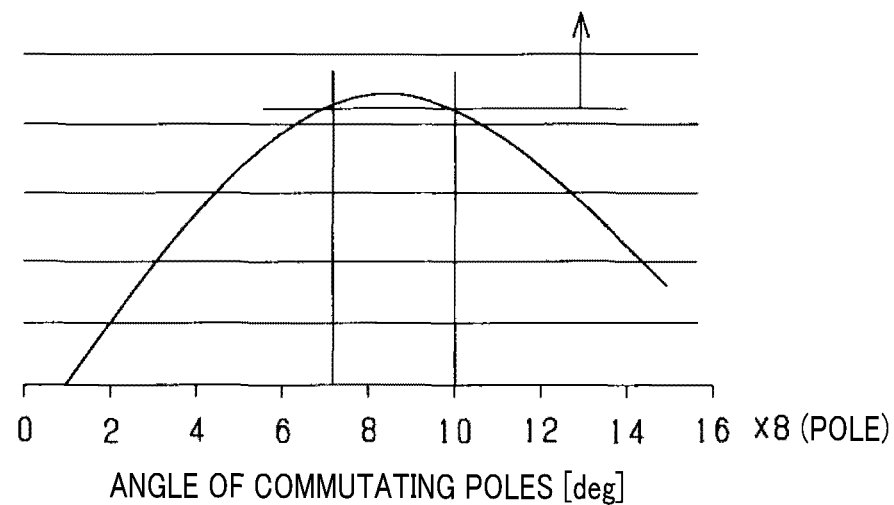
FIG. 40 is a view which represents a relation between a circumferential angle and generated magnetic flux in second magnets.

In the second embodiment, the length of the first magnets 131 and the second magnets 132 in the circumferential direction may be changed as needed. For instance, the first magnets 131 may be, as illustrated in FIG. 39, shaped to be shorter than the second magnets 132. It is advisable that the length of the second magnets 132 in the circumferential direction lies in a range of 52<a<80 where a is an electrical angle [degE] (see FIG. 40). The mounting of the magnetic members 133 usually causes an optimum value of an angle between commutating poles that is typically 60 [degE] to be shifted to 68 [degE]. This enables the second magnets 132 (i.e., the commutating poles) to be designed to lie in the above range to achieve the mechanical rotation stop without demagnetization.

In the second embodiment, the keys 134 and the key grooves 135 may be omitted from the magnetic members 133 and the magnet retainer 43.

The magnetic members 133 and the keys 134 are not essential for the second embodiment.

In the second embodiment, the magnet retainer 43 is made from a soft magnetic material, but however, may be made from another type of material.

In the second embodiment, the second magnets 132 may alternatively be designed to have a magnetization direction including components oriented in radial and circumferential directions.

Third Embodiment

Figure 41:
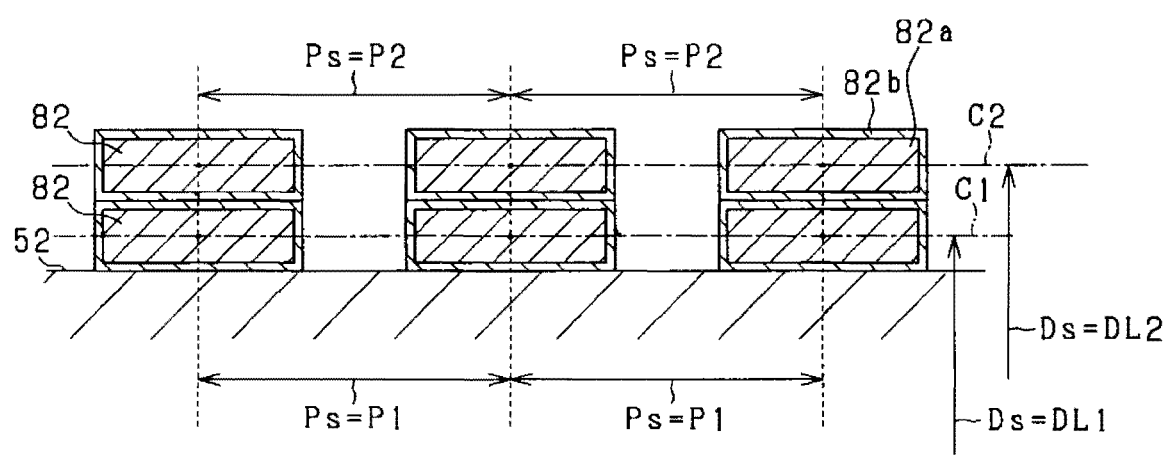
FIG. 41 is a view for explaining definition of $\tau(=Ds/Ps)$.

In this embodiment, the straight sections 83 for the same phase which are joined by the turns 84 are arranged on the same pitch circle defined about the axis of the rotor 40. In the following discussion, an interval between the centers of the circumferentially adjacent straight sections 83 mounted on the same pitch circle is defined as an arrangement pitch Ps. The arrangement pitch Ps will be described below with reference to FIG. 41. In FIG. 41, a pitch circle on which the straight sections 83 are arranged on the first layer position is expressed by C1. A pitch circle on which the straight sections 83 are arranged on the second layer position is expressed by C2. The arrangement pitch Ps for the straight sections 83 on the first layer position is expressed by P1. The arrangement pitch Ps for the straight sections 83 on the second layer position is expressed by P2. The diameter Ds of the pitch circle C1 on the first layer position is expressed by DL1. The diameter Ds of the pitch circle C2 on the second layer position is expressed by DL2. FIG. 41 illustrates the stator 50 when linearly developed.

Figure 42:
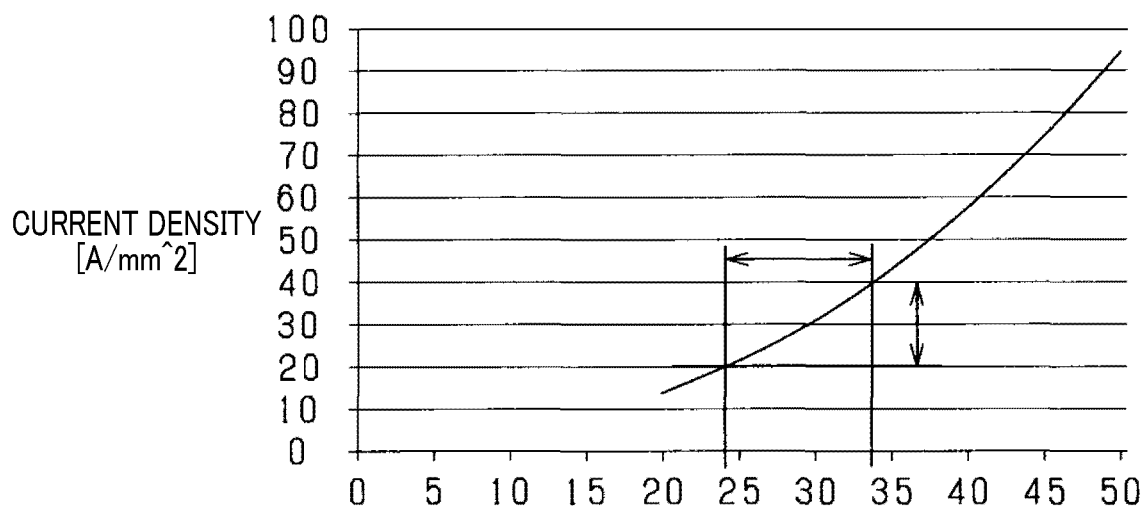
FIG. 42 is a view which represents a relation between an electrical current density and a value of $\tau$.
Figure 43:
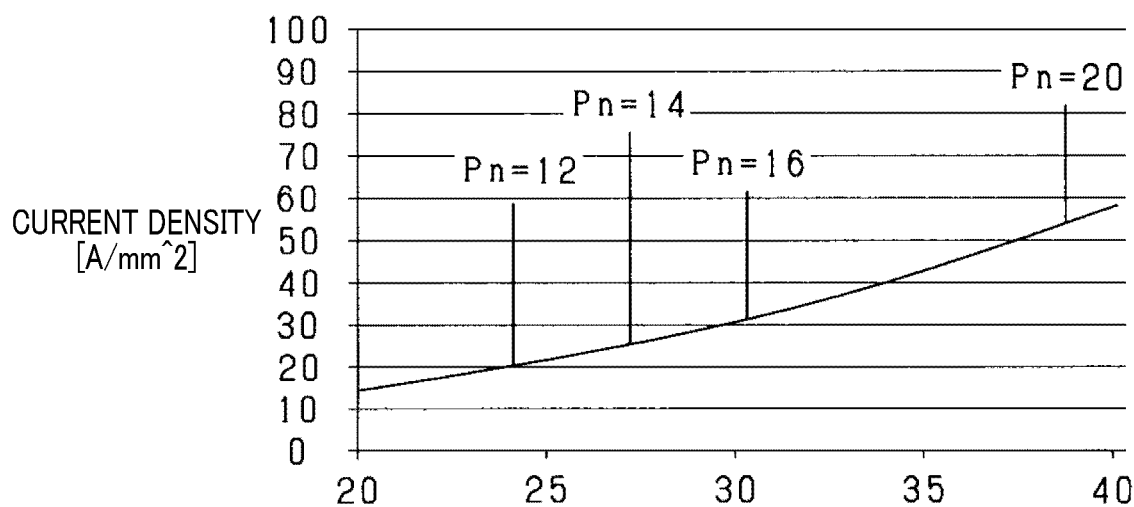
FIG. 43 is a view which represents a relation among an electrical current density, the number of poles, and a value of $\tau$.

If Ds/Ps for each phase is defined as τ, the torque may be increased in an easy way regardless of the size of the rotating electrical machine 10 by selecting a value of τ to lie in a suitable range which is, as can be seen in FIG. 42, set to meet a relation of 24<τ<34. This range is determined to increase conductor region/gap region within a range of 20[A/mm^2] to 40[A/mm^2] which is usually set as a maximum electrical current in typical rotating electrical machines. This setting realizes the stator winding 51 which has a maximum conductor area for the outer diameter of the rotating electrical machine 10 and maximizes a density of power inputted to the rotating electrical machine 10 as a function of the size thereof. FIG. 43 represents a value of τ for the number of magnetic poles Pn in a rotating electrical machine equipped with six phase-windings. In this embodiment, the number of poles of the stator winding 51 is 16, so that the value of τ is given by a value when Pn=16. The arrangement pitch Ps may be determined simply using the value of τ once the dimeter Ds is derived. The use of the value τ, therefore, minimizes the number of design steps to optimize the interval between the straight sections 83.

The range of τ may be set to 24<τ<38 if there is no need to use the rotating electrical machine 10 with vehicles. It is also advisable that τ be greater than 25. There is no distribution factor for each phase, so that a winding factor is, for example, one.

The above described embodiment offers the following beneficial advantages.

The straight sections 83 joined by the turns 84 for the same phase are located on the same pitch circle defined about the axial center of the rotor 40. An arrangement pitch that is an interval between the centers of the circumferentially adjacent straight sections 83 arranged on the same pitch circle in the circumferential direction is defined as Ps. The diameter of the same pitch circle is defined as Ds. Ds/Ps is expressed by τ. The arrangement pitch between the straight sections 83 in the circumferential direction is determined to meet a relation of 24<τ<34. This causes the straight sections 83 to be arranged close to each other in the circumferential direction, thereby enhancing the torque output. The use of the value τ enables the locations of the straight sections 83 to be determined properly to increase the torque output in the easy way regardless of the size of the rotating electrical machine and minimizes the number of design steps to optimize the interval between the straight sections 83. The arrangement pitch, as referred to herein, is a pitch between conductors or a pitch between insulating layers of, for example, U-phase, V-phase, and W-phase conductor groups.

The straight sections 83 and the turns 84 may be made from conductive material other than copper. In this case, if an electrical resistivity Ωm of copper is defined as ρ1, an electrical resistivity of a conductive material is defined as ρ2, and ρ1/ρ2 is defined as ρs, 24/ρs<τ<34/ρs is, as illustrated in FIGS. 42 and 43, preferably met. When the straight sections 83 and the turns 84 are made from copper, ρs will be equal to one.

The core 52 is assembled with the stator winding 51. The rotating electrical machine 10 is of the slot-less structure in which a soft magnetic material-made core is not disposed between the circumferentially adjacent straight sections 83. The stator core 52 which is arranged radially away from the rotor 40 functions as a back yoke to create a magnetic circuit although there is no core between the straight sections 83. The slot-less structure enables the adjacent straight sections 83 to be arranged close to each other to increase a conductor sectional area, as compared with when there is a core between the straight sections 83. The slot-less structure also minimizes the risk of magnetic saturation, increases the conductor sectional area, and enables a required magnetic circuit to be developed because there is no core between the straight sections 83, thereby enabling an electrical current delivered to the stator winding 51 to be increased. This enhances the torque output from the rotating electrical machine 10.

The parameter τ indicates a numerical range required to increase the torque output using the stator winding 51 used in the slot-less structure in which the straight sections 83 are arrayed adjacent each other in the circumferential direction. The parameter τ is a unique parameter derived based on technical ideas different to use of another parameter defining a numerical range to enhance the torque output.

Modification 1 of the Third Embodiment

Figure 44:
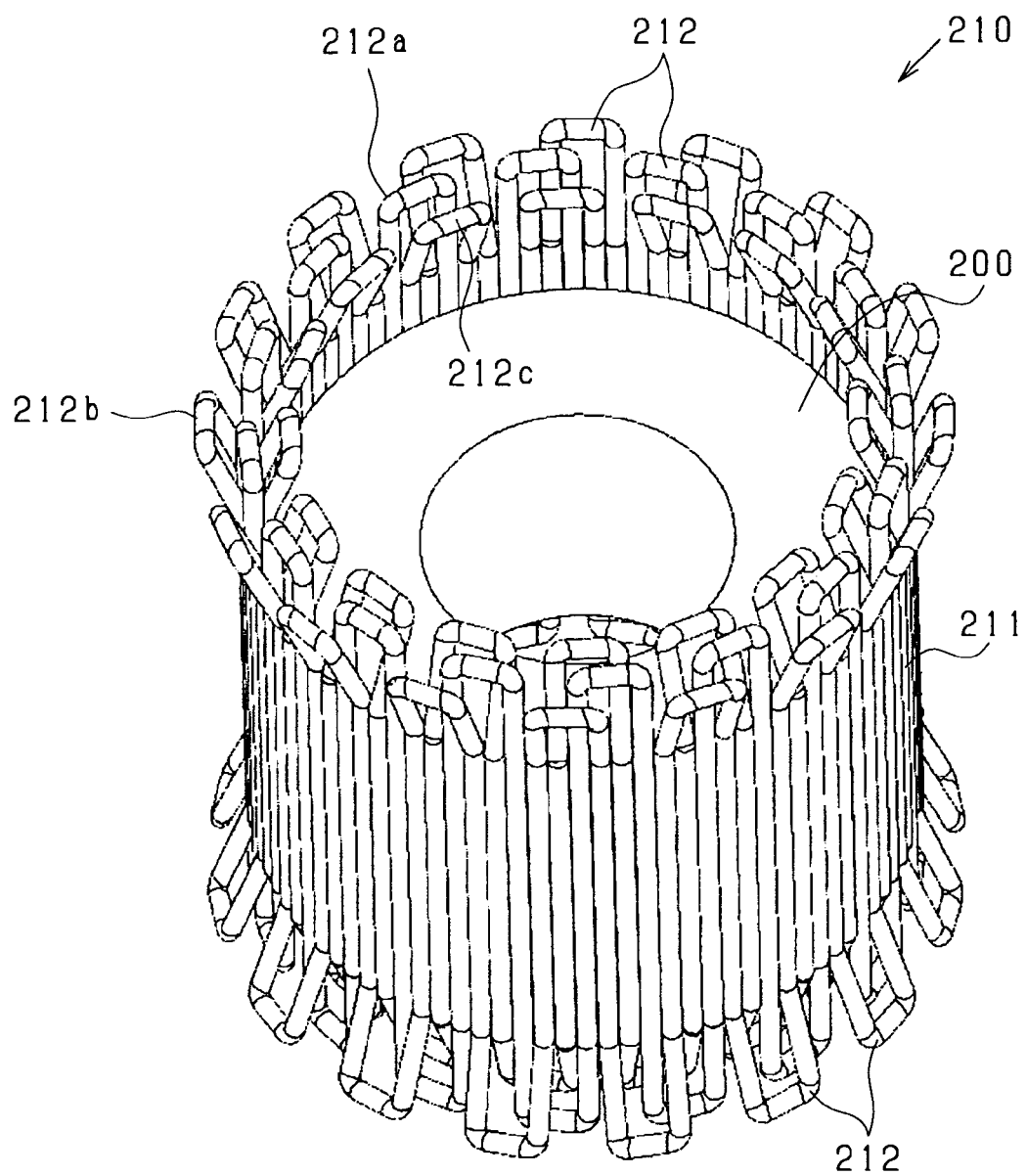
FIG. 44 is a perspective view which shows a stator winding in a modification 1 of the third embodiment.

In this embodiment, the stator winding 201 is, as illustrated in FIG. 44, made of round conductors. Specifically, the stator winding 201 is equipped with the annular stator core 200 and the conductors including the straight sections 211 and the turns 212. The conductors are each implemented by a round conductor whose sectional area is circular. The conductors are bent so that they are arranged in a given layout pattern in the circumferential direction, thereby creating phase windings of the stator winding 201. The conductors have the straight sections 211 and the turns 212 which are arranged alternately in the form of a continuing wave winding. The straight sections 211 face the magnet unit in the radial direction. The straight sections 211 have portions which are arranged at a given interval away from each other axially outside the magnet unit and joined together by the turns 212. In this embodiment the stator winding 201 is wound in the shape of an annular distributed winding.

The stator winding 201 includes phase windings, one pair for each phase. The three-phase windings are arranged in the form of one layer. In the example illustrated in FIG. 44, the number of poles is sixteen. The straight sections 211 and the turns 212 are each covered with an insulating coating to achieve electrical insulation therebetween. Each of the phase windings made up of the straight sections 211 and the turns 212 is insulated by the insulating coating except an exposed portion thereof for joining purposes. The exposed portion includes, for example, an input or an output terminal or a neutral point in a case of a star connection.

The straight sections 211 which are located at the same position in the radial direction and arranged at 3 pitches away from each other in the circumferential direction are joined together by the turn 212. In other words, outer two of every four adjacent straight sections 211 which are arranged on the same pitch circle defined about the axial center of the rotor are connected together by the turn 212. The turns 212 include three types: the turns 212a extending in the axial direction, the turns 212b bent outward in the radial direction, and the turns 212c bent inward in the radial direction. The use of such three types turns serves to avoid physical interference among the turns 212.

The arrangement pitch between the straight sections 211 in the circumferential direction is determined to meet a relation of 24<τ<34. The circumferentially adjacent straight sections 211 are, therefore, placed in contact with each other.

In this embodiment, the determination of the arrangement pitch in the range of 24<τ<34 enables easy-to-machine round conductors whose aspect ratio is less than two to be arranged close to each other between the stator and the rotor within a range of 20[A/mm^2] to 40[A/mm^2] which is usually set as a maximum electrical current in typical rotating electrical machines for vehicles. Rectangular conductors may alternatively be used.

If conductors whose aspect ratio is two or more are used out of the range of 24<τ<34, the percentage of extension of copper will be 35% or more which exceeds an allowable limit of copper, thereby resulting in damage to the copper wire when it is bent. It is, therefore, impossible to use the copper wire to make the stator winding 201.

The use of the range of 24<τ<34 maximizes the input power density although conductor segments or round conductors are used, thereby avoiding a great increase in production costs without need for altering a control system for current rotating electrical machines.

Figure 45:
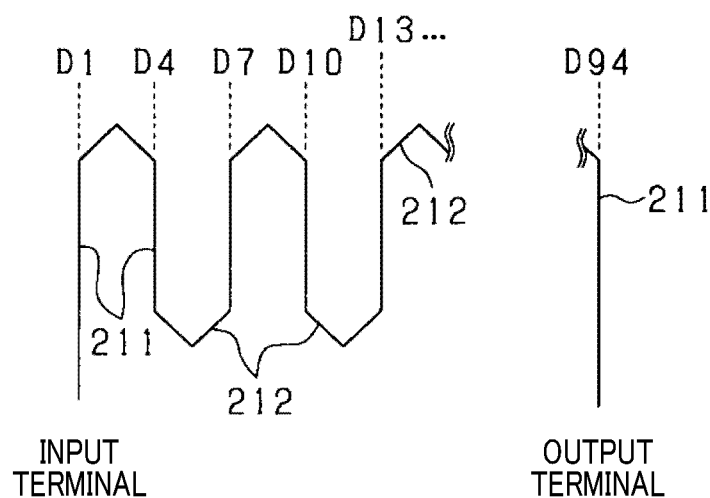
FIG. 45 is a schematic view which illustrates joints of straight sections and turns.

FIG. 45 is schematic view which illustrates how to connect the straight sections 211 and the turns 212 for one phase. In FIG. 45, locations of the straight sections 211 are indicated by symbols D1, D4, D7 . . . . In this embodiment, the straight sections 211 and the turns 212 are, as can be seen in FIG. 45, joined continuously between exposed input and output terminals. The positioning of the stator winding 201 in the circumferential direction is, therefore, achieved by simply engaging portions of the stator winding 201 with protrusions on the stator core 200, thereby greatly improving the ease of assembly of the stator winding 201.

The above protrusions are, as described already, preferably shaped not to protrude radially outside an imaginary circle defined to pass through radial centers (i.e., centers of circular cross sections) of the straight sections 211.

Modification 2 of the Third Embodiment

Figure 46:
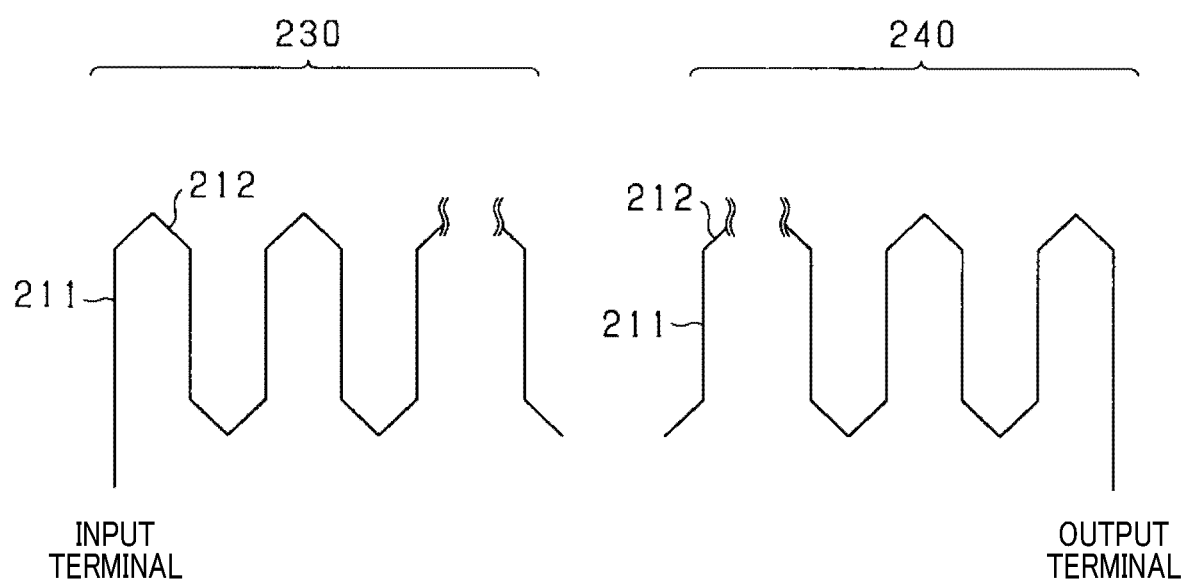
FIG. 46 is a schematic view which illustrates joints of straight sections and turns in modification 2 of the third embodiment.

Instead of each of the phase windings formed by a continuing conductor made up of the straight sections 211 and the turns 212, a wave winding for each phase may be, as illustrated in FIG. 46, made by welding or soldering a plurality of (e.g., two) conductors 230 and 240 to electrically join them. Each of the conductors 230 and 240 includes the straight sections 211 and the turns 212. In this case, the stator core 200 is preferably designed to have more protrusions than the conductors. Each of the protrusions is arranged at a location on the stator which corresponds to a location of one of the conductors 230 and 240. This structure facilitates positioning of the conductors 230 and 240 in the circumferential direction.

Modification 3 of the Third Embodiment

Figure 47:
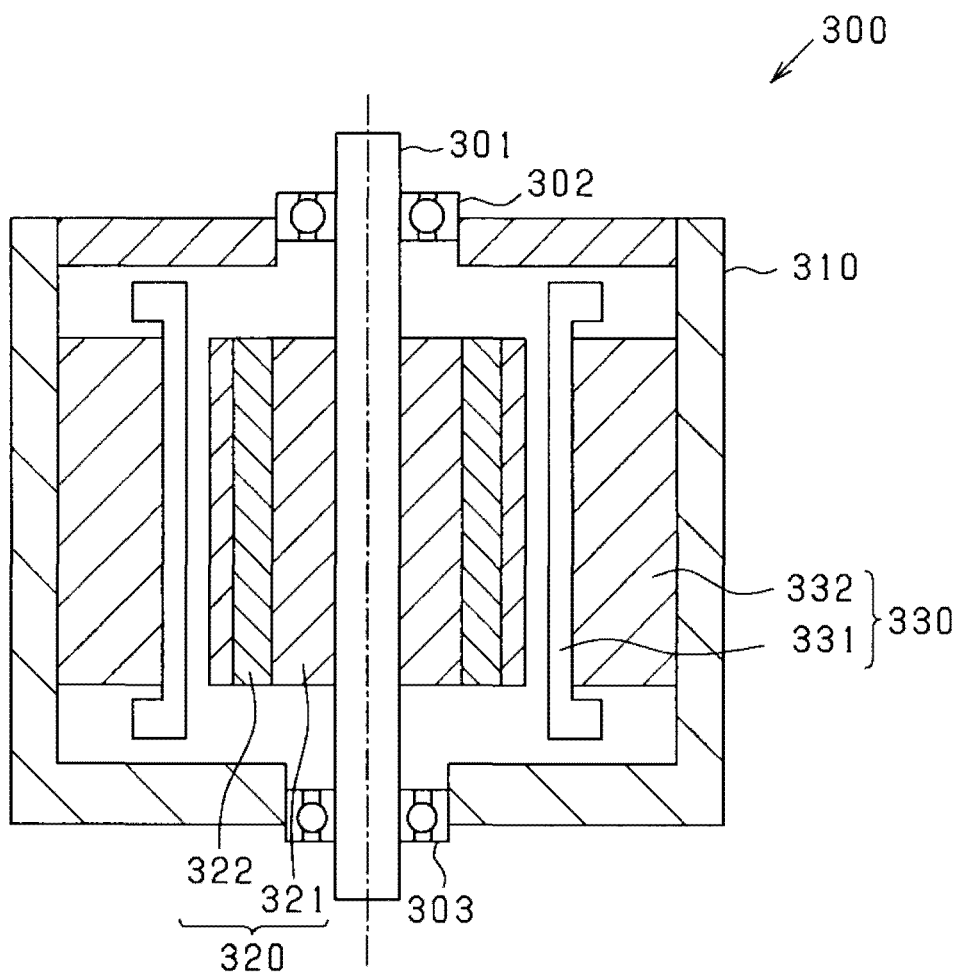
FIG. 47 is a longitudinal sectional view of a rotating electrical machine in a modification 3 of the third embodiment.

In this embodiment, a rotating electrical machine is of an inner rotor type (i.e., the inward rotating type). FIG. 47 is a longitudinal sectional view along the rotating shaft 301 of the rotating electrical machine 300.

The rotating electrical machine 300 is equipped with the rotating shaft 301, two bearings 302 and 303, the housing 310, the rotor 320, and the stator 330 which are arranged coaxially with each other along with the rotating shaft 301.

The bearings 302 and 303 are disposed away from each other in the axial direction within the housing 310. Each of the bearings 302 and 303 is implemented by, for example, a radial ball bearing. The bearings 302 and 303 retain the rotating shaft 301 and the rotor 320 to be rotatable.

The rotor 320 includes the cylindrical rotor body 321 and the annular magnet unit 322 mounted on the rotor body 321. The magnet unit 322 is made up of a plurality of magnets whose magnetic poles are arranged alternately in the circumferential direction. In this embodiment, the rotating electrical machine 300 is of a magnet-embedded type.

The stator 330 is located radially outside the rotor 320. The stator 330 includes the cylindrical stator winding 331 and the stator core 332 arranged radially outside the stator winding 331. The stator core 332 is of a circular ring shape and arranged radially inside the housing 310. The stator core 332 is secured to the housing 310 using, for example, adhesive. The stator core 332 may be designed, like in the first embodiment, to have a slot-less structure with no teeth.

The stator winding 331 faces the annular magnet unit 322 through a given air gap. The stator winding 331 is made of a three-phase winding in the form of a full-pitch distributed winding, but however, may alternatively be made of another type of winding. Conductors of the stator winding 331 are, like in the first embodiment, of a flattened shape. Each of the conductors of the stator winding 331 is, like in the first embodiment, made of an aggregation of a plurality of twisted wires.

This embodiment uses the rotor 320 with thirty two magnetic pole pairs. Inverter units are mounted radially inside the rotor 40 within the housing 310.

The above embodiment has substantially the same beneficial advantages as the third embodiment.

Other Modifications of the Third Embodiment

Figure 48:
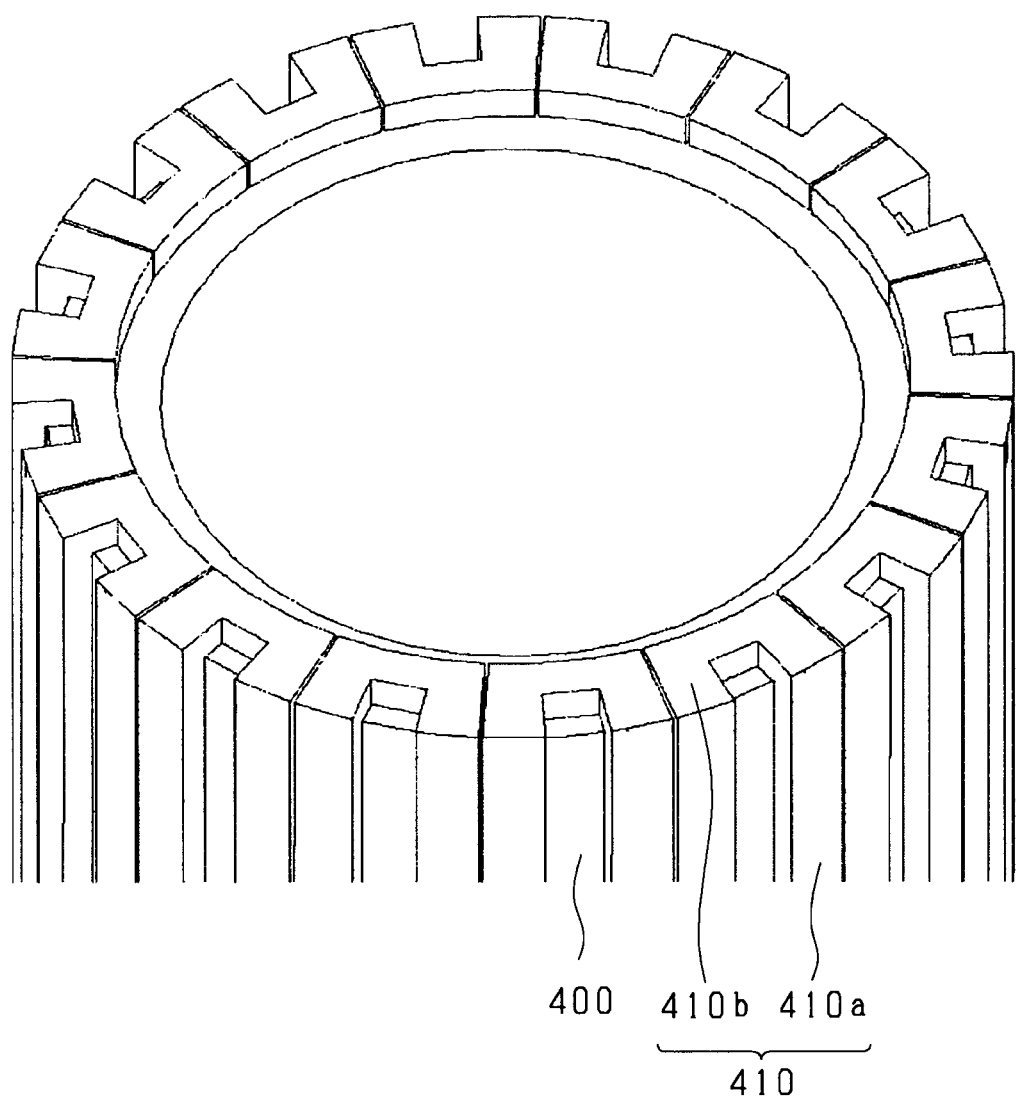
FIG. 48 is a view which illustrates securement of turns in another modification of the third embodiment.

The turns 410b of each conductor 410 may be, as illustrated in FIG. 48, firmly secured to axially opposed ends of the stator core 400, thereby firmly attaching the stator winding to the stator core 400. Numeral 410a indicates a straight section of the conductor 410.

Figure 49:
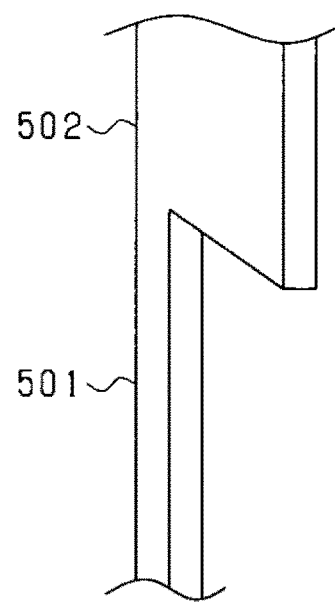
FIG. 49 is a view which partially illustrates straight sections and turns in another modification of the third embodiment.

The coil housing recess 47 is located near the coil ends. There is, therefore, low restriction to space in which the conductors are arranged. This enables the turns 502, as illustrated in FIG. 49, to have a sectional area greater than that of the straight section 501. This results in a decrease in electrical resistance of the turns 502 to increase the amount of electrical current flowing therethough, thereby enhancing the torque output. The increase in sectional area facilitates dissipation of heat from the turns 502.

The increase in sectional area results in an increased size of a surface of, for example, the turn 502 contacting the stator core near the coil end, thereby enhancing the firm securement of the stator winding. The stator winding may be secured to the stator core using, for example, adhesive or rivets made of non-conductive material.

Figure 50:
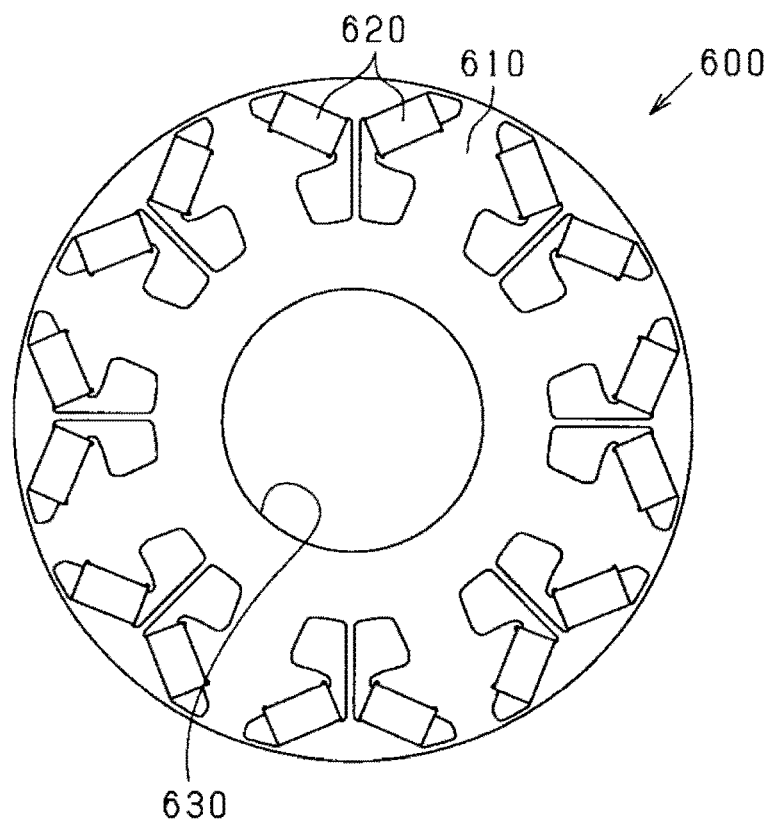
FIG. 50 is a view which illustrates a structure of a rotor in another modification of the third embodiment.

The rotor of the rotating electrical machine may have the embedded-magnet structure shown in FIG. 50. The rotor 600 includes the rotor body 610 and the permanent magnets 620. The rotor body 610 has formed therein the hole 630 through which a rotating shaft passes. This structure creates a magnetic flux not only on the d-axis on which a magnet-produced magnetic flux directly acts, but also on the q-axis, thereby increasing the strength of magnetic field to enhance the torque output from the rotating electrical machine.

Figure 51:
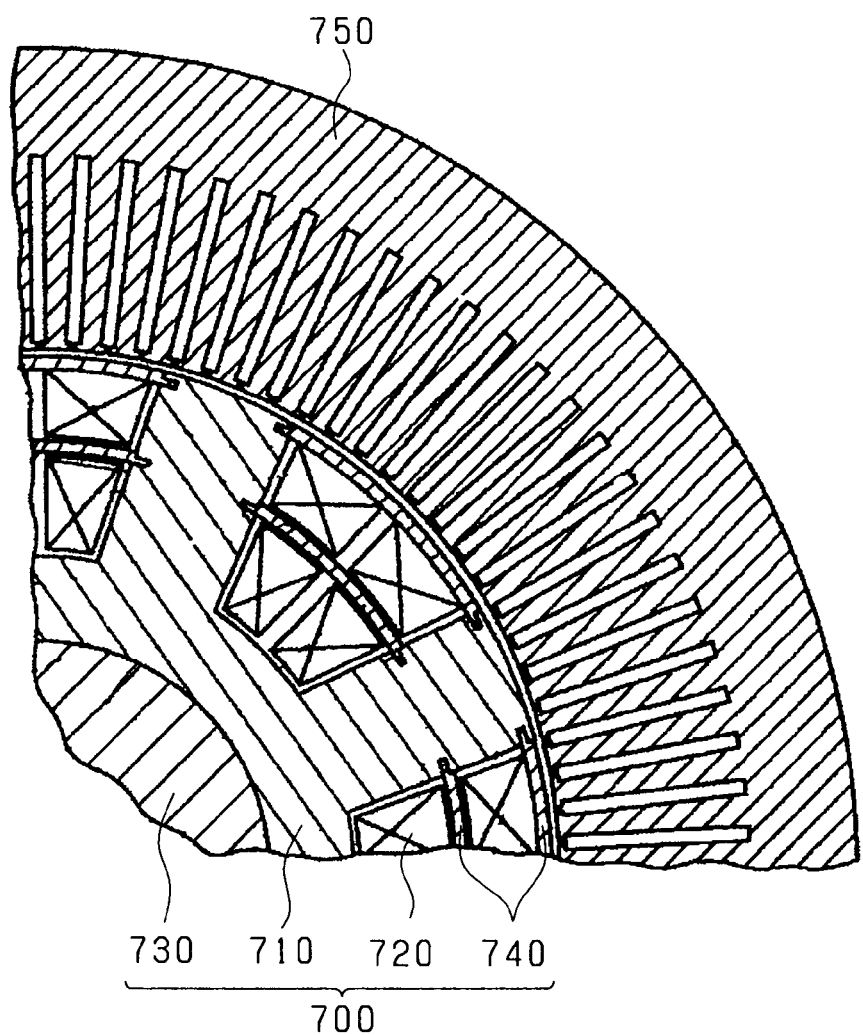
FIG. 51 is a view which illustrates structures of a rotor and a stator in another modification of the third embodiment.

The rotating electrical machine may be used as an induction machine or motor. In this case, the rotor 700 shown in FIG. 51 may be used. The rotor 700 includes the rotor body 710, the rotor conductors 720 (e.g., cage conductors), and the plate members 740 working to hold the rotor conductors 720 from being removed. In FIG. 51, numeral 730 indicates a rotating shaft. Numeral 750 indicates a stator core.

Figure 52:
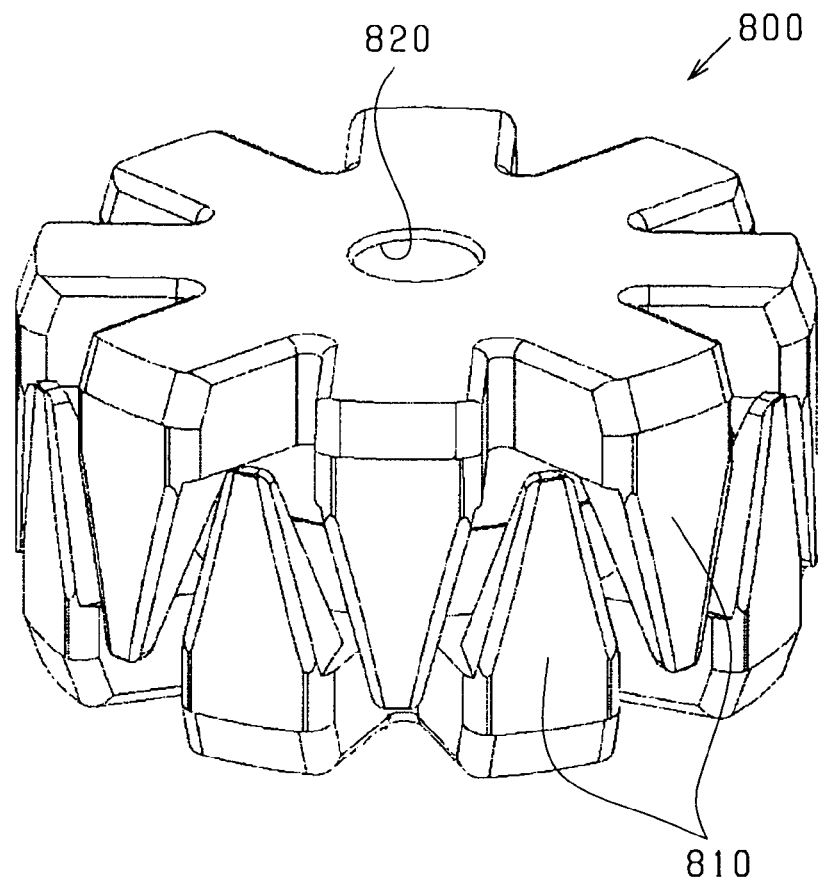
FIG. 52 is a view which illustrates a structure of a rotor in another modification of the third embodiment.

The rotor of the rotating electrical machine may be equipped with a field winding or a combination of a field winding and permanent magnets. Such a rotor may be, as illustrated in FIG. 52, implemented by the rotor 800 equipped with the Lundell pole core 810. In FIG. 52, numeral 820 indicates a hole through which a rotating shaft passes. In this structure, magnetic flux around the d-axis is created by a mixture of magnet-produced magnetic flux and excited magnetic flux, thereby increasing the amount of magnetic flux. This structure may be designed to set the parameter τ to a suitable value for increasing the torque output.

Figure 53:
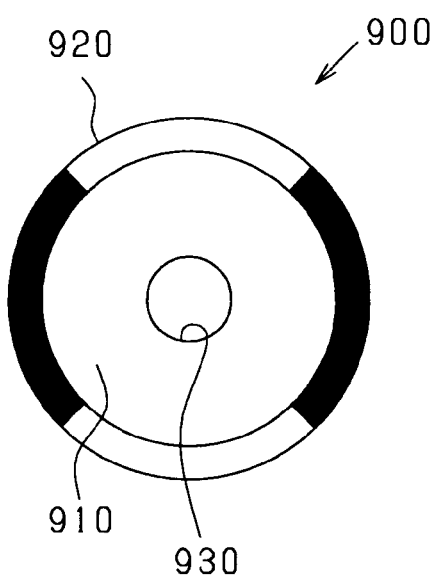
FIG. 53 is a view which illustrates a structure of a rotor in another modification of the third embodiment.

The rotor 900 of a surface magnet type shown in FIG. 53 may be used. The rotor 900 includes the rotor body 910 as an iron core and the permanent magnets 920 with two magnetic pole pairs. The rotor body 910 has formed therein the hole 930 through which a rotating shaft passes.

Figure 54:
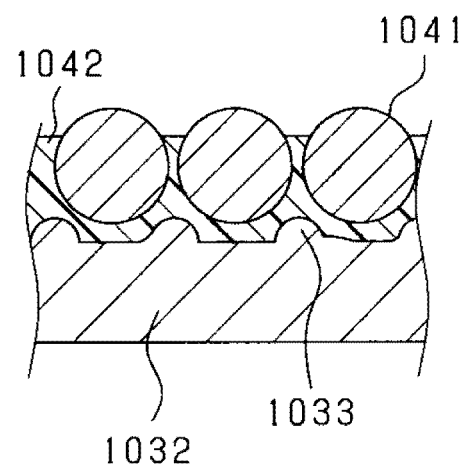
FIG. 54 is a view which illustrates a region near a stator winding in another modification of the third embodiment.

The stator winding is, as illustrated in FIG. 54, equipped with the conductors 1041 and the seal 1042 which occupies between the conductors 1041 and is made of synthetic resin. The stator winding is secured to the stator core 1032 using adhesive, not shown. The stator core 1032 has formed therein the protrusions 1033 located fully inside surfaces of the conductors 1041 facing the stator core 1032 in the radial direction. The protrusions 1033 may be implemented by convexities formed on the order of submicrometers, such as tool marks made by a lathe machine. The adhesive is firmly stuck to the protrusions 1033 to achieve a firm joint of the stator winding to the stator core 1032. For instance, each of the protrusions 1033 may be shaped to have a dimension in the radial direction which is selected in a range of 0.1 mm to 1.0 mm to conform with a curvature of rounded conductors or a curvature of corners of rectangular conductors.

Figure 55:
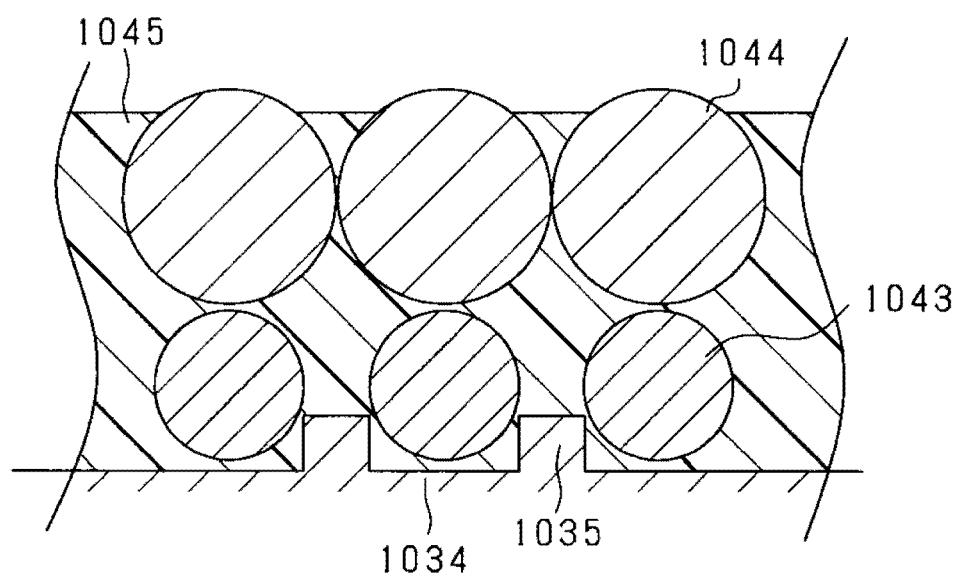
FIG. 55 is a view which illustrates a region near a stator winding in another modification of the third embodiment.

The stator winding may be, as illustrated in FIG. 55, equipped with the conductors 1043 and 1044 arranged in the form of two layers and the seal 1045 which occupies between the conductors 1043 and 1044 and is made of synthetic resin. The stator winding is secured to the stator core 1034 using adhesive, not shown. The stator core 1034 has the protrusions 1035 formed thereon. The conductors 1043 on the first layer position are arranged closer to each other than the conductors 1044 on the second layer position.

In a case where there are no gaps or only small gaps between the straight sections of the stator winding, the straight sections may be shaped to have an increased area contacting cooling liquid or air and also to minimize the diffusion of cooling liquid from a clearance between the straight sections which will usually be objectionable in typical cooling systems. In this case, the straight sections each have an increased sectional area, thus resulting in a low risk of copper loss and enhancing the dissipation of heat from the straight sections.

A problem is developed that the number of stator windings arranged in parallel to each other is increased for the number of poles of a rotor or the number of phases of a stator, thereby resulting in an increase in amount of electrical current circulating between parallel arranged conductors of the stator windings to generate reactive power. Such a problem is alleviated by increasing the number of phases to six or twelve.

The number of poles of the rotor may be selected to be twelve or more to omit parallel connections of six-phase stator windings which are available on the market for rotating electrical machines, such as alternators, for vehicles. This results in no electrical current circulating between the parallel arranged conductors, which facilitates the ease with which the rotating electrical machine is controlled or enables the stator winding to be designed to generate less heat. The rotating electrical machine equipped with six-phase windings may be remade as a three-phase rotating electrical machine by connecting two-phase portions of the six-phase windings parallel to each other to form three-phase windings.

Fourth Embodiment

Figure 56:
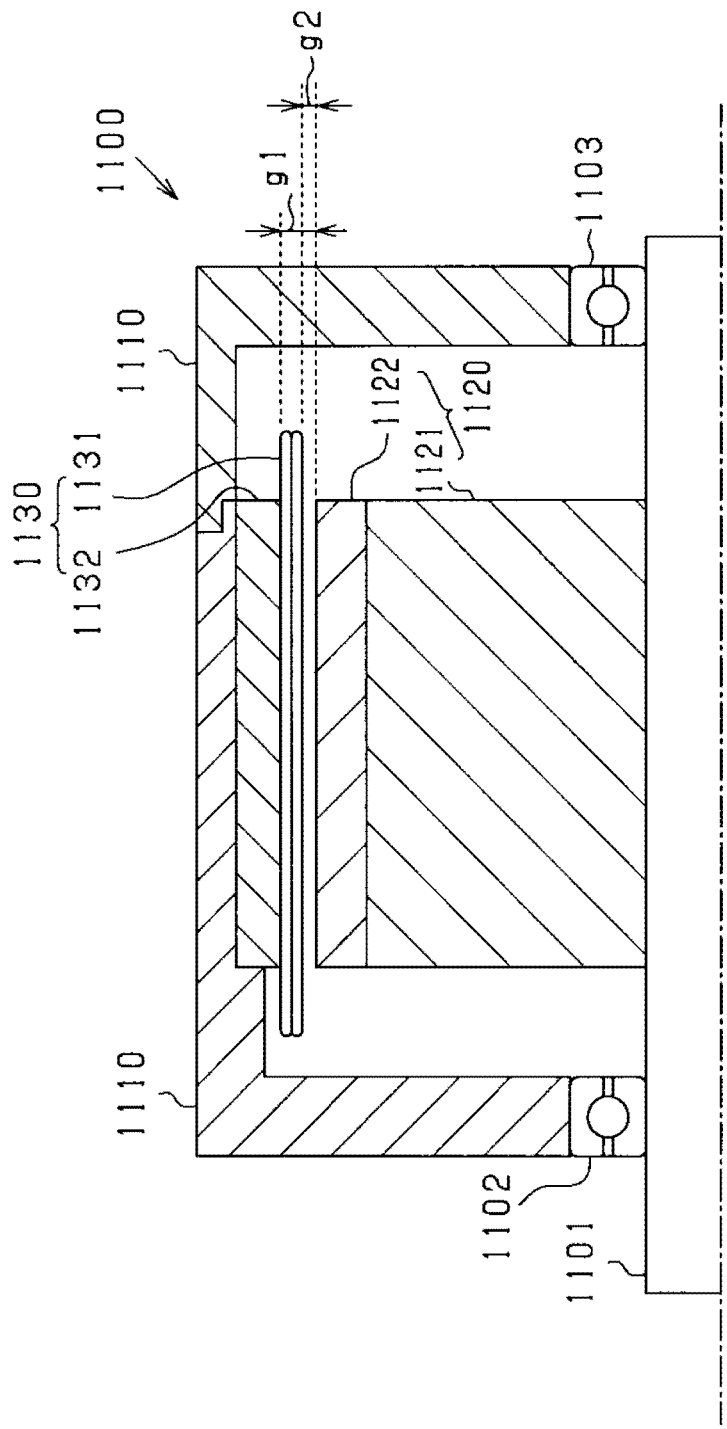
FIG. 56 is a longitudinal sectional view of a rotating electrical machine in the fourth embodiment.

Next, the fourth embodiment will be described below in terms of differences between itself and the first embodiment with reference to the drawings. In this embodiment, a rotating electrical machine is of an inner rotor type (i.e., an inward rotating type). FIG. 56 is a longitudinal sectional view along the rotating shaft 1101 of the rotating electrical machine 1100.

The rotating electrical machine 1100 is equipped with the rotating shaft 1101, two bearings 1102 and 1103, the housing 1110, the rotor 1120, and the stator 1130 which are arranged coaxially with the rotating shaft 1101.

The bearings 1102 and 1103 are disposed away from each other in the axial direction within the housing 1110. Each of the bearings 1102 and 1103 is implemented by, for example, a radial ball bearing. The bearings 1102 and 1103 retain the rotating shaft 1101 to be rotatable.

The rotor 1120 includes the cylindrical rotor body 1121 and the annular magnet unit 1122 mounted on an outer periphery of the rotor body 1121. The magnet unit 1122 is made up of a plurality of magnets whose magnetic poles are arranged alternately in the circumferential direction.

The stator 1130 is located radially outside the rotor 1120. The stator 1130 includes the cylindrical stator winding 1131 and the stator core 1132 arranged radially outside the stator winding 1131. The stator core 1132 is of a circular ring shape and arranged radially inside the housing 1110. The stator core 1132 is secured to the housing 1110 using, for example, adhesive. The stator core 1132 may be designed, like in the first embodiment, to have a slot-less structure with no teeth.

The stator winding 1131 faces the annular magnet unit 1122 through a given air gap. The stator winding 1131 is made of a three-phase winding in the form of a full-pitch distributed winding, but however, may alternatively be made of another type of winding. Conductors of the stator winding 1131 are, like in the first embodiment, of a flattened shape. Each of the conductors of the stator winding 1131 is, like in the first embodiment, made of an aggregation of a plurality of twisted wires.

For instance, an inverter unit may be mounted radially inside the rotor 1120 within the housing 1110. FIG. 56 shows a distance g1 between a radially outer periphery of the magnet unit 1122 and a radially inner periphery of the stator core 1132 and a distance g2 between the radially outer periphery of the magnet unit 1122 and a radially inner periphery of the stator winding 1131. This embodiment is capable of decreasing the winding ratio K to reduce a magnetic resistance in a magnetic circuit.

The above embodiment has substantially the same beneficial advantages as the first embodiment.

Modification 1 of the Fourth Embodiment

Figure 57:
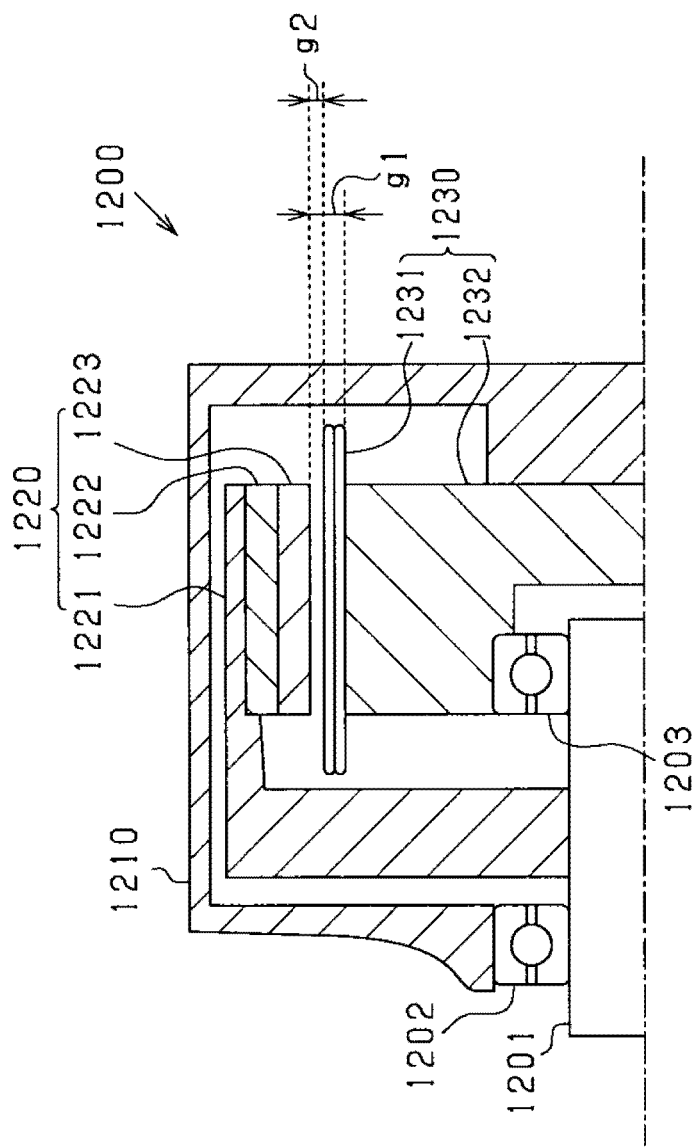
FIG. 57 is a longitudinal sectional view of a rotating electrical machine in a modification 1 of the fourth embodiment.

This embodiment will be described below in terms of differences between itself and the first embodiment. A rotating electrical machine in this embodiment is, as illustrated in FIG. 57, of an outer rotor structure different to that in the first embodiment. FIG. 57 is a longitudinal sectional view along the rotating shaft 1201 of the rotating electrical machine 1200.

The rotating electrical machine 1200 is equipped with the rotating shaft 1201, two bearings 1202 and 1203, the housing 1210, the rotor 1220, and the stator 1230 which are arranged coaxially with the rotating shaft 1201. The bearings 1202 and 1203 are disposed away from each other in the axial direction within the housing 1210. The bearings 1202 and 1203 retain the rotating shaft 1201 to be rotatable.

The rotor 1220 includes the hollow cylindrical rotor body 1221, the annular rotor core 1222 mounted radially inside the rotor body 1221, and the annular magnet unit 1223 arranged radially inside the rotor core 1222. The magnet unit 1223 is made up of a plurality of magnets whose magnetic poles are arranged alternately in the circumferential direction.

The stator 1230 is located radially outside the rotor 1220. The stator 1230 includes the cylindrical stator winding 1231 and the stator core 1232 arranged radially outside the stator winding 1231. The stator core 1232 is of a circular ring shape. The stator core 1232 may be designed, like in the first embodiment, to have a slot-less structure with no teeth.

The stator winding 1231 faces the annular magnet unit 1223 through a given air gap. Conductors of the stator winding 1231 are, like in the first embodiment, of a flattened shape. Each of the conductors of the stator winding 1231 is, like in the first embodiment, made of an aggregation of a plurality of twisted wires. FIG. 57 shows a distance g1 between a radially inner periphery of the magnet unit 1223 and a radially outer periphery of the stator core 1232 and a distance g2 between the radially inner periphery of the magnet unit 1223 and a radially outer periphery of the stator winding 1231.

The above embodiment has substantially the same beneficial advantages as the first embodiment.

Modification 2 of the Fourth Embodiment

Figure 58:
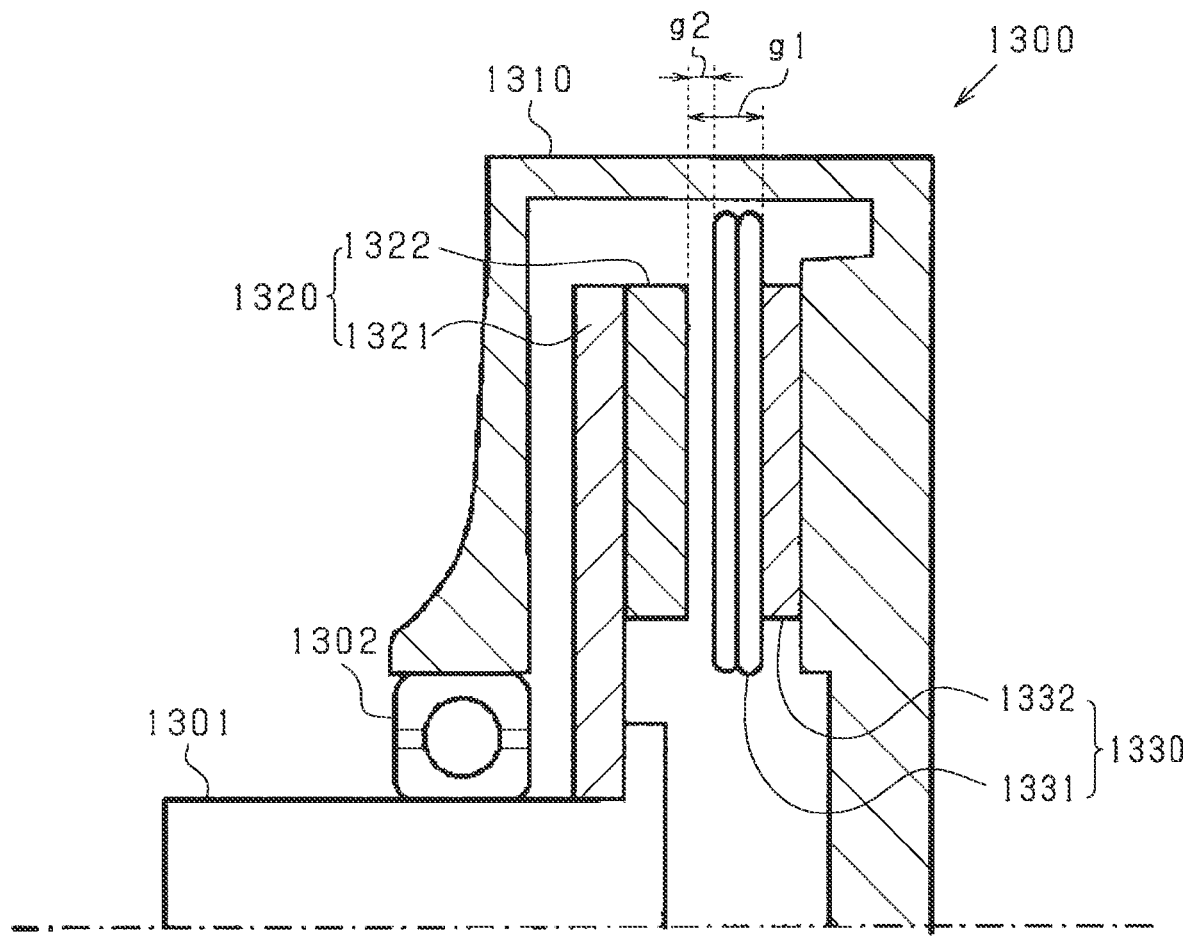
FIG. 58 is a longitudinal sectional view of a rotating electrical machine in a modification 2 of the fourth embodiment.

This embodiment will be described below in terms of differences between itself and the first embodiment. A rotating electrical machine in this embodiment is designed not to be of a radial gap structure, but, as illustrated in FIG. 58, of an axial gap structure. FIG. 58 is a longitudinal sectional view along the rotating shaft 1301 of the rotating electrical machine 1300.

The rotating electrical machine 1300 is equipped with the rotating shaft 1301, the bearing 1302, the housing 1310, the rotor 1320, and the stator 1330. The bearing 1302 is disposed within the housing 1310 and made of, for example, a radial ball bearing. The bearing 1302 retains the rotating shaft 1301 and the rotor 1320 to be rotatable.

The rotor 1320 includes the disc-shaped rotor body 1321, the disc-shaped magnet unit 1322 mounted on the rotor body 1321. The magnet unit 1323 is made up of a plurality of magnets whose magnetic poles are arranged alternately in the circumferential direction.

The stator 1330 is arranged at a position facing the rotor 1320 in the axial direction. The stator 1330 includes the disc-shaped stator winding 1331 and the stator core 1332. The stator core 1332 is of a disc-shape. The stator core 1332 is designed to have a slot-less structure with no teeth.

Figure 59:
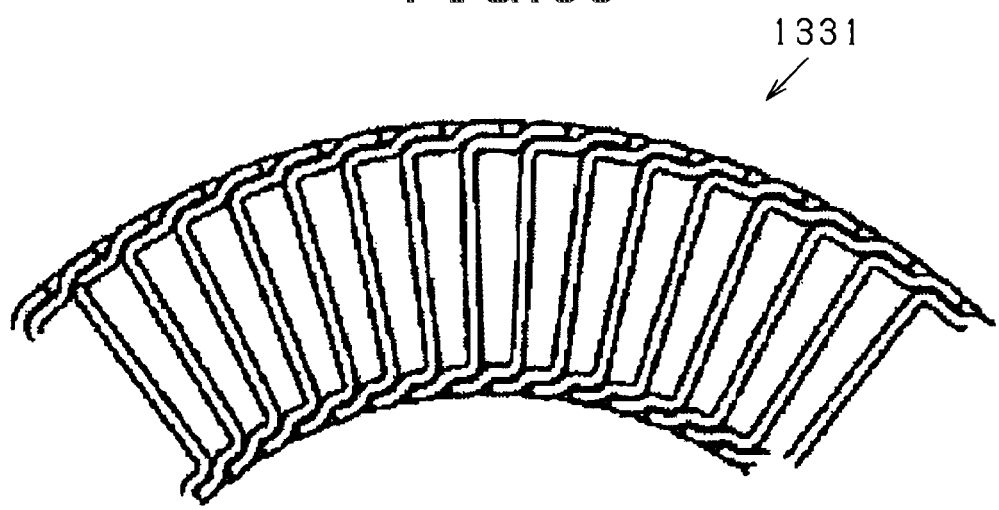
FIG. 59 is a view which illustrates a stator winding.

The stator winding 1331 faces the disc-shaped magnet unit 1323 through a given air gap. The stator winding 1331 is, as can be seen in FIG. 59, of a sector form. Conductors of the stator winding 1331 are, like in the first embodiment, of a flattened shape. Each of the conductors of the stator winding 1331 is, like in the first embodiment, made of an aggregation of a plurality of twisted wires. FIG. 58 shows a distance g1 between a surface of the magnet unit 1322 which faces the stator winding 1331 and a surface of one of axially opposed ends of the stator core 1332 which faces away from the stator winding 1331 and a distance g2 between the surface of the magnet unit 1322 which faces the stator winding 1331 and a surface of the stator winding 1331 which faces the magnet unit 1322.

Typical rotating electrical machines of an axial gap structure with teeth are usually designed to have concentrated windings because of the difficulty of a winding operation. The rotating electrical machine in this embodiment is of the slotless structure, thereby enabling the use of a full-pitch distributed winding which has an advantage for mechanical vibration or noise.

The above embodiment has substantially the same beneficial advantages as the first embodiment.

Modification 3 of the Fourth Embodiment

Figure 60:
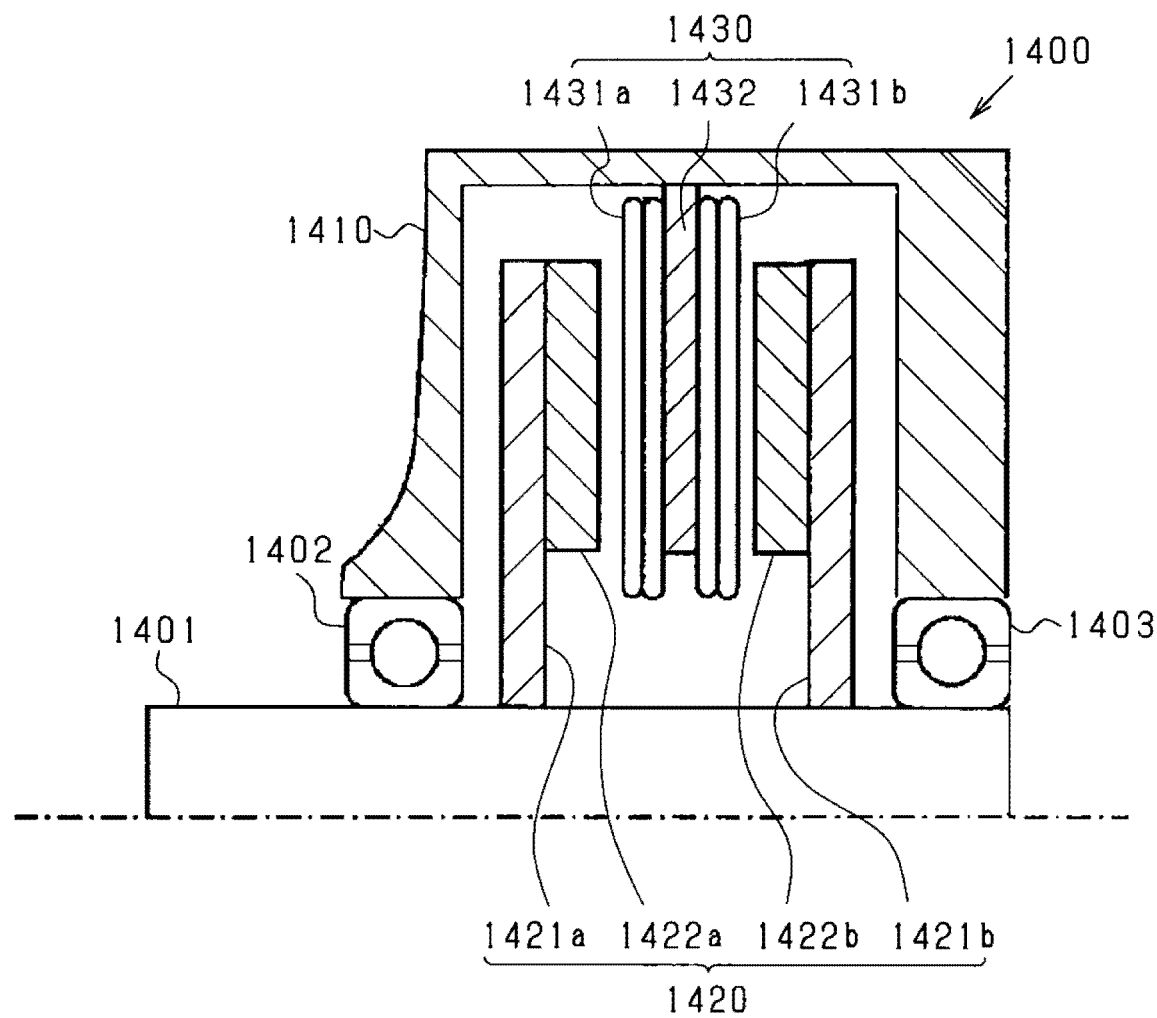
FIG. 60 is a longitudinal sectional view of a rotating electrical machine in a modification 3 of the fourth embodiment.

The rotating electrical machine of the axial gap structure may be designed, as illustrated in FIG. 60, to be of a tandem type in which two magnet units 1422a and 1422b are arranged to face each other through the stator 1430 in the axial direction. The rotating electrical machine 1400 includes the rotating shaft 1401, two bearings 1402 and 1403, the housing 1410, the rotor 1420, and the stator 1430. The stator 1430 is equipped with the first and second windings 1431a and 1431b and the stator core 1432. The rotor 1420 includes the first and second rotor cores 1421a and 1421b and the first and second magnet units 1422a and 1422b. The structure of the rotating electrical machine 1400 in FIG. 60 is capable of increasing the torque output to be greater than that in the modification 3 of the fourth embodiment.

Fifth Embodiment

Figure 61:
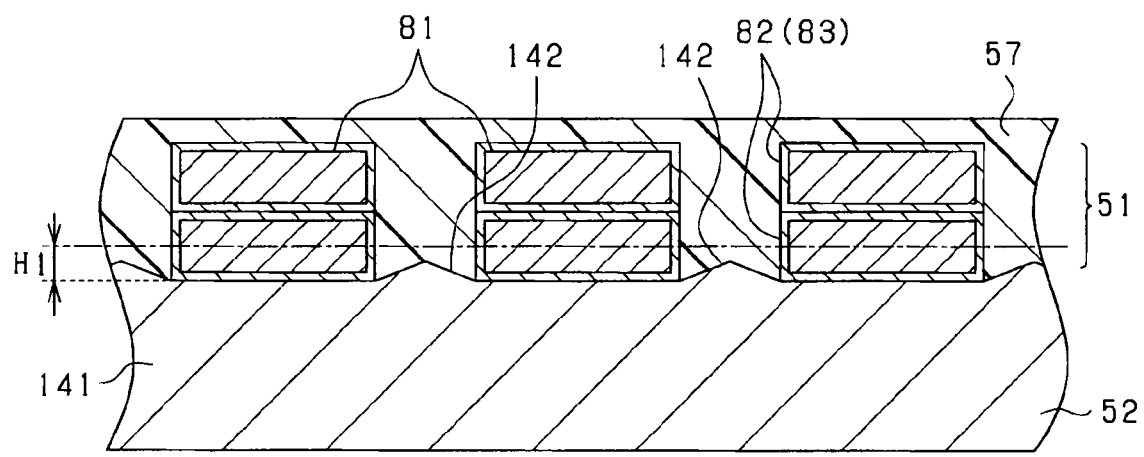
FIG. 61 is a sectional view of a stator in the fifth embodiment.

The stator core 52 in the first embodiment has an even curved outer peripheral surface without any irregularities and a plurality of conductor groups 81 arranged at a given interval away from each other on the outer peripheral surface, however, may be modified. For instance, the stator core 52 is, as illustrated in FIG. 61, equipped with the circular ring-shaped yoke 141 and the protrusions 142. The yoke 141 is located on the opposite side (i.e., a lower side, as viewed in the drawing) of the stator winding 51 to the rotor 40 in the radial direction. Each of the protrusions 142 protrudes into an interval or gap between a respective two of the straight sections 83 arranged adjacent each other in the circumferential direction. The protrusions 142 are arranged at a given interval away from each other in the circumferential direction radially outside the yoke 141, i.e., close to the rotor 40. Each of the conductor groups 81 of the stator winding 51 engages the protrusions 142 in the circumferential direction, in other words, the protrusions 142 are used as positioners to position the conductor groups 81 and arrayed in the circumferential direction. The protrusions 142 correspond to winding-to-winding members.

A radial thickness of each of the protrusions 142 from the yoke 141 is selected to be smaller than half a radial thickness (as indicated by H1 in the drawing) of the straight sections 83 arranged adjacent the yoke 141 in the radial direction. Such selection of the thickness of the protrusions 142 causes each of the protrusions 142 not to function as a tooth between the conductor groups 81 (i.e., the straight sections 83) arranged adjacent each other in the circumferential direction, so that there are no magnetic paths which would usually be formed by the teeth. The protrusions 142 need not necessarily to be arranged between a respective circumferentially adjacent two of all the conductor groups 81. A single protrusion 142 may be disposed at least only between two of the conductor groups 81 which are arranged adjacent each other in the circumferential direction. Each of the protrusions 142 may be designed to have any shape, such as a rectangular or arc-shape.

If an imaginary circle whose center is located at the axial center of the rotating shaft 11 and which passes through the radial centers of the straight sections 83 placed adjacent the yoke 141 in the radial direction is defined, each of the protrusions 142 may be shaped to protrude only within the imaginary circle, in other words, not to protrude radially outside the imaginary circle toward the rotor 40.

The above structure in which the protrusions 142 have the limited thickness in the radial direction and do not function as teeth in the gaps between the straight sections 83 arranged adjacent each other in the circumferential direction enables the adjacent straight sections 83 to be disposed closer to each other as compared with a case where teeth are provided in the gaps between the straight sections 83. This enables the conductor sectional area to be increased, thereby reducing heat generated upon excitation of the stator winding 51. The absence of the teeth enables magnetic saturation to be eliminated to increase the amount of electrical current delivered to the stator winding 51. It is, however, possible to alleviate the adverse effects arising from an increase in amount of heat generated by the increase in electrical current delivered to the stator winding 51. The stator winding 51, as described above, has the turns 84 which are shifted in the radial direction and equipped with the interference avoiding portions with the adjacent turns 84, thereby enabling the turns 84 to be disposed away from each other in the radial direction. This enhances the heat dissipation from the turns 84. The above structure is enabled to optimize the heat dissipating ability of the stator 50.

This embodiment described above is capable of using the protrusions 142 as positioners to position and array the straight sections 83 of the stator winding 51 in the circumferential direction. This facilitates the winding operation.

Since the thickness of the protrusions 142 is restricted in the radial direction, the amount of interlinkage magnetic flux, as produced by the magnet unit 42, passing through portions of the straight sections 83 extending outside the protrusions 142 in the radial direction is increased. Such an increase will result in an increase in eddy current. The conductor body 82a of each of the conductors 82 is, however, made of an aggregation of twisted, thereby reducing the eddy current.

The protrusions 142 also cause resinous adhesive fixing the stator winding 51 to enter between the circumferentially adjacent protrusions 142, thereby enhancing joining of the stator winding 51 to the stator core 52. The stator core 52 is made of a stack of steel plates and thus has three-dimensional irregularities in the circumferential or axial direction, which also strengthens the securement of the stator winding 51 by the stator core 52.

Modification 1 of the Fifth Embodiment

The radial thickness of the protrusions 142 may not be restricted by the dimension H1 in FIG. 25 as long as the yoke 141 of the stator core 52 and the magnet unit 42 (i.e., each of the magnets 91 and 92) of the rotor 40 are arranged at a given distance away from each other. Specifically, the radial thickness of the protrusions 142 may be larger than or equal to the dimension H1 in FIG. 61 as long as the yoke 141 and the magnet unit 42 arranged 2 mm or more away from each other. For instance, in a case where the radial thickness of the straight section 83 is larger than 2 mm, and each of the conductor groups 81 is made up of the two conductors 82 stacked in the radial direction, each of the protrusions 142 may be shaped to occupy a region ranging to half the thickness of the straight section 83 not contacting the yoke 141, i.e., the thickness of the conductor 82 located farther away from the yoke 141. In this case, the above beneficial advantages will be obtained by increasing the conductive sectional area of the conductor groups 81 as long as the radial thickness of the protrusions 142 is at least H1×3/2.

Modification 2 of the Fifth Embodiment

Figure 62:
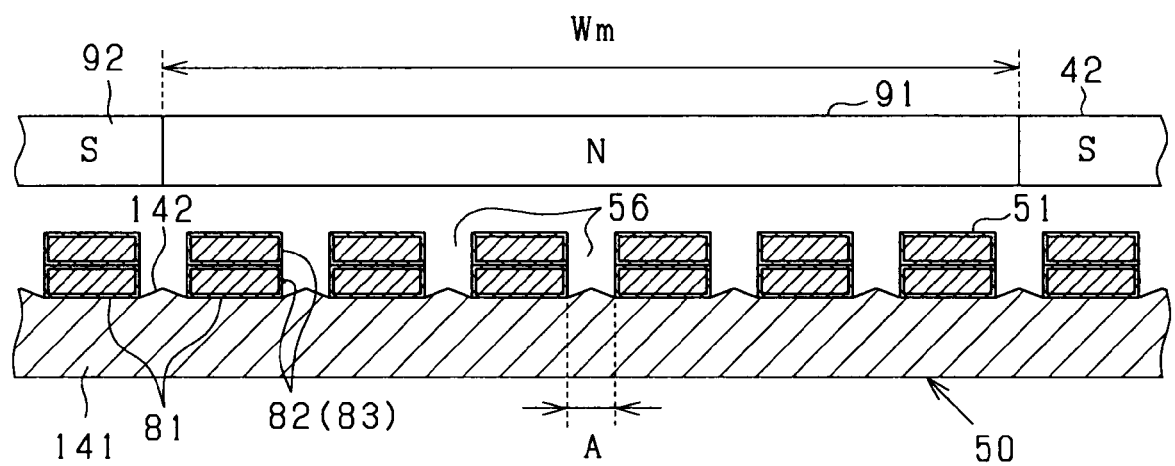
FIG. 62 is a longitudinal sectional view of a stator in a modification 2 of the fifth embodiment.

The stator core 52 may be designed to have the structure illustrated in FIG. 26. FIG. 62 omits the sealing members 57, but the sealing members 57 may be used. FIG. 26 illustrates the magnet unit 42 and the stator core 52 as being arranged linearly for the sake of simplicity.

In the structure of FIG. 62, the stator 50 has the protrusions 142 as winding-to-winding members each of which is arranged between a respective two of the conductors 82 (i.e., the straight sections 83) located adjacent each other in the circumferential direction. If a width of the protrusions 142 energized by excitation of the stator winding 51 in the circumferential direction within a portion of the magnet unit 42 equivalent to one of magnetic poles thereof is defined as Wt, the saturation magnetic flux density of the protrusions 412 is defined as Bs, a width of the magnet unit 42 equivalent to one of the magnetic poles of the magnet unit 42 in the circumferential direction of the magnet unit 42 is defined as Wm, and the remanent flux density in the magnet unit 42 is defined as Br, the protrusions 142 are made of a magnetic material meeting a relation of Wt×Bs≤Wm×Br . . . (1)

Specifically, the three-phase windings of the stator winding 51 in this embodiment are made in the form of distributed windings. In the stator winding 51, the number of the protrusions 142 for each pole of the magnet unit 42, that is, the number of the gaps 56 each between the adjacent conductor groups 81 is given by 3×m where m is the number of pairs of the conductors 82. In this case, when the three-phase windings of the stator winding 51 are excited in a given sequence, the protrusions 142 for two phases within each pole are magnetically excited. The width Wt of the protrusions 142 excited upon excitation of the stator winding 51 within a range of each pole of the magnet unit 42 is, therefore, given by 2×A×m where A is the width of each of the protrusions 142 (i.e., the gap 56) in the circumferential direction. The width Wt is determined in this way. The protrusions 142 of the stator core 52 are made from magnetic material satisfying the above equation (1). The width Wt is also equivalent to a dimension of a portion of the stator 50 where a relative magnetic permeability is higher than 1 within one magnetic pole in the circumferential direction.

In the case where the stator winding 51 is made in the form of the concentrated winding, the number of the protrusions 142 for one pole pair (i.e., two magnetic poles) of the magnet unit 42, in other words, the number of the gaps 56 between the conductor groups 81 for one pole pair is given by 3×m. When the three-phase windings of the stator winding 51 are excited in a given sequence, the protrusions 142 for one phase within one pole are magnetically energized. The circumferential width Wt of the protrusions 142 which are magnetically excited upon excitation of the stator winding in a range of each pole of the magnet unit 42 is, therefore, given by Wt=A×m. The width Wt is determined in this way. The protrusions 142 are made of magnetic material meeting the above equation (1).

Usually, a neodymium magnet, a samarium-cobalt magnet, or a ferrite magnet whose value of BH is higher than or equal to 20[MGOe (kJ/m^3)] has Bd=1.0 T or more. Iron has Br=2.0 T or more. The protrusions 142 of the stator core 52 may, therefore, be made of magnetic material meeting a relation of Wt<½×Wm for realizing a high-power motor.

Modification 3 of the Fifth Embodiment

Figure 63:
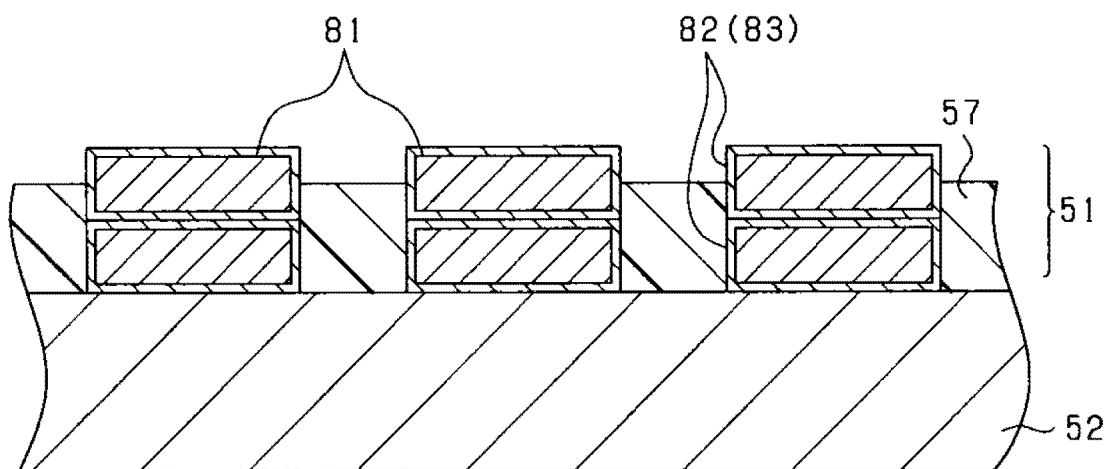
FIG. 63 is a sectional view of a stator in a modification 3 of the fifth embodiment.

The above embodiment has the sealing members 57 which cover the stator winding 51 and occupy a region including all of the conductor groups 81 radially outside the stator core 52, in other words, lie in a region where the thickness of the sealing members 57 is larger than that of the conductor groups 81 in the radial direction. This layout of the sealing members 57 may be changed. For instance, the sealing members 57 may be, as illustrated in FIG. 63, designed so that the conductors 82 protrude partially outside the sealing members 57. Specifically, the sealing members 57 are arranged so that portions of the conductors 82 that are radially outermost portions of the conductor groups 81 are exposed outside the sealing members 57 toward the stator 50. In this case, the thickness of the sealing members 57 in the radial direction may be identical with or smaller than that of the conductor groups 81.

The sealing members 57 are shaped to have the conductors 82 partially exposed outside the sealing members 57, so that the exposed portions of the conductors 82 are cooled by air. This enhances the dissipation of heat from the conductors 82.

The structure in FIG. 63 is not equipped with the protrusions 142, but may alternatively have them.

Modification 4 of the Fifth Embodiment

Figure 64:
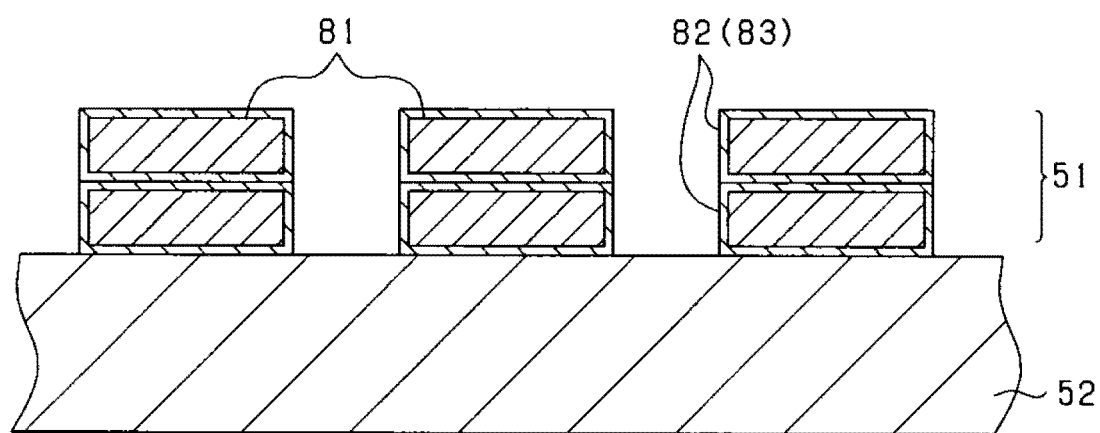
FIG. 64 is a sectional view of a stator in a modification 4 of the fifth embodiment.

The stator 50 may be, as illustrated in FIG. 64, designed not to have the sealing members 57 covering the conductor groups 81, i.e., the stator winding 51. In this case, a gap is created between the adjacent conductor groups 81 arranged in the circumferential direction without any tooth.

The structure in FIG. 64 is not equipped with the protrusions 142, but may alternatively have them.

Sixth Embodiment

Figure 65:
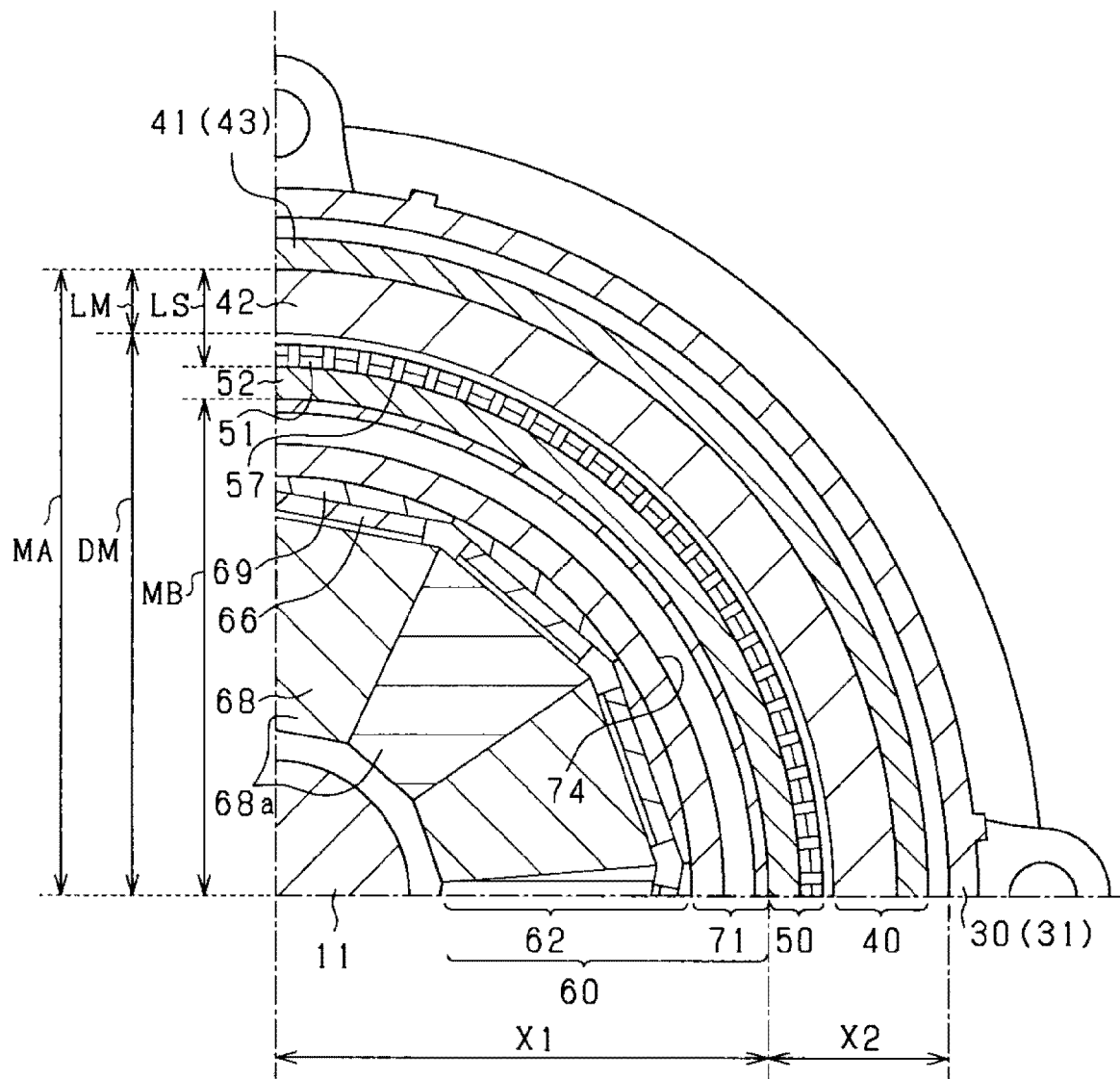
FIG. 65 is a partially enlarged longitudinal sectional view of a rotating electrical machine in the sixth embodiment.

In this embodiment shown in FIG. 65, the distance DM between a radially inner surface of the magnet unit 42 (i.e., the first and second magnets 91 and 92) and the axial center of the rotor 40 in the radial direction is selected to be 50 mm or more.

If a distance between a radially outer surface of the magnet unit 42 and a radially inner surface of the stator winding 51 in the radial direction is defined as LS, and a thickness of the magnet unit 42 in the radial direction is defined as LM, LM/LS is selected to be 0.6 or more and 1.0 or less.

If a first distance and a second distance are defined as MA and MB, respectively, MB/MA is selected to be 0.7 or more and 1.0 or less. The first distance MA is a distance between the axial center of the rotor 40 and the radially outer surface of the magnet unit 42. In other words, the first distance MA is a maximum value from the axial center of the rotor 40 in the radial direction in a magnetic circuit of the stator 50 and the rotor 40. The second distance MB is a distance between the axial center of the rotor 40 and the radially inner surface of the stator core 52. In other words, the second distance MB is a minimum value from the axial center of the rotor 40 in the radial direction in the magnetic circuit.

Figure 66:
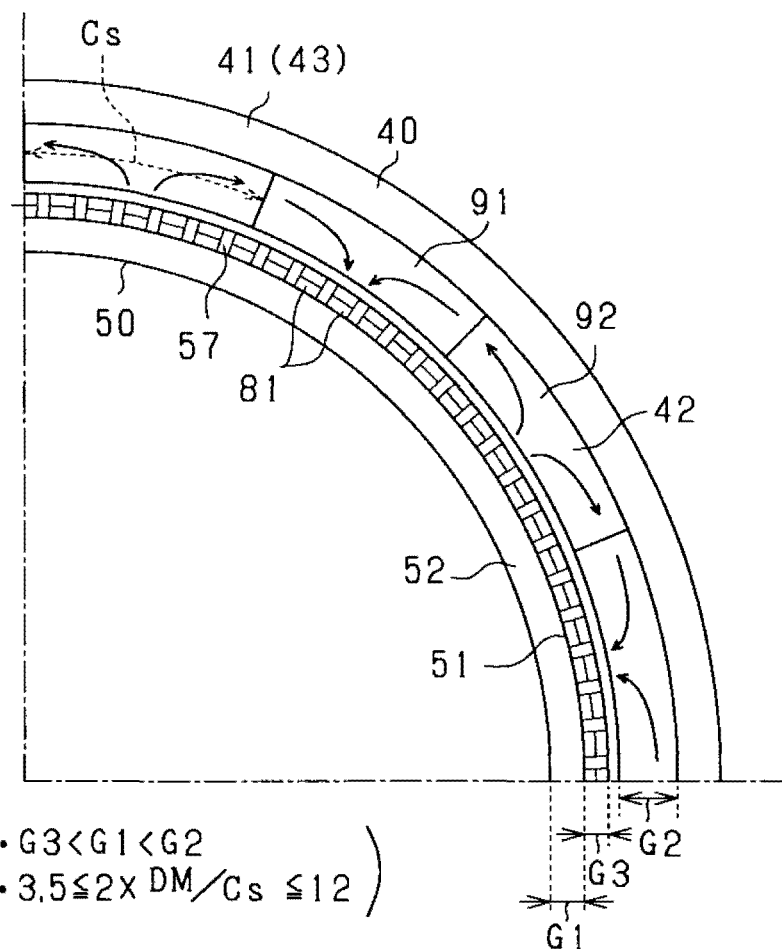
FIG. 66 is a partially enlarged transverse sectional view of a rotor and a stator.

If a length of a portion of the magnet unit 42 equivalent to one magnetic pole in the circumferential direction is, as illustrated in FIG. 66, defined as Cs, 2×DM/Cs is selected to be 3.5 or more and 12 or less.

The thickness G1 of the stator core 52 in the radial direction is, as illustrated in FIG. 66, selected to be smaller than the thickness G2 of the magnet unit 42 in the radial direction and greater than the thickness G3 of the stator winding 51 in the radial direction.

The above embodiment offers the following beneficial advantages.

The outer rotor structure of the rotating electrical machine 10 is designed to have LM/LS selected to be 0.6 or more and 1.0 or less. The greater the LM/LS, the grater the thickness of the magnet unit 42 in the radial direction, thereby resulting in an increase in magnetomotive force produced by the magnet unit 42. This results in an increase in magnetic flux density in the stator winding 51 to enhance the torque output of the rotating electrical machine 100. The greater LM/LS, the smaller the air gap between the magnet unit 42 and the stator winding 51, thereby resulting in a decrease in magnetic resistance in the magnetic circuit to increase the torque output. By selecting LM/LS to be 0.6 or more, a structure is established to be suitable for increasing the torque output.

MB/MA is selected to be 0.7 or more and 1.0 or less. The fact that MB/MA is great means that the magnetic circuit has a thickness decrease in the radial direction. The decreased thickness of the magnetic circuit in the radial direction means the magnetic path is shortened to decrease the magnetic resistance. The structure suitable for decreasing the magnetic resistance is, therefore, established by selecting MB/MA to be 0.7 or more. This enhance the torque output.

The outer rotor structure in which MB/MA is great means the casing 64 has formed therein a storage space for storage of the electrical components 62.

The thickness G1 of the stator core 52 in the radial direction is selected to be smaller than the thickness G2 of the magnet unit 42 in the radial direction and greater than the thickness G3 of the stator winding 51. This enables the stator core 52 to receive magnetic flux produced by the magnet unit 42 without any magnetic saturation and also eliminates a risk of leakage of magnetic flux from the stator 50.

The size of the stator winding 51 may be decreased relatively by meeting a relation of G3<G1<G2, which achieves LM/LS that is 0.6 or more.

Modification 1 of the Sixth Embodiment

Figure 67:
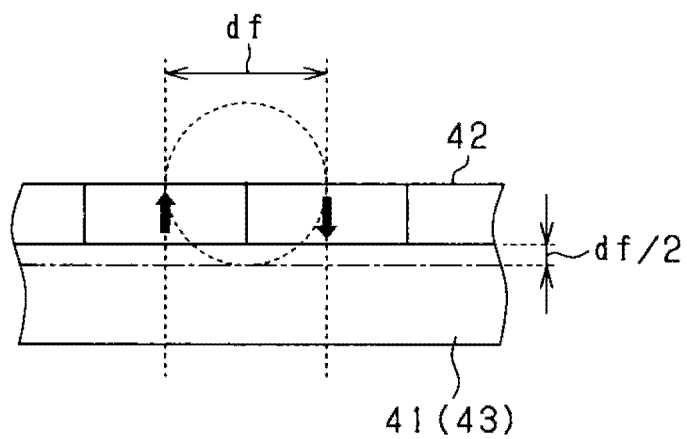
FIG. 67 is a view which indicates the definition of df.

The structure in the sixth embodiment may be used in the second embodiment. The second distance MB is selected to be the same value as in the fourth embodiment, while the first distance MA is set to a distance or an interval between a portion of the rotor body 41 which is located away from the radially outer surface of the magnet unit 42 by a distance df outward in the radial direction and the axial center of the rotor 40 in the radial direction. The reason why the first distance MA is defined as being away from the magnet unit 42 by the distance df is that in the Halbach array, the magnetic flux produced by the magnet unit 42 partially leaks toward the rotor body 41. The distance df is, as can be seen in FIG. 67, from the radially outer surface of the magnet unit 42 by half a distance between magnetic poles of the magnet unit 42 in the circumferential direction. FIG. 67 illustrates the magnet retainer 43 of the rotor body 41 and the magnet unit 42 as being developed linearly. The lower side in FIG. 67 is a side of the rotor 40. The upper side in FIG. 67 is a side of the stator 50. Arrows in FIG. 67 represent magnetic poles defined by the sum of magnetic fluxes produced by the first and second magnets 131 and 132.

Modification 2 of the Sixth Embodiment

Figure 68:
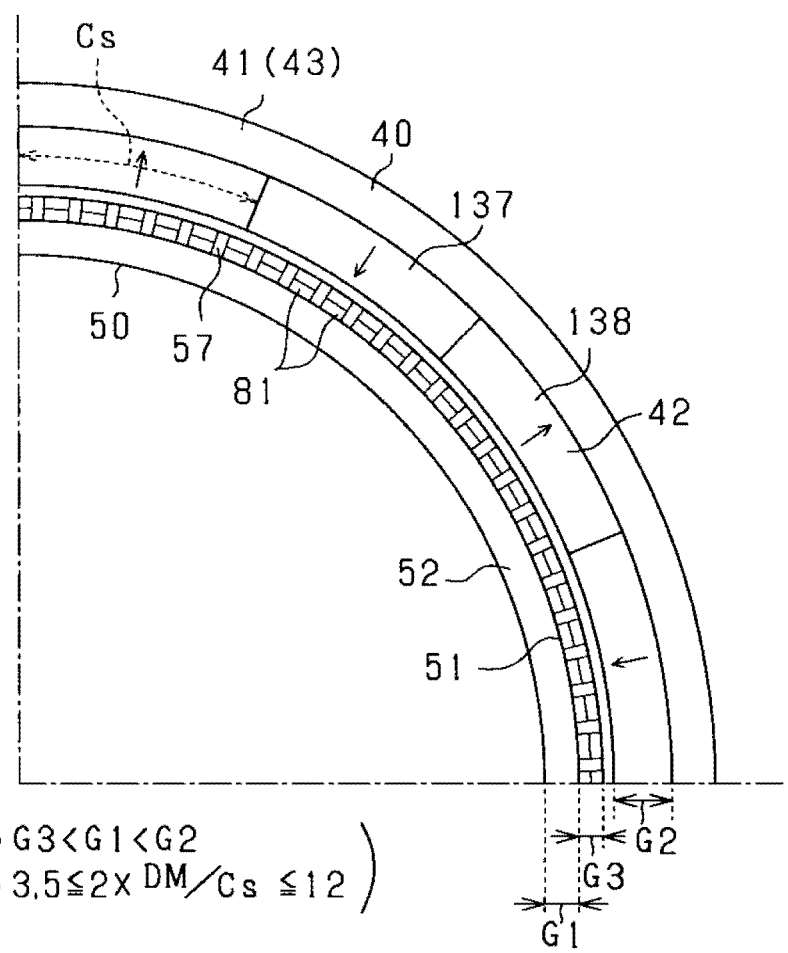
FIG. 68 is an enlarged transverse sectional view of a rotor and a stator in a modification 2 of the sixth embodiment.
Figure 69:
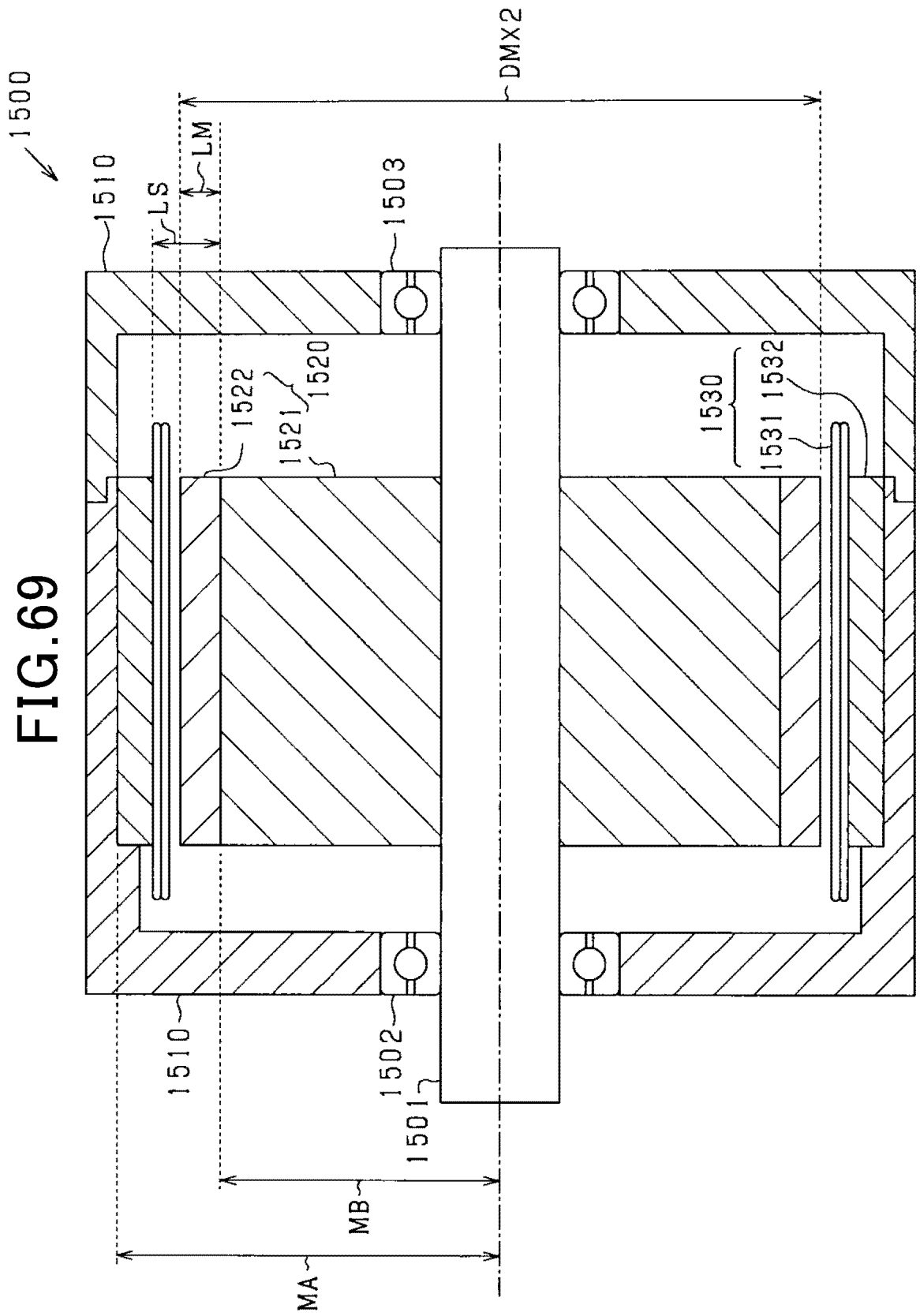
FIG. 69 is a longitudinal sectional view of a rotating electrical machine in a modification 3 of the sixth embodiment.

The magnet unit 42 may be, as illustrated in FIG. 68, magnetized in the radial direction. The magnet unit 42 includes the first magnets 137 whose magnetization direction is oriented inwardly in the radial direction and the second magnets 138 whose magnetization direction is oriented outwardly in the radial direction. The first and second distances MA and MB are the same as in the fourth embodiment.

Modification 3 of the Sixth Embodiment

The modification 3 will be described below in terms of differences between itself and the sixth embodiment with reference to the drawings. The rotating electrical machine in this embodiment is of the inner rotor structure (i.e., the inwardly rotating structure). FIG. 68 is a longitudinal sectional view along the rotating shaft 1501 of the rotating electrical machine 1500.

The rotating electrical machine 1500 is equipped with the rotating shaft 1501, two bearings 1502 and 1503, the housing 1510, the rotor 1520, and the stator 1530 which are arranged coaxially with the rotating shaft 1501.

The bearings 1502 and 1503 are disposed away from each other in the axial direction within the housing 1510. Each of the bearings 1502 and 1503 is implemented by, for example, a radial ball bearing. The bearings 1502 and 1503 retain the rotating shaft 1501 and the rotor 1520 to be rotatable.

The rotor 1520 includes the cylindrical rotor body 1521 and the annular magnet unit 1522 mounted radially outside the rotor body 1521. The magnet unit 1522 is made up of a plurality of magnets whose magnetic poles are arranged alternately in the circumferential direction. In this embodiment, the magnet unit 1522 has a structure similar to the polar anisotropic structure in the first embodiment.

The stator 1530 is located radially outside the rotor 1520. The stator 1530 includes the cylindrical stator winding 1531 and the stator core 1532 arranged radially outside the stator winding 1531. The stator core 1532 is of a circular ring shape and disposed radially inside the housing 1510. The stator core 1532 is secured to the housing 1510 using, for example, adhesive. The stator core 1532 may be designed, like in the first embodiment, to have a slot-less structure with no teeth.

The stator winding 1531 faces the annular magnet unit 1522 through a given air gap. The stator winding 1531 is made of a three-phase winding in the form of a full-pitch distributed winding, but however, may alternatively be made of another type of winding. Conductors of the stator winding 331 are, like in the first embodiment, of a flattened shape. Each of the conductors of the stator winding 1531 is, like in the first embodiment, made of an aggregation of a plurality of twisted wires.

For instance, the housing 1510 has inverter units disposed radially inside the rotor 1520.

The rotating electrical machine 1500 in this embodiment is of the inner rotor structure. The second distance MB is, therefore, a distance between the axial center of the rotor 1520 and a radially inner surface of the stator core 1532 in the radial direction. The rotating electrical machine 1500 uses polar anisotropic permanent magnets, so that the first distance MA is a distance between the axial center of the rotor 1520 and a radially outer surface of the stator core 1532 in the radial direction.

Modification 4 of the Sixth Embodiment

Figure 70:
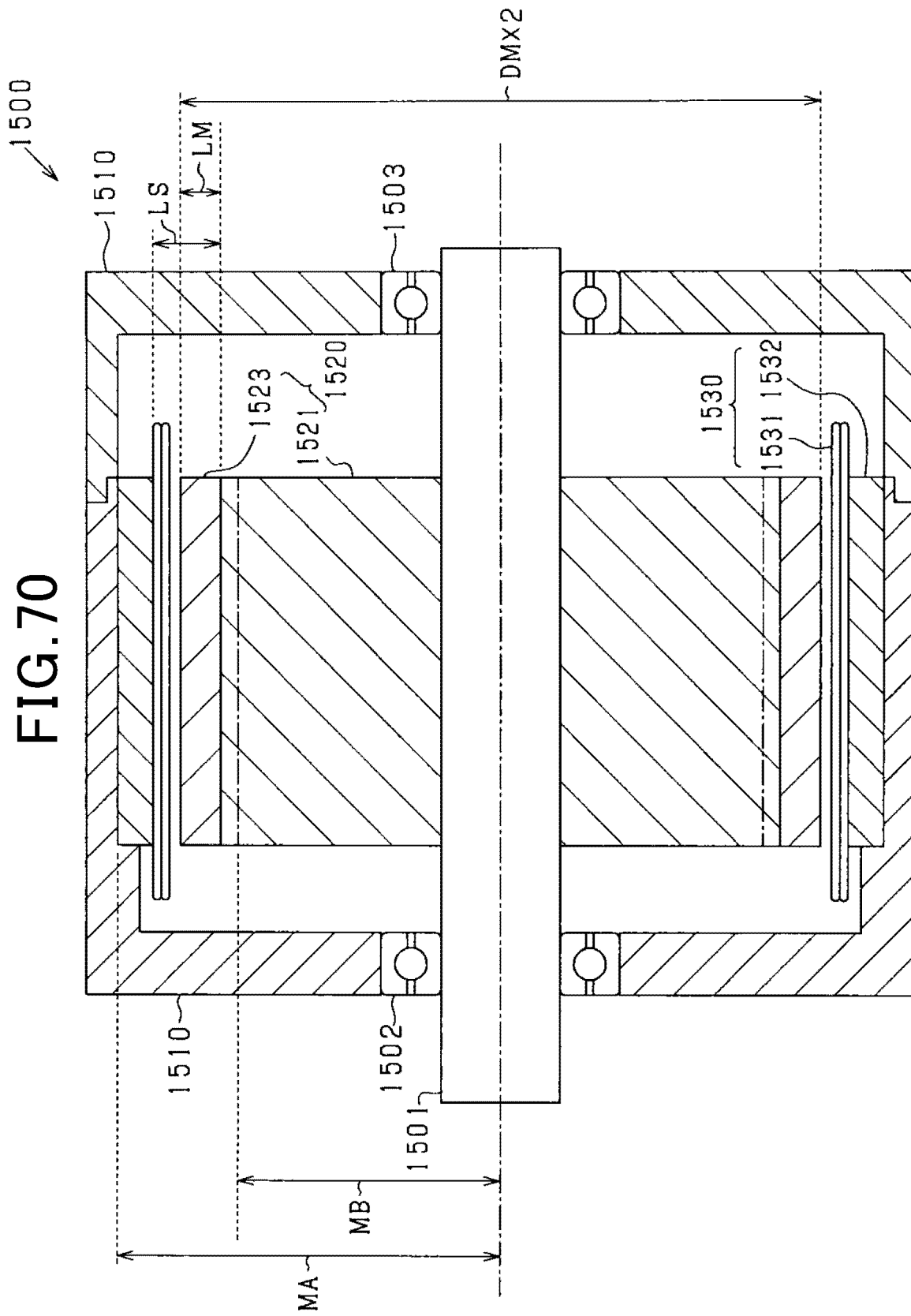
FIG. 70 is a longitudinal sectional view of a rotating electrical machine in a modification 4 of the sixth embodiment.

The magnet unit 1523 may alternatively be, as illustrated in FIG. 70, designed to include permanent magnets arranged in the Halbach array used in the second embodiment or magnets used in the modifications of the second embodiment. In this case, the second distance MB is the same as in the fourth embodiment. The first distance MA is selected to be a distance or an interval between a place located radially inwardly away from the radially inner surface of the stator core 1532 by df/2 and the axial center of the rotor 1520 in the radial direction.

Modification 5 of the Sixth Embodiment

Figure 71:
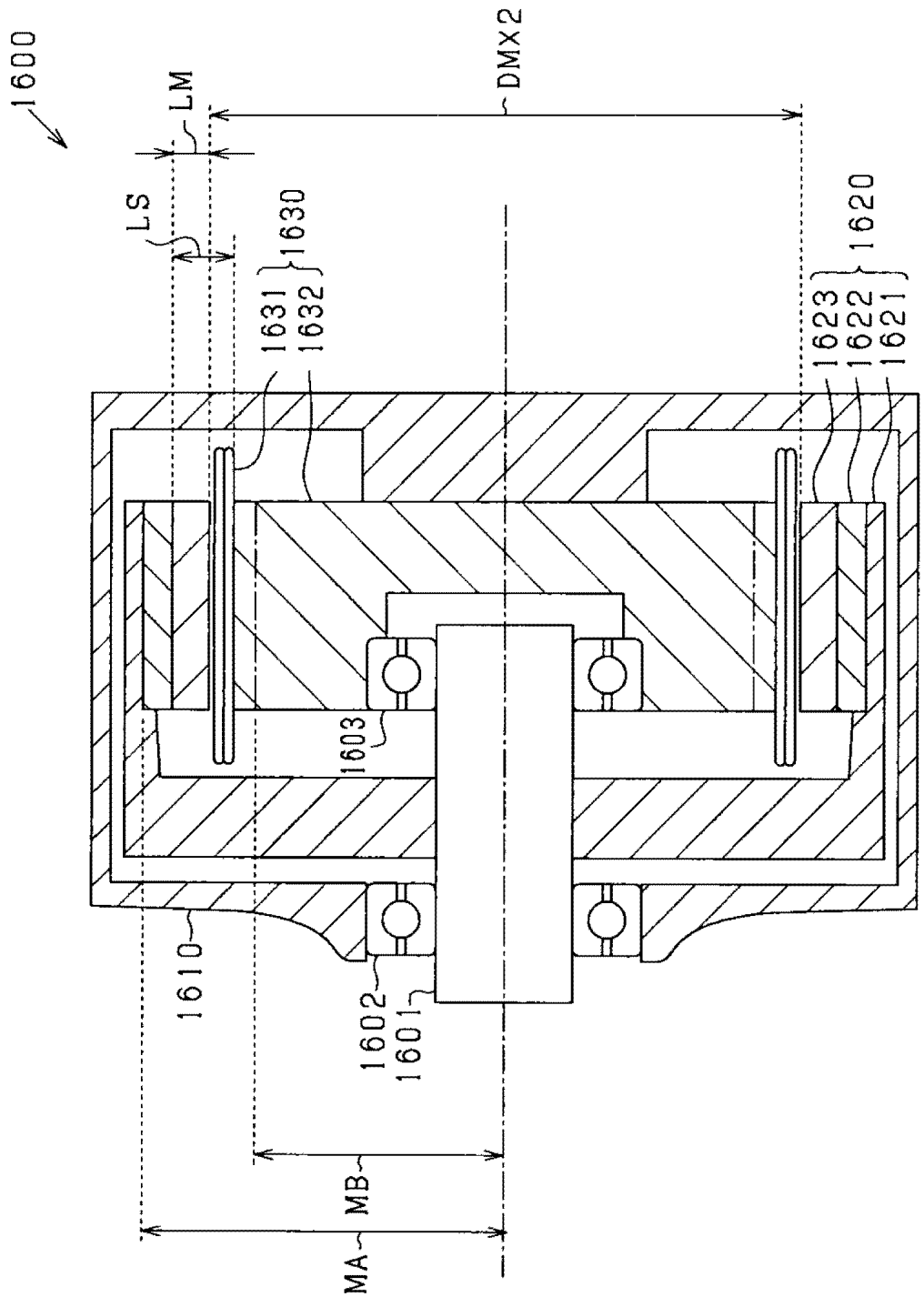
FIG. 71 is a longitudinal sectional view of a rotating electrical machine in a modification 5 of the sixth embodiment.

The modification 5 will be described below in terms of differences between itself and the first embodiment. A rotating electrical machine in this embodiment is, as illustrated in FIG. 71, of the outer rotor structure different to that in the first embodiment. FIG. 71 is a longitudinal sectional view along the rotating shaft 1601 of the rotating electrical machine 1600.

The rotating electrical machine 1600 is equipped with the rotating shaft 1601, two bearings 1602 and 1603, the housing 1610, the rotor 1620, and the stator 1630 which are arranged coaxially with the rotating shaft 1601. The bearings 1602 and 1603 are disposed away from each other in the axial direction within the housing 1610. The bearings 1602 and 1603 retain the rotating shaft 1601 and the rotor 1620 to be rotatable.

The rotor 1620 includes the hollow cylindrical rotor body 1621, the annular rotor core 1622 mounted radially inside the rotor body 1621, and the annular magnet unit 1623 arranged radially inside the rotor core 1622. The magnet unit 1623 is made up of a plurality of magnets whose magnetic poles are arranged alternately in the circumferential direction.

The stator 1630 is located radially inside the rotor 1620. The stator 1630 includes the cylindrical stator winding 1631 and the stator core 1632 arranged radially inside the stator winding 1631. The stator core 1632 is designed, like in the first embodiment, to have a slot-less structure with no teeth.

The stator winding 1631 faces the annular magnet unit 1623 through a given air gap. Conductors of the stator winding 1231 are, like in the first embodiment, of a flattened shape. Each of the conductors of the stator winding 1631 is, like in the first embodiment, made of an aggregation of a plurality of twisted wires.

The stator core 1632 in this embodiment is different in shape from the stator core 52 in the first embodiment. The first embodiment uses the outer peripheral surface of stator core 52 as the basis for determining the second distance MB, but however, it is infeasible in this embodiment. The basis for the second distance MB in the stator core 1632 may, therefore, be determined using simulations.

Other Embodiments

The above embodiments may be modified in the following ways.

The stator 50 may be designed not to have the stator core 52. Specifically, the stator 50 may be made of the stator winding 51 shown in FIG. 12. The stator winding 51 of the stator 50 may be covered with a sealing member. The stator 50 may alternatively be designed to have an annular winding retainer made from non-magnetic material, such as synthetic resin, instead of the stator core 52 made from soft magnetic material.

In the above embodiments, the rotating shaft 11 is designed to extend outside the ends of length of the rotating electrical machine 10, but however, may alternatively be designed to protrude outside only one of the ends of the rotating electrical machine 10. In this case, it is advisable that a portion of the rotating shaft 11 which is retained by the bearing unit 20 in the cantilever form be located on one of the ends of the rotating electrical machine, and that the rotating shaft 11 be arranged to extend outside such an end of the rotating electrical machine. This structure has the rotating shaft 11 not protruding inside the inverter unit 60, thus enabling a wide inner space of the inverter unit 60, i.e., the cylinder 71 to be used.

Bearings may be mounted on both axial ends of the rotor 40 for retaining the rotating shaft 11 to be rotatable. For example, the structure of FIG. 1 may have bearings mounted on or opposite sides of the inverter unit 60 in the axial direction.

The conductor body 82*a* of each of the conductors 82 of the stator winding 51 in the above embodiments is made of a collection of the wires 86, however, may alternatively be formed using a square conductor having a rectangular cross section. The conductor 82 may alternatively be made using a circular or rounded conductor having a circular cross section or an oval cross section.

The stator winding 51 in the above embodiments has the straight sections 83 which are arranged on the same pitch circle defined about the center of the rotating shaft 11 and joined together by the turns 84 equipped with the interference avoiding portions. Such a structure may be modified. For instance, the stator winding 51 may alternatively be designed to have the straight sections 83 which are located at different pitch circles defined about the center of the rotating shaft 11 and joined together by the turns 84. In either case, each of the turns 84 needs to have a portion extending in the radial direction to form an interference avoiding portion which avoids physical interference with another turn 84.

The interference between the radially overlapping conductors 82 of each of the conductor groups 82 of the stator winding 51 may alternatively be avoided by orienting portions of the turns 84 located at the $n^{th}$ layer position and the $(n+1)^{th}$ layer position in opposite directions or placing portions of the turns 84 located at the $n^{th}$ layer position and the $(n+1)^{th}$ layer position at different locations.

The stator winding 51 may be designed to have the conductors 82 each of which is made of a single straight section 83. Each of the conductors 82 may alternatively be made of three or more straight sections 83 (e.g., three, four, five, or six straight sections 83) stacked in a multi-layer form in the radial direction of the stator winding 51.

The structure of the above embodiments has the inverter unit 60 arranged radially inside the stator 50, but however, may alternatively be designed not to have the inverter 60 disposed inside the stator 50. This enables the stator 50 to have a radial inner void space in which parts other than the inverter unit 60 may be mounted.

For instance, a voltage converter, such as a transducer, may be disposed in the inner void space of the stator 50. The voltage converter may be engineered to excite the stator winding 51 at a high frequency to perform voltage conversion without any copper loss. This, however, creates an electromagnetic chair or seat. The stator 50, the rotor 40, and the housing 30, however, work to prevent it from leaking to the outside.

For instance, a speed reduction mechanism (i.e., a power transmission mechanism), such as a set of gears, may be disposed in the inner void space of the stator 50. The power transmission mechanism sometimes generates frictional heat more than 100° C., however, it may be arranged in the first region X1 (i.e., an inside region) which has a high thermal capacity, so that it is sufficiently cooled by the coolant path 74. The dissipation of the heat may also be enhanced by additionally using oil cooling.

The rotating electrical machine 10 may be designed not to have the housing 30. In this case, the rotor 40 or the stator 50 may be retained by a wheel or another part of a vehicle.

In the above embodiments, the rotor 40 is implemented by a surface permanent magnet (SPM) rotor, but however, may alternatively made of an interior permanent magnet (IPM) rotor.

In the above embodiments, the rotating shaft 11 is retained by the two bearings 21 and 22, but however, may be held by three or more bearings.

The type of the bearings 21 and 22 used in the above embodiments may be changed as needed. The bearings 21 and 22 may be each implemented by not only a radial ball bearing, but also a rolling bearing or a plain bearing.

The rotor body 41 in the above embodiments has an opening facing away from the bearings 21 and 22 in the axial direction, but may alternatively be designed to have a closed end.

The intermediate portion 45 or the housing 30 may have an air vent hole extending therethrough in the axial direction in order to create a flow of air to facilitate dissipation of heat.

The conductor body 82a of each of the conductors 82 of the stator winding 51 may be made of a conductive material, such as copper, aluminum, or copper alloy.

The wire referred to in the first embodiment may alternatively be made of copper or aluminum.

The stator 50 in the above embodiments is of the slot-less structure, but however, may be engineered to have slots.

The rotating electrical machine will additionally be described below.

Figure 72:
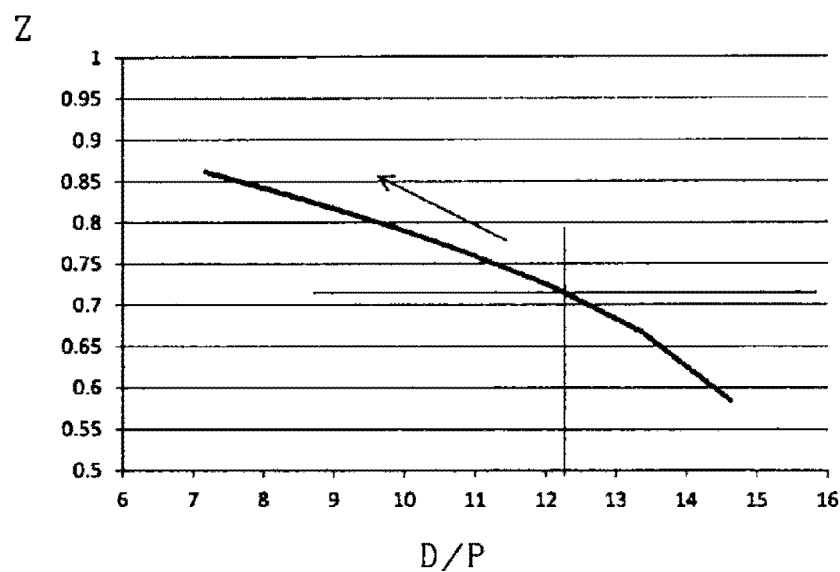
FIG. 72 is an explanatory view of a rotating electrical machine.
Figure 73:
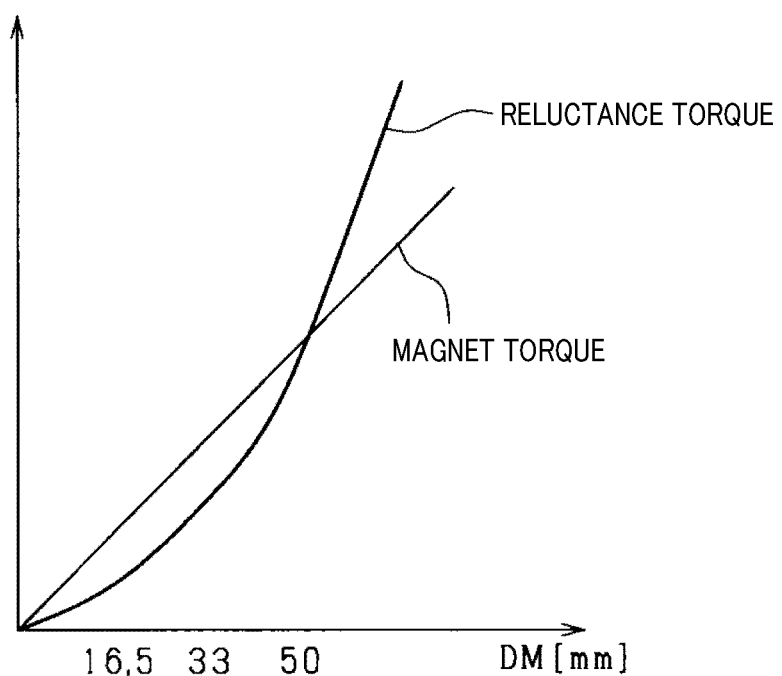
FIG. 73 is a view which illustrates a relation among reluctance torque, magnet torque, and distance DM.
Figure 74:
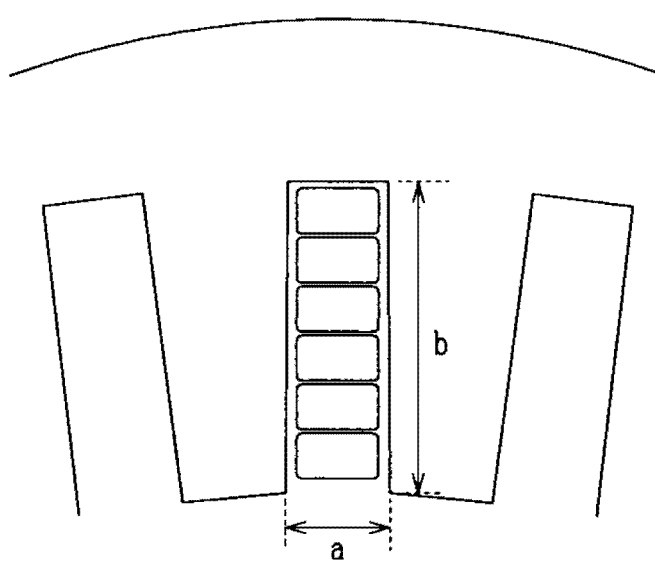
FIG. 74 is a view which illustrates teeth.

If a diameter of an imaginary circle defined to pass through the radial center of an air gap between the rotor 40 and the stator 50 is defined as D, and the number of poles in the rotating electrical machine is defined as P, the inner diameter of the stator 50 is selected to meet a condition where D/P is less than 12.2. FIG. 72 represents space created inside conductors wound in the stator 50, i.e., the diameter d×Z (1 or less) where the conductors wound in the stator 50 of the rotating electrical machine are engineered to lie in a range of 20[A/mm^2] to 40[A/mm^2] which is usually set as a maximum electrical current in typical rotating electrical machines. By selecting D/P to be 12.2 or less, the wide inner space is provided with the reliability of conventional technology being kept as it is.

While this disclosure has been discussed in terms of the preferred embodiments in order to facilitate better understanding thereof, it should be appreciated that the invention can be embodied in various ways without departing from the principle of the invention. Therefore, this disclosure should be understood to include all possible embodiments and modifications to the shown embodiments which can be embodied without departing from the principle of this disclosure as set forth in the appended claims.

What is claimed is:
1. A rotating electrical machine comprising:
a rotor which includes a magnet unit and is retained to be rotatable; and
a stator which is equipped with a stator winding made up of a plurality of phase windings, the stator being arranged coaxially with the rotor,
wherein the stator winding includes magnet facing portions which overlap the magnet unit in an axial direction and turns each of which joints a first one and a second one of the magnet facing portions used for the same phase together axially outside the magnet unit, the first and second ones of the magnet facing portions being away from each other with a given number of the magnet facing portions interposed therebetween,
wherein the first and second ones of the magnet facing portions which are used for the same phase and joined together by one of the turns are arranged on the same pitch circle defined about a center of the rotor, and
wherein if an arrangement pitch that is an interval between centers of the circumferentially adjacent magnet facing portions arranged on the same pitch circle in the circumferential direction is defined as Ps, a diameter of the same pitch circle is defined as Ds, and Ds/Ps is expressed by τ, a relation of 24<τ<34 is met.

2. The rotating electrical machine as set forth in claim 1, wherein there of no tooth made from soft magnetic material between the circumferentially adjacent magnet facing portions.

3. The rotating electrical machine as set forth in claim 1, wherein the stator includes a stator core, the stator core being located on an opposite side of the stator winding to the rotor in a radial direction, wherein the stator core includes a yoke located on the opposite side of the stator winding to the rotor in the radial direction and protrusions which protrude from the yoke toward an interval between the circumferentially adjacent magnet facing portions, and wherein a thickness of each of the protrusions from the yoke in the radial direction is smaller than half a thickness of the magnet facing portion in the radial direction.

4. The rotating electrical machine as set forth in claim 3, wherein the magnet facing portions are arranged at a given interval away from each other in a circumferential direction of the stator winding and stacked in a multi-layer form in a radial direction of the stator winding, and wherein a thickness of each of the protrusions from the yoke in the radial direction is smaller than half a thickness of one of the magnet facing portions which is arranged adjacent the yoke in the radial direction.

5. The rotating electrical machine as set forth in claim 4, wherein the protrusions engage the magnet facing portions in a circumferential direction.

6. The rotating electrical machine as set forth in claim 3, wherein one of the phase windings for the same phase is made of a plurality of conductors connected electrically together, each of the conductors including the magnet facing portions and turns, wherein the stator core has more protrusions than the conductors, and wherein each of the protrusions is arranged at a location on the stator which corresponds to a location of one of the conductors.

7. A rotating electrical machine comprising:
a rotor which includes a magnet unit and is retained to be rotatable; and
a stator which is equipped with a stator winding made up of a plurality of phase windings, the stator being arranged coaxially with the rotor,
wherein the stator winding includes magnet facing portions which overlap the magnet unit in an axial direction and turns each of which joints a first one and a second one of the magnet facing portions used for the same phase together axially outside the magnet unit, the first and second ones of the magnet facing portions being away from each other with a given number of the magnet facing portions interposed therebetween,
wherein the first and second ones of the magnet facing portions which are used for the same phase and joined together by one of the turns are arranged on the same pitch circle defined about a center of the rotor,
wherein the magnet unit includes a plurality of magnets which are disposed on a surface of the rotor which faces the stator and have magnetic poles arrayed alternately in a circumferential direction,
wherein winding-to-winding members are each disposed between the magnetic facing portions arranged adjacent each other in the circumferential direction,
wherein if a width of the winding-to-winding members energized by excitation of the stator winding in the circumferential direction within a portion of the magnet unit equivalent to one of magnetic poles thereof is defined as Wt, a saturation magnetic flux density of the winding-to-winding members is defined as Bs, a width of the magnet unit equivalent to one of the magnetic poles in the circumferential direction of the magnet unit is defined as Wm, and the remanent flux density in the magnet unit is defined as Br, the winding-to-winding members are made of magnetic material meeting a relation of Wt×Bs≤Wm×Br or non-magnetic material, and
wherein if an arrangement pitch that is an interval between centers of the circumferentially adjacent magnet facing portions arranged on said same pitch circle in the circumferential direction is defined as Ps, a diameter of the same pitch circle is defined as Ds, and Ds/Ps is expressed by τ, a relation of 24<τ<34 is met.

8. The rotating electrical machine as set forth in claim 7, wherein the stator includes a stator core, the stator core being located on an opposite side of the stator winding to the rotor in a radial direction.

9. The rotating electrical machine as set forth in claim 7, wherein the stator winding is made of a conductor having a flattened cross section whose thickness in a radial direction is smaller than a width thereof in a circumferential direction.

10. The rotating electrical machine as set forth in claim 7, wherein the conductor used in the stator winding includes a conductor body made of an aggregation of twisted wires.

11. The rotating electrical machine as set forth in claim 10, wherein at least two of the wires which are arranged adjacent each other are electrically insulated from each other.

12. The rotating electrical machine as set forth in claim 10, wherein an electrical resistance to flow of electrical current between the adjacent wires is higher than an electrical resistance of each of the wires to flow of electrical current through itself.

13. The rotating electrical machine as set forth in claim 7, wherein the turns are secured to at least axially opposed ends of the stator.

14. The rotating electrical machine as set forth in claim 7, wherein each of the turns has a sectional area greater than that of the magnet facing portions.

15. The rotating electrical machine as set forth in claim 7, wherein the number of pole pairs of the rotor is twelve or more.

* * * * *